United States Patent
Cherniaeva et al.

(10) Patent No.: US 12,534,525 B2
(45) Date of Patent: Jan. 27, 2026

(54) AQUEOUS PHARMACEUTICAL COMPOSITION OF AN ANTI-IL17A ANTIBODY AND USE THEREOF

(71) Applicant: JOINT STOCK COMPANY "BIOCAD", Saint Petersburg (RU)

(72) Inventors: Ekaterina Valerevna Cherniaeva, Moscow (RU); Ekaterina Aleksandrovna Lomkova, Saint Petersburg (RU); Antonina Vasilevna Artemeva, Saint-Petersburg (RU); Anna Viktorovna Eremeeva, Saint-Petersburg (RU); Roman Alekseevich Ivanov, Moscow (RU); Anastasiya Mikhajlovna Ryakhovskaya, Saint-Petersburg (RU); Viktoriia Olegovna Shitikova, Saint-Petersburg (RU); Aleksandr Olegovich Iakovlev, Moscow (RU); Dmitry Valentinovich Morozov, Saint-Petersburg (RU)

(*) Notice: Subject to any disclaimer, the term of this patent is extended or adjusted under 35 U.S.C. 154(b) by 998 days.

(21) Appl. No.: 17/599,380

(22) PCT Filed: Apr. 2, 2020

(86) PCT No.: PCT/RU2020/050065
§ 371 (c)(1),
(2) Date: Sep. 28, 2021

(87) PCT Pub. No.: WO2020/204765
PCT Pub. Date: Oct. 8, 2020

(65) Prior Publication Data
US 2022/0372127 A1    Nov. 24, 2022

(30) Foreign Application Priority Data
Apr. 2, 2019   (RU) .......................... RU2019109641

(51) Int. Cl.
| A61K 47/26 | (2006.01) |
| A61K 47/10 | (2017.01) |
| A61K 47/12 | (2006.01) |
| A61K 47/22 | (2006.01) |
| A61P 19/02 | (2006.01) |
| C07K 16/24 | (2006.01) |

(52) U.S. Cl.
CPC ............ *C07K 16/244* (2013.01); *A61K 47/10* (2013.01); *A61K 47/12* (2013.01); *A61K 47/22* (2013.01); *A61K 47/26* (2013.01); *A61P 19/02* (2018.01); *C07K 2317/24* (2013.01); *C07K 2317/565* (2013.01)

(58) Field of Classification Search
CPC ........ A61K 19/02; A61K 47/10; A61K 47/12; A61K 47/22; A61K 47/26
See application file for complete search history.

(56) References Cited

U.S. PATENT DOCUMENTS

| 2009/0202979 A1 | 8/2009 | Baty et al. |
| 2011/0028348 A1 | 2/2011 | Barthelemy et al. |
| 2017/0081401 A1 | 3/2017 | Ultin et al. |
| 2017/0368174 A1 | 12/2017 | Joerg et al. |
| 2018/0008707 A1* | 1/2018 | Bussemer ............... A61P 29/00 |

FOREIGN PATENT DOCUMENTS

| CN | 106795219 A1 | 5/2017 | |
| CN | 107001458 A1 | 8/2017 | |
| CN | 107249637 A1 | 10/2017 | |
| EP | 3130604 A1 | 2/2017 | |
| EP | 3199550 A1 | 8/2017 | |
| JP | 2017-508463 A | 3/2017 | |
| JP | 2017-538656 A | 12/2017 | |
| JP | 2018-502910 A | 2/2018 | |
| RU | 2356579 C1 | 5/2009 | |
| RU | 2609627 C2 | 2/2017 | |
| RU | 2665966 C2 | 9/2018 | |
| RU | 2017131618 A | 3/2019 | |
| WO | WO 98/56418 * | 12/1998 | ........... A61K 39/395 |
| WO | 2004/001007 A2 | 12/2003 | |
| WO | 2006/096491 A1 | 9/2006 | |
| WO | 2009/068630 A1 | 6/2009 | |
| WO | WO-2016048188 A1 * | 3/2016 | ........... A61K 39/395 |
| WO | 2016/103093 A1 | 6/2016 | |
| WO | 2016/103153 A1 | 6/2016 | |
| WO | 2016/128564 A1 | 8/2016 | |

OTHER PUBLICATIONS

Corresponding Japanese application No. 2021-559026 Decision of Refusal dated Jul. 11, 2024. (machine translation provided).
Corresponding Canadian application No. 3,135,357 Office Action dated Feb. 12, 2024.
Corresponding Chinese application No. 201911221194.7 Office Action dated Feb. 3, 2023.(machine translation provided).

(Continued)

*Primary Examiner* — Nelson B Moseley, II
*Assistant Examiner* — Dennis J Sullivan
(74) *Attorney, Agent, or Firm* — Anglehart et al.

(57) ABSTRACT

The present disclosure relates to aqueous compositions for anti-IL17a antibodies, and more particularly to aqueous compositions for anti-IL17a antibodies with a VHH variable domain and a VL variable domain, and can be used as a medicinal agent for treating IL-17A-mediated diseases.

23 Claims, 25 Drawing Sheets
Specification includes a Sequence Listing.

(56) References Cited

OTHER PUBLICATIONS

Corresponding Chinese application No. 201911221194.7 Office Action dated Nov. 29, 2023.(machine translation provided).
Corresponding Chinese application No. 201911221194.7 Office Action dated Mar. 28, 2024. (machine translation provided).
Corresponding Chinese application No. 201911221194.7 Notice of allowance dated Jul. 8, 2024. (machine translation provided).
Corresponding European application No. 20783664.4 extended European search report dated Oct. 17, 2023.
Zheng Songyan et al., Investigating the Degradation Behaviors of a Therapeutic Monoclonal Antibody Associated with pH and Buffer Species. AAPS PharmSciTech, vol. 18, pp. 42-48 (2017). Published: Sep. 4, 2015.
Katz J.S. et al., Dynamic Properties of Novel Excipient Suggest Mechanism for Improved Performance in Liquid Stabilization of Protein Biologics. Mol Pharm. Jan. 7, 2019;16(1): 282-291.
"Clinical Trial NCT02763111 (clinicaltrial.org): ""Clinical Trial to Evaluate Efficacy and Safety of Multiple Subcutaneous Injections of Various Doses of BCD-085 in Patients With Active Ankylosing Spondylitis"" May 5, 2016 url: https://clinicaltrials.gov/ct2/show/NCT02763111?term=02763111&draw=2&rank=1".
Corresponding European application No. 20783664.4 partial supplementary European search report dated Dec. 13, 2022.
Wang et al., Antibody Structure, Instability, and Formulation. Journal of Pharmaceutical Sciences. vol. 96, Issue 1, Jan. 2007, pp. 1-26.
Cavan Kalonia et al., Effects of Protein Conformation, Apparent Solubility, and Protein-Protein Interactions on the Rates and Mechanisms of Aggregation for an IgG1Monoclonal Antibody . . . Phys. Chem. B 2016, 120, 29, 7062-7075. Publication Date:Jul. 5, 2016.
Kang et al., Rapid Formulation Development for Monoclonal Antibodies. Bioprocess International, Informa Life Sciences Group, US, vol. 14, No. 4. Apr. 12, 2016, pp. 40, 42, 44, 46. Retrieved Jun. 19, 2023 from internet: https://bioprocessintl.com/2016/rapid-formulation-development-for-monoclonal-antibodies/.
Biocad. Clinical Trial to Evaluate Efficacy and Safety of Multiple Subcutaneous Injections of Various Doses of BCD-085 in Patients With Active Ankylosing Spondylitis. May 5, 2016. Retrieved Jun. 19, 2023 from the Internet:https://clinicaltrials.gov/ct2/show/NCT02763111?term=BCD-085&draw=2&rank=7.
Samtsov A.V. et al., Efficacy and Safety of BCD-085, a Novel Interleukin-17 Inhibitor. Results of Phase II Clinical Trial in Patients with Moderate-to-Severe Plaque Psoriasis. Vestnik Dermatologii I Venerologii, vol. 3, No. 5, Oct. 4, 2017, pp. 52-63.
Corresponding Japanese application No. 2021-559026 examination report dated Dec. 18, 2023. (machine translation provided).
International application No. PCT/RU2020/050065 International Search Report dated Jul. 16, 2020.
International application No. PCT/RU2020/050065 Written Opinion of the International Searching Authority dated Jul. 16, 2020.
BIOCAD: Interleukin-17 Inhibitor Shows High Efficacy After One Year of Therapy in Psoriasis Patients // BIOCAD News, Oct. 4, 2018 (Electronic source: https://biocad.ru/post/bervyj_rossijskij_ingibitor_interlejkina_17_demonstriruet_vysokuyu_effektivnost_po_rezul_tatam_odnogo_goda_terapii_pacientov_s_psoriazom), p. 1.
Vincke at al. General Strategy to Humanize a Camelid Single-domain Antibody and Identification of a Universal Humanized Nanobody Scaffold. The Journal of Biological Chemistry, vol. 284, Issue 5, p. 3273-3284. Jan. 2009.
Hermeling et al., Structure-Immunogenicity Relationships of Therapeutic Proteins. Pharmaceutical Research vol. 21, pp. 897-903 (2004).
Langer, New Methods of Drug Delivery. 1990, Science, 249: 1527-1533.

* cited by examiner

AQUEOUS PHARMACEUTICAL COMPOSITION OF AN ANTI-IL17A ANTIBODY AND USE THEREOF

TECHNICAL FIELD

The present disclosure relates to aqueous compositions for anti-IL17a antibodies, and more particularly to aqueous compositions for anti-IL17a antibodies with a $V_{HH}$ variable domain and a $V_L$ variable domain, and can be used as a medicinal agent for treating IL-17A-mediated diseases.

BACKGROUND

Antibodies, also referred to as immunoglobulins (Ig), are soluble blood or interstitial fluid glycoproteins that play a key role in humoral immunity of the Vertebrata. Antibodies are produced by B-cells in response to the foreign biological and chemical substances (antigens) of various structures. Due to high specificity and high affinity to the antigen, and the ability of producing antibodies against the unlimited antigen repertoire, antibodies and their derivatives are one of the most important reagents to be used in both fundamental and applied medical research.

Classical antibodies are represented by large multimeric proteins (IgG ~150 KDa) which comprise two identical heavy H-chains (one variable VH domain, three constant domains CH1, CH2 and CH3, and a hinged domain between CH1 and CH2) and two identical light L-chains (comprising of the variable domain VL and constant domain CL). A four-chain molecule has non-covalent and covalent (disulfide) bonds connecting the chains. Papain protease can be used to break down an antibody molecule into two fragments: Fab (Fragment antigen binding) and Fc (Fragment crystallizable).

Therefore, one region of the molecule (Fab) defines its antigen-related specificity, and another region (Fc) exercises the effector functions targeted to antigen elimination. CH1 and CH2 domains of H-chain are spaced by a hinge region that assures the mobility of Fab-region and the interaction of IgG molecule with Ig effector receptors exposed on the cells. CH2 domain contains the regions binding with Fcγ receptors that mediate the cell activation (ADCC and ADCP) and with complement system molecules (CDC). In addition, this domain contains the site that is an attach point for carbohydrates for all immunoglobulin isotypes. CH3-domain pretty much determines the stability of IgG dimer and interacts with FcRn-receptor on the cell surface establishing the pharmacokinetic properties of antibodies as well as their metabolism and distribution in the body. The combination of complementarity determining regions (CDR) of the variable domain of the heavy chain (VH) and the variable domain of the light chain (VL) forms an antigen-binding fragment, while the framework regions of the variable domains and the constant domains are not directly involved in antigen recognition. A minimized Fab-derivative for classical antibodies is a single-chain construct in which variable domains of the heavy and light chains are connected with a linker sequence (scFv).

Finding significant amounts of specific non-classical antibodies of simplified structure in the blood of Camelidae animals (camels, llamas, vicunas) was a valuable discovery. Such antibodies (heavy chain antibody, HCAb) consist of a dimeric single shortened heavy chain (without CH1 domain) with no light chain at all. Antigen-binding fragment of HCAb is formed by only one heavy chain variable domain (VHH), which is connected through the hinged region to the Fc-domain. Rather often VHH is called a single-domain antibody, "nanobody", "mini-antibody" or "nano-antibody".

It appears that in addition to its small size (12-15 KDa), such isolated mono-domain structure has a number of advantages compared to classical IgG antibodies, namely aggregation, chemical and thermal stability. VHH antibodies can be successfully cloned and expressed in bacterial and yeast cells. Having said properties, these antibodies were developed in therapeutic direction by Ablynx Company and in the direction of laboratory and industrial chromatography (CaptureSelect affinity products).

Heavy chain antibodies comprising a dimer of a single Ig heavy chain were first discovered by electrophoretic analysis of immunoglobulins in the serum obtained from various representatives of Camelidae family [5]. The relative fraction of HCAb varies from about 15-25% (of all IgG) in llamas and vicunas to about 60-80% in camels.

It is assumed that non-classical HCAb, at least in case of Camelidae, resulted from relatively recent evolution of the genes of classical antibodies. Two heavy chain constant domains, CH2 and CH3, in case of HCAb and classical antibodies are highly conserved. In HCAb there is no domain corresponding to the first constant domain CH1 of classical antibodies. Dromedary genome contains a cluster of about fifty VH- and forty VHH-generative genes followed by multiple genes of D-segments, J-segments and genes encoding the constant regions (Cμ, Cγ, Cε and Cα). It is clear that some of Cγ-genes serve to form HCAb (mutations result in the loss of CH1-domain), and others to form classical antibodies (with remained CH1-domain). The same genes of D- and J-segments may randomly connect to either one of VH-genes or one of VHH-genes. This indicates that VH- and VHH-genes are located in the same gene locus.

The organization of variable domains of non-classical antibodies (VHH) and variable domains of classical antibodies (VH) is very similar, as human VH-domains of IgG3 subclass have high homology to VH and VHH of Camelidae. In both cases, V-domains comprise four conservative framework regions FR surrounding three hypervariable complementary-determining regions (CDR). In addition, in both cases a 3-D structure typical for immunoglobulin V-domain is formed of two β-layers, one of which comprises 4 amino acid sequences and another—of 5 amino acid sequences). All three CDRs in this structure form a cluster on one side of the V-domain, where they participate in antigen recognition and are located in the loops connecting β-structures. However, there are several important distinctions related to the functioning of single-domain VHH. Thus, CDR1 and CDR3 of VHH are significantly enlarged.

Complementary-determining regions of VHH often contain cysteine residues in two fragments at a time (usually in CDR1 and CDR3, less often—in CDR2 and CDR3). The studies of VHH crystal structures have shown that these cysteine residues form disulfide bonds and provide additional stability to the loop structure of these antibodies. The strongest and most reproducible distinguishing feature of VHH is represented by four substitutions of hydrophobic amino acid residues by hydrophilic ones in the second framework region (Val37Phe, Gly44Glu, Leu45Arg, Trp47Gly according to the Kabat numbering). This framework region of the VH-domain is highly conservatively enriched with hydrophobic amino acid residues and is essential for linking to the light chain variable domain VL. VHH-domain differs greatly in this aspect: substitutions of hydrophobic amino acids by hydrophilic makes the association of VHH and VL impossible. These substitutions also explain the high solubility of VHH (nano-antibody) when it is obtained as a recombinant protein.

It appears that the repertoires of paratopes (antigen-binding parts of an antibody) possible for HCAb and classical antibodies may be significantly different. Since these two antibody types co-exist in the same organism, it can be assumed that they do not compete but are complementary to each other. For example, it was repeatedly noted that both antibody types could occur in parallel, exclusively or in different ratios with regard to various epitopes of the antigen material upon immunization of the very same animal. Despite the suspected lower variety of paratopes possible for single-domain antibodies compared to the classical two-domain antibodies, many publications have clearly demonstrated that HCAb can be obtained against the most diverse epitopes of a rather wide range of antigens. Apparently, this is due to enlarged CDR1 and CDR3 regions. We also should note the surprisingly large (compared to V-domains of classical antibodies) number of somatic hypermutations in VHH that are likely to accumulate during the affine maturation of the antibody during the immunization. X-ray diffraction analysis revealed that antigen-binding loop regions of VHH are able to form structures unusual for classical V-domains. In case of VH- and VL-domains of classical antibodies, all six CDRs contribute almost the same to antigen binding; while in the case of VHH, CDR3 is usually the most important for the formation of a paratope. It has been shown that CDR3 in VHH (but not in VH or VL) is capable of forming uncommonly long finger-structures that can deepen into the antigen structure and, in particular, detect the active sites of enzymes. The small size of the antigen-binding region of VHH and its ability to form unusual emerging paratopes explain how HCAb can be obtained able to recognize epitopes inaccessible for the classical antibodies (for example, production of antibodies that effectively inhibit enzymes).

For all the high potential of the specificity unique compared to the classical IgG antibodies, the therapeutic use of a single-domain VHH is sometimes limited due to its rapid elimination form the organism. There are several solutions designed to improve the pharmacokinetics of VHH structures, including the chemical conjugation with PEG and covalent binding to polypeptides mediating the reduced clearance (such as HSA or Fc-fusion proteins that possess the half-life of up to three weeks). Small peptides attached to VHH by the recombinant technology and capable of high-affinity non-covalent interaction with said components (HSA and IgG) in human blood have been successfully used. However, the technological effectiveness and immunogenicity of these approaches remain questionable, and the feasibility of using thereof in either clinical or earlier study phases is now under investigation.

In addition, the largest limitations of using antibodies as medicinal agents are due to their aggregation and chemical stability affinity and immunogenicity. Since the majority of monoclonal antibodies are obtained on the basis of murine ones, the regular use of such antibodies in humans causes the development of immune response to antibody therapy (for example, allergic reactions). These types of immune response finally result in the lack of efficacy at least, and in potential anaphylactic reactions at worst. From the other hand, aggregation- or chemically unstable therapeutic antibodies reduce the therapeutic properties of the drug product over time and may increase its immunogenicity upon administration to human patients.

According to aforesaid, it is important to develop VHH-based antibodies with improved (in comparison to previously known antibodies) functional and therapeutic features, particularly increased aggregation, chemical and thermal stability and improved affinity, which would at the same time be easily obtained on industrial scale.

The background of the disclosure provides the information on various antibody constructs containing the VHH domain.

PCT/EP2008/066368 publication describes antibodies that comprise separate variable domains linked with Fc-fragment. Nano-bodies can be used as variable domains with Fc obtained from IgE type antibodies. Said domain and Fc fragments can be connected through a linker located in the hinge domain.

Patent application US 2009/0202979 disclosed antibodies comprising complete VHH antibodies or parts thereof directly connected to the constant regions of human antibodies.

In addition, amino acid substitutions are known that affect the physical-chemical and biological properties of antibodies.

For example, application US 2011/0028348 describes the heavy chain variable domains wherein amino acid substitutions were introduced in positions 35, 45, 47, 93-100 and 100a to improve the hydrophilic properties of the antibody obtained.

Now, methods have been developed to optimize the structure of isolated VHH and VH mono-domains in order to reduce the immunogenicity and improve the aggregation stability thereof.

Thus, Vincke at al. have found that Glu-49→Gly and Arg-50→Leu substitutions in characteristic amino acids result in the obtainment of a new domain that is more stable yet less soluble.

Other substitutions in the framework region FR-2 Phe-42→Val and Gly/Ala-52→Trp are crucial for antibody affinity to the antigen due to re-orientation of H3-loop, so that the dissociation constant increases 6-10-fold ($6.85 \cdot 10^{-3}$ l/sec). Phe-42→Val substitution caused the reduced stability of antibodies obtained. The substitution of Gly-49 and Leu-50 in VH-sequence resulted in the lower stability of the domain, while Glu-49 and Arg-50 humanization in VHH allows obtaining the stable variable domains.

It is known from the literature, that in the presence of short HCDR3 regions neutralizing the shading effect of the conformation of classical VHH, and upon introduction of VH-characteristic Trp-47→Gly-47 substitution as well as Tyr-37→Val-37, Glu-4→Gly-44 and Arg-45→Leu-45, the isolated VHH domains can regenerate the ability to bind with VJ domain.

The relationship between the increased aggregation stability of therapeutic antibodies of classical IgG structure and the reduced immunogenicity thereof was demonstrated in multiple studies and summarized in the review by Hermeling et al., 2004. Yet there were no antibodies revealed that comprise VHH domains but were linked to the variable domains of the light chains within the full-size human IgG.

Therefore, there is a need for development of a new format of antibodies that would have improved stability and affinity, good expression and low immunogenicity.

Besides, no approaches were earlier described with regard to the development of such molecules that would be easy to obtain, have improved aggregation stability, increased affinity and high expression level in the mammal cell culture, and aqueous compositions for these antibodies.

SUMMARY

The present disclosure describes aqueous pharmaceutical antibody compositions comprising VHH-derivatives that are joined to variable domains of the light chains of the full-size human IgG, which results in the formation of a construct that (and, hence, having low immunogenicity) has improved aggregation stability, increased affinity over a traditional human antibody with both a heavy chain with a variable $V_H$ domain (instead of a variable $V_{HH}$ domain) and light chain with a variable $V_L$ domain, and a structure of a therapeutic monoclonal antibody. More particularly, the present disclosure relates to such antibodies that are specific to IL17a.

The present disclosure describes an aqueous pharmaceutical composition suitable for parenteral administration to a subject for inhibiting IL17a protein activity comprising a pharmaceutically effective amount of an anti-IL17a antibody comprising a VHH-derivative domain and a variable $V_L$ domain.

As described in Patent Application No. PCT/RU2015/000163, incorporated herein by reference, an anti-IL17a antibody including both a $V_{HH}$ domain and a variable $V_L$ domain (referred herein as "antibodies of the disclosure") has shown to have increased affinity and stability to IL17a when compared to recombinant anti-IL17a human antibodies with integrated human immunoglobulin cassettes, such as Sekukinumab. As such, it would be advantageous to administer an aqueous composition with the antibody of the disclosure to a patient having an IL17a-mediated disease. Exemplary three complementary determining regions (CDRs) of the $V_{HH}$ domain of the anti-IL17a antibody for binding to IL-17a may be those corresponding to SEQ ID Nos 1, 2, 3.

However, due to the structural differences between human antibodies such as Sekukinumab and the antibodies of, the disclosure, aqueous compositions suitable for Sekukinumab and related antibodies are not necessarily suitable for the antibodies of the disclosure. For instance, the antibodies of the present disclosure contain a variable $V_{HH}$ domain combined with a variable light chain $V_L$ domain, where the human antibodies such as Sekukinumab have a heavy chain with a variable VH domain combined with three constant domains, the heavy domain attached to a light chain. As such, there are significant structural differences in size, weight and configuration between the antibodies of the disclosure and human-based antibodies such as Sekukinumab. These differences may impact upon the appropriate selection of suitable aqueous pharmaceutical compositions for each of the antibodies. An aqueous pharmaceutical composition suitable for Sekukinumab may not necessarily be suitable for an aqueous pharmaceutical composition for an antibody of the disclosure, such as Netakimab. The additional testing, as detailed herein, was required to determine suitable aqueous pharmaceutical compositions for antibodies of the disclosure.

For these reasons, it is advantageous to determine suitable aqueous pharmaceutical compositions for the antibodies of the disclosure that provide sufficient colloidal stability, thermal stability, reduce antibody aggregation and antibody homogeneity in the composition.

As such, the present disclosure relates to determining suitable aqueous pharmaceutical compositions for the antibodies of the disclosure.

An exemplary antibody of the disclosure is Netakimab (also referred to BCD-085 herein). Netakimab is a humanized monoclonal IgG antibody with a weight average molecular weight around 149 kDa that is specific to human IL17a. It is also known under the tradename Aleira. Netakimab has a heavy chain with a mutant humanized variant of a VHH domain. The heavy chain counts 455 amino acids (SEQ ID NO: 5). Netakimab has a human kappa light chain counting 215 amino acids (SEQ ID NO: 6).

Another anti-IL17a antibody of the present disclosure that is suitable for the aqueous pharmaceutical compositions described herein includes a VHH domain with 3 CDRs corresponding respectively to SEQ ID NOs 1, 2, 3, and, in some examples, a variable $V_L$ domain corresponding to SEQ ID NO 4.

A broad aspect of the present disclosure is an aqueous pharmaceutical composition suitable for parenteral administration to a subject for inhibiting IL17a protein activity. The aqueous pharmaceutical composition may include a pharmaceutically effective amount of an anti-IL17a antibody comprising a VHH-derivative domain and a variable VL domain; a histidine-based buffering agent; and an effective amount of a sugar-based alcohol as an osmotic agent.

In some embodiments, the anti-IL17a antibody may comprise a VHH-derivative domain and a variable VL domain, wherein VHH-derivative domain may be directly connected to a variable VL domain.

In some embodiments, the VHH-derivative domain of the anti-IL17a antibody may comprise 3 hypervariable regions HCDR1, HCDR2 and HCDR3, wherein:
  HCDR1 may comprise the amino acid sequence of SEQ ID NO: 1;
  HCDR2 may comprise the amino acid sequence of SEQ ID NO: 2;
  HCDR3 may comprise the amino acid sequence of SEQ ID NO: 3; and
  wherein the variable $V_L$ domain of the anti-IL17a antibody may comprise the amino acid sequence of SEQ ID NO: 4.

In some embodiments, the anti-IL17a antibody may be Netakimab.

In some embodiments, the Netakimab may be of an amount of 5 mg/mL to 150 mg/mL.

In some embodiments, the Netakimab may be of an amount of 10 mg/mL to 100 mg/mL.

In some embodiments, the Netakimab may be of an amount of 10 mg/mL to 70 mg/mL.

In some embodiments, the Netakimab may be of an amount of 40 mg/mL.

In some embodiments, the Netakimab may be of an amount of 60 mg/mL.

In some embodiments, the Netakimab may be of an amount of 70 mg/mL.

In some embodiments, the sugar-based alcohol may be Mannitol.

In some embodiments, the Mannitol may be in an amount of 25-60 mg/mL.

In some embodiments, the Mannitol may be in an amount of 50-60 mg/mL.

In some embodiments, the Mannitol may be in an amount of 54.5 mg/mL.

In some embodiments, a suitable amount of the histidine-based buffering agent may be added to reach a pH of around 5.5 to around 6.5.

In some embodiments, the buffering agent may be composed of an amount of 0.4 mg/mL to 1.6 mg/mL of L-histidine; and an amount of 0.4 mg/mL to 1.6 mg/mL of L-histidine hydrochloride monohydrate.

In some embodiments, the aqueous pharmaceutical composition may further include a suitable solubilizer.

In some embodiments, the solubilizer may be Poloxamer 188.

In some embodiments, the Poloxamer 188 may be in an amount greater than 0 mg/mL but equal or less than 1 mg/mL.

Another broad aspect of the present disclosure is an aqueous pharmaceutical composition suitable for parenteral administration to a subject for inhibiting IL17a protein activity.

The aqueous pharmaceutical composition may include:

| | |
|---|---|
| Anti-IL17a antibody comprising a VHH-derivative domain and a variable VL domain | 10-70 mg/mL |
| L-Histidine | 0.4 mg/mL |
| L-Histidine hydrochloride monohydrate | 0.4 mg/mL |
| Mannitol | 54.5 mg/mL |
| Poloxamer 188 | 0-1 mg/mL |
| pH 6 0 ± 0.5 | |

In some embodiments, said VHH-derivative domain of said anti-IL17a antibody may include 3 hypervariable regions HCDR1, HCDR2 and HCDR3, wherein:
HCDR1 may comprise the amino acid sequence of SEQ ID NO: 1;
HCDR2 may comprise the amino acid sequence of SEQ ID NO: 2;
HCDR3 may comprise the amino acid sequence of SEQ ID NO: 3; and
wherein the variable VL domain of said anti-IL17a antibody may comprise the amino acid sequence of SEQ ID NO: 4.

In some embodiments, the anti-IL17a antibody may be Netakimab.

In some embodiments, the Netakimab may be of an amount of 40 mg/mL.

In some embodiments, the Netakimab may be of an amount of 60 mg/mL.

In some embodiments, the Netakimab may be of an amount of 70 mg/mL.

Another broad aspect is an aqueous pharmaceutical composition suitable for parenteral administration to a subject for inhibiting IL17a protein activity, wherein the aqueous pharmaceutical composition may include:

| | |
|---|---|
| Netakimab | 40 mg/mL |
| L-Histidine | 0.4 mg/mL |
| L-Histidine hydrochloride monohydrate | 0.4 mg/mL |
| Mannitol | 54.5 mg/mL |
| Poloxamer 188 | 0-1 mg/mL |
| pH 6.0 ± 0.5 | |

Another broad aspect of the present disclosure is an aqueous pharmaceutical composition suitable for parenteral administration to a subject for inhibiting IL17a protein activity.

The aqueous pharmaceutical composition may include a pharmaceutically effective amount of an anti-IL17a antibody comprising a VHH-derivative domain and a variable VL domain; an acetate-based buffering agent; and a disaccharide as an osmotic agent.

In some embodiments, said VHH-derivative domain of said anti-IL17a antibody may comprise 3 hypervariable regions HCDR1, HCDR2 and HCDR3, wherein:
HCDR1 may comprise the amino acid sequence of SEQ ID NO: 1;
HCDR2 may comprise the amino acid sequence of SEQ ID NO: 2;
HCDR3 may comprise the amino acid sequence of SEQ ID NO: 3; and
wherein the variable VL domain of said anti-IL17a antibody may comprise the amino acid sequence of SEQ ID NO: 4.

In some embodiments, the anti-IL17a antibody may be Netakimab.

In some embodiments, the Netakimab may be of an amount of 5 mg/mL to 150 mg/mL.

In some embodiments, the Netakimab may be of an amount of 10 mg/mL to 120 mg/mL.

In some embodiments, the Netakimab may be of an amount of 60 mg/mL.

In some embodiments, the Netakimab may be of an amount of 100 mg/mL.

In some embodiments, the Netakimab may be of an amount of 120 mg/mL.

In some embodiments, the disaccharide may be trehalose.

In some embodiments, the trehalose may be added to the composition as trehalose dihydrate in an amount of 50 mg/mL to 120 mg/mL.

In some embodiments, the trehalose may be added to the composition as trehalose dihydrate in an amount of 50 mg/mL.

In some embodiments, the trehalose may be added to the composition as trehalose dihydrate in an amount of 80 mg/mL.

In some embodiments, the acetate-based buffering agent may be composed of 0.4 mg/mL to 1.8 mg/mL of sodium acetate trihydrate; and a suitable amount of acetic acid to reach a pH of the composition inclusively between 4.0-6.0.

In some embodiments, the aqueous composition may further include a suitable solubilizer.

In some embodiments, the solubilizer may be Poloxamer 188.

In some embodiments, the Poloxamer 188 may be of an amount over 0 mg/mL and equal to or under 1.0 mg/mL.

Another broad aspect of the present disclosure is an aqueous pharmaceutical composition suitable for parenteral administration to a subject for inhibiting IL17a protein activity.

The aqueous pharmaceutical composition may include:

| | |
|---|---|
| Anti-IL17a antibody comprising a VHH-derivative domain and a variable VL domain | 10-120 mg/mL |
| Sodium acetate trihydrate | 0.44-1.74 mg/mL |
| Trehalose dihydrate | 80-100 mg/mL |
| Poloxamer 188 | 0-1 mg/mL |
| Acetic acid glac. | to pH 5.0 |
| pH 5.0 ± 0.5 | |

In some embodiments, said VHH-derivative domain of said anti-IL17a antibody may comprise 3 hypervariable regions HCDR1, HCDR2 and HCDR3:
HCDR1 may comprise the amino acid sequence of SEQ ID NO: 1;
HCDR2 may comprise the amino acid sequence of SEQ ID NO: 2;
HCDR3 may comprise the amino acid sequence of SEQ ID NO: 3; and
wherein the variable VL domain of said anti-IL17a antibody may comprise the amino acid sequence of SEQ ID NO: 4.

In some embodiments, the anti-IL17a antibody may be Netakimab.

In some embodiments, the Netakimab may be of an amount of 60 mg/mL.

In some embodiments, the Netakimab may be of an amount of 100 mg/mL.

In some embodiments, the Netakimab may be of an amount of 120 mg/mL.

Another broad aspect is an aqueous pharmaceutical composition suitable for parenteral administration to a subject for inhibiting IL17a protein activity, wherein the aqueous composition may include:

| | |
|---|---|
| Netakimab | 60 mg/mL |
| Sodium acetate trihydrate | 1.74 mg/mL |
| Trehalose dihydrate | 80 mg/mL |
| Acetic acid glac. | to pH 5.0 |
| pH 5.0 ± 0.5 | |

Another broad aspect is an aqueous pharmaceutical composition suitable for parenteral administration to a subject for inhibiting IL17a protein activity, wherein the aqueous composition may include:

| | |
|---|---|
| Netakimab | 60 mg/mL |
| Sodium acetate trihydrate | 1.74 mg/mL |
| Trehalose dihydrate | 80 mg/mL |
| Poloxamer 188 | 0.5 mg/mL |
| Acetic acid glac. | to pH 5.0 |
| pH 5.0 ± 0.5 | |

Another broad aspect is an aqueous pharmaceutical composition suitable for parenteral administration to a subject for inhibiting IL17a protein activity, wherein the aqueous composition may include:

| | |
|---|---|
| Netakimab | 60 mg/mL |
| Sodium acetate trihydrate | 1.74 mg/mL |
| Trehalose dihydrate | 80 mg/mL |
| Poloxamer 188 | 1 mg/mL |
| Acetic acid glac. | to pH 5.0 |
| bH 5.0 ± 0.5 | |

Another broad aspect is an aqueous pharmaceutical composition suitable for parenteral administration to a subject for inhibiting IL17a protein activity, wherein the aqueous composition may include:

| | |
|---|---|
| Netakimab | 120 mg/mL |
| Sodium acetate trihydrate | 1.74 mg/mL |
| Trehalose dihydrate | 80 mg/mL |
| Poloxamer 188 | 0-1 mg/mL |
| Acetic acid glac. | to pH 5.0 |
| pH 5.0 ± 0.5 | |

Another broad aspect is an aqueous pharmaceutical composition suitable for parenteral administration to a subject for inhibiting IL17a protein activity, wherein the aqueous composition may include:

| | |
|---|---|
| Netakimab | 120 mg/mL |
| Sodium acetate trihydrate | 1.74 mg/mL |
| Trehalose dihydrate | 80 mg/mL |
| Acetic acid glac. | to pH 5.0 |
| pH 5.0 ± 0.5 | |

Another broad aspect is an aqueous pharmaceutical composition suitable for parenteral administration to a subject for inhibiting IL17a protein activity, wherein the aqueous composition may include:

| | |
|---|---|
| Netakimab | 120 mg/mL |
| Sodium acetate trihydrate | 1.74 mg/mL |
| Trehalose dihydrate | 80 mg/mL |
| Poloxamer 188 | 0.5 mg/mL |
| Acetic acid glac. | to pH 5.0 |
| pH 5.0 ± 0.5 | |

Another broad aspect is an aqueous pharmaceutical composition suitable for parenteral administration to a subject for inhibiting IL17a protein activity, wherein the aqueous composition may include:

| | |
|---|---|
| Netakimab | 120 mg/mL |
| Sodium acetate trihydrate | 1.74 mg/mL |
| Trehalose dihydrate | 80 mg/mL |
| Poloxamer 188 | 1 mg/mL |
| Acetic acid glac. | to pH 5.0 |
| pH 5.0 ± 0.5 | |

Another broad aspect is the use of the composition as defined herein for treating an IL17a mediated disease.

In some embodiments, the IL17a mediated disease may be one of: wherein the IL17A-mediated disease or disorder may be selected from: rheumatoid arthritis, juvenile rheumatoid arthritis, systemic-onset juvenile rheumatoid arthritis, osteoarthritis, juvenile chronic arthritis, psoriatic arthritis, reactive arthritis, seronegative arthritis, polyarticular juvenile idiopathic arthritis, enthesitis-related arthritis; enthesitis; spondyloarthropathy, axial spondyloarthritis; Behcet' disease; inflammatory bowel disease, Crohn's disease, ulcerative colitis; asthma, allergic disorders, atopic allergy; ichthyosis; *pityriasis rubra* pilaris; papulopustular rosacea; pyoderma gangrenosum; hidradenitis suppurativa; psoriasis, psoriatic arthropathy, type I psoriasis, type II psoriasis, plaque psoriasis; dermatitis, atopic dermatitis, autoimmune dermatitis, dermatological conditions; systemic sclerosis; grafting, graft-versus-host disease, graft rejection, acute or chronic immune disease associated with organ grafting, acute graft-associated immune disease, chronic graft-associated immune disease, small intestinal graft rejection, pancreatic graft rejection, any organ or tissue graft rejection, heart transplant rejection, cartilage graft rejection, renal transplant rejection, liver transplant rejection, allograft rejection, skin allograft rejection, heterograft rejection for any organ or tissue, bone graft rejection, bone marrow transplant (BMT) rejection, parathyroid graft rejection; bone erosion; sarcoidosis, atherosclerosis, Wegener's disease, microscopic polyangiitis with renal involvement, uveitis, phacogenic uveitis, noninfectious uveitis, cachexia, acute transverse myelitis, primary biliary cirrhosis, polyglandular autoimmune syndrome type I and type II, Schmidt's syndrome, acute respiratory distress syndrome; arthropathy, seronegative arthropathy, arthropathy associated with ulcerative colitis, Reiter's syndrome, enteropathic synovitis, atheromatosis disease/coronary sclerosis, autoimmune bullous disease, pemphigus, pemphigus *foliaceus*, linear IgA diseases, autoimmune hemolytic anemia, cranial giant arteritis, primary sclerosing hepatitis, cryptogenic autoimmune hepatitis, cryptogenic fibrosing alveolitis, systemic scleroderma associated with interstitial lung disease, rheumatoid arthritis associated with interstitial lung disease, systemic lupus erythematosus associated with lung disease, dermatomyositis/polymyositis associated with lung disease, Sjogren disease associated with lung disease, ankylosing spondylitis associated with lung disease, vasculitis, diffuse pulmonary vasculitis, primary vasculitis, fibrosis, lung disease with lymphocyte infiltration, autoimmune hepatitis, autoimmune hepatitis type I (classic autoimmune or lupoid hepatitis), autoimmune hepatitis type II (associated with anti-LKM antibody), autoimmune hypoglycemia, osteoarthrosis, primary sclerosing cholangitis, erythematosus; systemic lupus erythematosus, discoid lupus erythematosus, lupus nephritis; multiple sclerosis (all types), sympathetic ophthalmia, pulmonary hypertension secondary to connective tissue disease, Goodpasture syndrome, pulmonary manifestations of polyarteritis nodosa, acute rheumatic fever, rheumatoid spondylitis, Still's disease, systemic scleroderma, scleroderma disease, scleroderma, Sjogren's Syndrome, Takayasu disease/arthritis; autoimmune thrombocytopenia, idiopathic thrombocytopenia; autoimmune thyroid disorders, hyperthyroid, autoimmune hypothyroidism (Hashimoto disease), atrophic autoimmune hypothyroidism; vitiligo, acute hepatic disease, chronic hepatic disease, cholestasis, Th1- and Th2-mediated disease; malignancies such as lung cancer, breast cancer, stomach cancer, bladder cancer, colorectal cancer, pancreatic cancer, pancreatic carcinoma, ovarian cancer, prostate cancer and hematopoietic malignancies (leukemia and lymphomas), acute leukemia, acute lymphoblastic leukemia, acute myeloid leukemia, adenocarcinoma, B-cell lymphoma, Burkitt lymphoma, inflammatory response to bypass, chronic myelocytic leukemia (CML), chronic inflammatory pathologies, chronic lymphatic leukemia (CLL), rectocolic carcinoma, cystic fibrosis, malignant lymphoma, malignant histiocytosis, malignant melanoma, multiple myeloma, non-Hodgkin's lymphomas, nasopharyngeal cancer, solid tumors, hairy-cell leukemia, Hodgkin disease, sarcoma, myelodysplastic syndrome, cytokine therapy-induced disorders, demyelinating disease, inflammatory demyelinating disease, pulmonary fibrosis, idiopathic pulmonary fibrosis, usual interstitial pneumonia, iridocyclitis/uveitis/optic neuritis, lymphoedema, mixed connective-tissue disease, monoclonal gammopathy, neonatal chronic lung disease, nephritis, nephrotic, neurodegenerative disorders, osteoporosis, paraneoplastic disease/tumor-related hypercalcemia, Raynaud's phenomenon and disease, skin changes, a comprehensive systemic inflammatory response syndrome, thrombocytopenia, toxicity, urticaria, acute coronary syndrome, adult-onset Stills disease, aplastic anemia, coronary sclerosis, atopic eczema; autoimmune disorder associated with *streptococcus* infection, autoimmune enteropathy, autoimmune hearing loss, autoimmune lymphoproliferative syndrome (ALPS), autoimmune myocarditis, autoimmune premature ovarian failure; celiac disease, cervical spondylosis, clinically isolated syndrome (cis) with the risk for multiple sclerosis, erythema multiform, severe erythema multiform, pemphigoid, bullous pemphigoid, cicatrical pemphigoid, mucosal pemphigoid, gestational pemphigoid, iritis, keratitis, motor neuron disease, non-A, non-B hepatitis, optic neuritis, oligoarticular JIA, polyarteritis nodosa, polychondritis, poliosis, polymyositis, relapsing neuromyelitis optica, rheumatic heart disease, SAPHO (synovitis, acne, pustulosis, hyperostosis and osteitis), secondary amyloidosis, ankylosing spondylitis, systemic inflammation response syndrome, cranial arteritis, and *Yersinia*- or *Salmonella*-associated arthropathy.

Another broad aspect is a method of treating an IL17a mediated disease comprising administering a pharmaceutically effective amount of the aqueous pharmaceutical composition as defined herein.

Another broad aspect of the present disclosure is a method of producing an aqueous pharmaceutical composition suitable for parenteral administration to a subject for inhibiting IL17a protein activity. The method includes combining a pharmaceutically effective amount of an anti-IL17a antibody comprising a VHH-derivative domain and a variable VL domain with: a histidine-based buffering agent; and an effective amount of Mannitol as an osmotic agent.

In some embodiments, the anti-IL17a antibody may be Netakimab.

Another broad aspect is a method of producing an aqueous pharmaceutical composition suitable for parenteral administration to a subject for inhibiting IL17a protein activity comprising: combining a pharmaceutically effective amount of an anti-IL17a antibody comprising a VHH-derivative domain and a variable VL domain with an acetate-based buffering agent; and an effective amount of trehalose as an osmotic agent.

In some embodiments, the anti-IL17a antibody may be Netakimab.

In some embodiments, Poloxamer 188 may be added as a solubilizer.

Another broad aspect is a method of treating psoriasis, comprising administering to a patient in need thereof a dose of 40 mg of Netakimab once a week during week 0, 1, 2, 4, 6, 8, 10.

In some embodiments, the method may include, after the administering the dose of Netakimab on week 10, administering a dose of 40 mg of Netakimab once every four weeks thereafter.

In some embodiments, the method may include, after the administering the dose of Netakimab on week 10, administering a dose of 40 mg of Netakimab once every two weeks thereafter.

Another broad aspect is a method of treating psoriasis, comprising administering to a patient in need thereof a dose of 80 mg of Netakimab once a week during week 0, 1, 2, 4, 6, 8, 10.

Another broad aspect is a method of treating psoriasis, comprising administering to a patient in need thereof a dose of 80 mg of Netakimab once a week during week 0, 1, 2, 6, 10.

In some examples, the method may include, after the administering the dose of Netakimab on week 10, administering a dose of 80 mg of Netakimab once every four weeks thereafter.

In some examples, the method may include, after the administering the dose of Netakimab on week 10, administering a dose of 80 mg of Netakimab once every two weeks thereafter.

Another broad aspect is a method of treating psoriasis, comprising administering to a patient in need thereof a dose of 80 mg of Netakimab once a week during week 0, 1, 2, 4, 6, 8, 10, 12.

In some embodiments, the method may include, after the administering the dose of 80 mg of Netakimab on week 12, administering a dose of 80 mg of Netakimab once every four weeks thereafter.

In some embodiments, the method may include, after the administering the dose of 80 mg of Netakimab on week 12, administering a dose of 80 mg of Netakimab once every two weeks thereafter.

In some embodiments, the method may include, after the administering the dose of 80 mg of Netakimab on week 12, administering a dose of 80 mg of Netakimab once every four weeks during next 12 weeks thereafter.

In some embodiments, the method may include, after the administering the dose of 80 mg of Netakimab on week 12, administering a dose of 80 mg of Netakimab once every two weeks during next 12 weeks thereafter.

In some embodiments, the method may include the administering of Netakimab according to the following regimen:
1) administering the dose of 80 mg of Netakimab once a week during week 0, 1, 2, 4, 6, 8, 10, 12,
2) administering the dose of 80 mg of Netakimab once every two weeks during next 12 weeks thereafter,
3) administering the dose of 80 mg of Netakimab once every four weeks thereafter.

In some embodiments, the method may include the administering of Netakimab according to the following regimen:
1) administering the dose of 80 mg of Netakimab once a week during week 0, 1, 2, 4, 6, 8, 10, 12,
2) administering the dose of 80 mg of Netakimab once every two weeks during next 12 weeks thereafter,
3) administering the dose of 80 mg of Netakimab once every two weeks thereafter.

In some embodiments, the method may include the administering of Netakimab according to the following regimen:
1) administering the dose of 80 mg of Netakimab once a week during week 0, 1, 2, 4, 6, 8, 10, 12,
2) administering the dose of 80 mg of Netakimab once every four weeks during next 12 weeks thereafter,
3) administering the dose of 80 mg of Netakimab once every four weeks thereafter.

In some embodiments, the method may include the administering of Netakimab according to the following regimen:
1) administering the dose of 80 mg of Netakimab once a week during week 0, 1, 2, 4, 6, 8, 10, 12,
2) administering the dose of 80 mg of Netakimab once every four weeks during next 12 weeks thereafter,
3) administering the dose of 80 mg of Netakimab once every two weeks thereafter.

In some embodiments, the dose of 80 mg of Netakimab may be administered by two injections comprising 40 mg of Netakimab.

Another broad aspect is a method of treating psoriasis, comprising administering to a patient in need thereof a dose of 120 mg of Netakimab once a week during week 0, 1, 2, 4, 6, 8, 10.

Another broad aspect is a method of treating psoriasis, comprising administering to a patient in need thereof a dose of 120 mg of Netakimab once a week during week 0, 1, 2, 6, 10.

In some embodiments, after the administering the dose of Netakimab on week 10, the method may include administering a dose of 120 mg of Netakimab once every four weeks thereafter.

In some embodiments, after the administering the dose of Netakimab on week 10, the method may include administering a dose of 120 mg of Netakimab once every two weeks thereafter.

Another broad aspect is a method of treating psoriasis, comprising administering to a patient in need thereof a dose of 120 mg of Netakimab once a week during week 0, 1, 2, 4, 6, 8, 10, 12.

In some embodiments, after the administering the dose of Netakimab on week 12, the method may include administering a dose of 120 mg of Netakimab once every four weeks thereafter.

In some embodiments, after the administering the dose of Netakimab on week 12, the method may include administering a dose of 120 mg of Netakimab once every two weeks thereafter.

In some embodiments, the method may include, after the administering the dose of 120 mg of Netakimab on week 12, administering a dose of 120 mg of Netakimab once every four weeks during next 12 weeks thereafter.

In some embodiments, the method may include, after the administering the dose of 120 mg of Netakimab on week 12, administering a dose of 120 mg of Netakimab once every two weeks during next 12 weeks thereafter.

In some embodiments, the method may include the administering of Netakimab according to the following regimen:
1) administering the dose of 120 mg of Netakimab once a week during week 0, 1, 2, 4, 6, 8, 10, 12,
2) administering the dose of 120 mg of Netakimab once every two weeks during next 12 weeks thereafter,
3) administering the dose of 120 mg of Netakimab once every four weeks thereafter.

In some embodiments, the method may include the administering of Netakimab according to the following regimen:
1) administering the dose of 120 mg of Netakimab once a week during week 0, 1, 2, 4, 6, 8, 10, 12,
2) administering the dose of 120 mg of Netakimab once every two weeks during next 12 weeks thereafter,
3) administering the dose of 120 mg of Netakimab once every two weeks thereafter.

In some embodiments, the method may include the administering of Netakimab according to the following regimen:
1) administering the dose of 120 mg of Netakimab once a week during week 0, 1, 2, 4, 6, 8, 10, 12,
2) administering the dose of 120 mg of Netakimab once every four weeks during next 12 weeks thereafter,
3) administering the dose of 120 mg of Netakimab once every four weeks thereafter.

In some embodiments, the method may include the administering of Netakimab according to the following regimen:
1) administering the dose of 120 mg of Netakimab once a week during week 0, 1, 2, 4, 6, 8, 10, 12,
2) administering the dose of 120 mg of Netakimab once every four weeks during next 12 weeks thereafter,
3) administering the dose of 120 mg of Netakimab once every two weeks thereafter.

In some embodiments, the dose of 120 mg of Netakimab may be administered by three injections comprising 40 mg of Netakimab.

In some embodiments, a dose of 120 mg of Netakimab may be administered by two injections comprising 60 mg of Netakimab.

In some embodiments, Netakimab may be administered by subcutaneous injection.

In some embodiments, Netakimab may be administered by intravenous injection.

In some embodiments, psoriasis may be plaque psoriasis.

Another broad aspect is a method of treating psoriatic arthritis, comprising administering to a patient in need thereof a dose of 120 mg of Netakimab once a week during week 0, 1, 2, 4, 6, 8, 10.

Another broad aspect is a method of treating psoriatic arthritis, comprising administering to a patient in need thereof a dose of 120 mg of Netakimab once a week during week 0, 1, 2, 6, 10.

In some embodiments, the method may include, after the administering the dose of Netakimab on week 10, administering a dose of 120 mg of Netakimab once every four weeks thereafter.

In some embodiments, the method may include, after the administering the dose of Netakimab on week 10, administering a dose of 120 mg of Netakimab once every two weeks thereafter.

Another broad aspect is a method of treating psoriatic arthritis, comprising administering to a patient in need thereof a dose of 120 mg of Netakimab once a week during week 0, 1, 2, 4, 6, 8, 10, 12.

In some embodiments, the method may include, after the administering the dose of Netakimab on week 12, administering a dose of 120 mg of Netakimab once every four weeks thereafter.

In some embodiments, the method may include, after the administering the dose of Netakimab on week 12, administering a dose of 120 mg of Netakimab once every two weeks thereafter.

In some embodiments, the dose of 120 mg of Netakimab may be administered by three injections comprising 40 mg of Netakimab.

In some embodiments, the dose of 120 mg of Netakimab may be administered by two injections comprising 60 mg of Netakimab.

In some embodiments, Netakimab may be administered by subcutaneous injection.

In some embodiments, Netakimab may be administered by intravenous injection.

Another broad aspect is a method of treating ankylosing spondylitis, comprising administering to a patient in need thereof a dose of 40 mg of Netakimab once a week during week 0, 1, 2.

In some embodiments, the method may include, after the administering the dose of Netakimab on week 2, administering a dose of 40 mg of Netakimab once every two weeks thereafter.

Another broad aspect is a method of treating ankylosing spondylitis, comprising administering to a patient in need thereof a dose of 40 mg of Netakimab once a week during week 0, 1, 2, 4, 6, 8, 10, 12.

In some embodiments, the method may include, after the administering the dose of Netakimab on week 12, administering a dose of 40 mg of Netakimab once every two weeks thereafter.

Another broad aspect is a method of treating ankylosing spondylitis, comprising administering to a patient in need thereof a dose of 80 mg of Netakimab once a week during week 0, 1, 2.

In some embodiments, after the administering the dose of Netakimab on week 2, the method may include administering a dose of 80 mg of Netakimab once every two weeks thereafter.

Another broad aspect is a method of treating ankylosing spondylitis, comprising administering to a patient in need thereof a dose of 80 mg of Netakimab once a week during week 0, 1, 2, 4, 6, 8, 10, 12.

In some embodiments, after the administering the dose of 80 mg of Netakimab on week 12, the method may include administering a dose of 80 mg of Netakimab once every two weeks thereafter.

In some embodiments, after administration of a dose of 80 mg of netakimab on week 12, starting on week 16 the method may include administering a dose of 80 mg of netakimab once every two weeks thereafter.

In some embodiments, after administration of a dose of 80 mg of netakimab on week 12, starting on week 16 the method may include administering a dose of 120 mg of Netakimab once every two weeks thereafter.

In some embodiments, the dose of 80 mg of Netakimab may be administered by two injections comprising 40 mg of Netakimab.

Another broad aspect is a method of treating ankylosing spondylitis, comprising administering to a patient in need thereof a dose of 120 mg of Netakimab once a week during week 0, 1, 2.

In some embodiments, after the administering the dose of Netakimab on week 2, the method may include administering a dose of 120 mg of Netakimab once every two weeks thereafter.

Another broad aspect is a method of treating ankylosing spondylitis, comprising administering to a patient in need thereof a dose of 120 mg of Netakimab once a week during week 0, 1, 2, 4, 6, 8, 10, 12.

In some embodiments, after the administering the dose of Netakimab on week 12, the method may include administering a dose of 120 mg of Netakimab once every two weeks thereafter.

In some embodiments, after administration of a dose of 120 mg of Netakimab on week 12, starting on week 16 the method may include administering a dose of 80 mg of Netakimab once every two weeks thereafter.

In some embodiments, after administration of a dose of 120 mg of Netakimab on week 12, starting on week 16 the method may include administering a dose of 120 mg of Netakimab once every two weeks thereafter.

In some embodiments, a dose of 120 mg of Netakimab may be administered by three injections comprising 40 mg of Netakimab.

In some embodiments, a dose of 120 mg of Netakimab may be administered by two injections comprising 60 mg of Netakimab.

In some embodiments, Netakimab may be administered by subcutaneous injection.

In some embodiments, Netakimab may be administered by intravenous injection.

Another broad aspect is a pharmaceutical composition suitable for administration to a subject for inhibiting IL17a protein activity wherein, for each 1 mL of the pharmaceutical composition, the pharmaceutical composition comprises:

| | |
|---|---|
| Netakimab | 40.0 mg, |
| histidine hydrochloride monohydrate | 0.4 mg, |
| L-histidine | 0.4 mg, |
| mannitol | 54.5 mg, |
| water for injection ad | 1.0 mL. |

Another broad aspect is a method of treating psoriasis comprising administering to a patient a pharmacologically effective volume of the pharmaceutical composition described herein.

In some embodiments, 1 mL of the pharmaceutical composition may be administered.

In some embodiments, 1 mL of the pharmaceutical composition may be administered once a week during week 0, 1, 2, 4, 6, 8, 10.

In some embodiments, the method may include, after the administering the dose of Netakimab on week 10, administering 1 mL doses of Netakimab on each of every four weeks thereafter.

In some embodiments, the method may include, after the administering the dose of Netakimab on week 10, administering 1 mL doses of Netakimab on each of every two weeks thereafter.

In some embodiments, 2 mL of the pharmaceutical composition may be administered.

In some embodiments, 2 mL of the pharmaceutical composition may be administered once a week during week 0, 1, 2, 4, 6, 8, 10.

In some embodiments, 2 mL of the pharmaceutical composition may be administered once a week during week 0, 1, 2, 6, 10.

In some embodiments, the method may include, after the administering the dose of Netakimab on week 10, administering 2 mL doses of Netakimab once every four weeks thereafter.

In some embodiments, the method may include, after the administering the dose of Netakimab on week 10, administering 2 mL doses of Netakimab once every two weeks thereafter.

In some embodiments, 2 mL of the pharmaceutical composition may be administered once a week during week 0, 1, 2, 4, 6, 8, 10, 12.

In some embodiments, the method may include after the administering the dose of Netakimab on week 12, administering 2 mL doses of Netakimab once every four weeks thereafter.

In some embodiments, the method may include after the administering the dose of Netakimab on week 12, administering 2 mL doses of Netakimab once every two weeks thereafter.

In some embodiments, the method may include, after the administering 2 mL doses of Netakimab on week 12, administering 2 mL doses of Netakimab once every four weeks during next 12 weeks thereafter.

In some embodiments, the method may include after the administering 2 mL doses of Netakimab on week 12, administering 2 mL doses of Netakimab once every two weeks during next 12 weeks thereafter.

In some embodiments, the method may include the administering of the pharmaceutical composition according to the following regimen:
 1) administering 2 mL of the pharmaceutical composition once a week during week 0, 1, 2, 4, 6, 8, 10, 12,
 2) administering 2 mL of the pharmaceutical composition once every two weeks during next 12 weeks thereafter,
 3) administering 2 mL of the pharmaceutical composition once every four weeks thereafter.

In some embodiments, the method may include the administering of the pharmaceutical composition according to the following regimen:
 1) administering 2 mL of the pharmaceutical composition once a week during week 0, 1, 2, 4, 6, 8, 10, 12,
 2) administering 2 mL of the pharmaceutical composition once every two weeks during next 12 weeks thereafter,
 3) administering 2 mL of the pharmaceutical composition once every two weeks thereafter.

In some embodiments, the method may include the administering of the pharmaceutical composition according to the following regimen:
 1) administering 2 mL of the pharmaceutical composition once a week during week 0, 1, 2, 4, 6, 8, 10, 12,
 2) administering 2 mL of the pharmaceutical composition once every four weeks during next 12 weeks thereafter,
 3) administering 2 mL of the pharmaceutical composition once every four weeks thereafter.

In some embodiments, the method may include the administering of the pharmaceutical composition according to the following regimen:
 1) administering 2 mL of the pharmaceutical composition once a week during-week 0, 1, 2, 4, 6, 8, 10, 12,
 2) administering 2 mL of the pharmaceutical composition once every four weeks during next 12 weeks thereafter,
 3) administering 2 mL of the pharmaceutical composition once every two weeks thereafter.

In some embodiments, the 2 mL may be delivered via syringe in two separate 1 mL doses.

In some embodiments, the syringe may be a pre-filled syringe.

In some embodiments, 3 mL of the pharmaceutical composition may be administered.

In some embodiments, 3 mL of the pharmaceutical composition may be administered once a week during week 0, 1, 2, 4, 6, 8, 10.

In some embodiments, 3 mL of the pharmaceutical composition may be administered once a week during week 0, 1, 2, 6, 10.

In some embodiments, the method may include, after the administering the dose of Netakimab on week 10, administering 3 mL doses of Netakimab once every four weeks thereafter.

In some embodiments, the method may include, after the administering the dose of Netakimab on week 10, administering 3 mL doses of Netakimab once every two weeks thereafter.

In some embodiments, 3 mL of the pharmaceutical composition may be administered once a week during week 0, 1, 2, 4, 6, 8, 10, 12.

In some embodiments, the method may include, after the administering the dose of Netakimab on week 12, administering 3 mL doses of Netakimab once every four weeks thereafter.

In some embodiments, the method may include, after the administering the dose of Netakimab on week 12, administering 3 mL doses of Netakimab once every two weeks thereafter.

In some embodiments, the method may include, after the administering 3 mL doses of Netakimab on week 12, administering 3 mL doses of Netakimab once every four weeks during next 12 weeks thereafter.

In some embodiments, the method may include after the administering 3 mL doses of Netakimab on week 12, administering 3 mL doses of Netakimab once every two weeks during next 12 weeks thereafter.

In some embodiments, the method may include the administering of the pharmaceutical composition according to the following regimen:
 1) administering 3 mL of the pharmaceutical composition once a week during week 0, 1, 2, 4, 6, 8, 10, 12,
 2) administering 3 mL of the pharmaceutical composition once every two weeks during next 12 weeks thereafter,
 3) administering 3 mL of the pharmaceutical composition once every four weeks thereafter.

In some embodiments, the method may include the administering of the pharmaceutical composition according to the following regimen:
 1) administering 3 mL of the pharmaceutical composition once a week during week 0, 1, 2, 4, 6, 8, 10, 12, 2) administering 3 mL of the pharmaceutical composition once every two weeks during next 12 weeks thereafter,
3) administering 3 mL of the pharmaceutical composition once every two weeks thereafter.

In some embodiments, the method may include the administering of the pharmaceutical composition according to the following regimen:
1) administering 3 mL of the pharmaceutical composition once a week during week 0, 1, 2, 4, 6, 8, 10, 12,
2) administering 3 mL of the pharmaceutical composition once every four weeks during next 12 weeks thereafter,
3) administering 3 mL of the pharmaceutical composition once every four weeks thereafter.

In some embodiments, the method may include the administering of the pharmaceutical composition according to the following regimen:
1) administering 3 mL of the pharmaceutical composition once a week during week 0, 1, 2, 4, 6, 8, 10, 12,
2) administering 3 mL of the pharmaceutical composition once every four weeks during next 12 weeks thereafter,
3) administering 3 mL of the pharmaceutical composition once every two weeks thereafter.

In some embodiments, the 3 mL may be delivered via syringe in three separate 1 mL doses.

In some embodiments, the syringe may be a pre-filled syringe.

In some embodiments, the pharmaceutical composition may be administered intramuscularly.

In some embodiments, the pharmaceutical composition may be administered subcutaneously.

In some embodiments, the pharmaceutical composition may be administered intravenously.

In some embodiments, psoriasis may be plaque psoriasis.

Another broad aspect is a method of treating psoriatic arthritis comprising administering to a patient a pharmacologically effective volume of the pharmaceutical composition as described herein.

In some embodiments, 1 mL of the pharmaceutical composition may be administered.

In some embodiments, 3 mL of the pharmaceutical composition may be administered.

In some embodiments, 3 mL of the pharmaceutical composition may be administered once a week during week 0, 1, 2, 4, 6, 8, 10.

In some embodiments, 3 mL of the pharmaceutical composition may be administered once a week during week 0, 1, 2, 6, 10.

In some embodiments, the method may include, after the administering the dose of Netakimab on week 10, administering 3 mL doses of Netakimab once every four weeks thereafter.

In some embodiments, the method may include, after the administering the dose of Netakimab on week 10, administering 3 mL doses of Netakimab once every two weeks thereafter.

In some embodiments, 3 mL of the pharmaceutical composition may be administered once a week during week 0, 1, 2, 4, 6, 8, 10, 12.

In some embodiments, the method may include, after the administering the dose of Netakimab on week 12, administering 3 mL doses of Netakimab once every four weeks thereafter.

In some embodiments, the method may include, after the administering the dose of Netakimab on week 12, administering 3 mL doses of Netakimab once every two weeks thereafter.

In some embodiments, the 3 mL may be delivered via syringe in three separate 1 mL doses.

In some embodiments, the syringe may be a pre-filled syringe.

In some embodiments, the pharmaceutical composition may be administered intramuscularly.

In some embodiments, the pharmaceutical composition may be administered subcutaneously.

In some embodiments, the pharmaceutical composition may be administered intravenously.

Another broad aspect is a method of treating ankylosing spondylitis comprising administering to a patient a pharmacologically effective volume of the pharmaceutical composition as described herein.

In some embodiments, 1 mL of the pharmaceutical composition may be administered.

In some embodiments, 1 mL of the pharmaceutical composition may be administered once a week during week 0, 1, 2.

In some embodiments, the method may include, after the administering the dose of Netakimab on week 2, administering 1 mL doses of Netakimab once every two weeks thereafter.

In some embodiments, 1 mL of the pharmaceutical composition may be administered once a week during week 0, 1, 2, 4, 6, 8, 10, 12.

In some embodiments, after the administering the dose of Netakimab on week 12, the method may include administering 1 mL doses of Netakimab once every two weeks thereafter.

In some embodiments, 2 mL of the pharmaceutical composition may be administered.

In some embodiments, 2 mL of the pharmaceutical composition may be administered once a week during week 0, 1, 2.

In some embodiments, the method may include, after the administering the dose of Netakimab on week 2, administering 2 mL doses of Netakimab once every two weeks thereafter.

In some embodiments, 2 mL of the pharmaceutical composition may be administered once a week during week 0, 1, 2, 4, 6, 8, 10, 12.

In some embodiments, the method may include, after the administering the dose of Netakimab on week 12, administering 2 mL doses of Netakimab once every two weeks thereafter.

In some embodiments, after administration of the 2 mL dose of Netakimab on week 12, starting on week 16 the method may include administering 2 mL doses of Netakimab once every two weeks thereafter.

In some embodiments, after administration of the 2 mL dose of Netakimab on week 12, starting on week 16 the method may include administering 3 mL doses of Netakimab once every two weeks thereafter.

In some embodiments, the 2 mL may be delivered via syringe in two separate 1 mL doses.

In some embodiments, the syringe may be a pre-filled syringe.

In some embodiments, 3 mL of the pharmaceutical composition may be administered.

In some embodiments, 3 mL of the pharmaceutical composition may be administered once a week during week 0, 1, 2.

In some embodiments, the method may include, after the administering the dose of Netakimab on week 2, administering 3 mL doses of Netakimab once every two weeks thereafter.

In some embodiments, 3 mL of the pharmaceutical composition may be administered once a week during week 0, 1, 2, 4, 6, 8, 10, 12.

In some embodiments, the method may include, after the administering the dose of Netakimab on week 12, administering 3 mL doses of Netakimab once every two weeks thereafter.

In some embodiments, after administration of the 3 mL dose of Netakimab on week 12, starting on week 16 the method may include administering 2 mL doses of Netakimab once every two weeks thereafter.

In some embodiments, after administration the 3 mL dose of Netakimab on week 12, starting on week 16 the method may include administering 3 mL doses of Netakimab once every two weeks thereafter.

In some embodiments, the 3 mL may be delivered via syringe in three separate 1 mL doses.

In some embodiments, the syringe may be a pre-filled syringe.

In some embodiments, the pharmaceutical composition may be administered intramuscularly.

In some embodiments, the pharmaceutical composition may be administered subcutaneously.

In some embodiments, the pharmaceutical composition may be administered intravenously.

Another broad aspect is a pharmaceutical composition suitable for administration to a subject for inhibiting IL17a protein activity wherein, for each 1 mL of the pharmaceutical composition, the pharmaceutical composition comprises:

| | |
|---|---|
| Netakimab | 60.0 mg, |
| sodium acetate trihydrate | 1.74 mg, |
| trehalose dihydrate | 80 mg, |
| poloxamer (kollifor) 188 | 0.5 mg, |
| glacial acetic acid ad | pH 5.0, |
| water for injection ad | 1.0 mL. |

Another broad aspect is a method of treating psoriasis comprising, administering to a patient a pharmacologically effective volume of the pharmaceutical composition as described herein.

In some embodiments, 1 mL of the pharmaceutical composition may be administered.

In some embodiments, 1 mL of the pharmaceutical composition may be administered once a week during week 0, 1, 2, 4, 6, 8, 10.

In some embodiments, the method may include, after the administering the dose of Netakimab on week 10, administering 1 mL doses of Netakimab once every four weeks thereafter.

In some embodiments, the method may include, after the administering the dose of Netakimab on week 10, administering 1 mL doses of Netakimab once every two weeks thereafter.

In some embodiments, 2 mL of the pharmaceutical composition may be administered.

In some embodiments, 2 mL of the pharmaceutical composition may be administered once a week during week 0, 1, 2, 4, 6, 8, 10.

In some embodiments, 2 mL of the pharmaceutical composition may be administered once a week during week 0, 1, 2, 6, 10.

In some embodiments, the method may include, after the administering the dose of Netakimab on week 10, administering 2 mL doses of Netakimab once every four weeks thereafter.

In some embodiments, the method may include, after the administering the dose of Netakimab on week 10, administering 2 mL doses of Netakimab once every two weeks thereafter.

In some embodiments, 2 mL of the pharmaceutical composition may be administered once a week during week 0, 1, 2, 4, 6, 8, 10, 12.

In some embodiments, the method may include, after the administering the dose of Netakimab on week 12, administering 2 mL doses of Netakimab once every four weeks thereafter.

In some embodiments, the method may include, after the administering the dose of Netakimab on week 12, administering 2 mL doses of Netakimab once every two weeks thereafter.

In some embodiments, the method may include, administering the dose of Netakimab on week 12, administering 2 mL doses of Netakimab once every four weeks during next 12 weeks thereafter.

In some embodiments, the method may include, after the administering the dose of Netakimab on week 12, administering 2 mL doses of Netakimab once every two weeks during next 12 weeks thereafter.

In some embodiments, the method may include the administering of the pharmaceutical composition according to the following regimen:
1) administering 2 mL doses of Netakimab once a week during week 0, 1, 2, 4, 6, 8, 10, 12,
2) administering 2 mL doses of Netakimab once every two weeks during next 12 weeks thereafter,
3) administering 2 mL doses of Netakimab once every four weeks thereafter.

In some embodiments, the method may include the administering of the pharmaceutical, composition according to the following regimen:
1) administering 2 mL doses of Netakimab once a week during week 0, 1, 2, 4, 6, 8, 10, 12,
2) administering 2 mL doses of Netakimab once every two weeks during next 12 weeks thereafter,
3) administering 2 mL doses of Netakimab once every two weeks thereafter.

In some embodiments, the method may include the administering of the pharmaceutical composition according to the following regimen:
1) administering 2 mL doses of Netakimab once a week during week 0, 1, 2, 4, 6, 8, 10, 12,
2) administering 2 mL doses of Netakimab once every four weeks during next 12 weeks thereafter,
3) administering 2 mL doses of Netakimab once every four weeks thereafter.

In some embodiments, the method may include the administering of the pharmaceutical composition according to the following regimen:
1) administering 2 mL doses of Netakimab once a week during week 0, 1, 2, 4, 6, 8, 10, 12,
2) administering 2 mL doses of Netakimab once every four weeks during next 12 weeks thereafter,
3) administering 2 mL doses of Netakimab once every two weeks thereafter.

In some embodiments, the 2 mL may be delivered via syringe in two separate 1 mL doses.

In some embodiments, the syringe may be a pre-filled syringe.

In some embodiments, the pharmaceutical composition may be administered intramuscularly.

In some embodiments, the pharmaceutical composition may be administered subcutaneously.

In some embodiments, the pharmaceutical composition may be administered intravenously.

Another broad aspect is a method of treating psoriatic arthritis comprising administering to a patient a pharmacologically effective volume of the pharmaceutical composition as described herein.

In some embodiments, 1 mL of the pharmaceutical composition may be administered.

In some embodiments, 2 mL of the pharmaceutical composition may be administered.

In some embodiments, 2 mL of the pharmaceutical composition may be administered once a week during week 0, 1, 2, 4, 6, 8, 10.

In some embodiments, 2 mL of the pharmaceutical composition may be administered once a week during week 0, 1, 2, 6, 10.

In some embodiments, the method may include, after the administering the dose of Netakimab on week 10, administering 2 mL doses of Netakimab once every four weeks thereafter.

In some embodiments, the method may include, after the administering the dose of Netakimab on week 10, administering 2 mL doses of Netakimab once every two weeks thereafter.

In some embodiments, 2 mL of the pharmaceutical composition may be administered once a week during week 0, 1, 2, 4, 6, 8, 10, 12.

In some embodiments, the method may include, after the administering the dose of Netakimab on week 12, administering 2 mL doses of Netakimab once every four weeks thereafter.

In some embodiments, the method may include, after the administering the dose of Netakimab on week 12, administering 2 mL doses of Netakimab once every two weeks thereafter.

In some embodiments, the 2 mL may be delivered via syringe in two separate 1 mL doses.

In some embodiments, the syringe may be a pre-filled syringe.

In some embodiments, the pharmaceutical composition may be administered intramuscularly.

In some embodiments, the pharmaceutical composition may be administered subcutaneously.

In some embodiments, the pharmaceutical composition may be administered intravenously.

Another broad aspect is a method of treating ankylosing spondylitis comprising administering to a patient a pharmacologically effective volume of the pharmaceutical composition as described herein.

In some embodiments, 1 mL of the pharmaceutical composition may be administered.

In some embodiments, 1 mL of the pharmaceutical composition may be administered once a week during week 0, 1, 2.

In some embodiments, after the administering the dose of Netakimab on week 2, the method may include administering 1 mL doses of Netakimab once every two weeks thereafter.

In some embodiments, 1 mL of the pharmaceutical composition may be administered once a week during week 0, 1, 2, 4, 6, 8, 10, 12.

In some embodiments, after the administering the dose of Netakimab on week 12, the method may include administering 1 mL doses of Netakimab once every two weeks thereafter.

In some embodiments, 2 mL of the pharmaceutical composition may be administered.

In some embodiments, 2 mL of the pharmaceutical composition may be administered once a week during week 0, 1, 2.

In some embodiments, after the administering the dose of Netakimab on week 2, the method may include administering 2 mL doses of Netakimab once every two weeks thereafter.

In some embodiments, 2 mL of the pharmaceutical composition may be administered once a week during week 0, 1, 2, 4, 6, 8, 10, 12.

In some embodiments, the method may include, after the administering the dose of Netakimab on week 12, administering 2 mL doses of Netakimab once every two weeks thereafter.

In some embodiments, after administration of the 2 mL dose of Netakimab on week 12, starting on week 16 the method may include administering 2 mL doses of Netakimab once every two weeks thereafter.

In some embodiments, the 2 mL may be delivered via syringe in two separate 1 mL doses.

In some embodiments, the syringe may be a pre-filled syringe.

In some embodiments, the pharmaceutical composition may be administered intramuscularly.

In some embodiments, the pharmaceutical composition may be administered subcutaneously.

In some embodiments, the pharmaceutical composition may be administered intravenously.

Another broad aspect is use of Netakimab for treating psoriasis in doses of 40 mg of Netakimab administered once a week during week 0, 1, 2, 4, 6, 8 and 10.

Another broad aspect is use of Netakimab for treating psoriasis in doses of 40 mg of Netakimab administered once a week during week 0, 1, 2, 4, 6, 8, 10 and once every four weeks thereafter.

Another broad aspect is use of Netakimab for treating psoriasis in doses of 40 mg of Netakimab administered once a week during week 0, 1, 2, 4, 6, 8, 10 and once every two weeks thereafter.

Another broad aspect is use of Netakimab for treating psoriasis in doses of 80 mg of Netakimab administered once a week during week 0, 1, 2, 4, 6, 8 and 10.

Another broad aspect is use of Netakimab for treating psoriasis in doses of 80 mg of Netakimab administered once a week during week 0, 1, 2, 4, 6, 8, 10 and once every four weeks thereafter.

Another broad aspect is use of Netakimab for treating psoriasis in doses of 80 mg of Netakimab administered once a week during week 0, 1, 2, 4, 6, 8, 10 and once every two weeks thereafter.

Another broad aspect is use of Netakimab for treating psoriasis in doses of 80 mg of Netakimab administered once a week during week 0, 1, 2, 6 and 10.

Another broad aspect is use of Netakimab for treating psoriasis in doses of 80 mg of Netakimab administered once a week during week 0, 1, 2, 6, 10 and once every four weeks thereafter.

Another broad aspect is use of Netakimab for treating psoriasis in doses of 80 mg of Netakimab administered once a week during week 0, 1, 2, 6, 10 and once every two weeks thereafter.

Another broad aspect is use of Netakimab for treating ipsoriasis in doses of 80 mg of Netakimab administered once a week during week 0, 1, 2, 4, 6, 8, 10, 12.

Another broad aspect is use of Netakimab for treating psoriasis in doses of 80 mg of Netakimab administered once a week during week 0, 1, 2, 4, 6, 8, 10, 12 and once every four weeks thereafter.

Another broad aspect is use of Netakimab for treating psoriasis in doses of 80 mg of Netakimab administered once a week during week 0, 1, 2, 4, 6, 8, 10, 12 and once every two weeks thereafter.

Another broad aspect is use of Netakimab for treating psoriasis in doses of 80 mg of Netakimab administered once a week during week 0, 1, 2, 4, 6, 8, 10, 12 and once every four weeks during next 12 weeks thereafter.

Another broad aspect is use of Netakimab for treating psoriasis in doses of 80 mg of Netakimab administered once a week during week 0, 1, 2, 4, 6, 8, 10, 12 and once every two weeks during next 12 weeks thereafter.

Another broad aspect is use of Netakimab for treating psoriasis in doses of 80 mg of Netakimab administered in accordance to the following regimen:
1) administering the dose of 80 mg of Netakimab once a week during week 0, 1, 2, 4, 6, 8, 10, 12,
2) administering the dose of 80 mg of Netakimab once every two weeks during next 12 weeks thereafter,
3) administering the dose of 80 mg of Netakimab once every four weeks thereafter.

Another broad aspect is use of Netakimab for treating psoriasis in doses of 80 mg of Netakimab administered in accordance to the following regimen:
1) administering the dose of 80 mg of Netakimab once a week during week 0, 1, 2, 4, 6, 8, 10, 12,
2) administering the dose of 80 mg of Netakimab once every two weeks during next 12 weeks thereafter,
3) administering the dose of 80 mg of Netakimab once every two weeks thereafter.

Another broad aspect is use of Netakimab for treating psoriasis in doses of 80 mg of Netakimab administered in accordance to the following regimen:
1) administering the dose of 80 mg of Netakimab once a week during week 0, 1, 2, 4, 6, 8, 10, 12,
2) administering the dose of 80 mg of Netakimab once every four weeks during next 12 weeks thereafter,
3) administering the dose of 80 mg of Netakimab once every four weeks thereafter.

Another broad aspect is use of Netakimab for treating psoriasis in doses of 80 mg of Netakimab administered in accordance to the following regimen:
1) administering the dose of 80 mg of Netakimab once a week during week 0, 1, 2, 4, 6, 8, 10, 12,
2) administering the dose of 80 mg of Netakimab once every four weeks during next 12 weeks thereafter,
3) administering the dose of 80 mg of Netakimab once every two weeks thereafter.

In some embodiments, each of the doses of 80 mg of Netakimab may be administered by two injections comprising 40 mg of Netakimab.

Another broad aspect is use of Netakimab for treating psoriasis in doses of 120 mg of Netakimab administered once a week during week 0, 1, 2, 4, 6, 8 and 10.

Another broad aspect is use of Netakimab for treating psoriasis in doses of 120 mg of Netakimab administered once a week during week 0, 1, 2, 4, 6, 8 and 10 and once every four weeks thereafter.

Another broad aspect is use of Netakimab for treating psoriasis in doses of 120 mg of Netakimab administered once a week during week 0, 1, 2, 4, 6, 8 and 10 and once every two weeks thereafter.

Another broad aspect is use of Netakimab for treating psoriasis in doses of 120 mg of Netakimab administered once a week during week 0, 1, 2, 6, 10.

Another broad aspect is use of Netakimab for treating psoriasis in doses of 120 mg of Netakimab administered once a week during week 0, 1, 2, 6, 10 and once every four weeks thereafter.

Another broad aspect is use of Netakimab for treating psoriasis in doses of 120 mg of Netakimab administered once a week during week 0, 1, 2, 6, 10 and once every two weeks thereafter.

Another broad aspect is use of Netakimab for treating psoriasis in doses of 120 mg of Netakimab administered once a week during week 0, 1, 2, 4, 6, 8, 10, 12.

Another broad aspect is use of Netakimab for treating psoriasis in doses of 120 mg of Netakimab administered once a week during week 0, 1, 2, 4, 6, 8, 10, 12 and once every four weeks thereafter.

Another broad aspect is use of Netakimab for treating psoriasis in doses of 120 mg of Netakimab administered once a week during week 0, 1, 2, 4, 6, 8, 10, 12 and once every two weeks thereafter.

Another broad aspect is use of Netakimab for treating psoriasis in doses of 120 mg of Netakimab administered once a week during week 0, 1, 2, 4, 6, 8, 10, 12 and once every four weeks during next 12 weeks thereafter.

Another broad aspect is use of Netakimab for treating psoriasis in doses of 120 mg of Netakimab administered once a week during week 0, 1, 2, 4, 6, 8, 10, 12 and once every two weeks during next 12 weeks thereafter.

Another broad aspect is use of Netakimab for treating psoriasis in doses of 120 mg of Netakimab administered in accordance to the following regimen:
1) administering the dose of 120 mg of Netakimab once a week during week 0, 1, 2, 4, 6, 8, 10, 12,
2) administering the dose of 120 mg of Netakimab once every two weeks during next 12 weeks thereafter,
3) administering the dose of 120 mg of Netakimab once every four weeks thereafter.

Another broad aspect is use of Netakimab for treating psoriasis in doses of 120 mg of Netakimab administered in accordance to the following regimen:
1) administering the dose of 120 mg of Netakimab once a week during week 0, 1, 2, 4, 6, 8, 10, 12,
2) administering the dose of 120 mg of Netakimab once every two weeks during next 12 weeks thereafter,
3) administering the dose of 120 mg of Netakimab once every two weeks thereafter.

Another broad aspect is use of Netakimab for treating psoriasis in doses of 120 mg of Netakimab administered in accordance to the following regimen:
1) administering the dose of 120 mg of Netakimab once a week during week 0, 1, 2, 4, 6, 8, 10, 12,
2) administering the dose of 120 mg of Netakimab once every four weeks during next 12 weeks thereafter,
3) administering the dose of 120 mg of Netakimab once every four weeks thereafter.

Another broad aspect is use of Netakimab for treating psoriasis in doses of 120 mg of Netakimab administered in accordance to the following regimen:
1) administering the dose of 120 mg of Netakimab once a week during week 0, 1, 2, 4, 6, 8, 10, 12,
2) administering the dose of 120 mg of Netakimab once every four weeks during next 12 weeks thereafter,
3) administering the dose of 120 mg of Netakimab once every two weeks thereafter.

In some embodiments, each of the doses of 120 mg of Netakimab may be administered by three injections comprising 40 mg of Netakimab.

In some embodiments, each of the doses of 120 mg of Netakimab may be administered by two injections comprising 60 mg of Netakimab.

In some embodiments, Netakimab may be administered by subcutaneous injection.

In some embodiments, Netakimab may be administered by intravenous injection.

In some embodiments, psoriasis may be plaque psoriasis.

Another broad aspect is use of Netakimab for treating psoriatic arthritis in doses of 120 mg of Netakimab administered once a week during week 0, 1, 2, 4, 6, 8, 10.

Another broad aspect is use of Netakimab for treating psoriatic arthritis in doses of 120 mg of Netakimab administered once a week during week 0, 1, 2, 4, 6, 8, 10 and once every four weeks thereafter.

Another broad aspect is use of Netakimab for treating psoriatic arthritis in doses of 120 mg of Netakimab administered once a week during week 0, 1, 2, 4, 6, 8, 10 and once every two weeks thereafter.

Another broad aspect is use of Netakimab for treating psoriatic arthritis in doses of 120 mg of Netakimab administered once a week during week 0, 1, 2, 6 and 10.

Another broad aspect is use of Netakimab for treating psoriatic arthritis in doses of 120 mg of Netakimab administered once a week during week 0, 1, 2, 6, 10 and once every four weeks thereafter.

Another broad aspect is use of Netakimab for treating psoriatic arthritis in doses of 120 mg of Netakimab administered once a week during week 0, 1, 2, 6, 10 and once every two weeks thereafter.

Another broad aspect is use of Netakimab for treating psoriatic arthritis in doses of 120 mg of Netakimab administered once a week during week 0, 1, 2, 4, 6, 8, 10, 12.

Another broad aspect is use of Netakimab for treating psoriatic arthritis in doses of 120 mg of Netakimab administered once a week during week 0, 1, 2, 4, 6, 8, 10, 12 and once every four weeks thereafter.

Another broad aspect is use of Netakimab for treating psoriatic arthritis in doses of 120 mg of Netakimab administered once a week during week 0, 1, 2, 4, 6, 8, 10, 12 and once every two weeks thereafter.

In some embodiments, each of the doses of 120 mg of Netakimab may be administered by three injections comprising 40 mg of Netakimab.

In some embodiments, each of the doses of 120 mg of Netakimab may be administered by two injections comprising 60 mg of Netakimab.

In some embodiments, Netakimab may be administered by subcutaneous injection.

In some embodiments, Netakimab may be administered by intravenous injection.

Another broad aspect is use of Netakimab for treating ankylosing spondilitis in doses of 40 mg of Netakimab administered once a week during week 0, 1, 2.

Another broad aspect is use of Netakimab for treating ankylosing spondilitis in doses of 40 mg of Netakimab administered once a week during week 0, 1, 2 and once every two weeks thereafter.

Another broad aspect is use of Netakimab for treating ankylosing spondilitis in doses of 40 mg of Netakimab administered once a week during week 0, 1, 2, 4, 6, 8, 10, 12.

Another broad aspect is use of Netakimab for treating ankylosing spondilitis in doses of 40 mg of Netakimab administered once a week during week 0, 1, 2, 4, 6, 8, 10, 12 and once every two weeks thereafter.

Another broad aspect is use of Netakimab for treating ankylosing spondilitis in doses of 80 mg of Netakimab administered once a week during week 0, 1, 2.

Another broad aspect is use of Netakimab for treating ankylosing, spondilitis in doses of 80 mg of Netakimab administered once a week during week 0, 1, 2 and once every two weeks thereafter.

Another broad aspect is use of Netakimab for treating ankylosing spondilitis in doses of 80 mg of Netakimab administered once a week during week 0, 1, 2, 4, 6, 8, 10, 12.

Another broad aspect is use of Netakimab for treating ankylosing spondilitis in doses of 80 mg of Netakimab administered once a week during week 0, 1, 2, 4, 6, 8, 10, 12 and once every two weeks thereafter.

Another broad aspect is use of Netakimab for treating ankylosing spondilitis in doses of 80 mg of Netakimab administered once a week during week 0, 1, 2, 4, 6, 8, 10, 12 and, starting on week 16, in doses of 80 mg of Netakimab administered once every two weeks thereafter.

Another broad aspect is use of Netakimab for treating ankylosing spondilitis in doses of 80 mg of Netakimab administered once a week during week 0, 1, 2, 4, 6, 8, 10, 12 and, starting on week 16, in doses of 120 mg of Netakimab administered once every two weeks thereafter.

In some embodiments, each of the doses of 80 mg of Netakimab may be administered by two injections comprising 40 mg of Netakimab.

Another broad aspect is use of Netakimab for treating ankylosing spondilitis in doses of 120 mg of Netakimab administered once a week during week 0, 1, 2.

Another broad aspect is use of Netakimab for treating ankylosing spondilitis in doses of 120 mg of Netakimab administered once a week during week 0, 1, 2 and once every two weeks thereafter.

Another broad aspect is use of Netakimab for treating ankylosing spondilitis in doses of 120 mg of Netakimab administered once a week during week 0, 1, 2, 4, 6, 8, 10, 12.

Another broad aspect is use of Netakimab for treating ankylosing spondilitis in doses of 120 mg of Netakimab administered once a week during week 0, 1, 2, 4, 6, 8, 10, 12 and once every two weeks thereafter.

Another broad aspect is use of Netakimab for treating ankylosing spondilitis in doses of 120 mg of Netakimab administered once a week during week 0, 1, 2, 4, 6, 8, 10, 12 and, starting on week 16, in doses of 80 mg of Netakimab administered once every two weeks thereafter.

Another broad aspect is use of Netakimab for treating ankylosing spondilitis in doses of 120 mg of Netakimab administered once a week during week 0, 1, 2, 4, 6, 8, 10, 12 and, starting on week 16, in doses of 120 mg of Netakimab administered once every two weeks thereafter.

In some embodiments, each of the doses of 120 mg of Netakimab may be administered by three injections comprising 40 mg of Netakimab.

In some embodiments, each of the doses of 120 mg of Netakimab may be administered by two injections comprising 60 mg of Netakimab.

In some embodiments, Netakimab may be administered by subcutaneous injection.

In some embodiments, Netakimab may be administered by intravenous injection.

Another broad aspect is use of a pharmaceutical composition comprising, for each 1 mL of the pharmaceutical composition:

| | |
|---|---|
| Netakimab | 40.0 mg, |
| histidine hydrochloride monohydrate | 0.4 mg, |
| L-histidine | 0.4 mg, |
| mannitol | 54.5 mg, |
| water for injection ad | 1.0 mL, |
| for inhibiting IL17a protein activity in a subject. | | for inhibiting IL17a protein activity in a subject.

In some embodiments, 1 mL of the pharmaceutical composition may be contained in a syringe.

In some embodiments, 2 mL of the pharmaceutical composition may be contained in a syringe.

In some embodiments, the use may be for treating psoriasis.

In some embodiments, the use for treating psoriasis may be by administering a 1 mL dose of the pharmaceutical composition to the subject.

In some embodiments, the use for treating psoriasis may be by administering a 1 mL dose of the pharmaceutical composition to the subject once a week during week 0, 1, 2, 4, 6, 8, 10.

In some embodiments, the use for treating psoriasis may be by administering a 1 mL dose of the pharmaceutical composition to the subject once a week during week 0, 1, 2, 4, 6, 8, 10 and once every four weeks thereafter.

In some embodiments, the use for treating psoriasis may be by administering a 1 mL dose of the pharmaceutical composition to the subject once a week during week 0, 1, 2, 4, 6, 8, 10 and once every two weeks thereafter.

In some embodiments, the use for treating psoriasis may be by administering a 2 mL dose of the pharmaceutical composition to the subject.

In some embodiments, the use for treating psoriasis may be by administering a 2 mL dose of the pharmaceutical composition to the subject once a week during week 0, 1, 2, 4, 6, 8, 10.

In some embodiments, the use for treating psoriasis may be by administering a 2 mL dose of the pharmaceutical composition to the subject once a week during week 0, 1, 2, 4, 6, 8, 10 and once every four weeks thereafter.

In some embodiments, the use for treating psoriasis may be by administering a 2 mL dose of the pharmaceutical composition to the subject once a week during week 0, 1, 2, 4, 6, 8, 10 and once every two weeks thereafter.

In some embodiments, the use for treating psoriasis may be by administering a 2 mL dose of the pharmaceutical composition to the subject once a week during week 0, 1, 2, 6, 10.

In some embodiments, the use for treating psoriasis may be by administering a 2 mL dose of the pharmaceutical composition to the subject once a week during week 0, 1, 2, 6, 10 and once every four weeks thereafter.

In some embodiments, the use for treating psoriasis may be by administering a 2 mL dose of the pharmaceutical composition to the subject once a week during week 0, 1, 2, 6, 10 and once every two weeks thereafter.

In some embodiments, the use for treating psoriasis may be by administering a 2 mL dose of the pharmaceutical composition to the subject once a week during week 0, 1, 2, 4, 6, 8, 10, 12.

In some embodiments, the use for treating psoriasis may be by administering a 2 mL dose of the pharmaceutical composition to the subject once a week during week 0, 1, 2, 4, 6, 8, 10, 12 and once every four weeks thereafter.

In some embodiments, the use for treating psoriasis may be by administering a 2 mL dose of the pharmaceutical composition to the subject once a week during week 0, 1, 2, 4, 6, 8, 10, 12 and once every two weeks thereafter.

In some embodiments, the use for treating psoriasis may be by administering a 2 mL dose of the pharmaceutical composition to the subject once a week during week 0, 1, 2, 4, 6, 8, 10, 12 and once every four weeks during next 12 weeks thereafter.

In some embodiments, the use for treating psoriasis may be by administering a 2 mL dose of the pharmaceutical composition to the subject once a week during week 0, 1, 2, 4, 6, 8, 10, 12 and once every two weeks during next 12 weeks thereafter.

In some embodiments, the use for treating psoriasis may be by administering a 2 mL dose of the pharmaceutical composition to the subject according to the following regimen:
1) administering 2 mL of the pharmaceutical composition once a week during week 0, 1, 2, 4, 6, 8, 10, 12,
2) administering 2 mL of the pharmaceutical composition once every two weeks during next 12 weeks thereafter,
3) administering 2 mL of the pharmaceutical composition once every four weeks thereafter.

In some embodiments, the use for treating psoriasis may be by administering a 2 mL dose of the pharmaceutical composition to the subject according to the following regimen:
1) administering 2 mL of the pharmaceutical composition once a week during week 0, 1, 2, 4, 6, 8, 10, 12,
2) administering 2 mL of the pharmaceutical composition once every two weeks during next 12 weeks thereafter,
3) administering 2 mL of the pharmaceutical composition once every two weeks thereafter.

In some embodiments, the use for treating psoriasis may be by administering a 2 mL dose of the pharmaceutical composition to the subject according to the following regimen:
1) administering 2 mL of the pharmaceutical composition once a week during week 0, 1, 2, 4, 6, 8, 10, 12,
2) administering 2 mL of the pharmaceutical composition once every four weeks during next 12 weeks thereafter,
3) administering 2 mL of the pharmaceutical composition once every four weeks thereafter.

In some embodiments, the use for treating psoriasis may be by administering a 2 mL dose of the pharmaceutical composition to the subject according to the following regimen:
1) administering 2 mL of the pharmaceutical composition once a week during week 0, 1, 2, 4, 6, 8, 10, 12,
2) administering 2 mL of the pharmaceutical composition once every four weeks during next 12 weeks thereafter,
3) administering 2 mL of the pharmaceutical composition once every two weeks thereafter.

In some embodiments, each of the doses of 2 mL of the pharmaceutical composition may be administered via syringe in two separate 1 mL doses.

In some embodiments, the syringe may be a pre-filled syringe.

In some embodiments, the use for treating psoriasis may be by administering a 3 mL dose of the pharmaceutical composition to the subject.

In some embodiments, the use for treating psoriasis may be by administering a 3 mL dose of the pharmaceutical composition to the subject once a week during week 0, 1, 2, 4, 6, 8, 10.

In some embodiments, the use for treating psoriasis may be by administering a 3 mL dose of the pharmaceutical composition to the subject once a week during week 0, 1, 2, 4, 6, 8, 10 and once every four weeks thereafter.

In some embodiments, the use for treating psoriasis may be by administering a 3 mL dose of the pharmaceutical composition to the subject once a week during week 0, 1, 2, 4, 6, 8, 10 and once every two weeks thereafter.

In some embodiments, the use for treating psoriasis may be by administering a 3 mL dose of the pharmaceutical composition to the subject once a week during week 0, 1, 2, 6, 10.

In some embodiments, the use for treating psoriasis may be by administering a 3 mL dose of the pharmaceutical composition to the subject once a week during week 0, 1, 2, 6, 10 and once every four weeks thereafter.

In some embodiments, the use for treating psoriasis may be by administering, a 3 mL dose of the pharmaceutical composition to the subject once a week during week 0, 1, 2, 6, 10 and once every two weeks thereafter.

In some embodiments, the use for treating psoriasis may be by administering a 3 mL dose of the pharmaceutical composition to the subject once a week during week 0, 1, 2, 4, 6, 8, 10, 12.

In some embodiments, the use for treating psoriasis may be by administering a 3 mL dose of the pharmaceutical composition to the subject once a week during week 0, 1, 2, 4, 6, 8, 10, 12 and once every four weeks thereafter.

In some embodiments, the use for treating psoriasis may be by administering a 3 mL dose of the pharmaceutical composition to the subject once a week during week 0, 1, 2, 4, 6, 8, 10, 12 and once every two weeks thereafter.

In some embodiments, the use for treating psoriasis may be by administering a 3 mL dose of the pharmaceutical composition to the subject once a week during week 0, 1, 2, 4, 6, 8, 10, 12 and once every four weeks during next 12 weeks thereafter.

In some embodiments, the use for treating psoriasis may be by administering a 3 mL dose of the pharmaceutical composition to the subject once a week during week 0, 1, 2, 4, 6, 8, 10, 12 and once every two weeks during next 12 weeks thereafter.

In some embodiments, the use for treating psoriasis may be by administering a 3 mL dose of the pharmaceutical composition to the subject according to the following regimen:
1) administering 3 mL of the pharmaceutical composition once a week during week 0, 1, 2, 4, 6, 8, 10, 12,
2) administering 3 mL of the pharmaceutical composition once every two weeks during next 12 weeks thereafter,
3) administering 3 mL of the pharmaceutical composition Netakimab once every four weeks thereafter.

In some embodiments, the use for treating psoriasis may be by administering a 3 mL dose of the pharmaceutical composition to the subject according to the following regimen:
1) administering 3 mL of the pharmaceutical composition once a week during week 0, 1, 2, 4, 6, 8, 10, 12,
2) administering 3 mL of the pharmaceutical composition once every two weeks during next 12 weeks thereafter,
3) administering 3 mL of the pharmaceutical composition once every two weeks thereafter.

In some embodiments, the use for treating psoriasis may be by administering a 3 mL dose of the pharmaceutical composition to the subject according to the following regimen:
1) administering 3 mL of the pharmaceutical composition once a week during week 0, 1, 2, 4, 6, 8, 10, 12,
2) administering 3 mL of the pharmaceutical composition once every four weeks during next 12 weeks thereafter,
3) administering 3 mL of the pharmaceutical composition once every four weeks thereafter.

In some embodiments, the use for treating psoriasis may be by administering a 3 mL dose of the pharmaceutical composition to the subject according to the following regimen:
1) administering 3 mL of the pharmaceutical composition once a week during week 0, 1, 2, 4, 6, 8, 10, 12,
2) administering 3 mL of the pharmaceutical composition once every four weeks during next 12 weeks thereafter,
3) administering 3 mL of the pharmaceutical composition once every two weeks thereafter.

In some embodiments, each of the doses of 3 mL of the pharmaceutical composition may be administered via syringe in three separate 1 mL doses.

In some embodiments, the syringe may be a pre-filled syringe.

In some embodiments, the pharmaceutical composition may be administered intramuscularly.

In some embodiments, the pharmaceutical composition may be administered subcutaneously.

In some embodiments, the pharmaceutical composition may be administered intravenously.

In some embodiments, psoriasis may be plaque psoriasis.

In some embodiments, the use may be for treating psoriatic arthritis.

In some embodiments, the use for treating psoriatic arthritis may be by administering a 1 mL dose of the pharmaceutical composition to the subject.

In some embodiments, the use for treating psoriatic arthritis may be by administering a 3 mL dose of the pharmaceutical composition to the subject.

In some embodiments, the use for treating psoriatic arthritis may be by administering a 3 mL dose of the pharmaceutical composition to the subject once a week during week 0, 1, 2, 4, 6, 8, 10.

In some embodiments, the use for treating psoriatic arthritis may be by administering a 3 mL dose of the pharmaceutical composition to the subject once a week during week 0, 1, 2, 4, 6, 8, 10 and once every four weeks thereafter.

In some embodiments, the use for treating psoriatic arthritis may be by administering a 3 mL dose of the pharmaceutical composition to the subject once a week during week 0, 1, 2, 4, 6, 8, 10 and once every two weeks thereafter.

In some embodiments, the use for treating psoriatic arthritis may be by administering a 3 mL dose of the pharmaceutical composition to the subject once a week during week 0, 1, 2, 6, 10.

In some embodiments, the use for treating psoriatic arthritis may be by administering a 3 mL dose of the pharmaceutical composition to the subject once a week during week 0, 1, 2, 6, 10 and once every four weeks thereafter.

In some embodiments, the use for treating psoriatic arthritis may be by administering a 3 mL dose of the pharmaceutical composition to the subject once a week during week 0, 1, 2, 6, 10 and once every two weeks thereafter.

In some embodiments, the use for treating psoriatic arthritis may be by administering a 3 mL dose of the pharmaceutical composition to the subject once a week during week 0, 1, 2, 4, 6, 8, 10, 12.

In some embodiments, the use for treating psoriatic arthritis may be by administering a 3 mL dose of the pharmaceutical composition to the subject once a week during week 0, 1, 2, 4, 6, 8, 10, 12 and once every four weeks thereafter.

In some embodiments, the use for treating psoriatic arthritis may be by administering a 3 mL dose of the pharmaceutical composition to the subject once a week during week 0, 1, 2, 4, 6, 8, 10, 12 and once every two weeks thereafter.

In some embodiments, each of the doses of 3 mL of the pharmaceutical composition may be administered via syringe in three separate 1 mL doses.

In some embodiments, the syringe may be a pre-filled syringe.

In some embodiments, the pharmaceutical composition may be administered intramuscularly.

In some embodiments, the pharmaceutical composition may be administered subcutaneously.

In some embodiments, the pharmaceutical composition may be administered intravenously.

In some embodiments, the use may be for treating ankylosing spondylitis.

In some embodiments, the use for treating ankylosing spondylitis may be by administering a 1 mL dose of the pharmaceutical composition to the subject.

In some embodiments, the use for treating ankylosing spondylitis may be by administering a 1 mL dose of the pharmaceutical composition to the subject once a week during week 0, 1, 2.

In some embodiments, the use for treating ankylosing spondylitis may be by administering a 1 mL dose of the pharmaceutical composition to the subject once a week during week 0, 1, 2 and once every two weeks thereafter.

In some embodiments, the use for treating ankylosing spondylitis may be by administering a 1 mL dose of the pharmaceutical composition to the subject once a week during week 0, 1, 2, 4, 6, 8, 10, 12.

In some embodiments, the use for treating ankylosing spondylitis may be by administering a 1 mL dose of the pharmaceutical composition to the subject once a week during week 0, 1, 2, 4, 6, 8, 10, 12 and once every two weeks thereafter.

In some embodiments, the use for treating ankylosing spondylitis may be by administering a 2 mL dose of the pharmaceutical composition to the subject.

In some embodiments, the use for treating ankylosing spondylitis may be by administering a 2 mL dose of the pharmaceutical composition to the subject once a week during week 0, 1, 2.

In some embodiments, the use for treating ankylosing spondylitis may be by administering a 2 mL dose of the pharmaceutical composition to the subject once a week during week 0, 1, 2 and once every two weeks thereafter.

In some embodiments, the use for treating ankylosing spondylitis may be by administering a 2 mL dose of the pharmaceutical composition to the subject once a week during week 0, 1, 2, 4, 6, 8, 10, 12.

In some embodiments, the use for treating ankylosing spondylitis may be by administering a 2 mL dose of the pharmaceutical composition to the subject once a week during week 0, 1, 2, 4, 6, 8, 10, 12 and once every two weeks thereafter.

In some embodiments, the use for treating ankylosing spondylitis may be by administering a 2 mL dose of the pharmaceutical composition to the subject once a week during week 0, 1, 2, 4, 6, 8, 10, 12 and, starting on week 16, by administering a 2 mL dose of the pharmaceutical composition administered once every two weeks thereafter.

In some embodiments, the use for treating ankylosing spondylitis may be by administering a 2 mL dose of the pharmaceutical composition administered once a week during week 0, 1, 2, 4, 6, 8, 10, 12 and, starting on week 16, by administering a 3 mL dose of the pharmaceutical composition administered once every two weeks thereafter.

In some embodiments, each of the doses of 2 mL of the pharmaceutical composition may be administered via syringe in two separate 1 mL doses.

In some embodiments, the syringe may be a pre-filled syringe.

In some embodiments, the use for treating ankylosing spondylitis may be by administering a 3 mL dose of the pharmaceutical composition to the subject.

In some embodiments, the use for treating ankylosing spondylitis may be by administering a 3 mL dose of the pharmaceutical composition to the subject once a week during week 0, 1, 2.

In some embodiments, the use for treating ankylosing spondylitis may be by administering a 3 mL dose of the pharmaceutical composition to the subject once a week during week 0, 1, 2 and once every two weeks thereafter.

In some embodiments, the use for treating ankylosing spondylitis may be by administering a 3 mL dose of the pharmaceutical composition to the subject once a week during week 0, 1, 2, 4, 6, 8, 10, 12.

In some embodiments, the use for treating ankylosing spondylitis may be by administering a 3 mL dose of the pharmaceutical composition to the subject once a week during week 0, 1, 2, 4, 6, 8, 10, 12 and once every two weeks thereafter.

In some embodiments, the use for treating ankylosing spondylitis may be by administering a 3 mL dose of the pharmaceutical composition to the subject once a week during week 0, 1, 2, 4, 6, 8, 10, 12 and, starting on week 16, by administering a 3 mL dose of the pharmaceutical composition administered once every two weeks thereafter.

In some embodiments, the use for treating ankylosing spondylitis may be by administering a 3 mL dose of the pharmaceutical composition to the subject once a week during week 0, 1, 2, 4, 6, 8, 10, 12 and, starting on week 16, by administering a 2 mL dose of the pharmaceutical composition administered once every two weeks thereafter.

In some embodiments, each of the doses of 3 mL of the pharmaceutical composition may be administered via syringe in three separate 1 mL doses.

In some embodiments, the syringe may be a pre-filled syringe.

In some embodiments, the pharmaceutical composition may be administered intramuscularly.

In some embodiments, the pharmaceutical composition may be administered subcutaneously.

In some embodiments, the pharmaceutical composition may be administered intravenously.

Another broad aspect is use of a pharmaceutical composition comprising, for each 1 mL of the pharmaceutical composition:

| | |
|---|---|
| Netakimab | 60.0 mg, |
| sodium acetate trihydrate | 1.74 mg, |
| trehalose dihydrate | 80 mg, |

| | |
|---|---|
| poloxamer (kollifor) 188 | 0.5 mg, |
| glacial acetic acid ad | pH 5.0, |
| water for injection ad | 1.0 mL, |
| for inhibiting IL17a protein activity in a subject. | | for inhibiting IL17a protein activity in a subject.

In some embodiments, 1 mL of the pharmaceutical composition may be contained in a syringe.

In some embodiments, 2 mL of the pharmaceutical composition may be contained in a syringe.

In some embodiments, the use may be for treating psoriasis.

In some embodiments, the use for treating psoriasis may be by administering a 1 mL dose of the pharmaceutical composition to the subject.

In some embodiments, the use for treating psoriasis may be by administering a 1 mL dose of the pharmaceutical composition to the subject once a week during week 0, 1, 2, 4, 6, 8, 10.

In some embodiments, the use for treating psoriasis may be by administering a 1 mL dose of the pharmaceutical composition to the subject once a week during week 0, 1, 2, 4, 6, 8, 10 and once every four weeks thereafter.

In some embodiments, the use for treating psoriasis may be by administering a 1 mL dose of the pharmaceutical composition to the subject once a week during week 0, 1, 2, 4, 6, 8, 10 and once every two weeks thereafter.

In some embodiments, the use for treating psoriasis may be by administering a 2 mL dose of the pharmaceutical composition to the subject.

In some embodiments, the use for treating psoriasis may be by administering a 2 mL dose of the pharmaceutical composition to the subject once a week during week 0, 1, 2, 4, 6, 8, 10.

In some embodiments, the use for treating psoriasis may be by administering a 2 mL dose of the pharmaceutical composition to the subject once a week during week 0, 1, 2, 4, 6, 8, 10 and once every four weeks thereafter.

In some embodiments, the use for treating psoriasis may be by administering a 2 mL dose of the pharmaceutical composition to the subject once a week during week 0, 1, 2, 4, 6, 8, 10 and once every two weeks thereafter.

In some embodiments, the use for treating psoriasis may be by administering a 2 mL dose of the pharmaceutical composition to the subject once a week during week 0, 1, 2, 6, 10.

In some embodiments, the use for treating psoriasis may be by administering a 2 mL dose of the pharmaceutical composition to the subject once a week during week 0, 1, 2, 6, 10 and once every four weeks thereafter.

In some embodiments, the use for treating psoriasis may be by administering a 2 mL dose of the pharmaceutical composition to the subject once a week during week 0, 1, 2, 6, 10.

In some embodiments, the use for treating psoriasis may be by administering a 2 mL dose of the pharmaceutical composition to the subject once a week during week 0, 1, 2, 6, 10 and once every two weeks thereafter.

In some embodiments, the use for treating psoriasis may be by administering a 2 mL dose of the pharmaceutical composition to the subject once a week during week 0, 1, 2, 4, 6, 8, 10, 12.

In some embodiments, the use for treating psoriasis may be by administering a 2 mL dose of the pharmaceutical composition to the subject once a week during week 0, 1, 2, 4, 6, 8, 10, 12 and once every four weeks thereafter.

In some embodiments, the use for treating psoriasis may be by administering a 2 mL dose of the pharmaceutical composition to the subject once a week during week 0, 1, 2, 4, 6, 8, 10, 12 and once every two weeks thereafter.

In some embodiments, the use for treating psoriasis may be by administering a 2 mL dose of the pharmaceutical composition to the subject once a week during week 0, 1, 2, 4, 6, 8, 10, 12 and once every four weeks during next 12 weeks thereafter.

In some embodiments, the use for treating psoriasis may be by administering a 2 mL dose of the pharmaceutical composition to the subject once a week during week 0, 1, 2, 4, 6, 8, 10, 12 and once every two weeks during next 12 weeks thereafter.

In some embodiments, the use for treating psoriasis may be by administering a 2 mL dose of the pharmaceutical composition to the subject according to the following regimen:
1) administering 2 mL of the pharmaceutical composition once a week during week 0, 1, 2, 4, 6, 8, 10, 12,
2) administering 2 mL of the pharmaceutical composition once every two weeks during next 12 weeks thereafter,
3) administering 2 mL of the pharmaceutical composition Netakimab once every four weeks thereafter.

In some embodiments, the use for treating psoriasis may be by administering a 2 mL dose of the pharmaceutical composition to the subject according to the following regimen:
1) administering 2 mL of the pharmaceutical composition once a week during week 0, 1, 2, 4, 6, 8, 10, 12,
2) administering 2 mL of the pharmaceutical composition once every two weeks during next 12 weeks thereafter,
3) administering 2 mL of the pharmaceutical composition once every two weeks thereafter.

In some embodiments, the use for treating psoriasis may be by administering a 2 mL dose of the pharmaceutical composition to the subject according to the following regimen:
1) administering 2 mL of the pharmaceutical composition once a week during week 0, 1, 2, 4, 6, 8, 10, 12,
2) administering 2 mL of the pharmaceutical composition once every four weeks during next 12 weeks thereafter,
3) administering 2 mL of the pharmaceutical composition once every four weeks thereafter.

In some embodiments, the use for treating psoriasis may be by administering a 2 mL dose of the pharmaceutical composition to the subject according to the following regimen:
1) administering 2 mL of the pharmaceutical composition once a week during week 0, 1, 2, 4, 6, 8, 10, 12,
2) administering 2 mL of the pharmaceutical composition once every four weeks during next 12 weeks thereafter,
3) administering 2 mL of the pharmaceutical composition once every two weeks thereafter.

In some embodiments, each of the doses of 2 mL of the pharmaceutical composition may be administered via syringe in two separate 1 mL doses.

In some embodiments, the syringe may be a pre-filled syringe.

In some embodiments, the pharmaceutical composition may be administered subcutaneously.

In some embodiments, the pharmaceutical composition may be administered intravenously.

In some embodiments, the use may be for treating psoriatic arthritis.

In some embodiments, the use for treating psoriatic arthritis may be by administering a 1 mL dose of the pharmaceutical composition to the subject.

In some embodiments, the use for treating psoriatic arthritis may be by administering a 2 mL dose of the pharmaceutical composition to the subject.

In some embodiments, the use for treating psoriatic arthritis may be by administering a 2 mL dose of the pharmaceutical composition to the subject once a week during week 0, 1, 2, 4, 6, 8, 10.

In some embodiments, the use for treating psoriatic arthritis may be by administering a 2 mL dose of the pharmaceutical composition to the subject once a week during week 0, 1, 2, 4, 6, 8, 10 and once every four weeks thereafter.

In some embodiments, the use for treating psoriatic arthritis may be by administering a 2 mL dose of the pharmaceutical composition to the subject once a week during week 0, 1, 2, 4, 6, 8, 10 and once every two weeks thereafter.

In some embodiments, the use for treating psoriatic arthritis may be by administering a 2 mL dose of the pharmaceutical composition to the subject once a week during week 0, 1, 2, 6, 10.

In some embodiments, the use for treating psoriatic arthritis may be by administering a 2 mL dose of the pharmaceutical composition to the subject once a week during week 0, 1, 2, 6, 10 and once every four weeks thereafter.

In some embodiments, the use for treating psoriatic arthritis may be by administering a 2 mL dose of the pharmaceutical composition to the subject once a week during week 0, 1, 2, 6, 10 and once every two weeks thereafter.

In some embodiments, the use for treating psoriatic arthritis may be by administering a 2 mL dose of the pharmaceutical composition to the subject once a week during week 0, 1, 2, 4, 6, 8, 10, 12.

In some embodiments, the use for treating psoriatic arthritis may be by administering a 2 mL dose of the pharmaceutical composition to the subject once a week during week 0, 1, 2, 4, 6, 8, 10, 12 and once every four weeks thereafter.

In some embodiments, the use for treating psoriatic arthritis may be by administering a 2 mL dose of the pharmaceutical composition to the subject once a week during week 0, 1, 2, 4, 6, 8, 10, 12 and once every two weeks thereafter.

In some embodiments, each of the doses of 2 mL of the pharmaceutical composition may be administered via syringe in two separate 1 mL doses.

In some embodiments, the syringe may be a pre-filled syringe.

In some embodiments, the pharmaceutical composition may be administered intramuscularly.

In some embodiments, the pharmaceutical composition may be administered subcutaneously.

In some embodiments, the pharmaceutical composition may be administered intravenously.

In some embodiments, the use may be for treating ankylosing spondylitis.

In some embodiments, the use for treating ankylosing spondylitis may be by administering a 1 mL dose of the pharmaceutical composition to the subject.

In some embodiments, the use for treating ankylosing spondylitis may be by administering a 1 mL dose of the pharmaceutical composition to the subject once a week during week 0, 1, 2.

In some embodiments, the use for treating ankylosing spondylitis may be by administering a 1 mL dose of the pharmaceutical composition to the subject once a week during week 0, 1, 2 and once every two weeks thereafter.

In some embodiments, the use for treating ankylosing spondylitis may be by administering a 1 mL dose of the pharmaceutical composition to the subject once a week during week 0, 1, 2, 4, 6, 8, 10, 12.

In some embodiments, the use for treating ankylosing spondylitis may be by administering a 1 mL dose of the pharmaceutical composition to the subject once a week during week 0, 1, 2, 4, 6, 8, 10, 12 and once every two weeks thereafter.

In some embodiments, the use for treating ankylosing spondylitis may be by administering a 2 mL dose of the pharmaceutical composition to the subject.

In some embodiments, the use for treating ankylosing spondylitis may be by administering a 2 mL dose of the pharmaceutical composition to the subject once a week during week 0, 1, 2.

In some embodiments, the use for treating ankylosing spondylitis may be by administering a 2 mL dose of the pharmaceutical composition to the subject once a week during week 0, 1, 2 and once every two weeks thereafter.

In some embodiments, the use for treating ankylosing spondylitis may be by administering a 2 mL dose of the pharmaceutical composition to the subject once a week during week 0, 1, 2, 4, 6, 8, 10, 12.

In some embodiments, the use for treating ankylosing spondylitis may be by administering a 2 mL dose of the pharmaceutical composition to the subject once a week during week 0, 1, 2, 4, 6, 8, 10, 12 and once every two weeks thereafter.

In some embodiments, the use for treating ankylosing spondylitis may be by administering a 2 mL dose of the pharmaceutical composition to the subject once a week during week 0, 1, 2, 4, 6, 8, 10, 12 and, starting on week 16, by administering a 2 mL dose of the pharmaceutical composition administered once every two weeks thereafter.

In some embodiments, each of the doses of 2 mL of the pharmaceutical composition may be administered via syringe in two separate 1 mL doses.

In some embodiments, the syringe may be a pre-filled syringe.

In some embodiments, the pharmaceutical composition may be administered intramuscularly.

In some embodiments, the pharmaceutical composition may be administered subcutaneously.

In some embodiments, the pharmaceutical composition may be administered intravenously.

Another broad aspect is use for treating ankylosing spondylitis may be by administering a 2 mL dose of the said pharmaceutical composition comprising 120 mg of Netakimab to the subject once a week during week 0, 1, 2, 4, 6, 8, 10, 12 and, starting on week 16, by administering a 2 mL dose of the pharmaceutical composition comprising 80 mg of Netakimab, administered once every two weeks thereafter.

Another broad aspect is use for treating ankylosing spondylitis may be by administering a 2 mL dose of the said pharmaceutical composition comprising 80 mg of Netakimab, to the subject once a week during week 0, 1, 2, 4, 6, 8, 10, 12 and, starting on week 16, by administering a 2 mL dose of the pharmaceutical composition, comprising 120 mg of Netakimab, administered once every two weeks thereafter.

BRIEF DESCRIPTION OF THE DRAWINGS

The invention will be better understood by way of the following detailed description of embodiments of the invention with reference to the appended drawings, in which.

DETAILED DESCRIPTION

Definitions

Figure 1:
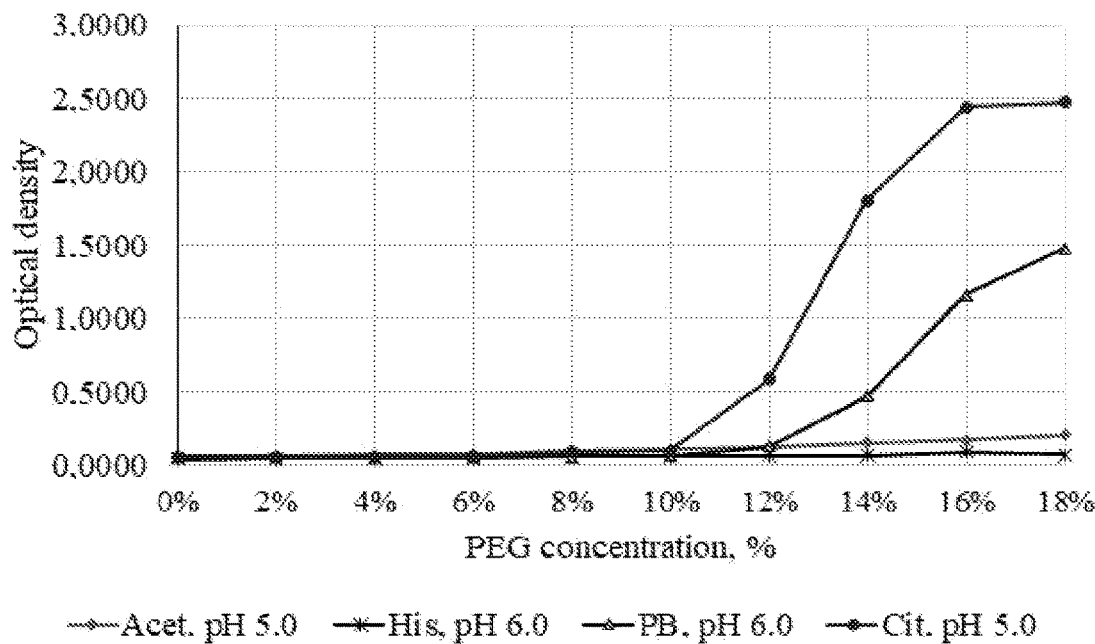
FIG. 1 is a graph illustrating the dependence of the optical density of solutions at 400 nm as a function of PEG concentration in exemplary anti-IL17a antibody compositions with different buffering agents.

"Monoclonal antibody" as used herein relates to an antibody obtained from llama, chimeric antibody, humanized antibody or fully human antibody, unless otherwise stated in the present application. Monoclonal antibodies according to the disclosure can be produced using, for example, recombinant technology, phage display technology, synthetic technology or the combinations of these or other technologies well known from the prior art.

"Monoclonal antibody" refers to an antibody obtained from a single copy or a clone including, for example, any eukaryotic, prokaryotic or phage clone, rather than to production method thereof. "Monoclonal antibody" can be an intact antibody (with full or full-length Fc-region), actually intact antibody, an antibody part or fragment comprising an antigen-binding region, for example, Fab-fragment, Fab'-fragment or F(ab')2-fragment from llama or chimeric, humanized or human antibody. "Fab"-fragment comprises a variable light chain domain and a constant light chain domain as well as a variable heavy chain domain and first constant heavy chain domain (CH1). "F(ab')2" antibody fragment contains a pair of Fab-fragments which are mostly covalently bound by hinged cysteine residues at C-terminal regions. Other chemical bonds between antibody fragments are also well known from the state of art.

In addition, "monoclonal antibody" as used herein can be a single-chain Fv that can be obtained by binding to DNA encoding VHH and VL with a linker sequence. As long as the protein keeps its ability of specific or preferable binding to the target (for example, epitope or antigen), it is covered by the term "antibody". Antibodies can be either glycosylated or not and are within the frames of the disclosure.

The term "derivative" or antibody "variant", as used herein, refers to a molecule the amino acid sequence of which differs from the parental sequence by adding, deletion and/or, substitution of one or more amino acid residues in the sequence of parental antibody. In the preferred embodiment, an antibody contains at least one (for example, from one to about ten preferably 2, 3, 4, 5, 6, 7 or 8) amino acid substitutions in FR- or CDR-regions of the parental antibody. This application defines the identity or homology regarding the sequence of a variant antibody as the percentage of amino acid residues in a variant antibody sequence that are identical to residues in parental antibody after aligning the sequences and, if needed, cutting in order to achieve the maximum percentage identical sequence.

An antibody derivative (from parental one) keeps its ability to bind the same antigen or, preferably, an epitope as that with which the parental antibody binds, or, preferably, exhibits at least one property or biological activity exceeding that of the parental antibody. For example, the antibody preferably has a better aggregation stability, more strong affinity, improved pharmacokinetics or increased ability to inhibit the antigen biological activity, compared to parental antibody.

The term "VHH-derivative", as used herein, refers to the derivatives of VHH antibodies the amino acid sequence of which differs from the sequence of parental VHH antibody by substitution of one or more amino acid residues in the sequence of parental antibody. In the preferred embodiment, VHH antibody contains at least one (for example, from one to about ten preferably 2, 3, 4, 5, 6, 7 or 8) amino acid substitutions in FR- or CDR-regions of the parental antibody.

An antibody derivative keeps its ability to bind the same antigen or, preferably, epitope as that with which the parental antibody binds, or, preferably, exhibits at least one property or biological activity exceeding that of the parental antibody. For example, the antibody preferably has a better aggregation stability, more strong affinity, improved pharmacokinetics or increased ability to inhibit the antigen biological activity, compared to parental antibody.

"Parental VHH antibody" or "initial VHH antibody", or "wild VHH antibody" as used herein refers to VHH antibody isolated from an immunized or non-immunized Camelidae animal encoded with amino acid sequence that is used to produce a VHH variant. Parental antibody can have a framework sequence originating from Camelidae (with respect to VHH variable domain), but preferably the frame sequence of the light chain variable domain is of completely or substantially human origin.

"Parental", "initial", or "wild" antibody as used herein refers to an antibody encoded with amino acid sequence that is used to produce a variant. Parental antibody can have a framework sequence originating from Camelidae (with respect to VHH variable domain), but preferably the frame sequence of the light chain variable domain is of completely or substantially human origin.

As used herein, the term "specifically binds" refers to such a situation in that one party involved in the process of specific binding does not significantly bind molecules other than its specific binding partner (partners). This term also applies if, for example, an antigen-binding site of the antibody according to the disclosure is specific for particular epitope that is carried by a number of antigens; in this case, the specific antibody with an antigen-binding site will be able to bind specifically with various epitope-carrying antigens. Thus, the monoclonal antibody according to the disclosure specifically binds to human IL17 (IL17A), while it does not specifically bind human IL17B, IL17C, IL17D or IL17E. Moreover, a monoclonal antibody of the disclosure specifically binds human IL17 and IL17 from cynomolgus monkey, but does not specifically bind neither rat IL17 nor murine IL17.

As used herein, the term "preferably binds" refers to such a situation in that an antibody binds a specific antigen at least by 20% more, preferably by about 50%, or 2-fold, 20-fold, 50-fold or 100-fold more than it binds any other antigen, as measured according to the procedures known from the prior art (for example, competitive ELISA or KD measurements obtained using Octet apparatus). An antibody can preferably bind one epitope within an antigen but not bind another epitope of the same antigen. Thus, an antibody of the disclosure preferably binds human IL17 but not rabbit IL17.

As used herein, the term "epitope" refers to the molecule part that can be recognized by and bind an antibody via one or several antigen-binding sites of an antibody. Epitopes often comprise the chemically surface-active groups of molecules such as amino acids or sugar side chains, and have specific 3-D structural characteristics "Inhibiting epitope" and/or "neutralizing epitope" means an epitope that, as in the context of an intact antigen molecule and binding an antibody specific to said epitope, causes in vivo or in vitro loss or reduction of activity of the molecule or organism that contains the molecule.

As used herein, the term "epitope" also refers to a polypeptide fragment, having antigenic and/or immunogenic activity in animals, preferably in mammals such as mice and humans.

The term "antigenic epitope" as used herein is a polypeptide fragment which can specifically bind the antibody and can be detected by any technique well known from the prior art (for example, by means of the standard immunoassay). Antigen epitopes are not necessary immunogenic, but they can possess immunogenicity. "Immunogenic epitope" as used herein is defined as a polypeptide fragment that evokes an antibody response in animals, as determined by any method of the prior art. "Nonlinear epitope" or "conformational epitope" contains nonadjacent polypeptides (amino acids) within the antigen protein, which binds with epitope-specific antibody.

Expressed "functional activity" or "functional characteristics" or the terms "biological activity" or "activity" referring to an antibody according to the disclosure are interchangeable as used herein, and include but not limited to: epitope/antigen affinity and specificity; ability to neutralize or be an antagonist to IL17 in vivo or in vitro; IC50; antibody stability and in vivo immunogenicity of the antibody. Other biological properties or antibody characteristics identified from the prior art include, for example, the cross-reactivity (i.e. reaction with non-human homologs of the target peptide or with other proteins or targets) and ability to retain high levels of protein expression in mammal cells. Aforementioned properties or characteristics may be observed, measured or evaluated using the procedures recognized in the prior art, including but not limited to ELISA, competitive ELISA, Octet analysis, neutralization assay in vitro or in vivo without limitation, receptor binding, production and/or release of cytokine or growth factor, signal transduction and immune histochemical study of tissue sections obtained from various sources including humans, primates or any other source.

The population of "monoclonal antibodies" as used herein refers to a homogenous or essentially homogeneous antibody population (i.e. at least or 96%, but more preferably no less than about 97 or 98%, or further preferably at least 99% of antibodies in the population will compete for the same antigen/epitope in ELISA, or further preferably antibodies are identical regarding their amino acid sequences).

A native full-size antibody is represented by immunoglobulin molecule comprising four polypeptide chains (two heavy H chains of about 50-70 KDa for the full length, and two light L chains of about 25 KDa for the full length) linked via disulfide bonds. Amino-terminal part of each chain comprises a variable domain of about 100-110 or more amino acids that are responsible for binding an antigen. Carboxyl-terminal domain of each chain determines the constant region that is mostly responsible for the effector function. Light chains are classified as kappa and lambda and have specific constant regions. Each light chain is characterized in comprising a variable N-terminal light chain region (hereafter referred to as VL or VK) and a constant light chain region that consists of a single domain (CL or CK). Heavy chains are classified as γ, δ, α, μ, and ε and define classes of immunoglobulins: IgG, IgM, IgA, IgD and IgE, respectively; some of them can be additionally divided into sub-classes (isotypes) such as IgG1, IgG2, IgG3, IgG4, IgA1 and IgA2. Each heavy chain type is characterized by a specific constant region Fc. Each heavy chain comprises a variable N-terminal region (hereafter referred to as VH) and constant region CH. Constant heavy chain region consists of three domains (CH1, CH2 and CH3) for IgG, IgD and IgA, and of 4 domains (CH1, CH2, CH3 and CH4) for IgM and IgE. VH, VHH and VL can also be divided into so-called hypervariable regions (complementarity determining regions, CDR) interspersing with more conservative framework regions (FR). Each variable domain comprises three CDRs and FRs located in the following order from N-terminus to C-terminus: FR1, CDR1, FR2, CDR2, FR3, CDR3 and FR4.

In the present application, 3 heavy chain CDRs are referred to as "HCDR1, HCDR2 and HCDR3", while 3 light chain CDR are referred to as "LCDR1, LCDR2 and LCDR3". CDRs contain the majority of amino acid residues specifically interacting with an antigen. CDR-residues are numbered and positioned in compliance with Kabat Numbering Scheme.

The term "antigen" refers to an antigen target against which an antibody can be reactive; it is used herein in the same way as specialists use it in the technical field, and includes but is not limited to, polypeptides, peptides, polysaccharides, glycoproteins, polynucleotides (for example, DNA), or chemical antigens, receptors or interleukins.

Interleukins can include interleukins of various groups, such as interleukin 1 (alfa and beta), interleukin 2, interleukin 3, interleukin 4, interleukin 5, interleukin 6, interleukin 7, interleukin 8, interleukin 9, interleukin 10, interleukin 11, interleukin 17, interleukin 18 and interleukin 33.

The term "antigen" can also be used to describe the material that is used for immunization of animals (for example, llama) with the purpose of production of antibodies as described in the present disclosure. In that context, "antigen" can have a broader meaning and may cover purified forms of an antigen as well as non-purified or not fully isolated, or purified antigen products such as cells, cell lysates, or supernatants, cell fractions, for example, cell membranes etc. with added haptens conjugated with a protein-carrier. Antigen used for immunization does not necessarily mean an antigen structurally identical to an antigen target to which, finally, an antibody of the disclosure is able to bind. Usually, antigen used for immunization is a downsized version of an antigen target, for example, a fragment comprising an immunogenic epitope. More details about antigens used for immunization are described in the literature and may be familiar to the specialist in this technical field.

Variable regions of each light/heavy chain pair form antigen-binding sites of an antibody. Thus, an intact IgG antibody has two binding sites. Except for bi-functional or bi-specific antibodies, two binding sites are identical. According to the present application, "antigen-binding region" or "antigen-binding site", or "antigen-binding domain", are interchangeable, as used herein, with refer to an antibody region comprising amino acid residues interacting with an antigen and giving the antibody its specificity and affinity to an antigen. This antibody fragment includes the frame amino acid residues necessary for maintaining the proper conformation of antigen-binding residues.

Preferably, CDR of VHH antigen-binding region or the entire antigen-binding region of an antibody of the present disclosure fully originates from Camelidae family or is substantially of Camelidae origin, and comprises specific amino acid residues changed, for example, substituted with various amino acid residues (for example, refer to Table 6) in order to improve the particular properties of an antibody (for example, KD, koff or IC50). Preferably, the antibody framework regions in accordance with the present disclosure are of Camelidae origin or of human origin, or substantially of a human origin (at least by 80, 85, 90, 95, 96, 97, 98 or 99% of human origin), and comply with Kabat numbering.

"Antibody fragment" may be represented by an antibody fragment or antibody fragment that has the activity of a full-size antibody. Said antibody fragment may be represented by F(ab')2, F(ab)2, Fab', Fab Fv and scFv.

"Interleukin 17", also referred to as "IL17" or "IL17A", is a 20-30 kD homo-dimeric glycoprotein. The gene of human IL17 encodes the protein consisting of 155 amino acids and having a 19 amino acid signal sequence and 136 amino acid mature segment.

Amino acid sequence of human IL17A is by 80%, 63% and 58% similar to amino acid sequences of rabbit, mouse and rat, respectively Amino acid sequence of human IL17A is by 97% identical to IL17A of cynomolgus monkey.

The term "antibody" when applied in relation to anti-IL17 monoclonal antibody of the present disclosure (hereafter referred to as an "antibody of the present disclosure"), as used herein, means a monoclonal antibody.

As used herein, the terms "inhibit" or "neutralize" regarding to the activity of an antibody of the present disclosure shall mean the ability to block, prevent, restrict, slow down, stop, reduce or reverse significantly, for example, the development or severity of inhibition subject, including but not limited to biological activity (such as activity of IL17) or property, disease or condition. Binding of an antibody according to the present disclosure with IL17 results in the inhibition or neutralization of IL17 activity preferably of at least 20, 30, 40, 50, 60, 70, 80, 90, 95% or higher.

The term "separated" or "isolated" with regard to nucleic acids or protein products (such as an antibody) refers to the nucleic acid molecule or protein molecule that is identified and separated from at least one of contaminating substances to which it is usually combined in the natural source. Preferably, an "isolated antibody" is an antibody that substantially contains no other antibodies that have particular antigenic specificity (for example, pharmaceutical compositions of the present disclosure contain an isolated antibody that specifically binds IL17A and substantially contain no antibodies that specifically bind antigens other than IL17A).

The term "Kabat numbering scheme" or "numbering according to Kabat" as used herein refers to the system for numbering of amino acid residues that are more variable (i.e. hypervariable) than other amino acid residues in variable regions of heavy and light chains of an antibody (Kabat et al. Ann. N.Y. Acad. Sci., 190:382-93 (1971); Kabat et al. Sequences of Proteins of Immunological Interest, Fifth Edition, U.S. Department of Health and Human Services, NIH Publication No. 91-3242 (1991)).

Polynucleotide is "functionally bound" if it has functional linkages to other polynucleotide. For example, promoter or enhancer is functionally bound to the coding sequence if it affects the sequence transcription. Polypeptide is "functionally bound" to another polypeptide if polynucleotides coding thereof is functionally bound, preferably if they are located in the same open reading frame.

The term "Specific binding" between an antibody and an antigen target (antigen) refers to immunological specificity.

Antibody can specifically bind an antigen target if it binds an antigen epitope stronger than other antigen epitopes. Specific binding does not exclude the cross-reactivity with other antigens that carry similar antigen epitopes.

VL domains in antibodies of the disclosure can be either VL lambda type or VL kappa type. The term "VL domain" covers both VL lambda and VL kappa isotypes that contain one or more amino acid substitutions, insertions or deletions.

The term "pharmaceutical composition" covers the formulation and/or composition containing a therapeutically effective amount of an antibody of the present disclosure plus excipients (carriers, diluents, vehicles, solvents and other excipients such as).

The term "use" or "treatment" applies to the ability of using an antibody of the present disclosure or a pharmaceutical composition containing thereof to treat, relief the course of the disease, expedite the remission or reduce the recurrence rate for the disease or disorders mediated by receptors with which an antibody of the present disclosure can bind.

Exemplary Embodiments

The present disclosure relates to suitable aqueous pharmaceutical compositions for an anti-IL17a antibody including a VHH-derivative domain and a variable $V_L$ domain, such as Netakimab. One aqueous pharmaceutical composition may have a histidine-based buffer and mannitol as an osmotic agent. Poloxamer 188 may be added as a solubilizer. Another aqueous pharmaceutical composition may have an acetate-based buffer and trehalose as an osmotic agent. Poloxamer 188 may be added as a solubilizer.

The histidine-based buffer may be the result of combining L-histidine with histidine hydrochloride monohydrate or, additionally, with hydrochloric acid, or other acids. It will be understood that even though histidine hydrochloride monohydrate may be used as a salt for the histidine-based buffer, any other histidine-based salt may be used for the histidine-based buffer without departing from the present teachings.

The acetate-based buffer may be the result of combining acetic acid with sodium acetate trihydrate. It will be understood that even though sodium acetate trihydrate may be used as a salt for the acetate-based buffer, any other acetate salt, such as potassium acetate, may be used for the acetate-based buffer without departing from the present teachings.

The composition of the present disclosure may, in addition, additionally include one or more other suitable excipients that are well known to specialists in this field.

The above compositions are suitable for parenteral administration, such as intravenous, subcutaneous, intradermal, intra-arterial, intrathecal, intraperitoneal, intra-articular and/or intramuscular administration.

In some embodiments, the implementation of the liquid pharmaceutical composition is stable during storage in the sense that it does not occur any further processes of protein aggregation or its modifications in comparison with the indicator of stability at zero time point.

Methods of treatment and use of the aqueous composition

In another embodiment, the present disclosure relates to a method of treating a mammal, comprising administering to the mammal a therapeutically effective amount of the pharmaceutical compositions of the present disclosure, wherein the mammal may have a disease or disorder that can be effectively treated with the anti-IL17a antibodies of the disclosure an anti-IL17a antibody of the disclosure.

In a preferred embodiment, the mammal is a human.

Diseases or disorders that can be treated with the compositions provided include, but are not limited to, rheumatoid arthritis, juvenile rheumatoid arthritis, systemic-onset juvenile rheumatoid arthritis, osteoarthritis, juvenile chronic arthritis, psoriatic arthritis, reactive arthritis, seronegative arthritis, polyarticular juvenile idiopathic arthritis, enthesitis-related arthritis; enthesitis; spondyloarthropathy, axial spondyloarthritis; Behcet' disease; inflammatory bowel disease, Crohn's disease, ulcerative colitis; asthma, allergic disorders, atopic allergy; ichthyosis; *pityriasis rubra* pilaris; papulopustular rosacea; pyoderma gangrenosum; hidradenitis suppurativa; psoriasis, psoriatic arthropathy, type I psoriasis, type II psoriasis, plaque psoriasis; dermatitis, atopic dermatitis, autoimmune dermatitis, dermatological conditions; systemic sclerosis; grafting, graft-versus-host disease, graft rejection, acute or chronic immune disease associated with organ grafting, acute graft-associated immune disease, chronic graft-associated immune disease, small intestinal graft rejection, pancreatic graft rejection, any organ or tissue graft rejection, heart transplant rejection, cartilage graft rejection, renal transplant rejection, liver transplant rejection, allograft rejection, skin allograft rejection, heterograft rejection for any organ or tissue, bone graft rejection, bone marrow transplant (BMT) rejection, parathyroid graft rejection; bone erosion; sarcoidosis, atherosclerosis, Wegener's disease, microscopic polyangiitis with renal involvement, uveitis, phacogenic uveitis, noninfectious uveitis, cachexia, acute transverse myelitis, primary biliary cirrhosis, polyglandular autoimmune syndrome type I and type II, Schmidt's syndrome, acute respiratory distress syndrome; arthropathy, seronegative arthropathy, arthropathy associated with ulcerative colitis, Reiter's syndrome, enteropathic synovitis, atheromatosis disease/coronary sclerosis, autoimmune bullous disease, pemphigus, pemphigus *foliaceus*, linear IgA diseases, autoimmune hemolytic anemia, cranial giant arteritis, primary sclerosing hepatitis, cryptogenic autoimmune hepatitis, cryptogenic fibrosing alveolitis, systemic scleroderma associated with interstitial lung disease, rheumatoid arthritis associated with interstitial lung disease, systemic lupus erythematosus associated with lung disease, dermatomyositis/polymyositis associated with lung disease, Sjogren disease associated with lung disease, ankylosing spondylitis associated with lung disease, vasculitis, diffuse pulmonary vasculitis, primary vasculitis, fibrosis, lung disease with lymphocyte infiltration, autoimmune hepatitis, autoimmune hepatitis type I (classic autoimmune or lupoid hepatitis), autoimmune hepatitis type II (associated with anti-LKM antibody), autoimmune hypoglycemia, osteoarthrosis, primary sclerosing cholangitis, erythematosus; systemic lupus erythematosus, discoid lupus erythematosus, lupus nephritis; multiple sclerosis (all types), sympathetic ophthalmia, pulmonary hypertension secondary to connective tissue disease, Goodpasture syndrome, pulmonary manifestations of polyarteritis nodosa, acute rheumatic fever, rheumatoid spondylitis, Still's disease, systemic scleroderma, scleroderma disease, scleroderma, Sjogren's Syndrome, Takayasu disease/arthritis; autoimmune thrombocytopenia, idiopathic thrombocytopenia; autoimmune thyroid disorders, hyperthyroid, autoimmune hypothyroidism (Hashimoto disease), atrophic autoimmune hypothyroidism; vitiligo, acute hepatic disease, chronic hepatic disease, cholestasis, Th1- and Th2-mediated disease; malignancies such as lung cancer, breast cancer, stomach cancer, bladder cancer, colorectal cancer, pancreatic cancer, pancreatic carcinoma, ovarian cancer, prostate cancer and hematopoietic malignancies (leukemia and lymphomas), acute leukemia, acute lymphoblastic leukemia, acute myeloid leukemia, adenocarcinoma, B-cell lymphoma, Burkitt lymphoma, inflammatory response to bypass, chronic myelocytic leukemia (CML), chronic inflammatory pathologies, chronic lymphatic leukemia (CLL), rectocolic carcinoma, cystic fibrosis, malignant lymphoma, malignant histiocytosis, malignant melanoma, multiple myeloma, non-Hodgkin's lymphomas, nasopharyngeal cancer, solid tumors, hairy-cell leukemia, Hodgkin disease, sarcoma, myelodysplastic syndrome, cytokine therapy-induced disorders, demyelinating disease, inflammatory demyelinating disease, pulmonary fibrosis, idiopathic pulmonary fibrosis, usual interstitial pneumonia, iridocyclitis/uveitis/optic neuritis, lymphoedema, mixed connective-tissue disease, monoclonal gammopathy, neonatal chronic lung disease, nephritis, nephrotic, neurodegenerative disorders, osteoporosis, paraneoplastic disease/tumor-related hypercalcemia, Raynaud's phenomenon and disease, skin changes, a comprehensive systemic inflammatory response syndrome, thrombocytopenia, toxicity, urticaria, acute coronary syndrome, adult-onset Stills disease, aplastic anemia, coronary sclerosis, atopic eczema; autoimmune disorder associated with *streptococcus* infection, autoimmune enteropathy, autoimmune hearing loss, autoimmune lymphoproliferative syndrome (ALPS), autoimmune myocarditis, autoimmune premature ovarian failure; celiac disease, cervical spondylosis, clinically isolated syndrome (cis) with the risk for multiple sclerosis, erythema multiform, severe erythema multiform, pemphigoid, bullous pemphigoid, cicatrical pemphigoid, mucosal pemphigoid, gestational pemphigoid, iritis, keratitis, motor neuron disease, non-A, non-B hepatitis, optic neuritis, oligoarticular JIA, polyarteritis nodosa, polychondritis, poliosis, polymyositis, relapsing neuromyelitis optica, rheumatic heart disease, SAPHO (synovitis, acne, pustulosis, hyperostosis and osteitis), secondary amyloidosis, ankylosing spondylitis, systemic inflammation response syndrome, cranial arteritis, and *Yersinia-* or *Salmonella-*associated arthropathy.

Additional diseases or disorders that can be treated with the compositions of the present disclosure include the diseases described in in Patent Application No. PCT/RU2015/000163, the relevant parts of which are incorporated herein by reference.

Provided pharmaceutical compositions can be administered to an individual in need of treatment through a systemic injection, for example, by intravenous or subcutaneous or intramuscular injection; or by injection or application to an appropriate site, for example, by direct injection or direct application to the site, when the site is available for surgery; or through topical use.

In one embodiment, the present disclosure relates to a method of treating and/or preventing axial spondylitis, comprising administering to a mammal in need thereof a therapeutically effective amount of one of the provided an anti-IL17a antibodies of the disclosure compositions.

In one embodiment, the present disclosure relates to a method of treating and/or preventing ankylosing spondylitis, comprising administering to a mammal in need thereof a therapeutically effective amount of one of the provided an anti-IL17a antibodies of the disclosure compositions.

In one embodiment, the present disclosure relates to a method of treating and/or preventing psoriasis, comprising administering to a mammal in need thereof a therapeutically effective amount of one of the provided an anti-IL17a antibodies of the disclosure compositions.

In one embodiment, the present disclosure relates to a method of treating and/or preventing psoriasis vulgaris or plaque psoriasis, comprising administering to a mammal in need thereof a therapeutically effective amount of one of the provided an anti-IL17a antibodies of the disclosure compositions.

In one embodiment, the present disclosure relates to a method of treating and/or preventing nail psoriasis, comprising administering to a mammal in need thereof a therapeutically effective amount of one of the provided an anti-IL17a antibodies of the disclosure compositions.

In one embodiment, the present disclosure relates to a method of treating and/or preventing genital psoriasis, comprising administering to a mammal in need thereof a therapeutically effective amount of one of the provided an anti-IL17a antibodies of the disclosure compositions.

In one embodiment, the present disclosure relates to a method of treating and/or preventing scalp psoriasis, comprising administering to a mammal in need thereof a therapeutically effective amount of one of the provided an anti-IL17a antibodies of the disclosure compositions.

In one embodiment, the present disclosure relates to a method of treating and/or preventing palmoplanar psoriasis, comprising administering to a mammal in need thereof a therapeutically effective amount of one of the provided an anti-IL17a antibodies of the disclosure compositions.

In one embodiment, the present disclosure relates to a method of treating and/or preventing pustular psoriasis, comprising administering to a mammal in need thereof a therapeutically effective amount of one of the provided an anti-IL17a antibodies of the disclosure compositions.

In one embodiment, the present disclosure relates to a method of treating and/or preventing psoriatic arthritis, comprising administering to a mammal in need thereof a therapeutically effective amount of one of the provided an anti-IL17a antibodies of the disclosure compositions.

In one embodiment, the present disclosure relates to a method of treating and/or preventing bullous pemphigoid, comprising administering to a mammal in need thereof a therapeutically effective amount of one of the provided an anti-IL17a antibodies of the disclosure compositions.

In one embodiment, the present disclosure relates to a method of treating and/or preventing pyoderma gangrenosum, comprising administering to a mammal in need thereof a therapeutically effective amount of one of the provided an anti-IL17a antibodies of the disclosure compositions.

The therapeutically effective amount of anti-IL17a antibodies of the disclosure, and of the aqueous compositions including the anti-IL17a antibodies of the disclosure, in the formulations provided depends on the condition being treated, the severity of the condition, the previous therapy and the patient's history and response to the therapeutic agent. A suitable dose can be adjusted by the decision of the attending physician so that it can be administered to the patient once or through several injections.

In one of the embodiments, the effective amount of anti-IL17a antibodies of the disclosure per dose for a patient is from about 0.01 to 10 mg per kilogram body weight, or about 0.01 to 5 mg per kilogram body weight, or about 0.01 to 4 mg per kilogram body weight, or approximately 0.05-3 mg per kilogram body weight, or approximately 0.05 mg per kilogram body weight, or approximately 0.25 mg per kilogram body weight, or approximately 0.825 mg per kilogram body weight, or approximately 1.25 mg per kilogram body weight, or approximately 1.75 mg per kilogram body weight, or approximately 2.25 mg per kilogram body weight or approximately 3 mg per kilogram body weight.

The frequency of dosing may be normally about twice per week, or once per week, or about once every 2 weeks, or about once every 4 to 8 weeks, or about once every 10 weeks, or about once per month or about once every 3 months.

If the dose should be administered more than once a week, the illustrative dose range is the same as the dose ranges indicated above or less, and it is preferably administered two or more times a week with a dose range of 5-240 mg/dose.

In another embodiment, an acceptable dose for administration by injection may contain 5-300 mg/dose, or may contain 40 mg, or 50 mg, or 60 mg per dose; or may contain 70 mg, or 80 mg, or 90 mg, or 100 mg per dose; or may contain 110 mg, or 120 mg, or 130 mg, or 140 mg per dose; or may contain 150 mg, or 160 mg, or 170 mg, or 180 mg per dose; or may contain 190 mg, or 200 mg, or 210 mg, or 220 mg per dose; or may contain 230 mg, or 240 mg, or 250 mg, or 260 mg per dose; or may contain 270 mg, or 280 mg, or 290 mg per dose.

A dose may be delivered as one or more than one injection. A dose may be delivered as one, two or three injection. One injection may contain 1 mL or 2 mL of the disclosure composition.

In one embodiment, anti-IL17a antibodies of the disclosure may be administered at a dose of 40 mg by a single (sc) injection.

In one embodiment, anti-IL17a antibodies of the disclosure may be administered at a dose of 60 mg by a single injection.

In one embodiment, anti-IL17a antibodies of the disclosure may be administered at a dose of 70 mg by a single injection.

In one embodiment, anti-IL17a antibodies of the disclosure may be administered at a dose of 80 mg by a single injection.

In one embodiment, anti-IL17a antibodies of the disclosure may be administered at a dose of 80 mg as two injections of 40 mg.

In one embodiment, anti-IL17a antibodies of the disclosure may be administered at a dose of 100 mg by a single injection.

In one embodiment, anti-IL17a antibodies of the disclosure may be administered at a dose of 120 mg by a single injection.

In one embodiment, anti-IL17a antibodies of the disclosure may be administered at a dose of 120 mg as two injections of 60 mg.

In some cases, to achieve the desired degree of improvement, treatment may be necessary for long periods. For incurable chronic conditions, the treatment regimen may be continued indefinitely.

In another embodiment, the pharmaceutical compositions of the present disclosure may be prepared as a bulk formulation, and in essence, the components of the pharmaceutical composition are present in amounts higher than may be required for administration, and are diluted accordingly before administration.

Alternatively, a pharmaceutical composition may be frozen, spray-dried or lyophilizated and reconstituted before application in an appropriate sterile carrier. Lyophilization can be performed using techniques in the art which includes various steps like freezing, annealing, primary and secondary drying.

The pharmaceutical compositions may be administered as a single therapeutic agent or in combination with additional therapeutic agents as needed. Thus, in one embodiment, the methods of treatment and/or prophylaxis provided are used in combination with the administration of a therapeutically effective amount of another active agent. Another active agent can be administered before, during or after the administration of the pharmaceutical compositions of the present disclosure. The other active agent may be administered as part of the provided composition or, alternatively, as a separate formulation.

The introduction provides a pharmaceutical composition can be carried out by various means, including parenteral, oral, buccal, nasal, rectal and local introduction.

Parenteral administration may include, but not limited, transdermal, subcutaneous, intravenous, intra-arterial, intraperitoneal, intradermal, intracardiac, intraventricular, intracranial, intratracheal, intrathecal, intramuscular injection, intravitreal injection.

The pharmaceutical compositions of the present disclosure are particularly suitable for parenteral administration, i.e. subcutaneously, intramuscularly, intravenously, intraperitoneally, into the spinal cord, into the joints, intrasynovially and/or intrathecally. Parenteral administration may be by bolus injection or continuous infusion.

Pharmaceutical compositions for injection can be in the standard dosage form, for example, in ampoules, vials, prefilled syringes or in multi-dose containers with an added preservative, but not limited to this. In addition, a number of recent approaches to drug delivery have been developed, and the pharmaceutical compositions of the present disclosure are suitable for administration by these new methods, for example, BD Physioject™, Inject-ease®, Genject®, pen-injectors such as GenPen®, and needleless devices such as like MediJector® and BioJector®. The pharmaceutical composition of the present disclosure can also be adapted for not yet open routes of administration.

See also Langer, 1990, Science, 249: 1527-1533.

The provided pharmaceutical compositions can also be formulated as a depot preparation. Such long-acting formulations can be administered by implantation (for example, subcutaneously or intramuscularly) or by intramuscular injection.

Thus, for example, the compositions can be modified using suitable polymeric or hydrophobic materials (for example, as an emulsion in an acceptable oil), or ion exchange resins, or as sparingly soluble derivatives, for example, as a sparingly soluble salt.

The pharmaceutical compositions, if desired, may be provided in a vial, package, or in a dispenser device, which may contain one or more unit dosage forms containing the active ingredient. In one embodiment, the dispenser device may comprise a syringe containing a single dose of the liquid composition ready for injection. The syringe may be accompanied by instructions for administration.

In another embodiment, the present disclosure relates to a kit or container containing the aqueous pharmaceutical composition according to the disclosure. The concentration of the polypeptide in the aqueous pharmaceutical composition may vary over a wide range, but, as a rule, within the range of from about 1 to about 200 mg/ml of aqueous composition. The kit may also be accompanied by instructions for use.

The method of obtaining the above compositions includes adding to the aqueous phase acetate buffer agents, followed by adding, in any sequence, the following components: osmolytic agent selected from disaccharides (such as trehalose, sucrose, or their combination), an anti-IL17a antibody comprising a VHH-derivative domain and a variable VL domain, and/or solubilizer selected from the group: polysorbate 20, polysorbate 80, poloxamer 188, or combinations thereof.

The method of obtaining the above compositions includes adding to the aqueous phase histidine buffer agents, followed by adding, in any sequence, the following components: osmolytic agent selected from sugar-based alcohols (such as mannitol, sorbitol, or their combination), an anti-IL17a antibody comprising a VHH-derivative domain and a variable VL domain, and/or solubilizer selected from the group: polysorbate 20, polysorbate 80, poloxamer 188, or combinations thereof.

Exemplary Study

The following represents an exemplary study for determining reagents and concentrations of same for making an aqueous composition of the anti-IL17a antibodies of the present disclosure, such as Netakimab.

It will be understood that the experiments and methods described herein refer to an anti-IL17a antibody of the disclosure, such as Netakimab, with a variable $V_{HH}$ domain and a variable $V_L$ domain. Exemplary suitable antibodies are described in Patent Application No. PCT/RU2015/000163.

It will be understood that even though the exemplary studies and examples presented herein refer to Netakimab as an exemplary antibody, the exemplary studies and examples may apply to another antibody of the disclosure without departing from the present teachings (e.g. namely due to the structural similarities of the antibodies of the present disclosure, a $V_{HH}$ variable domain joined to a $V_L$ variable domain).

The examples and studies presented herein are for illustrative purposes, demonstrating the suitability of certain of the constituents used in the anti-IL17a antibody aqueous compositions of the present disclosure. It will be understood that other methods and techniques may be used by a person of ordinary skill in the art without departing from the present teachings.

The suitability of the aqueous compositions of the present disclosure were tested using the exemplary methods described herein.

Method 1: Preparing Stable Anti-IL17 Antibody Formulations

Antibody samples (10 mg/ml) were prepared in Stirred Cell (Millipore) under pressure. To this end, the initial antibody formulation was placed in a cell, the protein was concentrated under a compressed air stream to 10 mg/ml under continuous stirring, at least 10-fold volume of an aqueous solution with the target formulation comprising buffering agents, osmotic agents and, if necessary, additional water-soluble stabilizers was then added to the cell. After diafiltration the antibody was concentrated to about 12-20 mg/ml, unloaded from the cell, and the exact protein concentration was measured by UV spectroscopy. An appropriate placebo solution was then added to the sample to prepare a solution comprising protein at a target concentration of 10±0.5 mg/ml.

Protein samples at 40 mg/ml or higher were prepared in Pellicon cassettes (Millipore) in a tangential flow mode. To this end, the initial antibody formulation was placed in a diafiltration tank, the protein was concentrated to 40-100 mg/ml, at least 10-fold volume of the solution with the target formulation comprising buffering agents, osmotic agents and, if necessary, additional water-soluble stabilizers was then supplied to the system. The concentrate of osmotic agents and water-soluble stabilizers may alternatively be added after diafiltration. After diafiltration the antibody was concentrated to a concentration exceeding the target one, unloaded from the system, and the exact protein concentration was measured. An appropriate placebo solution was then added to the sample to prepare a solution with protein at the target concentration.

When obtaining formulations comprising solubilizers, the surfactant concentrates were added to the antibody after diafiltering and concentrating, with the final dilution of the antibody to the target concentration with a placebo solution.

Before aseptic filling in the final container (for example, a glass/plastic vessel, vial or syringe), the antibody solution was filtered using a 0.22 μm membrane.

Method 2: Protein Concentration Assay in Test Samples

The protein concentration was measured by UV spectroscopy at a wavelength of 280 nm in UV transparent plates.

Each sample was diluted with a solution of appropriate placebo to around 0.5 mg/mL; 150 μl of the diluted sample was placed to a UV spectroscopy plate well. Optical density of solutions in the plate wells was measured using a plate spectrophotometer at a wavelength of 280 nm. An appropriate placebo solution was used as a reference solution.

Concentration (mg/ml) of protein (C) was calculated using the following formula:

$$C = \frac{A(280) * b}{\varepsilon * l}$$

$A_{280}$ is a value of optical density at a wavelength of 280 nm;

ε is an extinction coefficient of test protein;

b is a total dilution factor for a sample;

l is layer thickness in a plate well; for 150 μl, l=0.42 cm.

Method 3: PEG Aggregation

The solution of PEG 6000 with a mass concentration of 20-25% in a test excipient composition was prepared. The resulting solutions were filtered through a Durapore 0.45 μm filter.

The estimated amount of the sample, excipient solution, and 20-25% PEG 6000 solution was transferred to 96 well UV plates so that the concentration of PEG 6000 in a number of wells ranged from 0% to 18% and protein concentration in each well was 1 mg/ml. All solutions obtained in wells were thoroughly mixed by pipetting.

Turbidity of solutions was then evaluated visually, and optical density of solutions at a wavelength of 400 nm was measured.

Protein precipitation in the presence of PEG is associated with the effect of volume substitution, i.e. protein is sterically excluded from regions of solvent by the polymer. This results in an increase of protein concentration until its solubility will be exceeded and it will be precipitated. The less stable is a sample, the lower is PEG 6000 concentration, at which the sample will form visible aggregates (opalescence).

Method 4: Evaluation of Colloidal Stability by Shake Test

Test samples were divided into 2 portions of 200 µl each and placed into glass vials, 1 vial per formulation was stored in a refrigerator at 2-8° C., the rest vials were shaken at 800 rpm at 2-8° C. for the specified period. After the stress, the vials were then vortexed and transferred for analysis.

Method 5: Evaluation of Colloidal Stability by Cryoconcentration

Test samples were divided into 2 portions and placed into plastic vials: 1 vial per formulation was stored in a refrigerator at 2-8° C., the rest vials were stored in a freezer at minus 16-20° C. for the specified period of time. After the stress, the vials were removed from the freezer, kept at room temperature until the content was completely thawed; the solutions were then mixed using a vortex and transferred for analysis.

Method 6: Evaluation of Thermal Stability by Thermostress

Test samples were divided into 2 portions and placed into separate glass vials: 1 vial per composition was stored in a refrigerator at 2-8° C., the rest vials were incubated in a thermostat at a required temperature for the specified period of time. After heating, the vials were removed from the thermostat, kept at room temperature for about 15 minutes, and transferred for analysis.

Method 7: Determination of Homogeneity and Protein Aggregation Point by Dynamic Light Scattering (DLS)

Homogeneity of test samples was evaluated on Zetasizer Nano ZSP (measurement mode: Size). To this end, 0.5 ml of a solution was placed in a dust-free plastic disposable cuvette.
  Analytical model: Protein analysis.
  Keeping for 30 seconds at temperature before starting the measurement.
  At each point, average value from 13 measurements in 3 replications.

The aggregation point of test proteins was determined on Zetasizer Nano ZSP. To this end, a solution was placed in a dust-free quartz cuvette, the cuvette was gradually heated in the device with constant measurement of the intensity of scattered light in the "Temperature trend" measurement mode.
  Analytical model: Protein analysis.
  Mode: Temperature trend, mod: Protein aggregation point. 50 to 85° C. at a heating increment of 1° C.
  Keeping for 60 seconds at temperature before starting the measurement.
  At each point, average value from 15 measurements in 1 replication.

The temperature trend was built using the device software that also automatically calculates the protein aggregation point.

Method 8: Determination of samples homogeneity by size-exclusion high-performance liquid chromatography (SEC HPLC)

Sample homogeneity was then determined by performing high performance liquid chromatography (SEC HPLC) with the following specifications:
  Tosoh column TSK-GelG3000SWXL 7.8 mm ID×30 cm, cat. N 08541.
  Column temperature: 25° C.
  Mobile phase flow rate: 0.7 ml/min.
  Injection volume: 10 µl.
  Sample concentration: 5 mg/ml.
  Detector wavelength: 220 nm.
  Elution time: 25 min.
  Mobile phase: Disodium hydrogen phosphate anhydrous 7.1 mg/ml.
  Sodium chloride 17.54 mg/ml.
  The mobile phase pH was adjusted to 7.0 with orthophosphoric acid.

The change in purity after stress was calculated using the following formula:

$$\Delta = \text{(fracture of main peak after stress} - \text{fracture of main peak before stress)}$$

Method 9: Evaluation of Acid-Base Profile of Samples Using Ion-Exchange (IE) HPLC The acid-base profile of samples was then determined by performing ion-exchange (IE) HPLC in accordance with the following specifications:
  ProPac WCX-10 Analytical column, 4×250 mm
  ProPac WCX-10G guard column, 4×50 mm
  Column temperature: 25° C.
  Mobile phase flow rate: 0.7 ml/min
  Injection volume: 50 µl
  Sample concentration: 1 mg/ml
  Detector wavelength: 280 nM
  Elution time: 60 min
  Mobile phase:
    Eluent A: 20 mM 2-(N-morpholino)ethanesulfonic acid (MES), pH=6.0
    Eluent B: 20 mM 2-(N-morpholino)ethanesulfonic acid (MES), 400 mM_NaCl, pH=6.0
  Phase A gradient: 87-0-90%.

Absolute change in the acid-base profile after stress was calculated with the following formula:

$$\Delta = |\text{acidic fraction amount before stress} - \text{acidic fraction amount after stress}| + |\text{dominant fraction amount before stress} - \text{dominant fraction amount after stress}| + |\text{alkaline fraction amount before stress}| - \text{alkaline fraction amount after stress}|$$

Method 10: Determination of Low Molecular Weight Impurities by Reducing and Non-Reducing Polyacrylamide Gel Electrophoresis (SDS-PAGE)

Polyacrylamide gel (PAAG) was prepared in glass plates in the presence of sodium dodecyl sulfate, said plates consisting of a concentrating layer of 4% PAAG and a separating layer of 12.5% PAAG (under reducing conditions)/8% PAAG (under non-reducing conditions).

An electrophoresis chamber was assembled and installed in accordance with a vertical electrophoresis apparatus user manual. Probes were prepared by diluting samples with purified water to a final concentration of 1 mg/ml. A volume equivalent of 40 µg was taken, and the prepared probes of the test sample were mixed in a ratio of 3:1 (volume/volume) with a 4× sample buffer solution containing 2-mercaptoethanol (reducing conditions) and not containing 2-mercaptoethanol (non-reducing conditions), and stirred. The resulting solutions were incubated at (99±1) ° C. for 3 min (samples containing 2-mercaptoethanol) and at (99±1) ° C. for 1 min (samples without 2-mercaptoethanol). The solutions were cooled to room temperature, mixed, and transferred to PAAG wells under an electrode buffer solution layer.

Electrophoresis was performed in constant current mode using a water-cooling system. Parameters of power supply were set: the voltage was 110 V during passing of the dye front through the concentrating gel. After moving of the dye front to the lower separation gel at the level of 5-7 mm, the voltage was increased to 180 V. The power supply was turned off when the dye front reached the bottom line of the gel.

After electrophoresis, the gels were detached from the glasses, and the proteins were fixed in a fixing solution for 16-18 hours at room temperature. The gels were then stained (in an Acid Blue 83 solution) and washed to obtain a clear visualization of the bands. The gels were scanned. The purity and impurities in the test samples were evaluated using GelPro software.

Method 11: Specific Activity Determination

The specific activity of monoclonal anti-IL17 antibody samples was evaluated by their ability to specifically bind IL17a protein and neutralize IL17a-dependent production of IL6 by HT1080 cells. The suspension of HT1080 cells was added to culture plates in a volume of 50 µl/well. The plates were incubated for 5-6 hours at 37° C., 5% $CO_2$. Using a Freedom Evo robot, serial dilutions of the standard and test samples were prepared, mixed with IL17a+TNFα solution, incubated for 1 hour at room temperature. After incubation, the mixture was transferred to culture plates in a volume of 50 µl/well. The plates were incubated for 16-18 hours at 37° C., 5% CO2. All the procedures described above were performed under aseptic conditions.

The level of IL17a-dependent production of IL6 was detected by ELISA using an ELISA kit for measuring IL6 concentration: Human IL-6 DuoSet ELISA, R&D System, USA, cat. no. DY206.

Magellan 7.2 software was employed to plot four-parameter logistic curves (average optical density vs. protein concentration) for the standard sample/test sample solutions in the same plate.

The relative specific activity of the test sample as % (RP) was calculated by the following formula:

$$RP = \frac{ED_{50}st}{ED_{50}\ test} 100\%,$$

where $ED_{50}st$ —the value of half effective dose of a standard sample, ng/ml;

$ED_{50}test$ —the value of half effective dose of a test sample, ng/ml.

The average value of relative specific activity was taken as the final result, said average value was calculated from 3 independent measurements (determined from 3 different culture plates).

EXAMPLES

Example 1. Selecting the Buffer Solution

The present exemplary study covers two four typical buffer solutions for the antibodies of the present disclosure suitable for, e.g., parenteral administration, including subcutaneous administration.

Test formulations (per ml):

| Name | Composition | |
|---|---|---|
| 5 mM Acet, pH 5.0 | Netakimab | 10 mg |
| | Sodium acetate trihydrate (t/h) | 0.44 mg |
| | Acetic acid glac. | to pH 5.0 |
| 4.5 mM His, pH 6.0 | Netakimab | 10 mg |
| | L-Histidine | 0.4 mg |
| | L-Histidine hydrochloride monohydrate (m/h) | 0.4 mg |
| 5 mM PB, pH 6.0 | Netakimab | 10 mg |
| | Sodium dihydrogenphosphate monohydrate (m/h) | 0.59 mg |
| | Sodium hydrogen phosphate anhydrous (anhyd.) | 0.10 mg |
| 5 mM Cit, pH 5.0 | Netakimab | 10 mg |
| | Sodium citrate dihydrate (d/h) | 0.93 mg |
| | Citric acid anhydrous (anhyd.) | 0.35 mg |

Determination of colloidal stability by PEG aggregation

The results are present in Table 1 and in FIG. 1.

TABLE 1

Average optical density at 400 nm of solutions after preparation.

| PEG 6000, % | 0% | 2% | 4% | 6% | 8% | 10% | 12% | 14% | 16% | 18% |
|---|---|---|---|---|---|---|---|---|---|---|
| Acet, pH 5.0 | 0.0540 | 0.0584 | 0.0728 | 0.0793 | 0.0990 | 0.1123 | 0.1272 | 0.1520 | 0.1747 | 0.2023 |
| His, pH 6.0 | 0.0411 | 0.0489 | 0.0490 | 0.0492 | 0.0599 | 0.0602 | 0.0623 | 0.0660 | 0.0906 | 0.0733 |
| PB, pH 6.0 | 0.0502 | 0.0523 | 0.0549 | 0.0559 | 0.0601 | 0.0665 | 0.1275 | 0.4731 | 1.1599 | 1.4772 |
| Cit, pH 5.0 | 0.0584 | 0.0598 | 0.0600 | 0.0561 | 0.0934 | 0.0958 | 0.5840 | 1.8051 | 2.4373 | 2.4714 |

In bold: Visible aggregation is being observed.

In bold: Visible aggregation is being observed.

The samples in histidine and acetate buffer solutions showed the highest colloidal stability in the presence of PEG. The phosphate- and citrate-based composition were excluded from further research, since aggregation at 12% PEG is an unsatisfying indicator when developing concentrated finished dosage forms for subcutaneous administration. Based on the obtained results, the acetate and histidine buffer solutions were selected for further development.

Example 2. Development of Anti-IL17 Excipient Composition Based on Histidine Buffer Solution Buffer solution pH/ionic strength optimization
Test formulations (per ml):

| 4.5 mM His, pH 6.0 | Netakimab | 10 mg |
| | L-Histidine | 0.4 mg |
| | L-Histidine hydrochloride m/h | 0.4 mg |
| 10 mM His, pH 6.0 | Netakimab | 10 mg |
| | L-Histidine | 0.9 mg |
| | L-Histidine hydrochloride m/h | 0.9 mg |
| 20 mM His, pH 6.0 | Netakimab | 10 mg |
| | L-Histidine | 1.8 mg |
| | L-Histidine hydrochloride m/h | 1.8 mg |
| 10 mM His, pH 5.5 | Netakimab | 10 mg |
| | L-Histidine | 0.46 mg |
| | L-Histidine hydrochloride m/h | 1.48 mg |
| 10 mM His, pH 6.5 | Netakimab | 10 mg |
| | L-Histidine | 1.16 mg |
| | L-Histidine hydrochloride m/h | 0.54 mg |

Determination of colloidal stability by PEG aggregation

Figure 2:
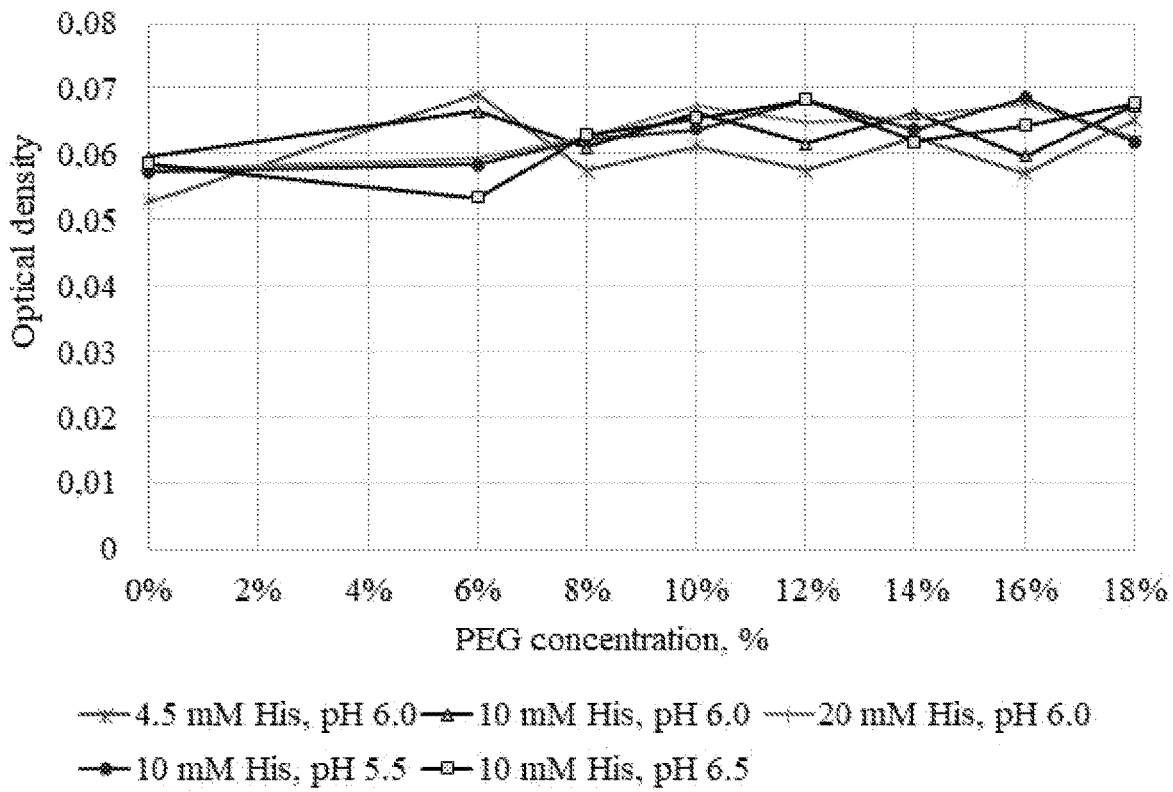
FIG. 2 is a graph illustrating the dependence of the optical density of solutions at 400 nm as a function of PEG concentration in exemplary anti-IL17a antibody compositions with different concentrations of Histidine and/or different pH.

The results are given in Table 2 and in FIG. 2. Changing pH and histidine concentration does not affect the colloidal stability and theoretical solubility of protein.

TABLE 2

Solutions average optical density data.

| Sample name/ PEG concentration | 0% | 6% | 8% | 10% | 12% | 14% | 16% | 18% |
| --- | --- | --- | --- | --- | --- | --- | --- | --- |
| 4.5 mM His, pH 6.0 | 0.0528 | 0.0690 | 0.0576 | 0.0611 | 0.0576 | 0.0625 | 0.0572 | 0.0651 |
| 10 mM His, pH 6.0 | 0.0596 | 0.0665 | 0.0610 | 0.0663 | 0.0616 | 0.0662 | 0.0597 | 0.0673 |
| 20 mM His, pH 6.0 | 0.0576 | 0.0595 | 0.0624 | 0.0673 | 0.0649 | 0.0658 | 0.0676 | 0.0626 |
| 10 mM His, pH 5.5 | 0.0573 | 0.0584 | 0.0623 | 0.0637 | 0.0683 | 0.0638 | 0.0686 | 0.0619 |
| 10 mM His, pH 6.5 | 0.0586 | 0.0534 | 0.0629 | 0.0655 | 0.0683 | 0.0619 | 0.0643 | 0.0677 |

Evaluation of thermal stability and temperature of protein aggregation

TABLE 3

Results summary

| | Total change Thermostress 50° C., 48 h | | | Aggregation temperature, ° C. |
| --- | --- | --- | --- | --- |
| | Change in purity, % | Total change in acid-base profile, % | Change in pH | |
| Test samples | SEC | IEC | | DLS |
| 4.5 mM His, pH 6.0 | −0.42 | 13.28 | 6.16 | 76 |
| 10 mM His, pH 6.0 | −0.74 | 14.33 | 6.14 | 75 |
| 20 mM His, pH 6.0 | *−1.24* | *16.70* | 6.08 | 72 |

TABLE 3-continued

Results summary

| | Total change Thermostress 50° C., 48 h | | | Aggregation temperature, ° C. |
| --- | --- | --- | --- | --- |
| | Change in purity, % | Total change in acid-base profile, % | Change in pH | |
| Test samples | SEC | IEC | | DLS |
| 10 mM His, pH 5.5 | −0.75 | 14.62 | 5.55 | 74 |
| 10 mM His, pH 6.5 | −0.79 | 15.83 | 6.53 | 74 |

Bold: positive, best result; italic: negative, worst result; no bold or italic: average result It was experimentally confirmed that an increase in the buffer capacity of the histidine buffer solution leads to a decrease in the thermal stability of anti-IL17 antibody. At the same time, a decrease in the histidine/histidine hydrochloride ratio to 0.4 mg/ml/0.4 mg/ml does not lead to a detectable pH shift after diafiltration and thermostress. Increasing the buffer solution pH to 6.5 slightly reduces the thermal stability of protein; the stability of anti-IL17 antibody in the pH range of 5.5-6.0 does not have significant differences.

The following placebo formulation is acceptable for further development (per ml):

| L-Histidine | 0.4 mg |
| L-Histidine hydrochloride m/h | 0.4 mg |
| pH 6.0 ± 0.5 | |

Selecting an osmotic agent

Four typical excipients were selected to be used as an osmolytic. Parenteral restrictions are taken into account when selecting their concentration.

Test formulations (per ml)

| Hisbuf. + TRE pH 6.0 | Netakimab | 10 mg |
| | L-Histidine | 0.4 mg |
| | L-Histidine hydrochloride monohydrate | 0.4 mg |
| | Trehalose dihydrate | 100 mg |
| Hisbuf. + SUC pH 6.0 | Netakimab | 10 mg |
| | L-Histidine | 0.4 mg |
| | L-Histidine hydrochloride monohydrate | 0.4 mg |
| | Sucrose | 100 mg |

-continued

| | | |
|---|---|---|
| Hisbuf. + MAN pH 6.0 | Netakimab | 10 mg |
| | L-Histidine | 0.4 mg |
| | L-Histidine hydrochloride monohydrate | 0.4 mg |
| | Mannitol | 54.5 mg |
| Hisbuf. + SORB pH 6.0 | Netakimab | 10 mg |
| | L-Histidine | 0.4 mg |
| | Histidine hydrochloride monohydrate | 0.4 mg |
| | Sorbitol | 54.5 mg |

Figure 3:
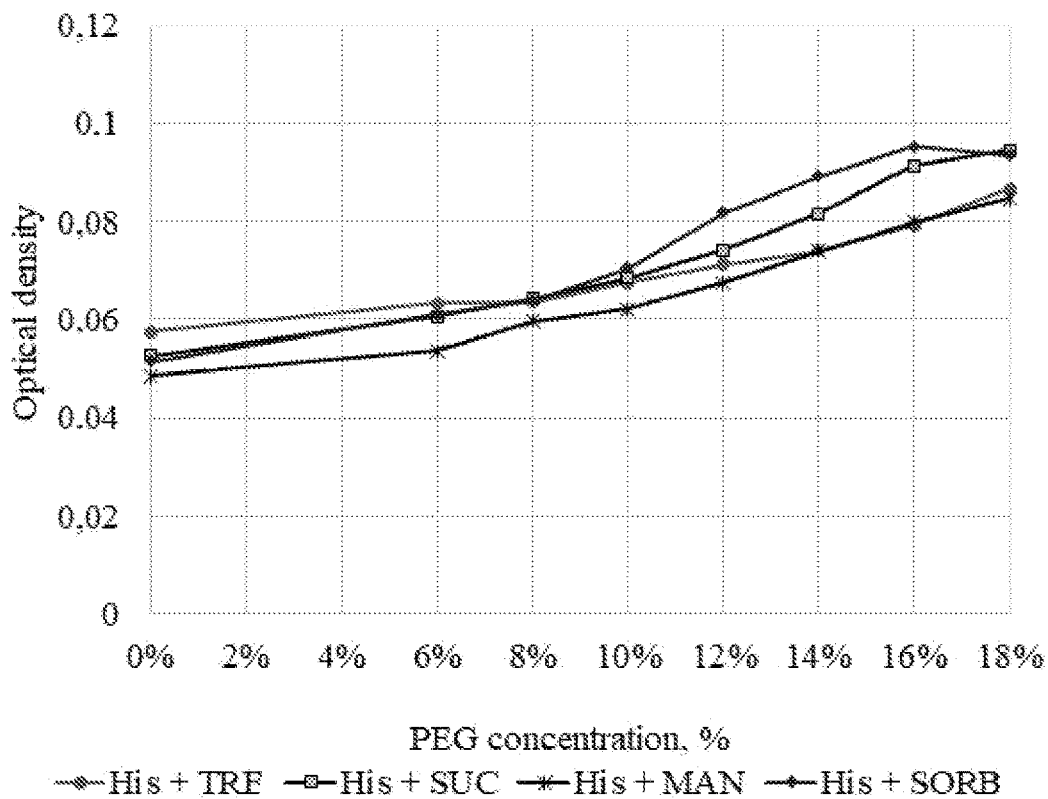
FIG. 3 is a graph illustrating the dependence of the optical density of solutions at 400 nm as a function of PEG concentration in exemplary anti-IL17a antibody compositions with different osmotic agents.

Determination of colloidal stability by PEG aggregation
The results are given in Table 4 and in FIG. 3.

TABLE 4

Solutions average optical density data.

| Sample name/ PEG concentration | 0% | 6% | 8% | 10% | 12% | 14% | 16% | 18% |
|---|---|---|---|---|---|---|---|---|
| His + TRE | 0.0574 | 0.0633 | 0.0636 | 0.0676 | 0.0714 | 0.0741 | 0.0794 | 0.0868 |
| His + SUC | 0.0527 | 0.0607 | 0.0643 | 0.0687 | 0.0742 | 0.0816 | 0.0914 | 0.0946 |
| His + MAN | 0.0485 | 0.0535 | 0.0597 | 0.0622 | 0.0676 | 0.074 | 0.0799 | 0.0847 |
| His + SORB | 0.0515 | 0.0610 | 0.0639 | 0.0705 | 0.0818 | 0.0893 | 0.0953 | 0.0935 |

Evaluation of thermal stability and temperature of protein aggregation

The results of the evaluation of thermal stability and temperature of the protein aggregations are presented in Table 5.

TABLE 5

[]Results summary

| | Change in purity, % | Total change in acid-base profile, % | Aggregation temperature, ° C. |
|---|---|---|---|
| | Thermostress 50° C., 48 h | | |
| Test samples | SEC | IEC | DLS |
| His + TRE | −0.73 | 16.31 | 72 |
| His + SUC | −0.54 | 16.21 | 71 |
| His + MAN | −0.27 | *14.33* | 74 |
| His + SORB | −1.48 | 19.46 | 71 |

Bold: positive, best result;
*italic*: negative, worst result;
no bold or italic: average result All the above formulations provide sufficient thermal and colloidal stability of protein. However, the formulation that comprises mannitol has good thermostabilizing properties, as its formulation showed an increase in protein impurities after 48 hours of thermostress, as demonstrated by SEC, as well as the total change in isoform profile showed the minimum value as compared to other formulations obtained.

Based on the obtained data, the following placebo formulation is acceptable to be used as a pharmaceutical composition:

| | |
|---|---|
| L-Histidine | 0.4 mg/mL |
| L-Histidine hydrochloride m/h | 0.4 mg/mL |
| Mannitol | 54.5 mg/mL |
| pH 6.0 ± 0.5 | |

Choosing a solubilizer and optimizing its content

To reduce the level of aggregation of the concentrated form of the monoclonal anti-IL17 antibody, the use of Polysorbate 80 and Poloxamer 188 solubilizers has been considered.

Test formulations (per ml)

| | | |
|---|---|---|
| His + MAN pH 6.0 | Netakimab | 10 mg |
| | L-Histidine | 0.4 mg |
| | L-Histidine hydrochloride m/h | 0.4 mg |
| | Mannitol | 54.5 mg |
| His + MAN + 0.1 PS80 pH 6.0 | Netakimab | 10 mg |
| | L-Histidine | 0.4 mg |
| | L-Histidine | 0.4 mg |

-continued

| | | |
|---|---|---|
| | hydrochloride m/h | |
| | Mannitol | 54.5 mg |
| | Polysorbate 80 | 0.1 mg |
| His + MAN + 0.2 PS80 pH 6.0 | Netakimab | 10 mg |
| | L-Histidine | 0.4 mg |
| | L-Histidine hydrochloride m/h | 0.4 mg |
| | Mannitol | 54.5 mg |
| | Polysorbate 80 | 0.2 mg |
| His + MAN + 0.5 PS80 pH 6.0 | Netakimab | 10 mg |
| | L-Histidine | 0.4 mg |
| | L-Histidine hydrochloride m/h | 0.4 mg |
| | Mannitol | 54.5 mg |
| | Polysorbate 80 | 0.5 mg |
| His + MAN + 1.0 PS80 pH 6.0 | Netakimab | 10 mg |
| | L-Histidine | 0.4 mg |
| | L-Histidine hydrochloride m/h | 0.4 mg |
| | Mannitol | 51.5 mg |
| | Polysorbate 80 | 1.0 mg |
| His + MAN + 0.1 Poloxamer pH 6.0 | Netakimab | 10 mg |
| | L-Histidine | 0.4 mg |
| | L-Histidine hydrochloride m/h | 0.4 mg |
| | Mannitol | 54.5 mg |
| | Poloxamer 188 | 0.1 mg |
| His + MAN + 1.0 Poloxamer pH 6.0 | Netakimab | 10 mg |
| | L-Histidine | 0.4 mg |
| | L-Histidine hydrochloride m/h | 0.4 mg |
| | Mannitol | 54.5 mg |
| | Poloxamer 188 | 1.0 mg |

Determination of colloidal stability by PEG aggregation

Figure 4:
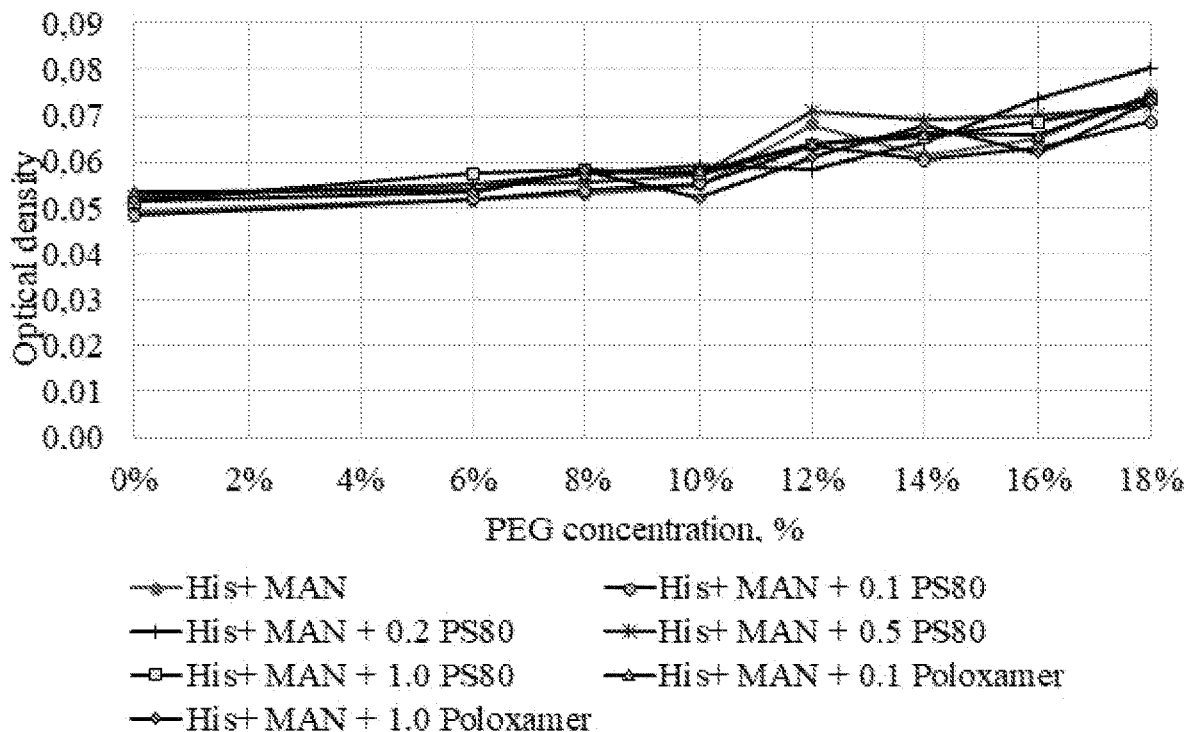
FIG. 4 is a graph illustrating the dependence of the optical density of solutions at 400 nm as a function of PEG concentration in exemplary anti-IL17a antibody compositions with different solubilizers and/or concentrations of solubilizers.

The colloidal stability by PEG aggregation of the solutions was then determined. The results are given in Table 6 and in FIG. 4.

TABLE 6

Solutions average optical density data.

| Sample name/ PEG concentration | 0% | 6% | 8% | 10% | 12% | 14% | 16% | 18% |
|---|---|---|---|---|---|---|---|---|
| His + MAN | 0.0494 | 0.0517 | 0.0529 | 0.0549 | 0.0680 | 0.0612 | 0.0649 | 0.0746 |
| His + MAN + 0.1 PS80 | 0.0483 | 0.0520 | 0.0537 | 0.0552 | 0.0635 | 0.0603 | 0.0628 | 0.0687 |
| His + MAN + 0.2 PS80 | 0.0524 | 0.0551 | 0.0578 | 0.0591 | 0.0583 | 0.0642 | 0.0736 | 0.0802 |
| His + MAN + 0.5 PS80 | 0.0526 | 0.0551 | 0.0557 | 0.0570 | 0.0710 | 0.0692 | 0.0701 | 0.0721 |
| His + MAN + 1.0 PS80 | 0.0512 | 0.0576 | 0.0583 | 0.0572 | 0.0638 | 0.0653 | 0.0687 | 0.0734 |
| His + MAN + 0.1 Poloxamer | 0.0534 | 0.0539 | 0.0576 | 0.0582 | 0.0639 | 0.0663 | 0.0658 | 0.0740 |
| His + MAN + 1.0 Poloxamer | 0.0514 | 0.0534 | 0.0581 | 0.0522 | 0.0611 | 0.0678 | 0.0619 | 0.0730 |

Evaluation of thermal stability and temperature of protein aggregation

The thermal stability and temperature of protein aggregation was then determined, the results presented in Table 7.

TABLE 7

Results summary

| Test samples | Change in purity, % Thermostress 50° C., 48 h SEC | Total change in acid-base profile, % IEC | Aggregation temperature, ° C. DLS |
|---|---|---|---|
| His + MAN | −0.30% | 15.67 | 74 |
| His + MAN + 0.1 PS80 | −0.53% | 15.91 | 72 |
| His + MAN + 0.2 PS80 | −2.72% | 15.92 | 72 |
| His + MAN + 0.5 PS80 | −3.03% | 15.78 | *71* |
| His + MAN + 1.0 PS80 | *−4.27%* | 16.30 | *71* |
| His + MAN + 0.1 Poloxamer | −0.32% | 15.55 | 74 |
| His + MAN + 1.0 Poloxamer | −0.37% | 16.87 | 72 |

Bold: positive, best result; italic: negative, worst result; no bold or italic: average result Bold: positive, best result; italic: negative, worst result; no bold or italic: average result It has been shown that polysorbate 80 has a negative effect on the aggregation stability of anti-IL17 antibody. SEC demonstrates increased gain of impurities during thermostress with an increase in the content of this surfactant in the formulation.

The content of poloxamer 188 as part of anti-IL17 antibody does not significantly affect the antibody stability. The acid-alkaline profile of the test protein does not significantly depend on the content of surfactants.

Based on the results of the study, the following exemplary placebo formulation is acceptable for the dosage form:

| L-Histidine | 0.4 mg/mL |
|---|---|
| L-Histidine hydrochloride m/h | 0.4 mg/mL |
| Mannitol | 54.5 mg/mL |
| Poloxamer 188 pH 6.0 ± 0.5 | 0-1.0 mg/mL |

Example 3. Development of Anti IL17 Excipient Composition Based on Acetate Buffer Solution Buffer solution pH/ionic strength optimization was then studied.

The following test formulations (per ml) were prepared:

| 5 mM Acet, pH 5.0 | Netakimab | 10 mg |
|---|---|---|
| | Sodium acetate trihydrate | 0.44 mg |
| | Acetic acid glac. | to pH 5.0 |
| 10 mM Acet, pH 5.0 | Netakimab | 10 mg |
| | Sodium acetate trihydrate | 0.87 mg |
| | Acetic acid glac. | to pH 5.0 |
| 20 mM Acet, pH 5.0 | Netakimab | 10 mg |
| | Sodium acetate trihydrate | 1.74 mg |
| | Acetic acid glac. | to pH 5.0 |
| 20 mM Acet, pH 4.0 | Netakimab | 10 mg |
| | Sodium acetate trihydrate | 0.98 mg |
| | Acetic acid glac. | to pH 4.5 |
| 20 mM Acet, pH 6.0 | Netakimab | 10 mg |
| | Sodium acetate trihydrate | 2.31 mg |
| | Acetic acid glac. | to pH 5.5 |

As demonstrated in Example 2, the solution pH/buffer capacity do not have a significant impact on the results of PEG aggregation, therefore the results of this experiment are not shown for the acetate buffer solution in Example 3.

Evaluation of thermal stability and temperature of protein aggregation

The evaluation of thermal stability and the temperature of protein aggregation was then performed, the resulted presented in Table 8.

TABLE 8

Results summary for sample before and after stresses.

| Test samples | Change in purity, % Thermostress 50° C., 48 h SEC | Total change in acid-base profile, % IEC | Change in pH | Aggregation temperature, ° C. DLS |
|---|---|---|---|---|
| 5 mM Acet, pH 5.0 | −0.10 | 14.74 | *5.23* | 74 |
| 10 mM Acet, pH 5.0 | −0.12 | 14.68 | 5.18 | 74 |
| 20 mM Acet, pH 5.0 | −0.11 | 15.81 | 5.01 | 77 |
| 20 mM Acet, pH 4.0 | *−0.18* | 15.07 | *4.52* | 74 |
| 20 mM Acet, pH 6.0 | −0.15 | 15.23 | 5.56 | 77 |

Bold: positive, best result; italic: negative, worst result; no bold or italic: average result Bold: positive, best result; italic: negative, worst result; no bold or italic: average result It has been experimentally confirmed that an increase in the buffer capacity stabilizes the pH of the acetate buffer solution, but does not have a significant effect on the thermal stability of anti-IL17 antibody. It has also been shown that the test protein is stable in the pH range of 4.0-6.0.

The following placebo formulation is acceptable for further development (per ml)

| | |
|---|---|
| Sodium acetate trihydrate | 1.74 mg |
| Acetic acid glac. | to pH 5.0 ± 1.0 |

Selecting an Osmotic Agent

In the present study, four typical osmolytics were selected. Restrictions on possible parenteral administration are taken into account when selecting osmolytic concentration.

The following test formulations (per ml) were prepared:

| Name | Composition | |
|---|---|---|
| 20 mM ACET + TRE | Netakimab | 10 mg |
| | Sodium acetate trihydrate | 1.74 mg |
| | Trehalore dihydrate | 100 mg |
| | Acetic acid glac. | to pH 5.0 |
| 20 mM ACET + SUC | Netakimab | 10 mg |
| | Sodium acetate trihydrate | 1.74 mg |
| | Sucrose | 100 mg |
| | Acetic acid glac. | to pH 5.0 |
| 20 mM ACET + MAN | Netakimab | 10 mg |
| | Sodium acetate trihydrate | 1.74 mg |
| | Mannitol | 54.5 mg |
| | Acetic acid glac. | to pH 5.0 |
| 20 mM ACET + SORB | Netakimab | 10 mg |
| | Sodium acetate trihydrate | 1.74 mg |
| | Sorbitol | 54.5 mg |
| | Acetic acid glac. | to pH 5.0 |
| 20 mM ACET + PROL | Netakimab | 10 mg |
| | Sodium acetate trihydrate | 1.74 mg |
| | L-Proline | 27 mg |
| | Acetic acid glac. | to pH 5.0 |

TABLE 9

Results summary for sample before and after stresses.

| | | | Change in purity, % | Total change in acid-base profile, % (modulo) |
|---|---|---|---|---|
| | Protein, | Formulation | Thermostress 50° C., 96 h | |
| No. | mg/ml | name | SEC | IEC |
| 1 | 10 | Acet + Tre | −0.0 | 22.90 |
| 2 | 10 | Acet + Suc | *−1.46* | 24.77 |
| 3 | 10 | Acet + Man | −0.15 | 26.18 |
| 4 | 10 | Acet + Sorb | −0.29 | 25.52 |
| 5 | 10 | Acet + Prol | −0.44 | *33.50* |

Bold: positive, best result; italic: negative, worst result; no bold or italic: average result According to the results of the present study, an acceptable exemplary placebo formulation (excluding excipients):

| | |
|---|---|
| Sodium acetate trihydrate | 1.74 mg/ml |
| Trehalose dihydrate | 100 mg/ml |
| Acetic acid glac. | to pH 5.0 |

This formulation showed good stabilizing properties during thermostress at 50° C., shake-test and freezing, as compared to the rest tests samples. It showed the smallest change in purity by SEC after stressing and acceptable changes in the acid-base profile of the samples.

Selecting Stabilizers

To obtain a stable dosage form comprising a maximum concentration of anti-IL17 antibody, stabilizers were screened for samples with a protein concentration of 60, 100 and 120 mg/ml. To ensure the physiologicity of the solution, taking into account the contribution of protein and other stabilizers to osmolality, the content of trehalose dihydrate was reduced to 80 or 50 mg/ml.

The histidine-containing formulations of Example 2 were used as a reference solution. However, a stable histidine solution was obtained at a concentration of not more than 70 mg/ml.

Due to increased aggregation of highly concentrated solutions of proteins under thermostress at this stage, the thermostress temperature was reduced, which was compensated by longer thermostating time.

The following test formulations (per ml) were prepared:

| Name | Composition | |
|---|---|---|
| 4.5 mM His + mannitol | Netakimab | 40, 60, 70 mg |
| | L-Histidine | 0.4 mg |
| | Mannitol | 54.5 mg |
| 4.5 mM His + mannitol | Netakimab | 40, 60, 70 mg |
| | L-Histidine | 0.4 mg |
| | Mannitol | 54.5 mg |
| | Poloxamer 188 | 1.0 mg |
| 20 mM acetate 80 trehalose | Netakimab | 60, 100,120 mg |
| | Sodium acetate trihydrate | 1.74 mg |
| | Acetic acid glac. | to pH 5.0 |
| 20 mM acetate 80 trehalose 0.5 Poloxamer 188 | Netakimab | 60, 100,120 mg |
| | Sodium acetate trihydrate | 1.74 mg |
| | Trehalose dihydrate | 80 mg |
| | Poloxamer 188 | 0.5 mg |
| | Acetic acid glac. | to pH 5.0 |
| 20 mM acetate 80 trehalose 1.0 Poloxamer 188 | Netakimab | 60, 100,120 mg |
| | Sodium acetate trihydrate | 1.74 mg |
| | Trehalose dihydrate | 80 mg |
| | Poloxamer 188 | 1.0 mg |
| | Acetic acid glac. | to pH 5.0 |
| 20 mM acetate 80 trehalose 0.5 Polysorbate 20 | Netakimab | 60, 100,120 mg |
| | Sodium acetate trihydrate | 1.74 mg |
| | Trehalose dihydrate | 80 mg |
| | Polysorbate 20 | 0.5 mg |
| | Acetic acid glac. | to pH 5.0 |
| 20 mM acetate 80 trehalose HPB 10 | Netakimab | 60, 100,120 mg |
| | Sodium acetate trihydrate | 1.74 mg |
| | Trehalose dihydrate | 80 mg |
| | Cyclodextrin HPB | 10 mg |
| | Acetic acid glac. | to pH 5.0 |
| 20 mM acetate 80 trehalose HPB 20 | Netakimab | 60, 100,120 mg |
| | Sodium acetate trihydrate | 1.74 mg |
| | Trehalose dihydrate | 80 mg |
| | Cyclodextrin HPB | 20 mg |
| | Acetic acid glac. | to pH 5.0 |
| 20 mM acetate 80 trehalose 5 mM Methionine | Netakimab | 60, 100,120 mg |
| | Sodium acetate trihydrate | 1.74 mg |
| | Trehalose dihydrate | 80 mg |
| | L-Methionine | 0.746 mg |
| | Acetic acid glac. | to pH 5.0 |

-continued

| Name | Composition | | |
|---|---|---|---|
| 20 mM acetate<br>80 trehalose<br>10 mM Methionine | Netakimab<br>Sodium acetate trihydrate<br>Trehalose dihydrate<br>L-Methionine<br>Acetic acid glac. | 60, 100,120<br>1.74<br>80<br>1.492<br>to pH 5.0 | mg<br>mg<br>mg<br>mg |
| 20 mM acetate<br>80 trehalose<br>20 mM Methionine | Netakimab<br>Sodium acetate trihydrate<br>Trehalose dihydrate<br>L-Methionine<br>Acetic acid glac. | 60, 100,120<br>1.74<br>80<br>2.984<br>to pH 5.0 | mg<br>mg<br>mg<br>mg |
| 20 mM acetate<br>50 trehalose<br>3 NaCl | Netakimab<br>Sodium acetate trihydrate<br>Trehalose dihydrate<br>Sodium chloride<br>Acetic acid glac. | 60, 100,120<br>1.74<br>50<br>3<br>to pH 5.0 | mg<br>mg<br>mg<br>mg |
| 20 mM acetate<br>50 trehalose<br>100 mM Glycine | Netakimab<br>Sodium acetate trihydrate<br>Trehalose dihydrate<br>Glycine<br>Acetic acid glac. | 60, 100,120<br>1.74<br>50<br>7.507<br>to pH 5.0 | mg<br>mg<br>mg<br>mg |
| 20 mM acetate<br>50 trehalose<br>100 mM Glycine +<br>10 mM Meth | Netakimab<br>Sodium acetate trihydrate<br>Trehalose dihydrate<br>Glycine<br>L-Methionine<br>Acetic acid glac. | 60, 100,120<br>1.74<br>50<br>7.507<br>1.492<br>to pH 5.0 | mg<br>mg<br>mg<br>mg<br>mg |
| 20 mM acetate<br>50 trehalose<br>100 mM Lysine | Netakimab<br>Sodium acetate trihydrate<br>Trehalose dihydrate<br>L-Lysine monohydrate<br>Acetic acid glac. | 60, 100,120<br>1.74<br>50<br>16.42<br>to pH 5.0 | mg<br>mg<br>mg<br>mg |
| 20 mM acetate<br>50 trehalose<br>100 mM Serine | Netakimab<br>Sodium acetate trihydrate<br>Trehalose dihydrate<br>L-Serine<br>Acetic acid glac. | 60, 100,120<br>1.74<br>50<br>10.91<br>to pH 5.0 | mg<br>mg<br>mg<br>mg |
| 20 mM acetate<br>50 trehalose<br>100 mM Guanidine hydrochloride | Netakimab<br>Sodium acetate trihydrate<br>Trehalose dihydrate<br>Guanidine hydrochloride<br>Acetic acid glac. | 60, 100,120<br>1.74<br>50<br>9.55<br>to pH 5.0 | mg<br>mg<br>mg<br>mg |
| 20 mM acetate<br>50 trehalose<br>25 mM Leucine | Netakimab<br>Sodium acetate trihydrate<br>Trehalose dihydrate<br>L-Leucine<br>Acetic acid glac. | 60, 100,120<br>1.74<br>50<br>3.28<br>to pH 5.0 | mg<br>mg<br>mg<br>mg |
| 20 mM acetate<br>50 trehalose<br>5 mM Tryptophan | Netakimab<br>Sodium acetate trihydrate<br>Trehalose dihydrate<br>L-Tryprophan<br>Acetic acid glac. | 60, 100,120<br>1.74<br>50<br>1.02<br>to pH 5.0 | mg<br>mg<br>mg<br>mg |
| 20 mM acetate<br>50 trehalose<br>100 mM Glutamate | Netakimab<br>Sodium acetate trihydrate<br>Trehalose dihydrate<br>Monosodium glutamate<br>Acetic acid glac. | 60, 100,120<br>1.74<br>50<br>16.91<br>to pH 5.0 | mg<br>mg<br>mg<br>mg |
| 20 mM acetate<br>50 trehalose<br>100 mM Arginine hydrochloride | Netakimab<br>Sodium acetate trihydrate<br>Trehalose dihydrate<br>L-Arginine hydrochloride<br>Acetic acid glac. | 60, 100,120<br>1.74<br>50<br>21.07<br>to pH 5.0 | mg<br>mg<br>mg<br>mg |
| 20 mM acetate<br>50 trehalose<br>50 mM Glutamate<br>50 mM Arginine | Netakimab<br>Sodium acetate trihydrate<br>Trehalose dihydrate<br>Monosodium glutamate<br>L-Arginine hydrochloride<br>Acetic acid glac. | 60, 100,120<br>1.74<br>50<br>8.46<br>10.53<br>to pH 5.0 | mg<br>mg<br>mg<br>mg<br>mg |

TABLE 10

SEC results summary for samples before and after stresses.

| | | | Variation of monomer content, SEC, % | | | |
|---|---|---|---|---|---|---|
| No. | Protein, mg/ml | Formulation name | Thermo-stress, 42° C., 96 h | Thermo-stress, 42° C., 10 days | Thermo-stress, 37° C., 1 week | Thermo-stress, 37° C., 2 weeks |
| 4.5 mM Histidine buffer solution-based formulations | | | | | | |
| 1 | 40 | 54.5 mg/mL mannitol | −0.68 | −1.26 | −0.72 | −0.30 |
| 2 | 60 | | −0.84 | −2.96 | −1.56 | −1.71 |
| 3 | 70 | | −1.75 | −3.67 | −1.23 | −2.07 |
| 4 | 40 | 54.5 mg/mL mannitol +<br>1.0 mg/mL poloxamer | −0.55 | −1.22 | −0.65 | −0.29 |
| 5 | 60 | | −0.38 | −1.03 | −1.28 | −1.54 |
| 6 | 70 | | −1.72 | −3.38 | −1.39 | −1.98 |
| 20 mM Acetate buffer solution-based formulations | | | | | | |
| 7 | 60 | 80 mg/mL trehalose d/h | −0.11 | −1.50 | −0.18 | −0.56 |
| 8 | | 80 mg/mL trehalose d/h +<br>0.5 mg/mL Poloxamer | −0.17 | −1.29 | −0.25 | −0.27 |
| 9 | | 80 mg/mL trehalose d/h +<br>1 mg/mL Poloxamer | −0.05 | −1.25 | −0.31 | −0.49 |
| 10 | | 50 mg/mL trehalose d/h<br>100 mM Gly | −0.43 | −1.47 | −0.13 | −1.16 |
| 11 | | 50 mg/mL trehalose d/h<br>10 mM Meth | 0.15 | −1.53 | −0.09 | −0.89 |

TABLE 10-continued

SEC results summary for samples before and after stresses.

| No. | Protein, mg/ml | Formulation name | Variation of monomer content, SEC, % | | | |
|---|---|---|---|---|---|---|
| | | | Thermo-stress, 42° C., 96 h | Thermo-stress, 42° C., 10 days | Thermo-stress, 37° C., 1 week | Thermo-stress, 37° C., 2 weeks |
| 12 | | 50 mg/mL trehalose d/h 100 mM Glutamate | −0.29 | −2.58 | −0.24 | −0.59 |
| 13 | | 50 mg/mL trehalose d/h 50 mM Glutamate 50 mM Arginine | −0.15 | −3.82 | −0.79 | −1.38 |
| 14 | 100 | 80 mg/mL trehalose d/h | −0.53 | −2.96 | −1.35 | −0.81 |
| 15 | | 80 mg/mL trehalose d/h 0.5 mg/mL Poloxamer 188 | −1.02 | −3.54 | −1.08 | −1.47 |
| 16 | | 80 mg/mL trehalose d/h + 1 mg/mL Poloxamer | −0.97 | −2.99 | −0.99 | −1.52 |
| 17 | | 80 mg/mL trehalose d/h 0.5 mg/mL Polysorbate 20 | −1.43 | *−4.46* | −1.94 | −1.56 |
| 18 | | 80 mg/mL trehalose d/h 10 mg/mL HPB Cyclodextrine | −1.11 | −3.38 | −1.67 | −1.84 |
| 19 | | 80 mg/mL trehalose d/h 20 mg/mL HPB Cyclodextrine | −1.37 | −3.22 | −1.72 | −1.16 |
| 20 | | 80 mg/mL trehalose d/h 5 mM Methionine | −1.08 | −3.46 | −1.88 | −1.22 |
| 21 | | 80 mg/mL trehalose d/h 10 nnM Methionine | −0.48 | −2.99 | −1.63 | −1.05 |
| 22 | | 80 mg/mL trehalose d/h 20 mM Methionine | −0.77 | −3.70 | −0.12 | −1.32 |
| 23 | | 50 mg/mL trehalose d/h 3 mg/mL NaCl | −2.79 | *−6.34* | −2.60 | −2.94 |
| 24 | | 50 mg/mL trehalose d/h 100 mM Glycine | −1.76 | −3.45 | −2.50 | *−1.06* |
| 25 | | 50 mg/mL trehalose d/h 100 mM Glycine + 10 mM Methionine | −1.45 | *−3.56* | −2.04 | *−1.25* |
| 26 | | 50 mg/m trehalose d/h 100 mM Lysine | *−4.58* | *−8.00* | *−4.15* | *−4.70* |
| 27 | | 50 mg/mL trehalose d/h 100 mM Serine | −1.27 | −3.59 | −2.20 | −1.20 |
| 28 | | 50 mg/mL trehalose d/h 100 mM Guanidine hydrochloride | *−5.84* | *−8.08* | *−4.74* | *−5.57* |
| 29 | | 50 mg/mL trehalose d/h 25 mM Leucine | −1.12 | −3.86 | −2.30 | −2.19 |
| 30 | | 50 mg/mL trehalose d/h 5 mM Tryptophan | −1.74 | −3.38 | −1.53 | −1.89 |
| 31 | 100 | 50 mg/mL trehalose d/h 100 mM Glutamate | −1.92 | −5.59 | −2.42 | −1.93 |
| 32 | | 50 mg/mL trehalose d/h 100 mM Arginine hydrochloride | *−5.35* | *−7.73* | *−4.26* | *−5.58* |
| 33 | | 50 mg/mL trehalose d/h 50 nnM Glutamate | *−3.40* | *−6.94* | −2.65 | *−3.84* |
| 34 | 120 | 50 mM Arginine 80 mg/mL trehalose d/h | −0.28 | −4.13 | −1.86 | −1.94 |
| 35 | | 80 mg/mL trehalose d/h + 0.5 mg/mL Poloxamer | −0.32 | −3.10 | −1.06 | −1.27 |
| 36 | | 80 mg/mL trehalose d/h + 1 mg/mL Poloxamer | −0.36 | −3.01 | −0.98 | −1.10 |
| 37 | | 50 mg/mL trehalose d/h 100 mM Gly | −2.32 | −3.27 | −1.13 | −2.29 |
| 38 | | 50 mg/mL trehalose d/h 10 mM Methionine | −2.45 | −4.50 | −0.64 | −2.39 |
| 39 | | 50 mg/mL trehalose d/h 100 mM Glutamate | *−3.02* | −6.18 | −1.88 | −2.69 |
| 40 | | 50 mg/mL trehalose d/h 50 mM Glutamate 50 mM Arginine | *−3.13* | *−8.26* | −1.18 | *−3.73* |

As confirmed by SEC, formulation containing trehalose dihydrate and poloxamer 188 exhibit the excellent stabilizing properties in the range of anti-IL17 antibody of the disclosure concentrations of 60-120 mg/ml. Also, the stabilizing effect of L-methionine and glycine on the test protein under thermostress was observed. The histidine buffer solution-based formulation has a lower solubility; however, it shows sufficient thermal stability for further use.

Selecting Stabilizers

To confirm the stability of the anti-IL17 antibody of the disclosure in the recommended formulations, the samples were subjected to accelerated aging at +37° C. At this stage, the formulations were analyzed to determine such quality indicators as specific activity, low molecular weight impurities, acid-base profile, purity. The results are shown in table 11.

TABLE 11

| Sample | Quality indicator | Norm | Protein concentration, mg/ml | Incoming control | 2 weeks at 37° C. | 4 weeks at 37° C. | Change after 4 weeks |
|---|---|---|---|---|---|---|---|
| Placebo composition: L-Histidine 0.4 mg/ml L-Histidine hydrochloride monohydrate 0.4 mg/ml Mannitol 54.4 mg/ml | pH | 6.0 ± 0.5 | 40 | 6.17 | — | 6.11 | −0.05 |
| | | | 60 | 6.17 | — | 6.15 | −0.02 |
| | | | 70 | 6.18 | — | 6.14 | −0.04 |
| | Purity, SEC (aggregate content– upper value, monomer content– lower value) | Not less than 95 % | 40 | 97.02 | 96.72 | 95.60 | −1.42 |
| | | | 60 | 97.22 | 95.46 | 94.28 | −2.94 |
| | | | 70 | 97.31 | 94.95 | 93.67 | −3.64 |
| | SDS-PAGE | Not less than 95 % in reduced conditions | 40 | 95.66 | 95.26 | 94.37 | −1.29 |
| | | | 60 | 95.64 | 95.10 | 93.71 | −1.93 |
| | | | 70 | 95.70 | 94.58 | 94.25 | −1.45 |
| | | Not less than 90 % in nonreduced | 40 | 95.90 | 94.15 | 92.32 | −3.58 |
| | | | 60 | 95.88 | 93.67 | 92.00 | −3.88 |
| | | | 70 | 95.12 | 93.68 | 92.09 | −3.03 |
| | Acid-basic profile, IEX HPLC | — | 40 | 12.64 | 17.02 | 22.30 | 23.54 |
| | | | | 75.99 | 70.39 | 64.22 | |
| | | | | 11.37 | 12.59 | 13.48 | |
| | | | 60 | 12.90 | 19.20 | 23.01 | 24.18 |
| | | | | 75.20 | 69.28 | 63.11 | |
| | | | | 11.9 | 11.52 | 13.88 | |
| | | | 70 | 12.88 | 20.02 | 23.40 | 25.18 |
| | | | | 75.46 | 66.32 | 62.87 | |
| | | | | 11.66 | 13.66 | 13.73 | |
| | Potency | 80-125 % of reference standard | 40 | 111 | — | 102 | −9 |
| | | | 60 | 109 | — | 98 | −11 |
| | | | 70 | 105 | — | 96 | −9 |
| Placebo composition: L-Histidine 0.4 mg/ml L-Histidine hydrochloride monohydrate 0.4 mg/ml Mannitol 54.5 mg/ml Poloxamer 188 1 mg/ml | pH | 6.0 ± 0.5 | 40 | 6.15 | — | 6.13 | −0.02 |
| | | | 60 | 6.20 | — | 6.18 | −0.02 |
| | | | 70 | 6.22 | — | 6.16 | −0.06 |
| | Purity, SEC (aggregate content- upper value, monomer content- lower value) | Not less than 95 % | 40 | 97.11 | 96.16 | 95.44 | −1.67 |
| | | | 60 | 97.28 | 95.12 | 94.69 | −2.59 |
| | | | 70 | 97.52 | 94.29 | 93.89 | −3.63 |
| | SDS-PAGE | Not less than 95 % in reduced conditions | 40 | 95.23 | 94.76 | 94.12 | −1.11 |
| | | | 60 | 95.39 | 95.02 | 93.48 | −1.91 |
| | | | 70 | 95.42 | 94.67 | 94.12 | −1.30 |
| | | Not less than 90 % in nonreduced | 40 | 95.64 | 94.87 | 92.75 | −2.89 |
| | | | 60 | 95.43 | 93.58 | 92.49 | −2.94 |
| | | | 70 | 95.29 | 93.45 | 92.19 | −3.10 |
| | Acid-basic profile, IEX HPLC | — | 40 | 12.32 | 17.02 | 21.69 | 21.98 |
| | | | | 75.68 | 70.39 | 64.69 | |
| | | | | 12.00 | 12.59 | 13.62 | |
| | | | 60 | 12.09 | 19.20 | 23.44 | 24.42 |
| | | | | 75.31 | 69.28 | 63.10 | |
| | | | | 12.60 | 11.52 | 13.46 | |
| | | | 70 | 12.40 | 20.02 | 24.09 | 27.18 |
| | | | | 75.76 | 66.32 | 62.17 | |
| | | | | 11.84 | 13.66 | 13.74 | |

TABLE 11-continued

| Sample | Quality indicator | Norm | Protein concentration, mg/ml | Incoming control | 2 weeks at 37° C. | 4 weeks at 37° C. | Change after 4 weeks |
|---|---|---|---|---|---|---|---|
| | Potency | 80-125 % of reference standard | 40 | 100 | — | 96 | −4 |
| | | | 60 | 102 | — | 92 | −10 |
| | | | 70 | 106 | — | 94 | −12 |
| Placebo composition: Sodium acetate trihydrate 1.74 mg/ml Acetic acid to pH 5.0 Trehalose dihydrate 80 mg/ml | pH | 6.0 ± 0.5 | 60 | 5.21 | — | 5.24 | 0.03 |
| | | | 100 | 5.34 | — | 5.40 | 0.06 |
| | | | 120 | 5.34 | — | 5.41 | 0.07 |
| | Purity, SEC (aggregate content-upper value, monomer content-lower value) | Not less than 95 % | 60 | 95.98 | 95.41 | 96.22 | 0.25 |
| | | | 100 | 95.96 | 95.16 | 94.15 | −1.81 |
| | | | 120 | 95.48 | 94.04 | 93.97 | −1.51 |
| | SDS-PAGE | Not less than 95 % in reduced conditions | 60 | 95.57 | 95.13 | 94.60 | −0.97 |
| | | | 100 | 95.30 | 94.99 | 94.58 | −0.72 |
| | | | 120 | 95.44 | 95.26 | 94.58 | −0.86 |
| | | Not less than 90 % in nonreduced | 60 | 95.31 | 95.06 | 94.58 | −0.73 |
| | | | 100 | 95.42 | 94.77 | 94.48 | −0.94 |
| | | | 120 | 95.67 | 94.23 | 94.21 | −1.46 |
| | Acid-basic profile, IEX HPLC | — | 60 | 13.33 | 20.34 | 22.83 | 26.60 |
| | | | | 76.17 | 66.32 | 62.87 | |
| | | | | 10.50 | 13.34 | 14.30 | |
| | | | 100 | 13.38 | 20.94 | 23.10 | 27.78 |
| | | | | 76.01 | 65.23 | 62.12 | |
| | | | | 10.61 | 13.83 | 14.78 | |
| | | | 120 | 13.12 | 21.00 | 22.11 | 32.38 |
| | | | | 75.19 | 64.91 | 59.00 | |
| | | | | 11.69 | 14.09 | 18.89 | |
| | Potency | 80-125 % of reference standard | 60 | 98 | | 95 | −3 |
| | | | 100 | 99 | | 92 | −7 |
| | | | 120 | 104 | | 97 | −7 |
| Placebo composition: Sodium acetate trihydrate 1.74 mg/ml Acetic acid to pH 5.0 Trehalose dihydrate 80 mg/ml Poloxamer 188 1 mg/ml | pH | 6.0 ± 0.5 | 60 | 5.21 | — | 5.28 | 0.07 |
| | | | 100 | 5.33 | — | 5.41 | 0.08 |
| | | | 120 | 5.32 | — | 5.42 | 0.10 |
| | Purity, SEC (aggregate content-upper value, monomer content-lower value) | Not less than 95 % | 60 | 95.98 | 96.02 | 96.04 | 0.07 |
| | | | 100 | 95.98 | 94.89 | 93.83 | −2.15 |
| | | | 120 | 95.98 | 94.71 | 94.00 | −1.97 |
| | SDS-PAGE | Not less than 95 % in reduced conditions | 60 | 94.98 | 94.58 | 94.21 | −0.77 |
| | | | 100 | 94.89 | 94.60 | 94.37 | −0.52 |
| | | | 120 | 95.35 | 95.10 | 94.37 | −0.98 |
| | | Not less than 90 % in nonreduced | 60 | 95.01 | 93.54 | 92.91 | −2.10 |
| | | | 100 | 94.58 | 93.15 | 92.06 | −2.52 |
| | | | 120 | 95.55 | 94.34 | 93.66 | −1.89 |
| | Acid-basic profile, IEX HPLC | — | 60 | 13.56 | 20.34 | 22.99 | 28.02 |
| | | | | 76.02 | 65.03 | 62.01 | |
| | | | | 10.42 | 14.63 | 15.00 | |
| | | | 100 | 13.49 | 19.98 | 23.87 | 30.90 |
| | | | | 76.45 | 65.24 | 61.00 | |
| | | | | 10.06 | 14.78 | 15.13 | |
| | | | 120 | 13.52 | 22.10 | 23.78 | 35.16 |
| | | | | 75.69 | 64.19 | 58.11 | |
| | | | | 10.79 | 13.71 | 18.11 | |
| | Potency | 80-125 % of reference standard | 60 | 108 | — | 101 | −7 |
| | | | 100 | 103 | — | 97 | −6 |
| | | | 120 | 110 | — | 99 | −11 |

Accelerated aging of samples for 1 month at +37° C. has proved the maintenance of the homogeneity and specific activity of anti-IL17 antibody of the disclosure with the exemplary acceptable storage formulations:

| | |
|---|---|
| Anti-IL17 antibody | 10-70 mg/mL |
| L-Histidine | 0.4 mg/mL |
| L-Histidine hydrochloride monohydrate | 0.4 mg/mL |
| Mannitol | 54.5 mg/mL |
| Poloxamer 188 | 0-1 mg/mL |
| pH 6.0 ± 0.5 | |
| Anti-IL17 antibody | 10-120 mg/mL |
| Sodium acetate trihydrate | 0.44-1.74 mg/mL |
| Trehalose dihydrate | 80-100 mg/mL |
| Poloxamer 188 | 0-1 mg/mL |
| Acetic acid glac. | to pH 5.0 |
| pH 5.0 ± 0.5 | |

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention.

Furthermore, various features of the above-described representative examples, as well as the various independent and dependent claims below, may be combined in ways that are not specifically and explicitly enumerated in order to provide additional useful embodiments of the present teachings.

Additional Exemplary Studies

Additional exemplary studies were conducted using different pharmaceutical compositions including anti-IL17a antibody as described herein (e.g. Netakimab) for treating different IL17a mediated diseases. The exemplary pharmaceutical compositions used for these studies are described in Table 11.1:

TABLE 11.1

| Clinical trial code | Indication | Therapeutic doses, mg | Phase | Composition per 1 mL of solution |
|---|---|---|---|---|
| BCD-085-2 | plaque psoriasis | 40, 80, 120 | II | anti-IL17 monoclonal antibody 40.0 mg, histidine hydrochloride monohydrate 0.4 mg, L-histidine 0.4 mg, mannitol 54.5 mg, water for injection ad 1.0 mL |
| BCD-085-2ext | plaque psoriasis | 80, 120 | | |
| BCD-085-3 | ankylosing spondylitis | 40, 80, 120 | | |
| BCD-085-3ext | ankylosing spondylitis | 80, 120 | | |
| BCD-085-7, BCD-085-4 | plaque psoriasis | 120 | III | anti-IL-17 monoclonal antibody 60.0 mg, sodium acetate |
| BCD-085-5 | ankylosing spondylitis | 120 | | |

TABLE 11.1-continued

| Clinical trial code | Indication | Therapeutic doses, mg | Phase | Composition per 1 mL of solution |
|---|---|---|---|---|
| BCD-085-8 | psoriatic arthritis | 120 | | trihydrate 1.74 mg, trehalose dihydrate 80 mg, poloxamer (kollifor) 188 0.5 mg, glacial acetic acid ad pH 5.0, water for injection ad 1.0 mL |

In some examples, 80 mg was administered as 2 syringes (1 mL each, 40 mg BCD-085), where in others, 120 mg was administered as 3, syringes (1 mL each, 40 mg BCD-085) or 120 mg was administered as 2 syringes (1 mL each, 60 mg BCD-085).

The different doses of the pharmaceutical compositions and/or Netakimab described in Table 11.1 were shown to be suitable for treatment of the respective IL17a mediated diseases as described in Table 11.1, and by following the dosage regimens as further detailed herein. As such, different doses/dosage regimens of Netakimab and its pharmaceutical compositions as described herein may be used for treatment in a subject.

The results of the exemplary studies are described herein.

Example 4. Use of Netakimab at Different Doses to Treat Plaque Psoriasis (PSO), Proof-of Concept Study (BCD-085-2)

Study Design

BCD-085-2 is a multicenter double-blind placebo-controlled randomized phase II clinical study in patients with moderate-to-severe plaque psoriasis. The primary objective was to find an effective and safe dose of BCD-085 for multiple injections in patients with moderate to severe plaque-type psoriasis.

Pharmacokinetics and immunogenicity assessments were included in secondary objectives of the study.

The study population is presented by adult patients (18-65 years old inclusively) with moderate to severe plaque psoriasis established for at least 6 months before screening, with baseline BSA involved with psoriasis ≥10%, PASI score of 12 or greater, sPGA score of 3 or greater, who are candidates for systemic or phototherapy or have failed previous biologic therapy. Patients with previous use of monoclonal antibodies were allowed to participate (with exception of previous IL17/IL17R inhibitors use) after appropriate washout periods.

120 patients were randomized (1:1:1:1) into the 4 treatment groups: 1) BCD-085 40 mg, 2) BCD-085 80 mg, 3) BCD-085 120 mg and 4) placebo. BCD-085-2 study used 40 mg/1 ml formulation of BCD-085 in pre-filled syringes. BCD-085/placebo was used on Day 1 at weeks 0, 1, 2, 4, 6, 8 and 10. For blinding purposes, patients from 40 mg and 80 mg arms received two or one SC injections of placebo (1 mL each), respectively. Patients in the control arm received 3 SC injections of placebo (each injection was 1.0 mL). Patients were followed up for safety up to week 14.

The hypothesis of the study was that BCD-085 has superior efficacy over placebo in patients with moderate-to-severe plaque psoriasis. The superiority margin ($\delta$) was 0.1 (10%), type 1 error ($\alpha$) of −5% (0.05), type 2 error ($\beta$) of 20% (0.2) and power of 80%. The primary endpoint in this study was the proportion of patients who achieved PASI75 at week 12. PASI 75 achievement was defined as at least 75% improvement of the overall PASI score at Week 12 versus baseline. Secondary endpoints include assessment of PASI 50 and PASI 90, sPGA 0-1, percent improvement in PASI, BSA and NAPSI scores, change in itching assessment by VAS (mm), assessment of QoL (SF-36 and DLQI). The efficacy endpoints were evaluated at weeks 0, 4, 8 and 12. Safety endpoints included rates of adverse events (AE), SAE, 3-4 grade AE according to CTCAE 4.03, rates of early study discontinuation due to AE. Pharmacokinetic endpoints included standard PK parameters ($C_{min}$, $AUC_{(0-168)}$, $AUC_{(0-672)}$, $T_{max}$, T½, Vd, $K_{el}$, CL). Immunogenicity parameters included incidence of binding and neutralizing antibodies to BCD-085 after multiple drug injections.

Study Results

Demographics and baseline characteristics were comparable between groups (Table 12).

TABLE 12

Baseline characteristics of patients (BCD-085-2 study)

| Parameter | BCD-085 40 mg (n = 30) | BCD-085 80 mg (n = 30) | BCD-085 120 mg (n = 28) | Placebo (n = 26) |
|---|---|---|---|---|
| Age (years), Median [IQR] | 41.50 [32.00-50.00] | 35.00 [29.00-45.00] | 45.00 [35.00-54.00] | 41.50 [32.00-48.00] |
| BMI (kg/m$^2$), median [IQR] | 25.81 [23.7-28.09] | 26.85 [23.62-29.59] | 29.72 [24.15-31.94] | 24.95 [22.95-30.12] |
| Male sex, no. (%) | 23 (76.67%) | 19 (63.33%) | 22 (78.57%) | 15 (57.69%) |
| Duration of the disease (months), median [IQR] | 178 [76.00-224.00] | 137 [73.00-187.00] | 137 [46.00-191.00] | 112 [69.00-211.00] |
| PASI score, median [IQR] | 25.7 [17.4-30.7] | 21.9 [17.4-28.2] | 23.55 [16.4-30.6] | 26.4 [17.8-31.1] |
| BSA %, median [IQR] | 31 [18-39] | 23.05 [17.5-36] | 31.8 [21.9-40] | 31 [16-38] |
| sPGA score, median [IQR] | 4 [3-4] | 4 [3-4] | 4 [3-4] | 4 [3-4] |
| Prior use of systemic glucocorticoids, no. (%) | 6 (20%) | 4 (14.33%) | 4 (14.29%) | 3 (11.54%) |
| Prior use of phototherapy, no. (%) | 21 (70%) | 19 (63%) | 19 (67.86%) | 20 (76.92%) |
| Prior biologic treatment, no. (%) | 1 (3.33%) | 1 (3.33%) | 1 (3.57%) | 0 (0.00%) |

Note:

IQR—interquartile range

Figure 5:
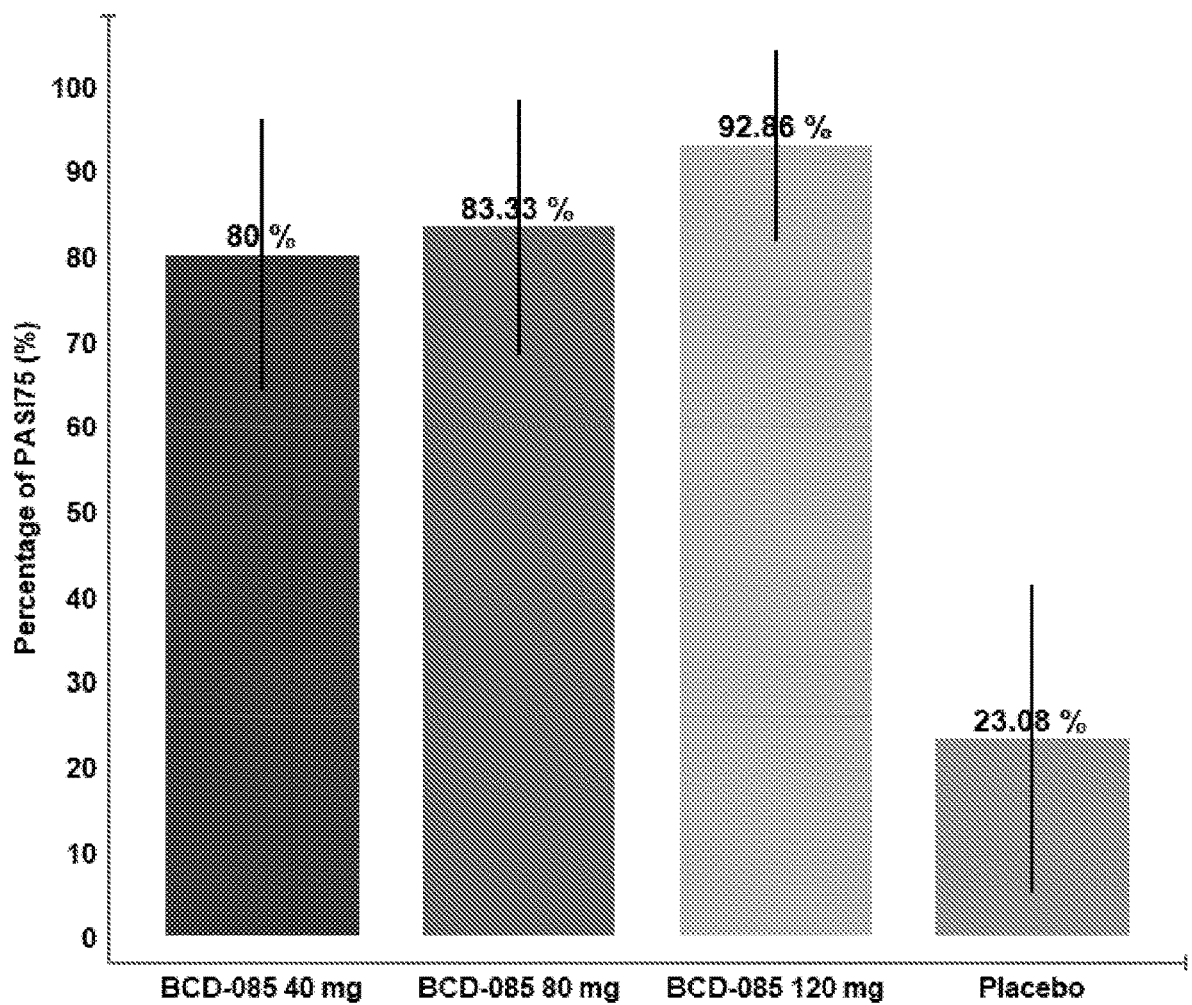
FIG. 5 is a graph illustrating the proportion of patients in each study arm who achieved a PASI 75 at Week 12 of treatment (BCD-085-2 Study).

The efficacy population comprised 114 patients. Six of 120 randomized subjects were not included in the efficacy assessment due to the following reasons: IC recalled before the first dosing (1 patient in the 80 mg BCD-085 arm and 2 patients in the 120 mg BCD-085 arm), violated inclusion/exclusion criteria (1 patient in the 40 mg BCD-085 arm), and violation of the dosing regimen (2 patients in the placebo arm). The analysis has shown that BCD-085 in all tested doses is superior to placebo in patients with moderate to severe plaque-type psoriasis. Over 90% of patients in the highest-dose arm (120 mg) responded to the treatment. The main efficacy results are presented on Table 13, FIG. 5, FIG. 6, FIG. 7.

TABLE 13

Comparative assessment of the frequency of PASI75 responses at Week 12 (BCD-085-2 Study)

| Arm | Drug | Proportion of PASI 75 achievers, n (%) | p-value |
|---|---|---|---|
| 1 (n = 30) | BCD-085 (40 mg) | 24 (80.0%) | $p_1 < 0.0001$ |
| 2 (n = 30) | BCD-085 (80 mg) | 25 (83.33%) | $p_2 < 0.0001$ |
| 3 (n = 28) | BCD-085 (120 mg) | 26 (92.86%) | |
| 4 (n = 26) | Placebo | 6 (23.08%) | |

Note:
[1]—two-tailed Fisher's exact test;
[2]—Yates-corrected $\chi^2$ test.

To prove the protocol-stated hypothesis of BCD-085 being superior to placebo, the 95% CIs were calculated for the difference in proportions of PASI 75 achievement (individual pairwise comparisons were performed for placebo versus each BCD-085 arm). The hypothesis was accepted if the lower bound of the estimated 95% CI for the difference in proportions of PASI 75 achievement was above the pre-specified margin of clinically non-meaningful differences (δ) of 10% (0.10). The results are provided in Table 14.

TABLE 14

Comparative assessment of the frequency of PASI75 responses at Week 12 (BCD-085-2 Study)

| Difference in PASI 75 achievement | | 95% CI | p-value[1] |
|---|---|---|---|
| Arms 1 and 4 | 56.92% | [31.72%; 82.13%] | <0.0001 |
| Arms 2 and 4 | 60.25% | [35.69%; 84.83%] | <0.0001 |
| Arms 3 and 4 | 69.78% | [47.28%; 92.28%] | <0.0001 |

Note:
[1]—two-tailed Yates-corrected $\chi^2$ test

Figure 6:
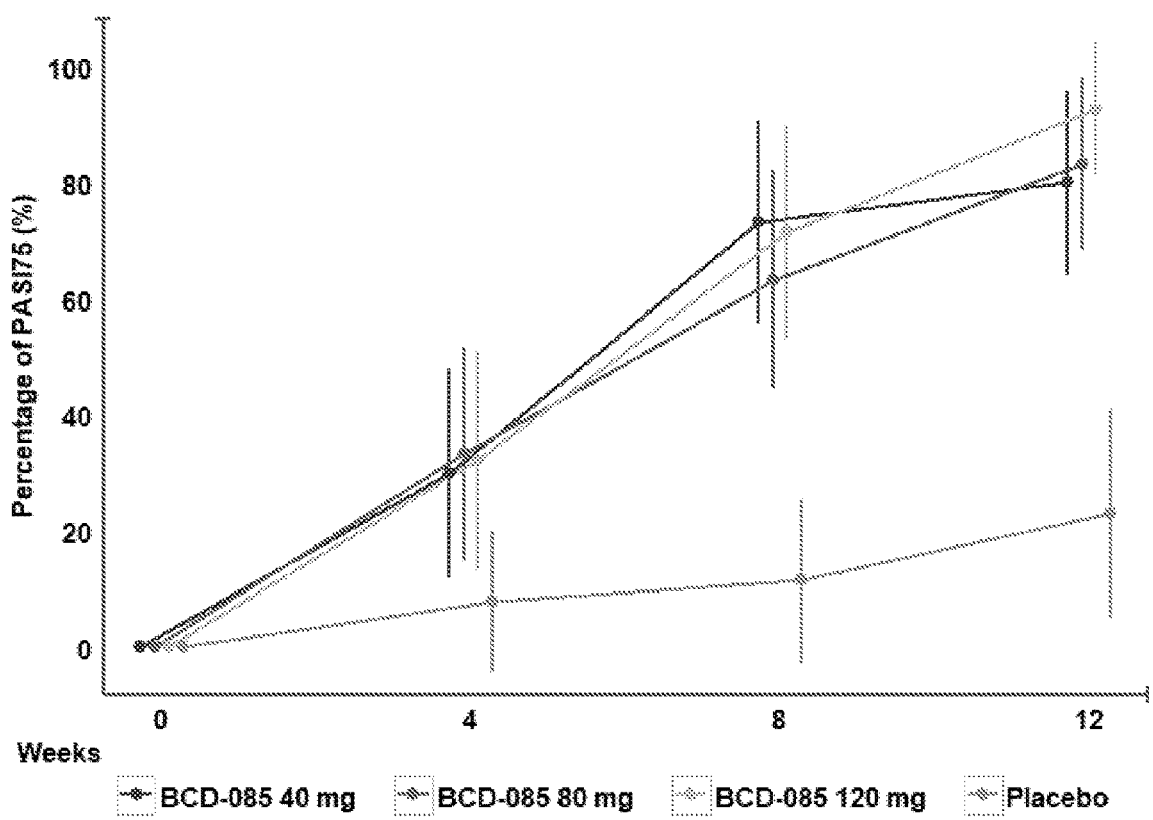
FIG. 6 is a graph illustrating the proportion of patients in each study arm who achieved a PASI 75 at Weeks 4, 8 and 12 of treatment (BCD-085-2 study).
Figure 7:
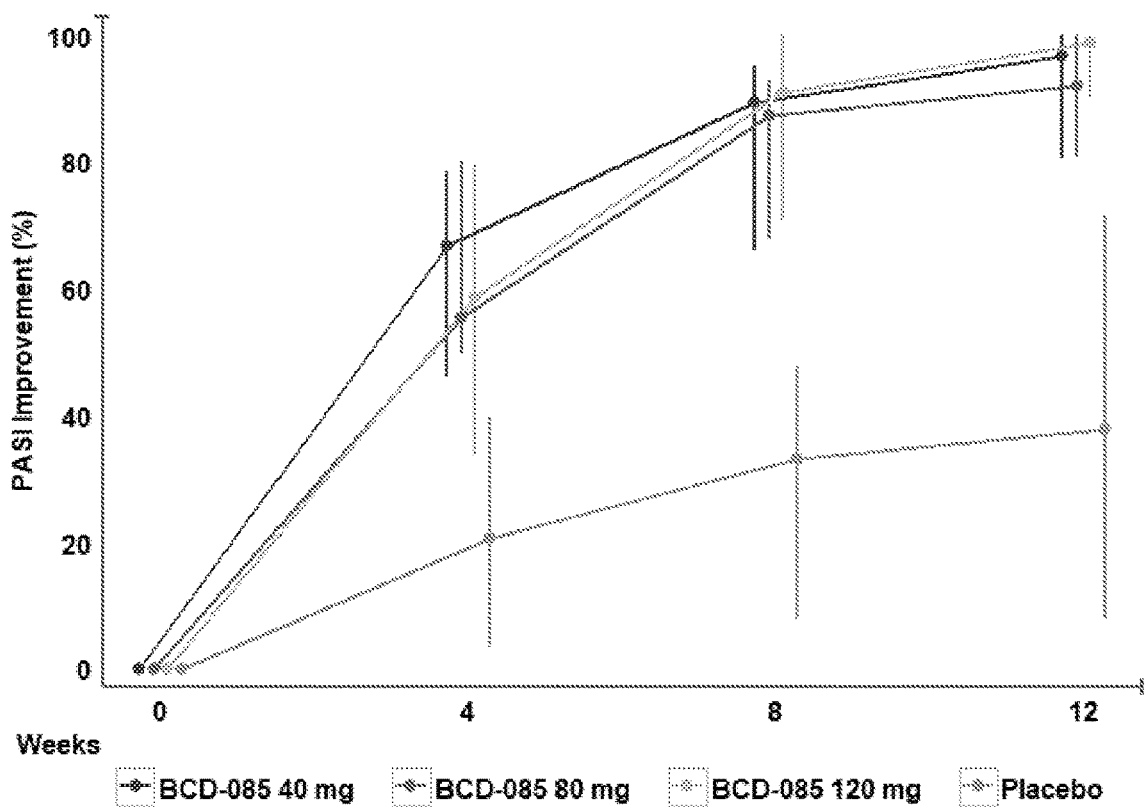
FIG. 7 is a graph illustrating the mean percent improvement in the PASI score from baseline at Weeks 4, 8 and 12 of treatment (BCD-085-2 study).

This table shows that the lower bounds of the 95% CIs for all pairwise comparisons (placebo versus BCD-085) fall outside the pre-specified superiority margin. Thus, the hypothesis of BCD-085 being superior to placebo in patients with moderate to severe plaque psoriasis was accepted and the primary study objective was met. Of note, the superiority of BCD-085 to placebo was proved for all tested doses (40 mg, 80 mg, and 120 mg). The dynamic assessment of PASI 75 and PASI percent improvement from baseline have shown pronounced results from week 4 (FIG. 6, FIG. 7).

PASI90 was reported in 66.7%, 60.0%, 78.6% of BCD-085 patients respectively vs 19.2% for placebo at week 12 (p<0.0001 for groups 1, 2, 3 vs placebo). Also, 83.3%, 90.0%, 89.3% of BCD-085 patients achieved clear or almost clear skin (sPGA 0/1) in groups 1, 2, 3 respectively vs 30.8% for placebo (p<0.0001 for groups 1, 2, 3 compared with placebo) at week 12. The mean percentage decrease in the percent affected BSA at week 12 was 92.2% in group 1 (range 70.2% to 100%), 94.8% in group 2 (range 62.9% to 100%), 97.8% in group 3 (range 67.7% to 100%) vs 27.1% for placebo (range 0 to 69.7%), p<0.0001 for groups 1, 2, 3 vs placebo.

Figure 8:
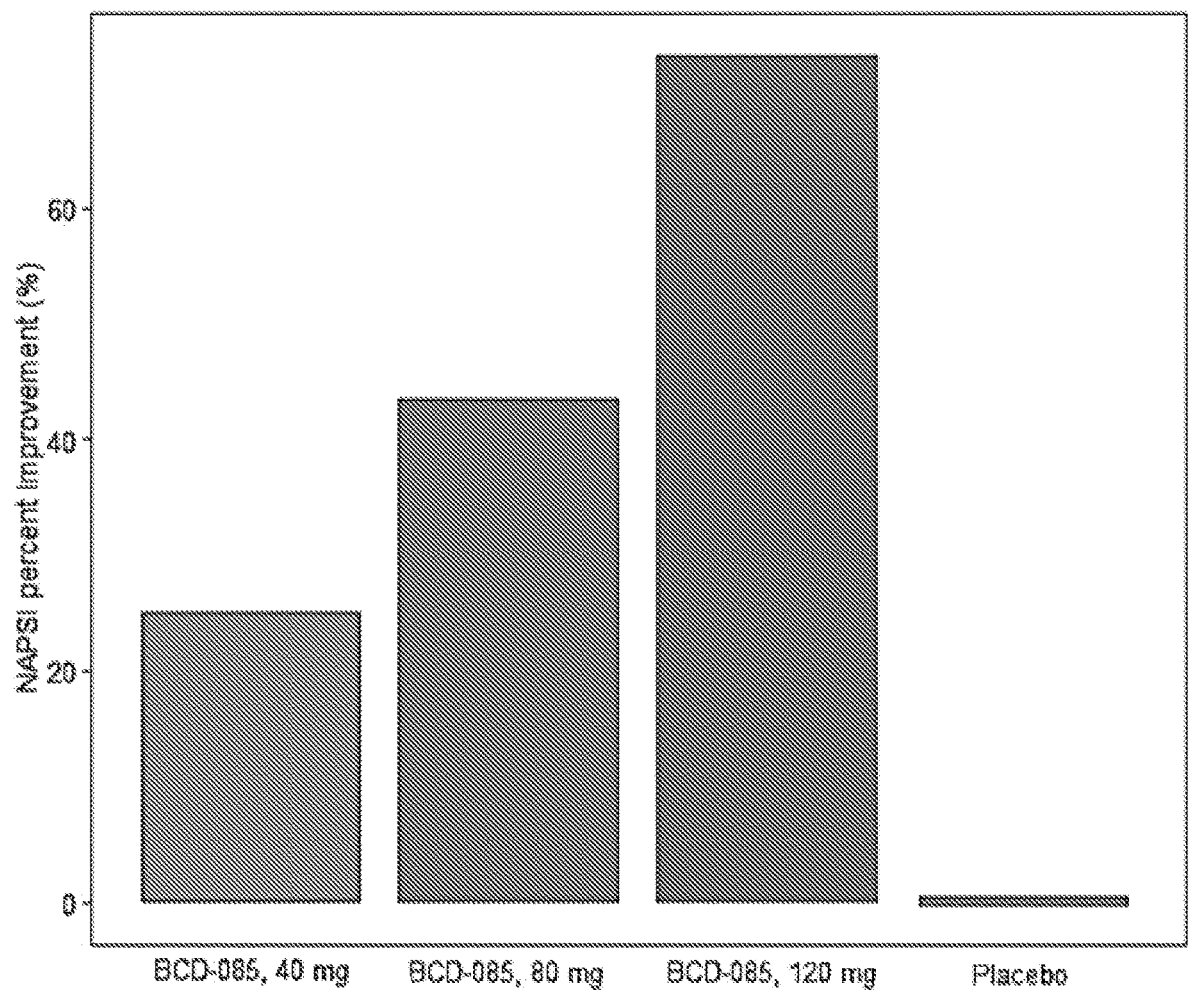
FIG. 8 is a graph illustrating the mean percent improvement in the NAPSI score from baseline at Week 12 of treatment (BCD-085-2 Study).

BCD-085 also showed significant efficacy in nail psoriasis (FIG. 8). Population for assessing nail psoriasis was 66 patients (other patients didn't have signs of nail psoriasis during the study period). The mean percentage change in NAPSI score at week 12: 25% in group 1 (range 0 to 44.8%), 43.4% in group 2 (range 18.6% to 78.6%), 73.1% in group 3 (range 50% to 81.7%) vs 0 for placebo (range −9.3% to 0%), p=0.0002 for group 1, 2, 3 respectively vs placebo.

The QoL assessment demonstrated that the DLQI score decreased significantly with time indicating an improvement in the QoL in the BCD-085 arms and did not change in the placebo arm. BCD-085 has been proven superior to placebo, and the primary study objective was met. Although there were no differences among three BCD-085 doses for most endpoints, the best overall reduction of the signs/symptoms of psoriasis was detected in the 120 mg BCD-085 arm.

Pharmacokinetics

Figure 9:
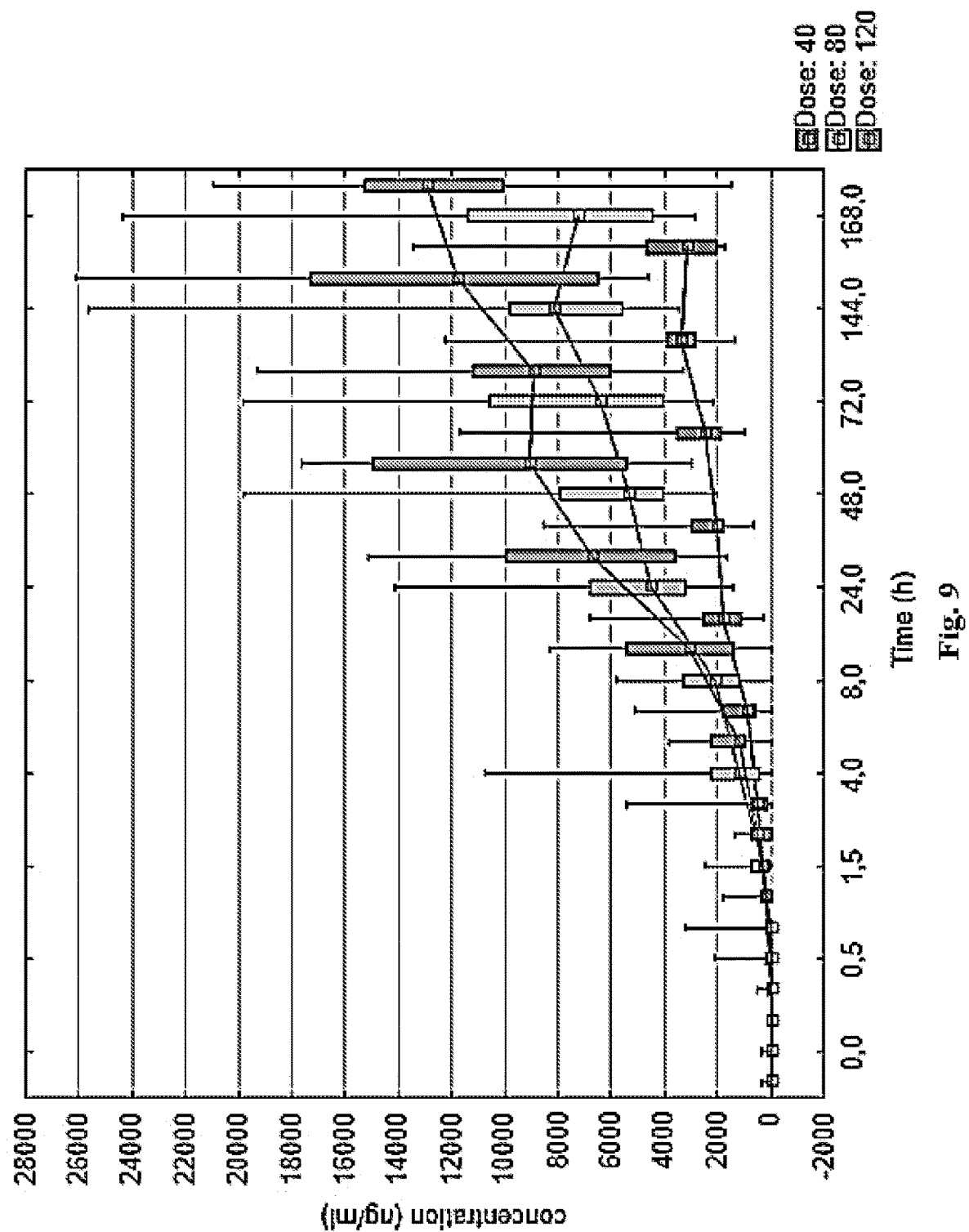
FIG. 9 is a graph illustrating Netakimab concentration profile after the first injection and shows medians and interquartile ranges, min and max values (BCD-085-2 Study).

After a single injection of 40 mg, 80 mg, and 120 mg BCD-085, Netakimab was detectable in the serum for 0.5 to 4 h post-dose. Its concentration changed with time similarly for all doses. Changes in Netakimab concentration were proportional to the dose administered. There was a slow absorption with a gradual linear increase in the serum concentration of BCD-085 with a maximum seen at the end of Week 1. Higher doses (80 mg and 120 mg) were characterized with higher $C_{max}$ and $AUC_{(0-168)}$ as compared with 40 mg dose. (FIG. 9)

A long-term absorption resulted in the $C_{max}$ of BCD-085 at 144 [78-168]h post-dose, which is near the time of the second injection. No terminal half-life for BCD-085 after a single dosing in this trial suggested it unfeasible to calculate such PK parameters as $AUC_{(0-\infty)}$, $T\frac{1}{2}$, and $K_{el}$, thus the data for these endpoints are not presented.

Upon repeated injections of 40 mg, 80 mg, and 120 mg of BCD-085, the minimal serum concentration was rather high (>60% $C_{max}$) and was reached before the second injection of BCD-085.

Figure 10:
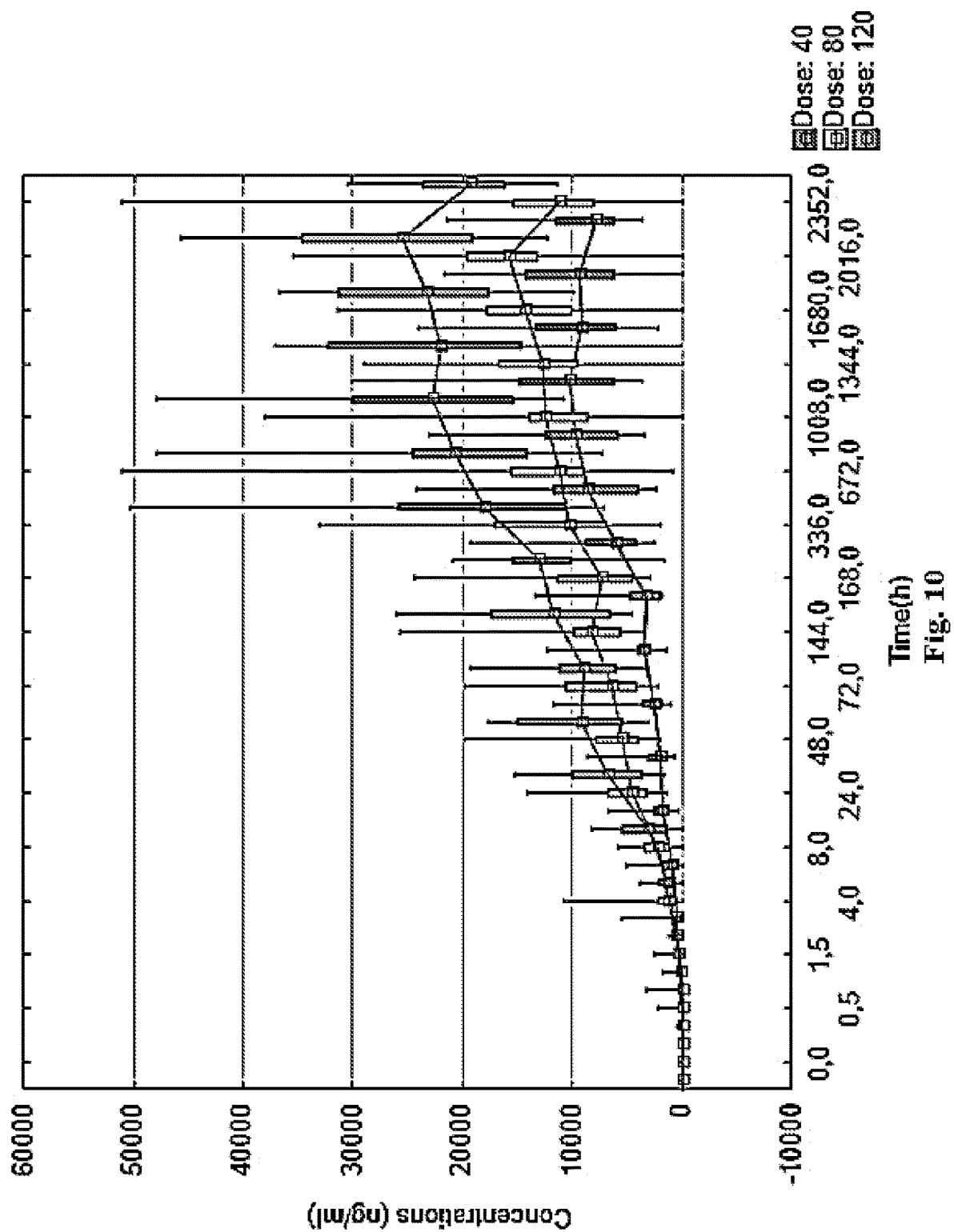
FIG. 10 is a graph illustrating Netakimab concentration profile after multiple injections and shows medians and interquartile ranges, min and max values (BCD-085-2 Study).

With re-administrations, BCD-085 accumulated in the serum, and its concentration increased 1.8-3.6-fold. Higher doses (80 mg and 120 mg) show higher induction potential as compared with 40 mg because fewer injections were needed to achieve concentrations around $C_{max-mult}$ (FIG. 10).

Safety

The safety analysis included all patients who received at least one dose of BCD-085 (n=117, Table 15). At least one AE/SAE was reported in 45.16% of patients (group 1), 36.67% of patients (group 2), 25.00% of patients (group 3), and 39.29% of patients (group 4) (p=0.443). Treatment-related AEs were judged in 19.35% patients in group 1, in 10.00% patients in group 2, in 7.14% patients in group 3, and in 10.71% patients in group 4 (p=0.534). No grade 4 AEs and no SAEs were reported. No patients had to discontinue the study treatment due to AEs/SAEs. Grade 3 AEs were reported in 3.23% of patients in Arm 1, 3.33% of patients in Arm 2, 3.57% patients in Arm 3, and 7.14% patients in Arm 4 (p=0.872, two-two-tailed Fisher's exact test). The most common AEs were neutropenia, acute respiratory tract infections, increased blood pressure, and elevated liver transaminases. Most of the AEs were mild. Only one local reaction (grade 1) was detected in group 1 (BCD-085, 40 mg)

TABLE 15

Summary of safety data (BCD-085-2 Study)

| Parameter | BCD-085, 40 mg (n = 31) | BCD-085, 80 mg (n = 30) | BCD-085, 120 mg (n = 28) | Placebo (n = 28) | p-value |
|---|---|---|---|---|---|
| Any adverse events | 14 (45.16%) | 11 (36.67%) | 7 (25.00%) | 11 (39.29%) | 0.443 |
| Any serious adverse events | NONE | | | | |
| Therapy-related adverse events: | 6 (19.35%) | 3 (10.00%) | 2 (7.14%) | 3 (10.71%) | 0.534 |
| Adverse events with grade 3 of toxicity | 1 (3.23%) | 1 (3.33%) | 1 (3.47%) | 2 (7.14%) | 0.872 |
| Adverse events with grade 4 of toxicity | NONE | | | | |
| Administration site reactions | 1 (3.23%) | 0 | 0 | 0 | 1.000 |
| Therapy discontinuation due to AEs/SAEs | NONE | | | | |
| Common adverse events | | | | | |
| Neutroponia | 4 (12.90%) | 2 (6.67%) | 1 (3.57%) | 1 (3.57%) | 0.539 |
| Upper respiratory tract infection | 3 (9.68%) | 1 (3.33%) | 1 (3.57%) | 1 (3.57%) | 0.721 |
| Elevated serum gamma-glutamyl transferase (GGT) | 0 | 3 (10.00%) | 1 (3.57%) | 2 (7.14%) | 0.291 |

Immunogenicity

The population for immunogenicity assessment included 117 patients (those who received at least one injection of the study product and provided at least two blood samples for testing, one of which was taken before the first dosing on Day 1, Week 0). Blood samples were drawn at week 0 before injection and at week 14. Immunogenicity assessment did not detect any binding anti-BCD-085 antibodies in any patient.

Conclusion

The analysis has shown that BCD-085 in all tested doses is superior to placebo. The highest efficacy was shown for the dose of 120 mg: 92.86% of patients achieved PASI75 at week 12 (compared with 23.08% in the placebo arm, two-sided 95% CI is [47.28%; 92.28%], p<0.0001, chi-square test with Yates correction). Toxicity of BCD-085 was mild: rate of AE did not differ between groups (incl. placebo), grade 1-2 laboratory abnormalities and elevation of blood pressure were the most frequent types of AE. The were no cases of SAE, early withdrawal due to safety reasons, ADA formation.

Example 5. Long-Term Use of Netakimab in Patients With Moderate to Severe Plaque Psoriasis (BCD-085-2Ext Study)

Study Design

BCD-085-2ext was a multicentre open-label Phase II extension study of the efficacy and safety of BCD-085 80 mg and 120 mg in patients with moderate-to-severe plaque psoriasis who completed the BCD-085-2 study according to the Protocol. The primary objective was to assess the efficacy and safety of the maintenance therapy (up to 1 year) of BCD-085.

If summarizing the duration of the follow-up in the main study BCD-085-2 (14 weeks) and its extension phase BCD-085-2ext (42 weeks), the total follow-up for 1 subject in both studies was 56 weeks (about 1 year).

Patient Population and Study Design

Figure 11:
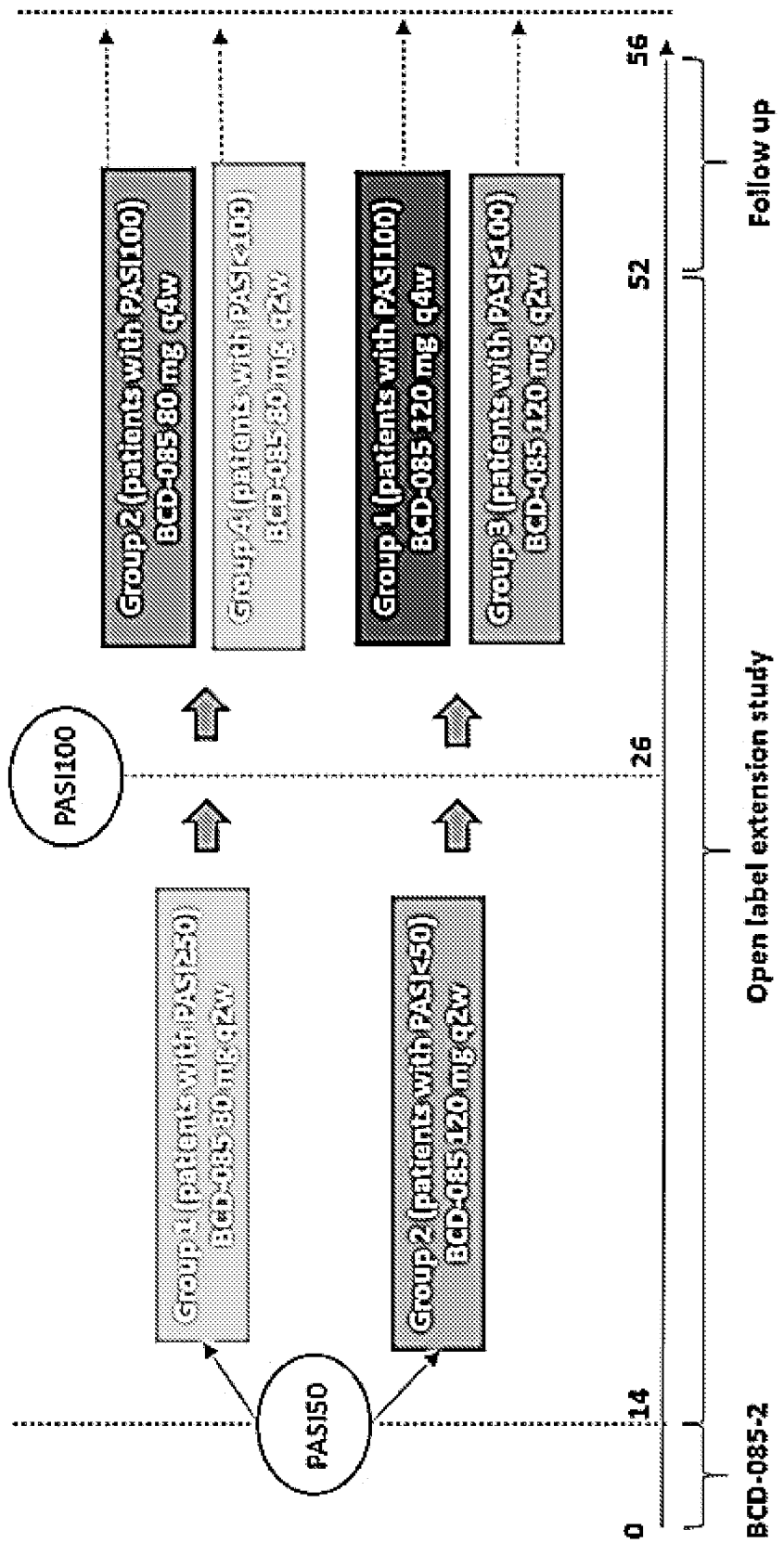
FIG. 11 is a graph illustrating study design (BCD-085-2ext Study).

The study included 103 patients, who completed the BCD-085-2 study according to the Protocol. Patients who achieved PASI 50 and less (unresponders) after BCD-085-2 study received BCD-085 SC 120 mg in Q2W regimen (BCD-085 given once every 2 weeks), patients who achieved PASI 50 and more received BCD-085 SC 80 mg in Q2W regimen. After 6 months of treatment patients who achieved PASI 100 were switched from BCD-085 Q2W to BCD-085 Q4W (BCD-085 given once every four weeks) in the same doses. Patients who did not achieve PASI 100 were considered to be poor responders, they continued to receive the same dose of BCD-085 in Q2W regimen until the end of the study (FIG. 11).

During 12 weeks of BCD-085-2ext study patients were treated in Q2W regimen in two arms:
Arm 1: BCD-085 80 mg;
Arm 2: BCD-085 80 120 mg.

Because a Q4W regimen was introduced after 6 month of treatment (12 weeks of BCD-085-2ext study), patients were distributed into 4 arms:
Arm 1: BCD-085 120 mg (Q2W/Q4W);
Arm 2: BCD-085 80 mg (Q2W/Q4W);
Arm 3: BCD-085 120 mg (Q2W);
Arm 4: BCD-085 80 mg (Q2W).

Baseline characteristics are provided in BCD-085-2 study.

The primary endpoint was the proportion of patients who achieved PASI 75 by Week 38 of the present study (or Week 52 if considering the participation in the main study BCD-085-2) Secondary endpoints include assessment of PASI 90, PASI 100 and sPGA 0-1. The efficacy endpoints were evaluated at weeks 12 and 38 of BCD-085-2ext study (weeks 24 and 52 of treatment). Immunogenicity parameters included incidence of binding and neutralizing antibodies to BCD-085 after one year of treatment (week 56).

The study involved 86 patients enrolled in the Russian Federation and 17 patients in the Republic of Belarus.

Results
Efficacy

The primary efficacy endpoint of this study was the proportion of patients who achieved PASI 75 by Week 38 of the present study (or Week 52 if considering the participation in the main study BCD-085-2). The achievement of PASI 75 was defined as at least 75% improvement of the PASI score at Week 38 in comparison with the baseline value before the beginning of the therapy with BCD-085 (at screening for BCD-085-2 study). Efficacy was assessed in ITT (intent-to-treat, total population, n=103).

The analysis showed that the proportion of patients who achieved PASI 75 after 1 year of treatment with BCD-085 was 98.06% (including non-responders—patients who did not achieve PASI 50 at the moment of inclusion in the extension phase).

Data on efficacy after 6 months of the study treatment (i.e. 12 weeks of BCD-085-2ext study) are presented in two arms of patients who were receiving BCD-085 80 mg and 120 mg.

Data on efficacy after 1 year of the treatment (i.e. after 38 weeks of BCD-085-2ext study) are presented in 4 arms:

Arm 1: BCD-085 120 mg (Q2W/Q4W),
Arm 2: BCD-085 80 mg (Q2W/Q4W),
Arm 3: BCD-085 120 mg (Q2W),
Arm 4: BCD-085 80 mg (Q2W).

In this study, the two subpopulations were identified: a subpopulation highly sensitive to the study treatment (Arms 1 and 2, where patients were receiving BCD-085 in Q2W regimen and then, after Week 12, in Q4W regimen, n=45) and a subpopulation of patients who responded slower (Arms 3 and 4, where patients were receiving BCD-085 in Q2W regimen throughout the entire study; n=58).

Figure 12:
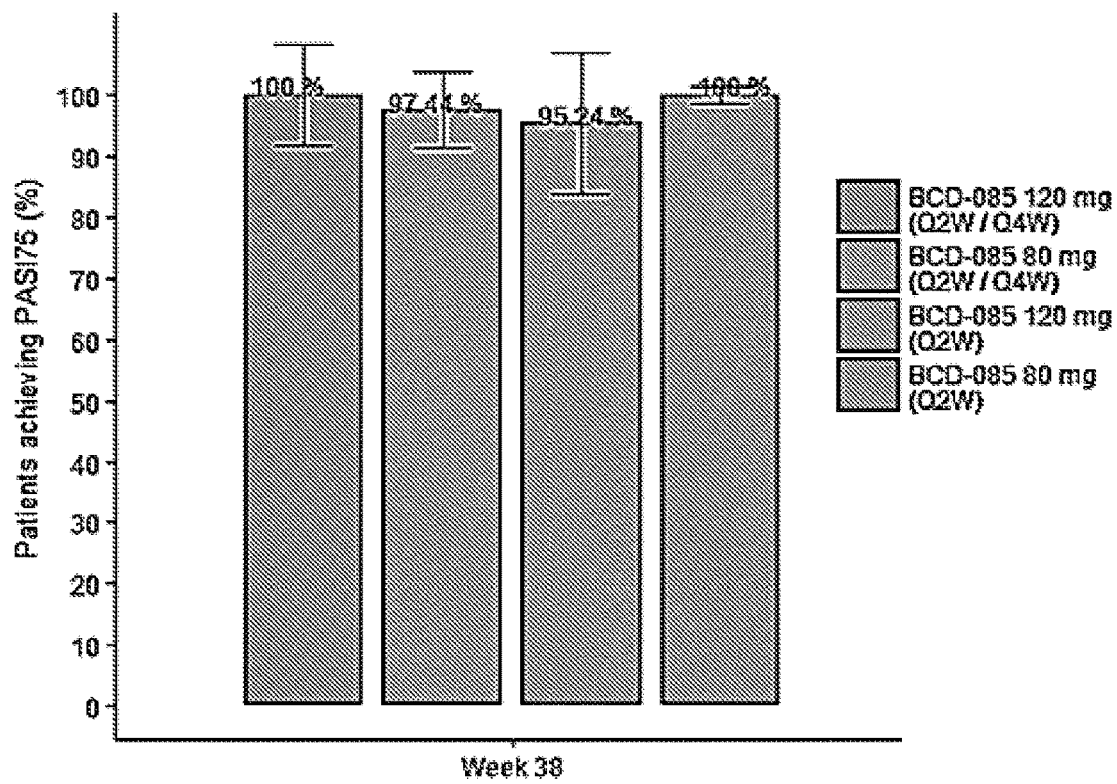
FIG. 12 is a graph illustrating the proportion of patients who achieved PASI 75 after one year of treatment (week 38 of the BCD-085-2ext study).

Results of PASI 75 assessment in the ITT population are presented in Table 16 and FIG. 12.

TABLE 16

Proportion of patients who achieved PASI 75 after one year of treatment (week 38 of BCD-085-2ext study) (BCD-085-2ext Study)

| Therapy arm | number | % | P-value[1] |
|---|---|---|---|
| All patients, n = 103 | 101 | 98.06 | — |
| Arm 1, n = 6 | 6 | 100 | 1.000 |
| Arm 2, n = 39 | 38 | 97.44 | |
| Arm 3, n = 21 | 20 | 95.24 | 0.3621 |
| Arm 4, n = 37 | 37 | 100 | |

[1]two-tailed Fisher's exact test.
[1]The timepoint-38 weeks-in BCD-085-2ext study is equal to 52 weeks if summarized with the duration of previous BCD-085-2 study (here and onwards)

A comparison in the subpopulation of patients more sensitive to the therapy (Arms 1 and 2) showed the absence of significant differences (p=1.000, two-sided exact Fisher's test) between BCD-085 80 mg and 120 mg. However, the efficacy was the highest with BCD-085 120 mg (Arm 1): 100% of patients achieved PASI 75.

A comparison in the subpopulation of patients less sensitive to the therapy (Arms 3 and 4) also showed the absence of significant differences. Arm 3 showed a lower response because it included most severe patients, who did not have the minimal response (PASI 50) at inclusion in the extension phase and did not achieve PASI 100 after 12 weeks of the extension study. However, 95.24% of patients in this arm achieved PASI 75, which confirms the high efficacy of the therapy even in slow responders.

Assessment of the loss of response after one year of treatment

Biological therapy of psoriasis with TNF-alpha inhibitors is known to be associated with a loss of response over time. Monoclonal antibodies to interleukin-17 have been shown to have a high level of efficacy over a long time. To confirm this fact, a loss of response in patients receiving BCD-085 for one year was evaluated. A proportion of patients with a loss of PASI 75/90/100 after 1 year of therapy was compared with PASI 75/90/100 at Week 12 of the BCD-085-2 study among patients who were receiving BCD-085 in both studies (n=77). This population did not include patients who were receiving placebo during the BCD-085-2 study.

TABLE 17

Proportion of patients with a loss of response PASI 75/90/100 after one year of treatment (BCD-085-2ext Study)

| Arms | Proportion of patients with a loss of response at Week 38 (52 weeks of treatment) | |
|---|---|---|
| | Absolute number | % |
| PASI 75 | | |
| n = 77 | 2 | 2.60 |
| Arm 2, n = 33 | 1 | 3.03 |
| Arm 3, n = 13 | 1 | 7.69 |
| Arm 4, n = 31 | 0 | 0 |
| PASI 90 | | |
| n = 77 | 3 | 3.90 |
| Arm 2, n = 33 | 1 | 3.03 |
| Arm 3, n = 13 | 0 | 0 |
| Arm 4, n = 31 | 4 | 12.90 |
| PASI 100 | | |
| n = 77 | 7 | 9.09 |
| Arm 2, n = 33 | 6 | 18.18 |
| Arm 3, n = 13 | 0 | 0 |
| Arm 4, n = 31 | 1 | 3.23 |

In Arm 1, all patients were receiving placebo during the main period.

As seen from the Table 17 above, a loss of response was detected in few patients. Failures to achieve PASI 90 were seen mostly in Arm 4 (in 12.9% of patients), where subjects were receiving BCD-085 80 mg in Q2W regimen. A loss of PASI 100 was shown mainly in Arm 2 (18.18%), where patients received BCD-085 80 mg in Q2W/Q4W regimen.

A loss of PASI 75 was recorded only in 2 patients (2.6%) of the total population (n=77, without patients who were receiving placebo in the main study). This shows that the majority of patients maintained a sustained response with long-term treatment with BCD-08-5. Cases of loss of PASI 90/100 in the arms receiving BCD-085 80 mg might show that this dose was not effective enough.

An effect of the switch from a more frequent dosing regimen (Q2W) to a less frequent one (Q4W) on the maintenance of the clinical response was studied. This was assessed using the proportion of patients in Arms 1 and 2 (n=45) who maintained PAST 100 by the end of the follow-up (Table 18).

TABLE 18

Proportion of patients who maintained/lost PASI 100 after swithching the regimen (Q2W/Q4W) (BCD-085-2ext Study)

| Arm | Proportion of patients who maintained PASI 100 | | Proportion of patients with a loss of PASI 100 | | P-value[1] |
|---|---|---|---|---|---|
| | Abs. number | % | Abs. number | % | |
| n = 45 (patients of Arms 1 and 2) | 38 | 84.44 | 7 | 15.56 | — |
| Arm 1, n = 6 | 6 | 100 | 0 | 0 | 0.5686 |
| Arm 2, n = 39 | 32 | 82.05 | 7 | 17.95 | |

[1]two-tailed Fisher's exact test

There were no patients in Arm 1 (patients receiving BCD-085 120 mg in Q2W/Q4W regimen), who lost PASI 100 response by the end of the extension study and 17.95% of patients lost the PAST 100 response in Arm 2 (patients receiving BCD-085 80 mg in Q2W/q4 regimen). Thus, the use of BCD-085 120 mg in Q4W regimen allowed maintaining high treatment response in more patients than the use of BCD-085 80 mg with the same dosing frequency.

Assessment of BCD-085 efficacy after 6 months of treatment (12 weeks of BCD-085-2ext study)

The Table 19 presents data on efficacy at Week 12 of the BCD-085-2ext study (i.e. after 6 months of inclusion into the previous BCD-085-2 study and start of study treatment) in ITT population t(n=103). A comparison was performed in two arms, depending on the dose of BCD-085 received during the first 12 weeks of the BCD-085-2ext study (80 mg or 12056 mg).

TABLE 19

Proportion of patients who achieved PASI 75 after 6 months of treatment (BCD-085-2ext Study)

| Therapy arm | Abs. number | % | P-value[1] |
|---|---|---|---|
| Proportion of patients who achieved PASI 75 at Week 12 (after 6 months of treatment) | | | |
| All patients, n = 103 | 92 | 89.32 | — |
| 80 mg arm, n = 76 | 75 | 98.68 | <0.0001 |
| 120 mg arm, n = 27 | 17 | 62.96 | |
| Proportion of patients who achieved PASI 90 at Week 12 (after 6 months of treatment) | | | |
| All patients, n = 103 | 63 | 61.17 | — |
| 80 mg arm, n = 76 | 56 | 73.68 | <0.0001 |
| 120 mg arm, n = 27 | 7 | 25.93 | |
| Proportion of patients who achieved PASI 100 at Week 12 (after 6 months of treatment) | | | |
| All patients, n = 103 | 45 | 43.69 | — |
| 80 mg arm, n = 76 | 39 | 51.32 | 0.0167 |
| 120 mg arm, n = 27 | 6 | 22.22 | |

[1]two-tailed Fisher's exact test.

The sPGA score 0-1 (clean or almost clean skin) was achieved by 87.38% after 6 months of therapy (Table 20).

TABLE 20

Proportion of patients who achieved sPGA score 0-1 after 6 months of treatment (BCD-085-2ext Study)

| Therapy arm | number | % | P-value[1] |
|---|---|---|---|
| Proportion of patients who achieved sPGA score 0-1 at Week 12 (after 6 months of treatment) | | | |
| All patients, n = 103 | 90 | 87.38 | — |
| 80 mg arm, n = 76 | 73 | 96.05 | <0.0001 |
| 120 mg arm, n = 27 | 17 | 62.96 | |

The data show that the proportion of patients with PAST 75/90/100 and sPGA score 0-1 after 12 weeks in the BCD-085-2ext study was significantly lower with BCD-085 120 mg. These differences are explained by the absence of the lowest response (PASI 50) in patients of the BCD-085 120 mg arm at inclusion in the BCD-085-2ext study, i.e. they had more severe state at baseline and developed treatment response slower.

Assessment of BCD-085 efficacy after one year of treatment

Figure 13:
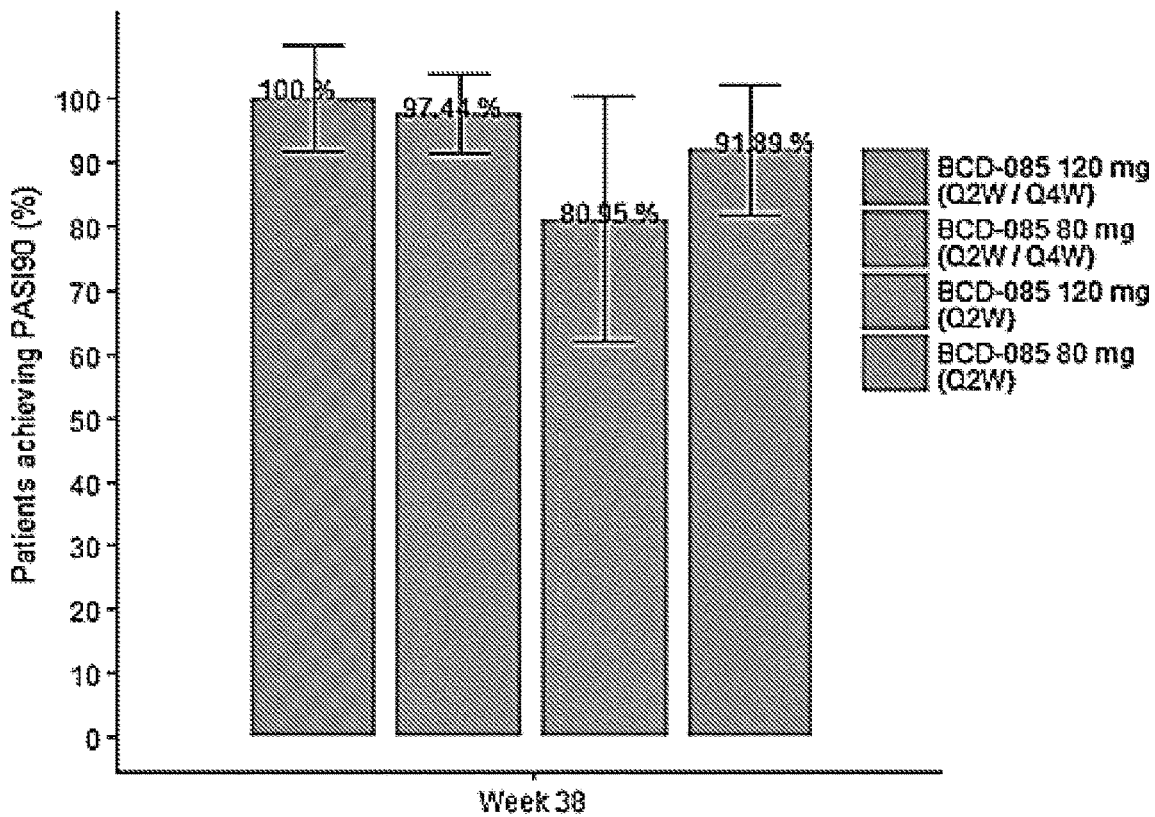
FIG. 13 is a graph illustrating the proportion of patients who achieved PASI 90 after 52 weeks of treatment (38 weeks of BCD-085-2ext study).
Figure 14:
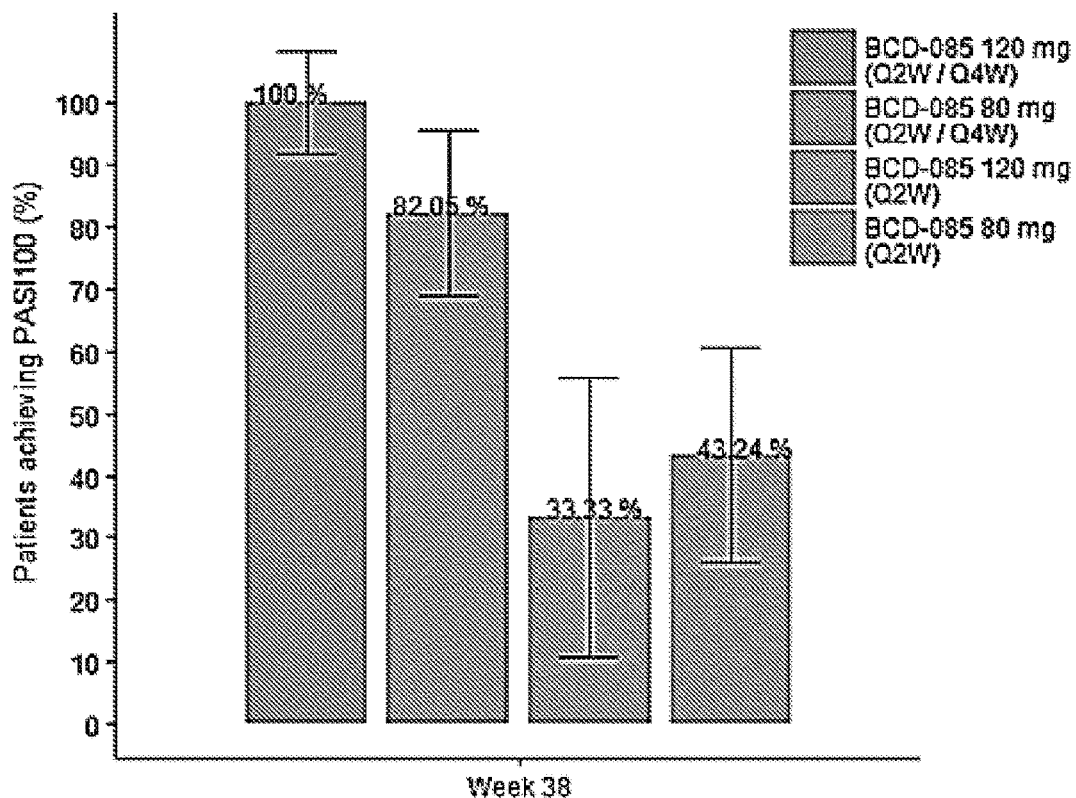
FIG. 14 is a graph illustrating the proportion of patients who achieved PASI 100 after 52 weeks of treatment (38 weeks of BCD-085-2ext study).

By the end of the extension study, PAST 90/100 was achieved by 92.23%/59.22% of patients in the ITT population (n=103), respectively (Table 21, FIG. 13, FIG. 14).

TABLE 21

Proportion of patients who achieved PASI 90 and PASI 100 after one year of treatment (38 weeks of BCD-085-2ext study)

| Therapy arm | number | % | P-value[1] |
|---|---|---|---|
| Proportion of patients who achieved PASI 90 at Week 38 (one year of treatment) | | | |
| All patients, n = 103 | 95 | 92.23 | — |
| Arm 1, n = 6 | 6 | 100 | 1.000[1] |
| Arm 2, n = 39 | 38 | 97.44 | |
| Arm 3, n = 21 | 17 | 80.95 | 0.241[1] |
| Arm 4, n = 37 | 34 | 91.89 | |
| Proportion of patients who achieved PASI 100 at Week 38 (one year of treatment) | | | |
| All patients, n = 103 | 61 | 59.22 | — |
| Arm 1, n = 6 | 6 | 100 | 0.5686[1] |
| Arm 2, n = 39 | 32 | 82.05 | |
| Arm 3, n = 21 | 7 | 33.33 | 0.6439[2] |
| Arm 4, n = 37 | 16 | 43.24 | |

[1]—two-tailed Fisher's exact test;
[2]Yates-corrected $\chi^2$ test

The highest response was shown in Arm 1, where all the subjects achieved PAST 90/100. No significant differences were found between the arms (Arms 1 and 2, Arms 3 and 4) in any parameter.

Figure 15:
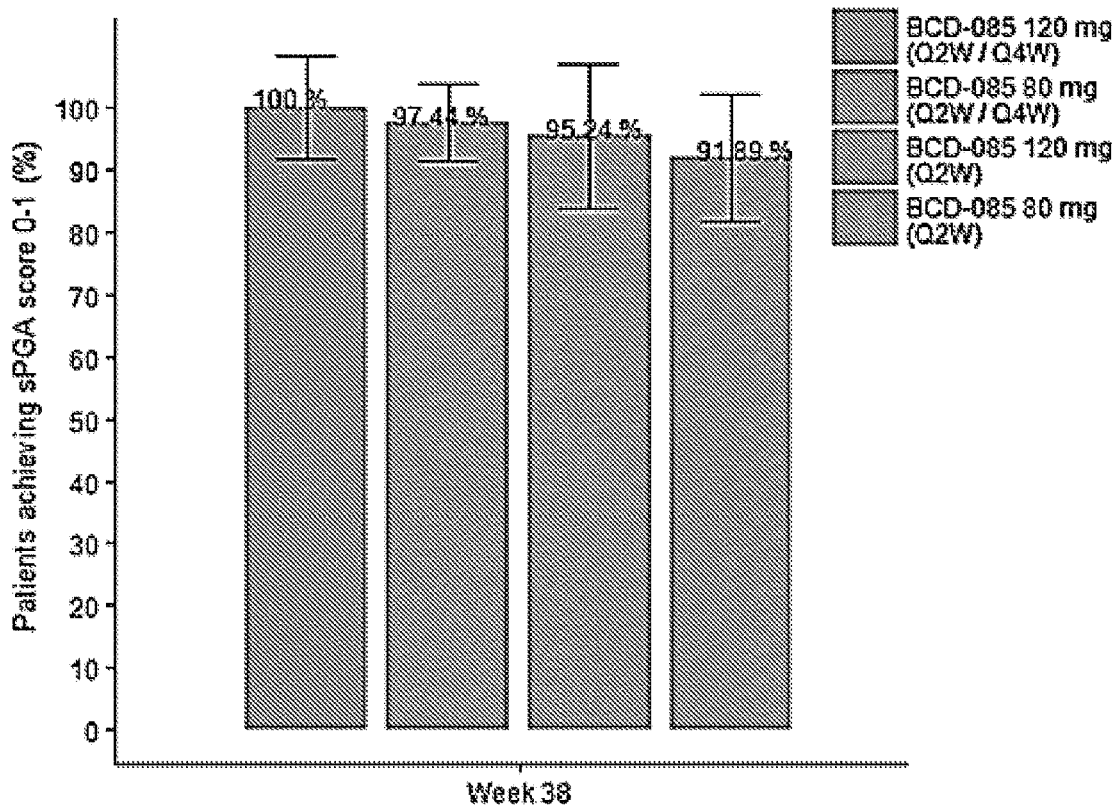
FIG. 15 is a graph illustrating the proportion of patients who achieved sPGA score 0-1 after 52 weeks of treatment (38 weeks of BCD-085-2ext study).
Figure 16:
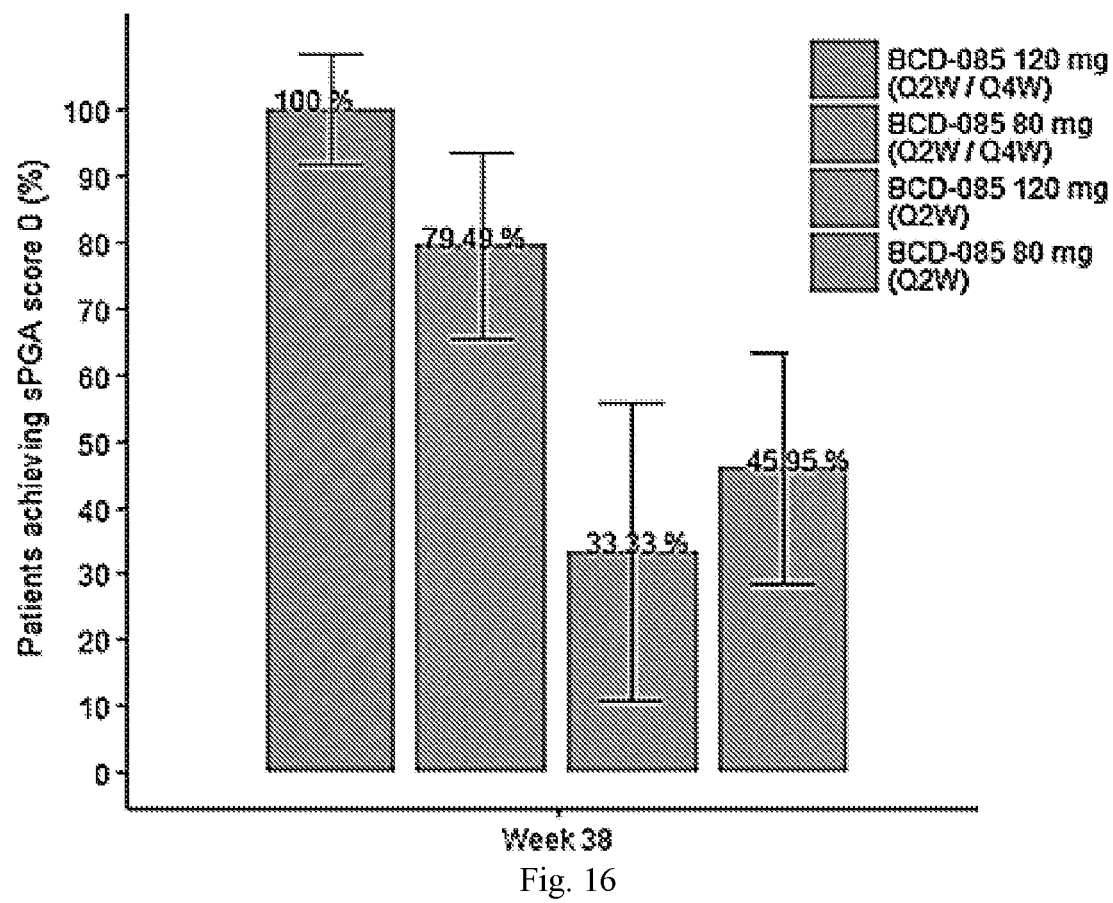
FIG. 16 is a graph illustrating the proportion of patients who achieved sPGA score 0 (clean skin) after 52 weeks of treatment (38 weeks of BCD-085-2ext study).

After one year of treatment sPGA score 0-1 was achieved by 95.15% of patients and sPGA score 0 (clean skin) was achieved by 59.22% of patients (Table 22, FIG. 15, FIG. 16).

TABLE 22

Proportion of patients who achieved sPGA score 0-1 and sPGA score 0 (clean skin) after 52 weeks of treatment (38 weeks of BCD-085-2ext study)

| Therapy arm | Abs. number | % | P-value[1] |
|---|---|---|---|
| Proportion of patients who achieved sPGA score 0-1 at Week 38 (52 weeks of treatment) | | | |
| All patients, n = 103 | 98 | 95.15 | — |
| Arm 1, n = 6 | 6 | 100 | 1.000 |
| Arm 2, n = 39 | 38 | 97.44 | |
| Arm 3, n = 21 | 20 | 95.24 | 1.000 |
| Arm 4, n = 37 | 34 | 91.89 | |
| Proportion of patients who achieved sPGA score 0 at Week 38 (52 weeks of treatment) | | | |
| All patients, n = 103 | 61 | 59.22 | — |
| Arm 1, n = 6 | 6 | 100.00 | 0.5719 |
| Arm 2, n = 39 | 31 | 79.49 | |
| Arm 3, n = 21 | 7 | 33.33 | 0.4135 |
| Arm 4, n = 37 | 17 | 45.95 | |

[1]two-tailed Fisher's exact test

The best results for sPGA assessment were seen in patients receiving BCD-085 120 mg in Q2W/Q4W regimen.

Safety

Safety analysis included the data from all patients who received at least one dose of BCD-085 (n=103, Table 23).

Regardless of the dose and dosing regimen, BCD-085 showed a favorable safety profile, which did not differ between the groups.

During the period studied, at least one AE/SAE was recorded in 36.89% of patients (38 out of 103): 33.33% of patients in Arm 1 (2 out of 6), 35.90% of patients in Arm 2 (14 out of 39), 38.10% of patients in Arm 3 (8 out of 21), and 37.84% of patients in Arm 4 (14 out of 37) (p=1.0000, exact Fisher's test).

AEs/SAEs related to the study therapy were recorded in 5.83% of patients (6/103): four patients in Arm 2 (10.26%), one patient in Arm 3 (4.76%), and one patient in Arm 4 (2.70%) (p=0.6542, two-sided exact Fisher's test).

During the study, two SAEs not related to the study therapy were recorded in one patient of Arm 2 (2.56%): left-sided obstructive pyelonephritis (kidney stone disease) and acute pancreatitis. In both cases, hospitalization was a seriousness criterion.

Grade 3/4 AEs not related to the study therapy were recorded in 4.85% of patients (5/103): one patient in Arm 1, two patients in Arms 2 and 4, and no patients in Arm 3.

Most common AEs were lymphocytosis, liver function tests increased indirect bilirubin increased, and blood pressure increased (Table 24).

The AEs were mostly mild or moderate (Grade 1/2, CTCAE 4.03).

TABLE 23

Summary of safety data (BCD-085-2ext Study)

| | All patients | | Arm 1 (n = 6) | | Arm 2 (n = 39) | | Arm 3 (n = 21) | | Arm 4 (n = 37) | |
|---|---|---|---|---|---|---|---|---|---|---|
| | n | % | n | % | n | % | n | % | n | % |
| Any AEs/SAEs | 38 | 36.89 | 2 | 33.33 | 14 | 35.90 | 8 | 38.10 | 14 | 37.84 |
| P-value[1] | | | | | | | 1.0000 | | | |
| Therapy-related AEs/SAEs | 6 | 5.83 | 0 | 0 | 4 | 10.26 | 1 | 4.76 | 1 | 2.70 |
| P-value[1] | | | | | | | 0.6542 | | | |
| Any SAEs | 1 | 0.97 | 0 | 0 | 1 | 2.56 | 0 | 0 | 0 | 0 |
| P-value[1] | | | | | | | 1.0000 | | | |
| Therapy-related SAEs | | | | | None | | | | | |
| AEs, Grade 3/4 | 5 | 4.85 | 1 | 16.67 | 2 | 5.13 | 0 | 0 | 2 | 5.41 |
| P-value[1] | | | | | | | 0.3528 | | | |
| Therapy-related AEs, Grade 3/4 | 5 | 4.85 | 1 | 16.67 | 2 | 5.13 | 0 | 0 | 2 | 5.41 |
| P-value[1] | | | | | | | 1.0000 | | | |
| Local reactions | | | | | None | | | | | |
| Therapy discontinuation due to AE/SAE | | | | | None | | | | | |

Note:
[1]two-tailed exact Fisher's test.

TABLE 24

The most frequent AEs (more that 1 case per arm) (BCD-085-2ext Study)

| Deviation | Arm 1 (n = 6) | | Arm 2 (n = 39) | | Arm 3 (n = 21) | | Arm 4 (n = 37) | | P-value[1] |
|---|---|---|---|---|---|---|---|---|---|
| | n | % | n | % | n | % | N | % | |
| Blood and lymphatic system disorders | | | | | | | | | |
| Lymphocytosis (Grade 2) | 0 | 0.00 | 2 | 5.13 | 0 | 0.00 | 1 | 2.70 | 0.8287 |
| Hepatobiliary disorders | | | | | | | | | |
| ALT increased (total) | 0 | 0.00 | 0 | 0.00 | 0 | 0.00 | 5 | 13.51 | 0.0434 |
| Grade 1 | 0 | 0.00 | 0 | 0.00 | 0 | 0.00 | 4 | 10.81 | 0.1018 |
| Grade 2 | 0 | 0.00 | 0 | 0.00 | 0 | 0.00 | 1 | 2.70 | 0.6214 |
| AST increased | 0 | 0.00 | 0 | 0.00 | 2 | 9.52 | 1 | 2.70 | 0.2127 |

TABLE 24-continued

The most frequent AEs (more that 1 case per arm) (BCD-085-2ext Study)

| Deviation | Arm 1 (n = 6) n | % | Arm 2 (n = 39) n | % | Arm 3 (n = 21) n | % | Arm 4 (n = 37) N | % | P-value[1] |
|---|---|---|---|---|---|---|---|---|---|
| (Grade 1) | | | | | | | | | |
| GGT increased (total) | 0 | 0.00 | 4 | 10.26 | 1 | 4.76 | 2 | 5.41 | 0.7992 |
| Grade 1 | 0 | 0.00 | 1 | 2.56 | 0 | 0.00 | 1 | 2.70 | 1.0000 |
| Grade 2 | 0 | 0.00 | 2 | 5.13 | 1 | 4.76 | 1 | 2.70 | 1.0000 |
| Grade 3 | 0 | 0.00 | 1 | 2.56 | 0 | 0.00 | 0 | 0.00 | 1.0000 |

TABLE 24-continued

The most frequent AEs (more that 1 case per arm) (BCD-085-2ext Study)

| Deviation | Arm 1 (n = 6) n | % | Arm 2 (n = 39) n | % | Arm 3 (n = 21) n | % | Arm 4 (n = 37) N | % | P-value[1] |
|---|---|---|---|---|---|---|---|---|---|
| Indirect bilirubin increased (Grade 2) | 0 | 0.00 | 2 | 5.13 | 0 | 0.00 | 0 | 0.00 | 0.4215 |
| Cardiac and vascular disorders | | | | | | | | | |
| BP increased (total) | 0 | 0.00 | 0 | 0.00 | 2 | 9.52 | 3 | 8.11 | 0.1613 |
| Grade 2 | 0 | 0.00 | 0 | 0.00 | 2 | 9.52 | 1 | 2.70 | 0.2127 |
| Grade 3 | 0 | 0.00 | 0 | 0.00 | 0 | 0.00 | 2 | 5.41 | 0.2804 |

Note:
[1] exact Fisher's test.

Grade 3 adverse events, except for 2 cases of increased blood pressure (Arm 4: 5.41%), were recorded as single events: increased diastolic BP in 1 patient from Arm 2 (2.56%), increased GGT in 1 patient in Arm 2 (2.56%); deforming osteoarthritis of the right knee and two-sided gonarthrosis (psoriatic arthropathy, pain syndrome) in 1 patient from Arm 1 (16.67%).

No cases of therapy discontinuation due to AEs or SAEs were recorded.

No local reactions related to the administration of the study drug were recorded.

During the study period, there were no cases of inflammatory bowel disease or candidiasis with long-term use of BCD-085. To assess the risk of increasing AE rate during long-term use of BCD-085, exposure-adjusted AEs incidence rate (EAIR) was assessed during BCD-085-2ext study (42 weeks) and compared with that during the BCD-085-2 study (14 weeks). Data of patients who were receiving BCD-085 80 mg and 120 mg were considered (Table 25).

TABLE 25 exposure-adjusted AEs incidence rate in BCD-085-2ext vs BCD-085-2 study (BCD-085-2ext Study)

| | Dose, mg | | | | | | | |
|---|---|---|---|---|---|---|---|---|
| | BCD-085-2 | | | | BCD-085-2ext | | | |
| | 80 | | 120 | | 80 | | 120 | |
| Parameter | Number of cases during the period studied, n | EAIR | Number of cases during the period studied, n | EAIR | Number of cases during the period studied, n | EAIR | Number of cases during the period studied, n | EAIR |
| AE/SAE | 11 | 1.2571 | 7 | 0.8571 | 28 | 0.4211 | 10 | 0.4233 |
| Related AE/SAE | 3 | 0.3429 | 2 | 0.2449 | 4 | 0.0602 | 1 | 0.0423 |
| Grade 3-4 AE | 1 | 0.1143 | 1 | 0.1224 | 2 | 0.0301 | 2 | 0.0847 |
| Grade 3-4 AE related to the study therapy | 1 | 0.1143 | 0 | 0.0000 | 0 | 0.0000 | 0 | 0 |

The exposition-adjusted AE/SAE rate was 1.2571 and 0.8571 AE per 1 patient-year for BCD-085 80 mg and 120 mg, respectively, during the BCD-085-2 study and 0.4211 and 0.4233 AE per 1 patient-year for BCD-085 80 mg and 120 mg, respectively, during the BCD-085-2ext study. Thus, the occurrence rate of AE/SAE did not increase during the extension study. The results justify a possibility of long-term use of BCD-085 80 mg and 120 mg without risks of increasing the rate of adverse effects.

Immunogenicity

The immunogenicity analysis included data from 101 patients, who received at least one-dose of BCD-085 starting from Week 0 of the present study and did not have missed/lost/spoiled serum samples taken on any day of Week 42 of BCD-085-2ext, study.

The immunogenicity analysis did not reveal binding antibodies after 42 weeks of the BCD-085-2ext study (i.e. 56 weeks from the beginning of the BCD-085-2 study).

Conclusion

A high efficacy of BCD-085 during long-term use was shown: 98.06% of patients achieved meaningful clinical improvement in psoriasis course regardless of the dose and dosing regimen of BCD-085.

The highest efficacy was recorded in patients who were receiving BCD-085 120 mg in Q2W/Q4W regimen: by the end of the BCD-085-2ext study, 100% of these patients achieved PAST 100 and sPGA score 0-1.

In the population of patients who were receiving BCD-085 for 1 year (during the previous study BCD-085-2 and the current study BCD-085-2ext), PAST 75 was lost only in 2.6% of subjects. Cases of loss of PAST 90/100 were seen more often in the arms receiving BCD-085 80 mg, thus showing that this dose was not effective enough.

Among patients who were switched from Q2W to Q4W use of BCD-085 (Q2W/Q4W regimen) the best result was shown for BCD-085 120 mg, neither subject lost PASI 100 response.

Thus, the overall analysis demonstrated high efficacy of long-term use of BCD-085 in patients with moderate to severe plaque psoriasis who failed to respond to previous standard therapy. It was demonstrated that BCD-085 can be used less often (once a month) after 6 months of treatment if administered at the dose of 120 mg.

Example 6. Use of Netakimab in Standard and Low Frequent Regimens in Patients with Moderate to Severe Plaque Psoriasis (BCD-085-7 Study)

Study Design

BCD-085-7 is an ongoing multicenter double-blind placebo-controlled Phase III study in patients with moderate-to-severe plaque psoriasis. Study objective is to evaluate the efficacy and safety of BCD-085 given once every four weeks (Q4W regimen) in comparison with BCD-085 given once every 2 weeks (Q2W regimen).

Study BCD-085-7 uses the 60 mg/1 ml formulation for BCD-085 in pre-filled syringes. The route of administration is SC injections with 2 pre-filled syringes (2 SC injections, given within 15 min). The study is ongoing and has results of the first 12 weeks.

Patient Population and Study Design

The includes 213 patients with moderate-to-severe plaque psoriasis (PASI>10, BSA≥10 and sPGA≥3) aged 18 and older, who met other eligibility criteria. The study doesn't include patients previously treated with monoclonal antibodies targeting IL17 (or IL17 receptor) and patients previously treated with 2 or more medicines containing monoclonal antibodies or their fragments. After screening examination patients were randomized in 2:2:1 ratio into 3 arms: 1) BCD-085 Q2W arm, 2) BCD-085 Q4W arm and 3) placebo arm. Patients received BCD-085/placebo in the blinded manner for 12 weeks. Arm 1 received BCD-085 120 mg at weeks 0, 1, 2, then at weeks 4, 6, 8, 10. Arm 2 received BCD-085 120 mg at weeks 0, 1, 2, then at weeks 6, 10 (for blinding purpose patients received placebo at weeks 4 and 8). Patients from Arm 3 received placebo at weeks 0, 1, 2, 4, 6, 8, 10. On Week 12, the primary endpoint was assessed with a PASI 75, and the therapies was unblinded.

Figure 17:
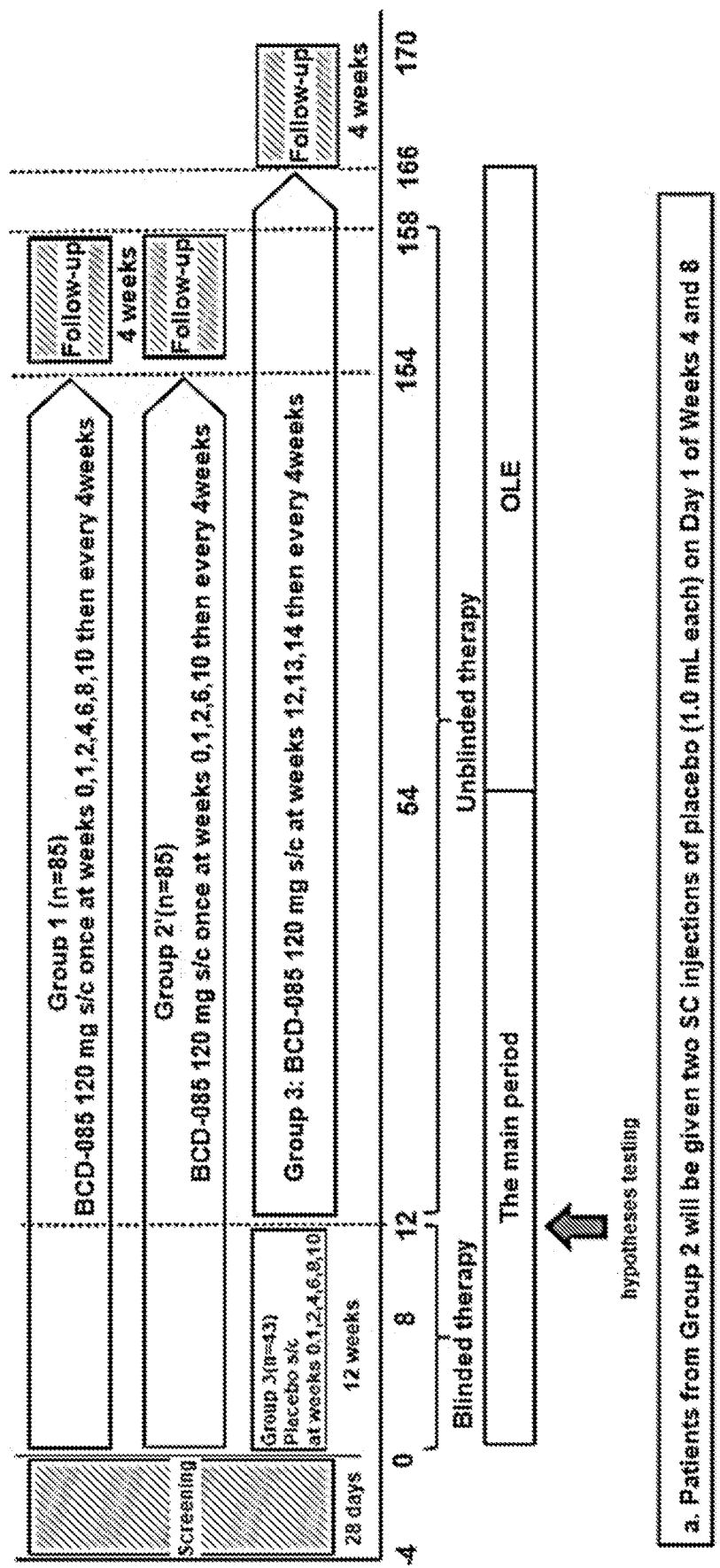
FIG. 17 is a graph illustrating the study design (BCD-085-7 study).
Figure 18:
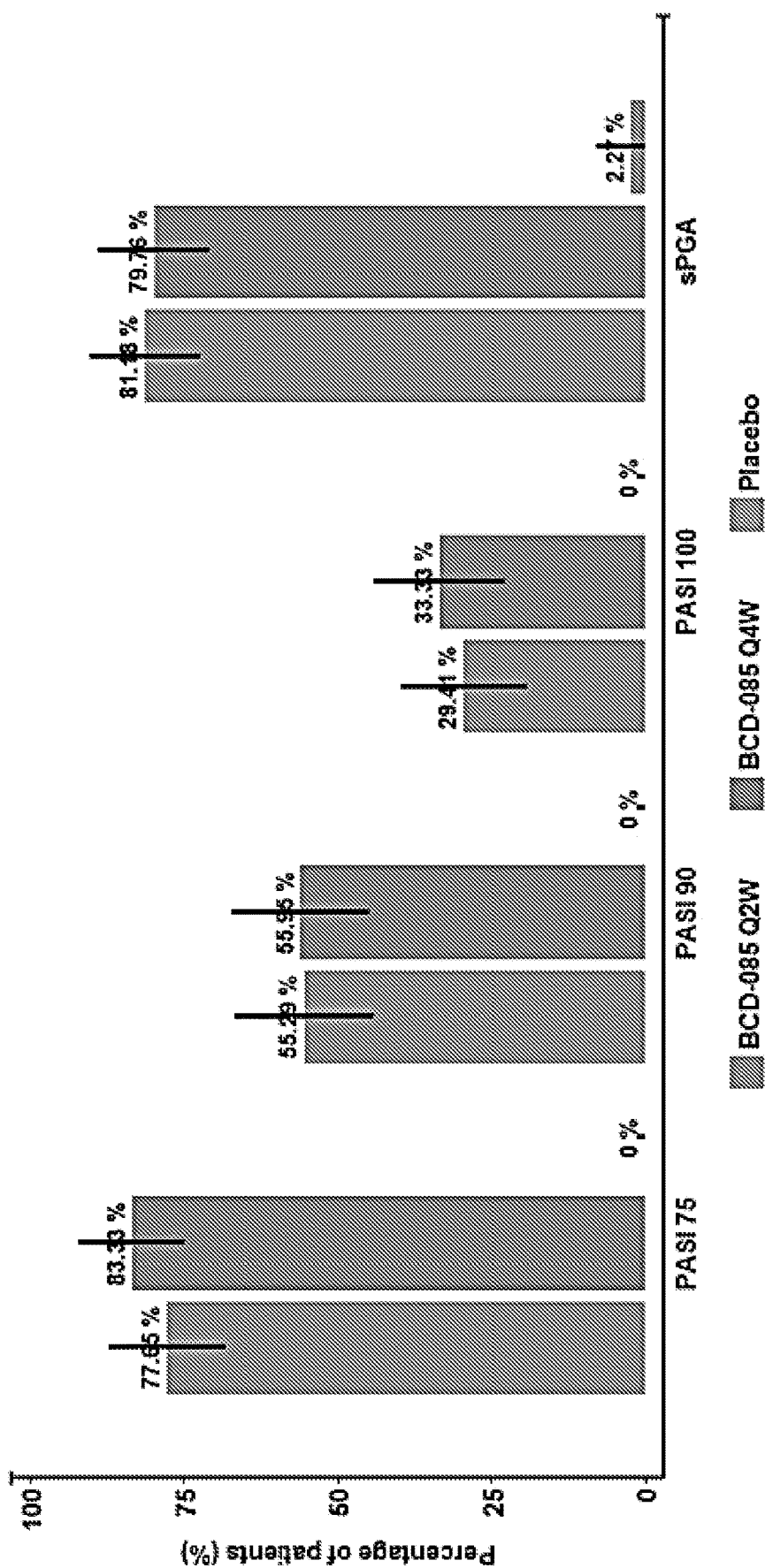
FIG. 18 is a graph illustrating the assessment of the PASI 75/90/100 and sPGA 0-1 (ITT population, n=213), (BCD-085-7 study).
Figure 19:
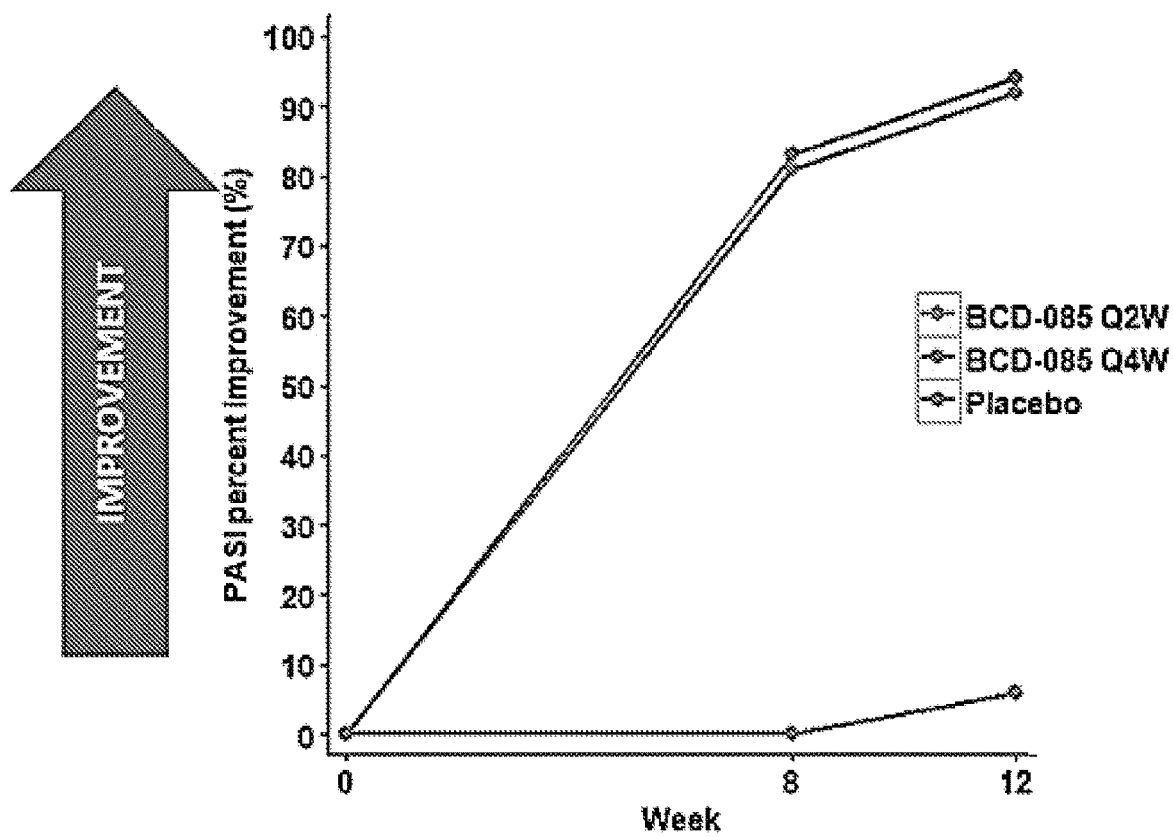
FIG. 19 is a graph illustrating the relative change in PASI at. Weeks 8 and 12 (Visits 6 and 8) in ITT population (n=213) (BCD-085-7 study).
Figure 20:
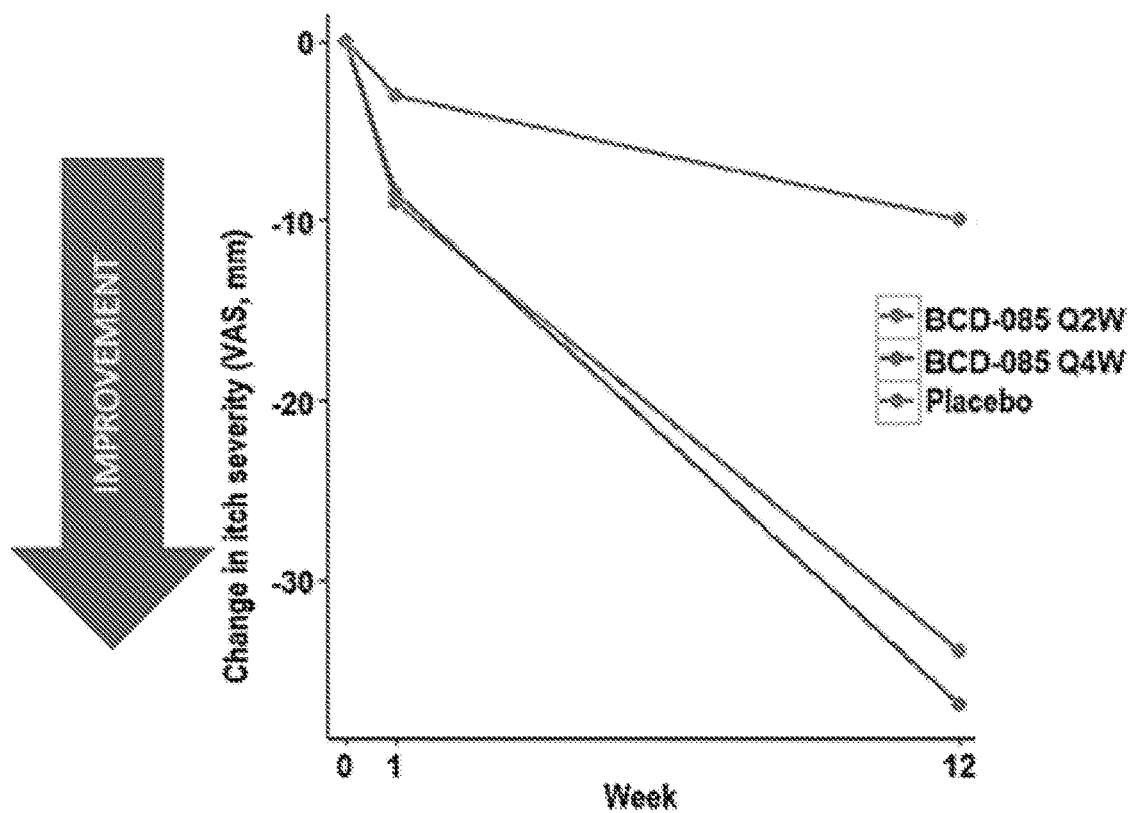
FIG. 20 is a graph illustrating the mean change from baseline in itch severity (VAS) at Weeks 1 and 12 (Visits 2 and 8) in ITT population (n=213) (BCD-085-7 study).
Figure 21:
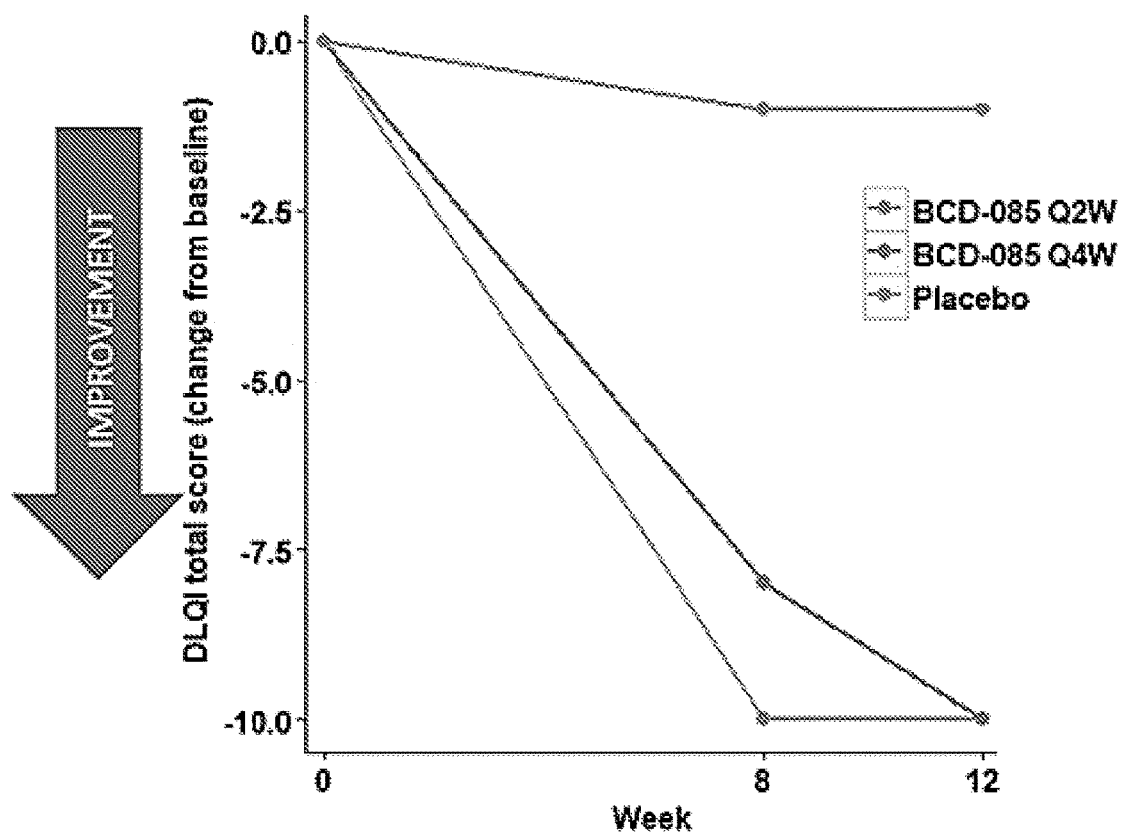
FIG. 21 is a graph illustrating the mean change in DLQI score at Weeks 8 and 12 (Visits 6 and 8) in ITT population (n=213) (BCD-085-7 study).
Figure 22:
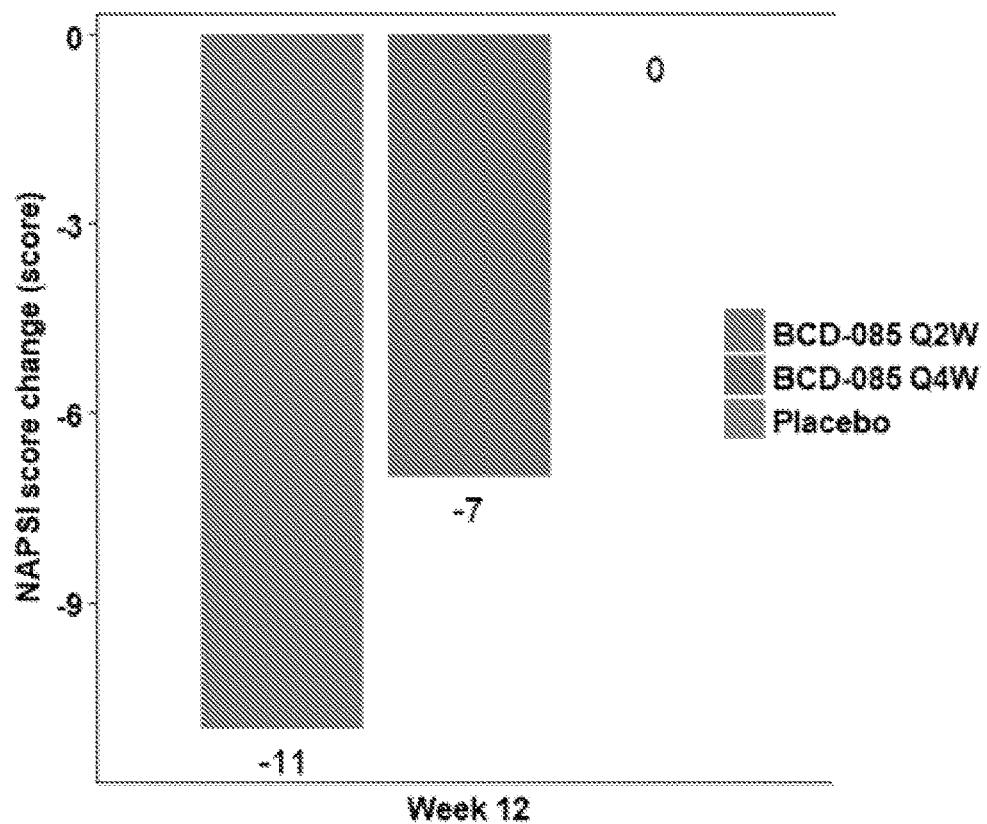
FIG. 22 is a graph illustrating the mean change from baseline in NAPSI score at Week 12 (N=131) (the figure shows median value) (BCD-085-7 study).

From week 14 all patients from Arm 1 and 2 will receive BCD-085 in Q4W regimen up to week 50. All patients from Arm 3 (placebo) will receive BCD-085 at weeks 12, 13, 14 and then every 4 weeks starting from week 14 to week 50. From week 54 only responders (who achieved PASI75 and more at week 52) will continue the extension study period in Q4W regimen starting from week 54. Patients from Arms 1 and 2 will receive BCD-085 up to week 154 and patients from Arm 3 will receive BCD-085 up to week 166. The follow-up period for all patients is 4 weeks (FIG. 17).

The primary endpoint is the proportion of patients in each study arm who achieved PASI 75 at Week 12 of the study. Secondary endpoints include assessment of sPGA 0-1, PASI 90 and PASI 100, percent improvement in PASI and NAPSI scores, change in itching assessment by VAS (mm), assessment of dermatologic QoL (DLQI). The BCD-085-7 study includes the assessment of psoriatic arthritis (PsA) by evaluation of ACR20/50/70 response (among patients with active PsA at baseline). The efficacy endpoints are evaluated at weeks 0, 8, 12, 24, 42 and 52 of the study in the main period and at weeks 62, 74, 86, 98, 110, 122, 134, 146 and 154 of treatment with BCD-085 in the OLE period. Safety endpoints include rates of adverse events (AE), SAE, 3-4 grade AE according to CTCAE 4.03, rates of early study discontinuation due to AE. Immunogenicity parameters include incidence of binding and neutralizing antibodies to BCD-085 at weeks 0, 12, 24 and 54 of the study in the main period and at weeks 86, 98, 110, 134, 154 of treatment with BCD-085 in the OLE period.

The BCD-085-7 study was based on sequential hypotheses testing:
BCD-085 in either regimen has superior efficacy over the placebo; margin (5) 0 (0%), type-I-error 0.025, type-II-error 80%;
BCD-085 in Q4W regimen has non-inferior efficacy when compared with Q2W regimen; margin (δ) −0,2038 (−20,38%), type-I-error 0.05 (two-sided significance level), type-II-error 80%.

Verification of the Superiority Hypothesis

The statistical hypothesis stating the superior efficacy of BCD-085 over placebo was sequentially checked by comparing the lower bound of the 95% confidence interval for the difference in the proportion of patients with PASI 75 by Week 12 in BCD-085 Q2W and placebo arm, then—in BCD-085 Q4W arm and placebo arm, with the pre-specified superiority margin (5, 0%).

Results

The efficacy was evaluated in 2 populations of patients: ITT using NRI method (n=213) and PP population (n=210). Two patients have discontinued the study early due to IC recall and one patient was lost to follow up before week 12.

Demographics and baseline characteristics did not differ between groups (Table 26, Table 27).

TABLE 26

Demographic and baseline characteristics of patients (BCD-085-7 Study)

| Parameter | BCD-085 Q2W (n = 85) | BCD-085 Q4W (n = 84) | Placebo (n = 44) | P value |
|---|---|---|---|---|
| Age (years), median [IQR] | 42 [35-49] | 41.5 [32-53] | 39 [33-53] | 0.9344[1] |
| Body mass (kg), median [IQR] | 87.3 [75-96.1] | 89.5 [78-98] | 83.5 [70-95] | 0.3078[1] |
| Height (sm), median [IQR] | 178 [170-184] | 176 [168-182] | 175.5 [168-180] | 0.6110[2] |

TABLE 26-continued

Demographic and baseline characteristics of patients (BCD-085-7 Study)

| Parameter | BCD-085 Q2W (n = 85) | BCD-085 Q4W (n = 84) | Placebo (n = 44) | P value |
|---|---|---|---|---|
| BMI (kg/m$^2$), median [IQR] | 27.9 [24.5-31.5] | 28.5 [25.5-32.5] | 27.1 [24.2-30.0] | 0.3958[1] |
| Females (%) | 22 (22.58) | 26 (30.95) | 9 (20.45) | 0.4319[3] |
| Males (%) | 63 (74.12) | 58 (69.05) | 35 (79.55) | |
| childbearing potential in women (%) | 13 (59.09) | 18 (69.23) | 4 (44.44) | 0.4114[4] |
| Duration of the disease (months), median [IQR] | 120 [36-204] | 111 [36-183] | 100 [34-193] | 0.8727[1] |
| BSA, % | 20 [13-42] | 22 [14.5-43] | 22.5 [13-44] | 0.9136[1] |
| PASI score | 18.4 [14.2-27] | 17.9 [15.1-28.6] | 19.7 [16.3-29.4] | 0.3469[1] |
| NAPSI score | 7 [0-29] | 14 [2-28] | 14 [0-37] | 0.5001[1] |
| sPGA score | 3 [3-4] | 4 [3-4] | 4 [3-4] | 0.1210[1] |
| Itch assessment by VAS, mm | 47 [27-67] | 48 [27-71] | 45.5 [23-70] | 0.961[1] |
| Beck's Depression Inventory, score | 6 [2-9] | 6 [2-11] | 6.5 [2-10] | 0.7388[1] |
| DLQI score | 13 [10-20] | 13 [9-18] | 15 [9-20] | 0.7450[2] |
| Psoriatic arthritis in anamnesis, n (%) | 6 (7.06) | 10 (11.9) | 2 (4.55) | 0.3478[4] |
| Psoriatic arthritis at screening visit, n (%) | 6 (7.06) | 7 (8.33) | 2 (4.55) | 0.7883[4] |

[1]—Kruskal-Wallis test,
[2]—analysis of variance,
[3]—Yates-corrected Pierson's $\chi^2$ test,
[4]—exact Fisher's test

TABLE 27

Previous treatment of psoriasis (BCD-085-7 Study)

| Type of previous treatment | BCD-085 Q2W (n = 85) | | BCD-085 Q4W (n = 84) | | Placebo (n = 44) | | P value |
|---|---|---|---|---|---|---|---|
| | N | % | n | % | n | % | |
| Monoclonal antibodies and janus kinase inhibitors | 5 | 5.88 | 6 | 7.14 | 1 | 2.27 | 0.6389[2] |
| Adalimumab | 3 | 3.53 | 2 | 2.38 | 1 | 2.27 | 1.0000[2] |
| Infliximab | 0 | 0.00 | 1 | 1.19 | 0 | 0.00 | 0.6009[2] |
| Ustekinumab | 0 | 0.00 | 2 | 2.38 | 0 | 0.00 | 0.1963[2] |
| Guselkumab | 1 | 1.18 | 0 | 0.00 | 0 | 0.00 | 1.0000[2] |
| Tofacitinib | 1 | 1.18 | 1 | 1.19 | 0 | 0.00 | 1.0000[2] |
| GCS | 23 | 27.06 | 32 | 38.10 | 16 | 36.36 | 0.2802[1] |
| Systemic use | 10 | 11.76 | 8 | 9.52 | 5 | 11.36 | 0.8820[2] |
| Topical use | 15 | 17.65 | 22 | 26.19 | 12 | 27.27 | 0.3149[1] |
| Other systemic therapies | 22 | 25.88 | 29 | 34.52 | 21 | 47.73 | 0.0447[1] |
| Methotrexate | 17 | 20.00 | 24 | 28.57 | 19 | 43.18 | 0.0212[1] |
| Cyclosporin A | 4 | 4.71 | 3 | 3.57 | 1 | 2.27 | 0.9032[2] |
| Apremilast | 1 | 1.18 | 0 | 0.00 | 0 | 0.00 | 1.0000[2] |
| Acitretin | 1 | 1.18 | 3 | 3.57 | 0 | 0.00 | 0.4366[2] |
| Phototherapy | 47 | 55.29 | 50 | 59.52 | 30 | 68.18 | 0.3677[1] |

Note:
[1]Yates-corrected Pierson's $\chi^2$ test;
[2]two-sided exact Fisher's test.

Efficacy Results (the First 12 Weeks)

The difference in PASI 75 response rates at Week 12 was 77.65% (BCD-085 Q2W and placebo) with 95% CI [67.07%; 88.23%](P<0.0001, Fisher's exact test) and 83.33% (BCD-085 Q4W and placebo) with 95% CI [73.63%; 93.03%](P<0.0001, Fisher's exact test). The results show that lower bounds of 95% CI for BCD-085 Q4W and BCD-085 Q2W arms (73.63% and 67.07%, respectively) exceed the superiority margin (0%). Thus, both BCD-085 regimens in patients with moderate to severe plaque psoriasis were superior in efficacy over placebo.

According to statistical methods used to assess efficacy, the study hypothesis of non-inferior efficacy of BCD-085 once every 4 weeks vs. BCD-085 once every 2 weeks was tested comparing the lower bound of the 95% confidence interval for the difference in proportions of patients with PASI 75 at Week 12 between the BCD-085 Q4W and BCD-085 Q2W with the pre-specified non-inferiority margin (δ) equal to −20.38%.

Difference in the proportion of patients with PASI 75 at Week 12 between BCD-085 Q4W and BCD-085 Q2W arms was 5.68% with 95% CI [−7.41%; 18.78%](P=0.4603, Yates-corrected Pierson's $X^2$ test). The lower bound of the 95% CI (−7.41%) is within the pre-specified margin of −20.38%. This shows that the efficacy of BCD-085 every 4 weeks was non-inferior to that of BCD-085 every 2 weeks (Table 28).

TABLE 2

Assessment of the primary endpoint (PASI75 at week 12) with 95% CI (ITT population, n = 213) (BCD-085-7 study)

| group | PASI75 at week 12, n = 213 | | P value | 95% CI (%) |
|---|---|---|---|---|
| | N | % | | |
| BCD-085 Q2W (85) | 66 | 77.65 | 0.46031 | [−7.41; 18.78][1] |
| BCD-085 Q4W (84) | 70 | 83.33 | | |
| Placebo (44) | 0 | 0 | <0.0001[2] | [7.07; 88.23][2] |
| | | | <0.0001[3] | [73.63; 93.03][3] |

[1]Q4W (Pearson's chi-square test with Yates correction),
[2]BCD-085 Q2W vs Placebo (exact Fisher test),
[3]BCD-085 Q4W vs Placebo (exact Fisher test)

The comparison of secondary efficacy endpoints (proportion of patients who achieved PASI 75, PASI 90, PASI 100, sPGA 0-1, relative change in PASI score, change in itch severity according to VAS, change in NAPSI score, change in quality of life according to DLQI, ACR 20/50/70 in patients with psoriatic arthritis) confirmed the results obtained after the assessment of the primary endpoint (Table 29, FIG. 18, FIG. 19, FIG. 20, FIG. 21, FIG. 22, FIG. 23).

TABLE 29

Efficacy of BCD-085 in BCD-085-7 study at weeks 8 and 12 (ITT population, n = 213)

| Endpoint | Group | Week 8 | | Week 12 | |
|---|---|---|---|---|---|
| PASI75 | BCD-085 Q2W (85) | 50 | 58.82 | 66 | 77.65 |
| | BCD-085 Q4W (84) | 50 | 59.52 | 70 | 83.33 |
| | Placebo (44) | 0 | 0 | 0 | 0 |
| | p value | | 1.0000[1] | | 0.4603[1] |
| | | | <0.0001[2] | | <0.0001[2] |
| | | | <0.0001[3] | | <0.0001[3] |
| PASI90 | BCD-085 Q2W (85) | 31 | 36.47 | 47 | 55.29 |
| | BCD-085 Q4W (84) | 33 | 39.29 | 47 | 55.95 |
| | Placebo (44) | 0 | 0 | 0 | 0 |
| | p value | | 0.8269[1] | | 1.0000[1] |
| | | | <0.0001[2] | | <0.0001[2] |
| | | | <0.0001[3] | | <0.0001[3] |
| PASI100 | BCD-085 Q2W (85) | 16 | 18.82 | 25 | 29.41 |
| | BCD-085 Q4W (84) | 16 | 19.05 | 28 | 33.33 |
| | Placebo (44) | 0 | 0 | 0 | 0 |
| | p value | | 1.0000[1] | | 0.7013[1] |
| | | | 0.0012[2] | | <0.0001[2] |
| | | | 0.0012[3] | | <0.0001[3] |

TABLE 29-continued

Efficacy of BCD-085 in BCD-085-7 study at weeks 8 and 12 (ITT population, n = 213)

| Endpoint | Group | Week 8 | | Week 12 | |
|---|---|---|---|---|---|
| SPGA 0-1 | BCD-085 Q2W (85) | 48 | 56.47 | 69 | 81.18 |
| | BCD-085 Q4W (84) | 51 | 60.71 | 67 | 79.76 |
| | Placebo (44) | 1 | 2.27 | 1 | 2.27 |
| | p value | | 0.6864[1] | | 0.9698[1] |
| | | | <0.0001[2] | | <0.0001[2] |
| | | | <0.0001[3] | | <0.0001[3] |

[1]BCD-085 Q2W vs BCD-085 Q4W (Pearson's chi-square test with Yates correction),
[2]BCD-085 Q2W vs Placebo (exact Fisher test),
[3]BCD-085 Q4W vs Placebo (exact Fisher test)

Safety Results (the First 12 Weeks)

The use of BCD-085 during 12 weeks of the study was characterized by good tolerability and demonstrated a favorable safety profile (Table 30). During the study, there were no cases of early withdrawal due to the safety reasons. Local reaction was detected in one patient (2.27%) in the Placebo group (redness at the site of injection). There were no cases of unexpected toxicity.

One therapy-related SAE (pneumonia) with grade 3 according to CTCAE 4.03 was registered in BCD-085 Q4W group. Neutropenia grade 3 was observed in 1 patient from group BCD-085 Q2W and elevated creatinine level was observed in 1 patient in placebo group. Other AEs were mild or moderate. There were no statistically significant differences between groups in the frequency of registration of AEs (Table 31).

TABLE 3

Assessment of safety outcomes after 12 weeks of treatment (BCD-085-7 study)

| Parameter | BCD-085 Q2W (n = 85) | | BCD-085 Q4W (n = 84) | | Placebo (n = 44) | | p-value |
|---|---|---|---|---|---|---|---|
| | n | % | n | % | n | % | |
| The proportion of patients who develop AEs | 15 | 17.65 | 14 | 16.67 | 8 | 18.18 | 0.9735[1] |
| The proportion of patients who develop SAEs | 0 | 0.00 | 1 | 1.19 | 0 | 0.00 | 0.60092[2] |
| The proportion of patients who develop grade 3-4 AEs | 1 | 1.18 | 1 | 1.19 | 1 | 2.27 | 1.0000[2] |
| The proportion of patients who develop injection site reactions | 0 | 0.00 | 0 | 0.00 | 1 | 2.27 | 0.2066[2] |
| The proportion of patients who discontinued the study due to AEs/SAEs | 0 | 0.00 | 0 | 0.00 | 0 | 0.00 | 1.0000[2] |

[1]—$X^2$ Pearson with Yates correction,
[2]—Fisher exact test

TABLE 31

Safety profile after 12 weeks of treatment (BCD-085-7 study)

| Adverse event | BCD-085 Q2W (n = 85) % | | BCD-085 Q4W (n = 84) | | Placebo (n = 44) | | P-value |
|---|---|---|---|---|---|---|---|
| | % | % | N | % | N | % | |
| Cardiovascular diseases | | | | | | | |
| Increased blood pressure (2 gr) | 0 | 0.00% | 1 | 1.19% | 0 | 0.00% | 0.60[1] |
| Increased systolic blood pressure (2 gr) | 1 | 1.18% | 0 | 0.00% | 0 | 0.00% | 1.00[1] |
| Increased diastolic blood pressure (2 gr) | 0 | 0.00% | 1 | 1.19% | 0 | 0.00% | 0.60[1] |
| Signs of focal myocardial ischemia on an ECG (lgr) | 1 | 1.18% | 0 | 0.00% | 0 | 0.00% | 1.00[1] |
| Infectious diseases | | | | | | | |
| Upper espiratory tract infection (2 gr) | 0 | 0.00% | 0 | 0.00% | 1 | 2.27% | 0.21[1] |
| Upper respiratory tract infection (2 gr) | 0 | 0.00% | 0 | 0.00% | 1 | 2.27% | 0.21[1] |
| Follicular tonsillitis (2 gr) | 1 | 1.18% | 0 | 0.00% | 0 | 0.00% | 1.00[1] |
| Pneumonia (3 gr) | 0 | 0.00% | 1 | 1.19% | 0 | 0.00% | 0.60[1] |
| Urinary tract infection (2 gr) | 1 | 1.18% | 0 | 0.00% | 0 | 0.00% | 1.00[1] |
| Diseases of the skin and subcutaneous tissue | | | | | | | |
| Erythema (1 gr) | 0 | 0.00% | 0 | 0.00% | 1 | 2.27% | 0.21[1] |
| Eczema (2 gr) | 1 | 1.18% | 0 | 0.00% | 0 | 0.00% | 1.00[1] |
| General reactions and reactions to the injection | | | | | | | |
| Injection-related reaction: dizziness (1 gr) | 1 | 1.18% | 1 | 1.19% | 0 | 0.00% | 1.00[1] |
| Abdominal pain (2 gr) | 0 | 0.00% | 1 | 1.19% | 0 | 0.00% | 0.60[1] |
| Laboratory deviations | | | | | | | |
| Hyperhemoglobinemia (2 gr) | 1 | 1.18% | 0 | 0.00% | 0 | 0.00% | 1.00[1] |
| Thrombocytopenia (1 gr) | 0 | 0.00% | 1 | 1.19% | 0 | 0.00% | 0.60[1] |
| Leukopenia (total) | 1 | 1.18% | 2 | 2.38% | 0 | 0.00% | 0.61[1] |
| 1 gr | 0 | 0.00% | 1 | 1.19% | 0 | 0.00% | 0.60[1] |
| 2 gr | 1 | 1.18% | 1 | 1.19% | 0 | 0.00% | 1.00[1] |
| Neutropenia (total) | 3 | 3.53% | 1 | 1.19% | 0 | 0.00% | 0.54[1] |
| 2 gr | 2 | 2.35% | 1 | 1.19% | 0 | 0.00% | 0.80[1] |
| 3 gr | 1 | 1.18% | 0 | 0.00% | 0 | 0.00% | 1.00[1] |
| Lymphocytosis (2 gr) | 1 | 1.18% | 0 | 0.00% | 1 | 2.27% | 0.68[1] |
| Hyperbilirubinemia (2 gr) | 4 | 4.71% | 2 | 2.38% | 1 | 2.27% | 0.70[1] |
| Increased AST activity (2 gr) | 1 | 1.18% | 1 | 1.19% | 0 | 0.00% | 1.00[1] |
| Increased ALT activity (2 gr) | 1 | 1.18% | 0 | 0.00% | 0 | 0.00% | 1.00[1] |
| Hypercholesterolemia (2 gr) | 1 | 1.18% | 1 | 1.19% | 0 | 0.00% | 1.00[1] |
| Hyperglycemia (2 gr) | 0 | 0.00% | 3 | 3.57% | 0 | 0.00% | 0.17[1] |
| Increase in serum creatinine (3 gr) | 0 | 0.00% | 0 | 0.00% | 1 | 2.27% | 0.21[1] |
| Proteinuria (total) | 1 | 1.18% | 0 | 0.00% | 2 | 4.55% | 0.11[1] |
| 1 gr | 1 | 1.18% | 0 | 0.00% | 1 | 2.27% | 0.68[1] |
| 2 gr | 0 | 0.00% | 0 | 0.00% | 1 | 2.27% | 0.21[1] |
| Injuries | | | | | | | |
| Thermal burn (1 gr) | 0 | 0.00% | 0 | 0.00% | 1 | 2.27% | 0.21[1] |

[1]—Fisher exact test

Immunogenicity Results (the First 12 Weeks)

The immunogenicity analysis included data from 209 patients who received at least one dose of the study drug and provided at least two blood samples for testing, one of which was taken before the first dosing on Day 1, Week 0 (85 patients in the BCD-085 Q2W group, 81 patients in the BCD-085 Q4W group and 43 patients in the Placebo group, n=209). Blood samples were drawn at week 0 before injection and at week 12.

TABLE 32

Assessment of immunogenicity after 12 weeks of treatment (BCD-085-7 study)

| | BCD-085 Q2W (n = 85) | | BCD-085 Q4W (n = 81) | | Placebo (n = 43) | | P-value[1] |
|---|---|---|---|---|---|---|---|
| | n | % | n | % | n | % | |
| Proportion of patients with BAbs | 1 | 1.18 | 0 | 0 | 0 | 0 | 1.000 |
| Proportion of patients with NAbs | | | not identified | | | | |

[1]Fisher exact test

Immunogenicity assessment showed the presence of binding antibodies in one patient from BCD-085 Q2W group after 12 weeks of treatment. No neutralizing activity was detected (Table 32).

Conclusion 83.3% and 77.7% patients from BCD-085-Q4W, BCD-085-Q2W arms achieved PASI75 at week 12 (p=0.46 for BCD-085-Q4W vs BCD-085-Q2W) compared to 0% in placebo arm (p<0.0001), sPGA(0-1) was reached by 79.8%, 81.2% and 2.27% patients in BCD-085-Q4W, BCD-085-Q2W, placebo arms, respectively. Adverse events (AEs) were registered in: 17.7%, 16.7% and 18.2% patients in BCD-085-Q4W, BCD-085-Q2W, placebo arms (p=1.0), respectively. One grade 3 (CTCAE 4.03) therapy-related SAE (pneumonia) was registered in BCD-085-Q4W arm. Grade 3 neutropenia was observed in 1 patient from BCD-085-Q2W, increase of creatinine was observed in 1 patient in placebo arm. Other AEs were mild or moderate (laboratory abnormalities were the most frequent), there were no local reactions in BCD-085 groups. Binding anti-drug antibodies were found in one patient (1.18%, BCD-085-Q2W arm). Neutralizing antibodies were not detected.

Example 7. Efficacy of Netakimab in Standard and Low Frequent Regimens in Treatment of Psoriatic Arthritis (PsA), Proof-of-Concept Sub-Study (BCD-085-7)

Study Design

In BCD-085-7 study described in Example 6 the efficacy of Netakimab versus placebo was evaluated on the limited population of patients who had baseline psoriatic arthritis. The endpoint for the assessment of psoriatic arthritis during this period was the proportion of patients (with patients with psoriatic arthritis) who achieved ACR 20/50/70 by Week 12. The parameter was assessed by estimating the 66/68 swollen/tender joint count, functional activity (HAQ-DI, assessed by the patient), disease activity (assessed by the physician and by the patient), patient's assessment of pain (VAS), and markers of inflammation (CRP and ESR).

Results

The population for the assessment of psoriatic arthritis included 15 patients (6 in BCD-085 Q2W arm, 7 in BCD-085 Q4W arm and 2 in placebo arm). One patient (BCD-085

Q4W arm) included in this population (rand. ID 10-131) was withdrawn at Visit 7 (Week 10), i.e. before the assessment at Visit 8 (Week 12). This patient was considered to be a non-responder.

TABLE 33

Proportion of patients who achieved ACR 20
(among patients with psoriatic arthritis, n = 15)

| Treatment arm | Proportion of patients who achieved ACR 20 at Visit 8 (Week 12), n = 15 | | P value |
|---|---|---|---|
| | Abs. number | % | |
| BCD-085 Q2W arm, n = 6 | 5 | 83.33 | 1.000[1] |
| BCD-085 Q4W arm, n = 7 | 6 | 85.71 | |
| Placebo arm, n = 2 | 0 | 0 | 0.1071[2] |
| | | | 0.0833[3] |

[1]Comparison of BCD-085 Q2W vs BCD-085 Q4W (Fisher's exact test),
[2]Comparison of BCD-085 Q2W vs placebo (Fisher's exact test),
[3]Comparison of BCD-085 Q4W vs placebo (Fisher's exact test)

TABLE 34

Proportion of patients who achieved ACR 50
(among patients with psoriatic arthritis, n = 15)

| Treatment arm | Proportion of patients who achieved ACR 50 at Visit 8 (Week 12), n = 15 | | P value |
|---|---|---|---|
| | Abs. number | % | |
| BCD-085 Q2W arm, n = 6 | 3 | 50 | 0.5921[1] |
| BCD-085 Q4W arm, n = 7 | 2 | 28.57 | 0.4643[2] |
| Placebo arm, n = 2 | 0 | 0 | 1.000[3] |

[1]Comparison of BCD-085 Q2W vs BCD-085 Q4W (Fisher's exact test),
[2]Comparison of BCD-085 Q2W vs placebo (Fisher's exact test),
[3]Comparison of BCD-085 Q4W vs placebo (Fisher's exact test)

TABLE 35

Proportion of patients who achieved ACR 70
(among patients with psoriatic arthritis, n = 15)

| Treatment arm | Proportion of patients who achieved ACR 70 at Visit 8 (Week 12), n = 15 | | P value |
|---|---|---|---|
| | Abs. number | % | |
| BCD-085 Q2W arm, n = 6 | 1 | 16.67 | 1.000[1] |
| BCD-085 Q4W arm, n = 7 | 1 | 14.29 | 1.000[2] |
| Placebo arm, n = 2 | 0 | 0 | 1.000[3] |

[1]Comparison of BCD-085 Q2W vs BCD-085 Q4W (Fisher's exact test),
[2]Comparison of BCD-085 Q2W vs placebo (Fisher's exact test),
[3]Comparison of BCD-085 Q4W vs placebo (Fisher's exact test)

Conclusion

Figure 23:
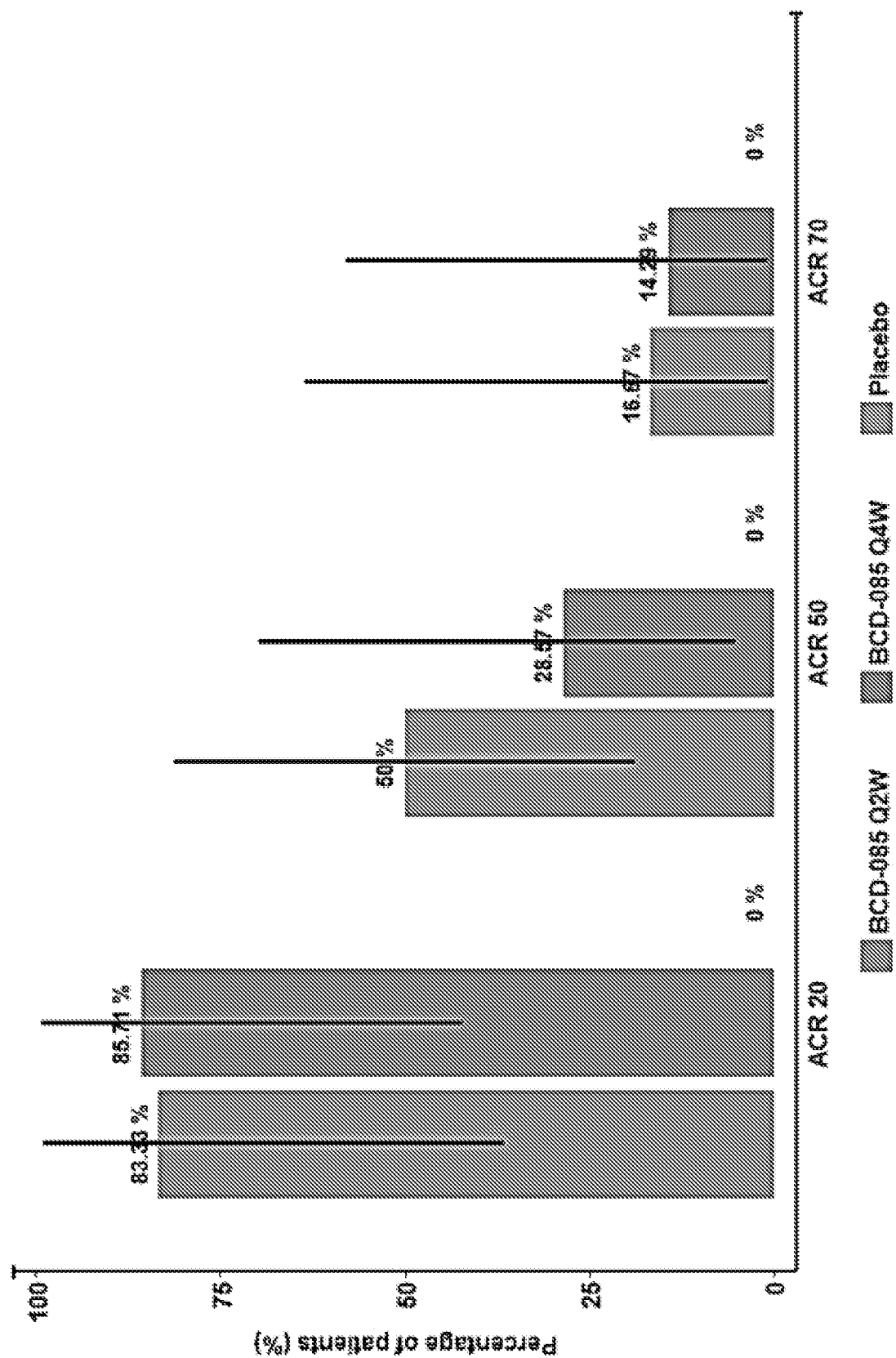
FIG. 23 is a graph illustrating the proportion of patients who achieved ACR 20/50/70 (among those with psoriatic arthritis, n=15) (BCD-085-7 study).

The analysis in patients with psoriatic arthritis (n=15) showed that ACR 20 at Week 12 was achieved by 83.33%, 85.71% and 0% of patients in the BCD-085 Q2W arm, BCD-085 Q4W arm and placebo arm, respectively (Table 33, FIG. 23). ACR 50 was achieved by 50%, 28.57% and 0% in the BCD-085 Q2W arm, BCD-085 Q4W arm and placebo arm, respectively (Table 34, FIG. 23). ACR 70 was achieved by 16.67%, 14.29% and 0% of patients in the BCD-085 Q2W arm, BCD-085 Q4W arm and placebo arm, respectively (Table 35, FIG. 23). The assessment at Week 12 did not show significant differences between the arms in any parameter. This may be caused by a low number of patients or too early assessment. However, the ACR 20 response in almost all-patients with psoriatic arthritis who received BCD-085 shows pronounced positive dynamics.

Example 8. Use of Netakimab at Different Doses to Treat Ankylosing Spondylitis (AS), Proof-of Concept Study (BCD-085-3)

Study Design

BCD-085-3 (NCT02763111) was a multicentre double-blind randomized Phase II study in patients with active ankylosing spondylitis. The primary objective was to establish the therapeutically effective and safe dose of BCD-085 to be given as multiple injections in patients with active ankylosing spondylitis.

Patient Population and Study Design

The study included 88 patients with active ankylosing spondylitis aged 18 to 65 years inclusively, who had established AS (modified New York criteria, 1984), BASDAI score of 4 or greater, with inadequate response to NSAIDs used for at least 3 months before screening, who met other eligibility criteria. The study did not include patients previously treated with MAbs targeting IL17 (or IL17 receptor) and patients previously treated with 2 or more therapeutic monoclonal antibodies. After the screening patients were randomized in ratio 1:1:1:1 into 4 arms: 1) BCD-085 40 mg, 2) BCD-085 80 mg, 3) BCD-085 120 mg and 4) placebo. BCD-085/placebo was used on Day 1 at weeks 0, 1, 2, 4, 6, 8, 10 and 12. For blinding purposes, patients from 40 mg and 80 mg arms received two or one SC injections of placebo (1 mL each), respectively. Patients in the control arm received 3 SC injections of placebo (each injection was 1.0 mL). Placebo used in all three arms had a similar composition that includes the excipients from the BCD-085 dosage form. Patients were observed up to week 16.

The hypothesis of the study was that BCD-085 is superior to placebo in patients with active ankylosing spondylitis. The superiority margin (5) was 0.1 (10%), type 1 error ($\alpha$) of −5% (0.05), type 2 error ($\mu$) of 20% (0.2) and power of 80%.

The primary endpoint was the proportion of patients in each study arm who achieved ASAS20 at Week 16 of the study. Secondary endpoints include assessment of ASAS40 and ASAS5/6, the mean change from baseline in the BASDAI, BASMI, MASES, BASFI, ASDAS-CRP and the chest expansion, change in the 24-h pain score and the mean CRP concentration, also assessment of QoL was provided. The efficacy endpoints were evaluated at weeks 0, 4, 8, 12 and 16. Safety endpoints included rates of adverse events (AE), SAE, 3-4 grade AE according to CTCAE 4.03, rates of early study discontinuation due to AE. Pharmacokinetic endpoints included standard PK parameters ($C_{min}$, $AUC_{(0-168)}$, $AUC_{(0-672)}$, $T_{max}$, $T^{1/2}$, $V_d$, $K_{el}$, CL). Immunogenicity parameters included incidence of binding and neutralizing antibodies to BCD-085 after multiple drug injections.

Results

Demographics and baseline characteristics did not differ between groups (Table 36).

TABLE 36

Baseline characteristics of patients (BCD-085-3 Study)

| Parameter | BCD-085 40 mg n = 22 | BCD-085 80 mg n = 22 | BCD-085 120 mg n = 22 | Placebo n = 22 |
|---|---|---|---|---|
| Age, years, median [IQR] | 40.0 [33.0-44.0] | 34.0 [31.0-36.0] | 38.0 [35.0-44.0] | 41.0 [32.0-47.0] |
| Man, n (%) | 17 [77.27] | 19 [86.36] | 22 [100.00] | 15 [68.18] |
| Weight, kg, median [IQR] | 75.5 [61.0-93.0] | 79.0 [63.0-86.1] | 79.1 [71.5-85.0] | 81.3 [75.0-90.0] |
| AS duration, months, median [IQR] | 26.5 [11-75] | 37.5 [20-56] | 46.5 [13-96] | 26.5 [10-48] |
| Spinal pain, total score (0-10 scale), median [IQR] | 7.5 [6-8] | 7 [6-8] | 7 [6-8] | 7 [6-7] |
| BASDAI, total score, median [IQR] | 6.45 [5.4-7.4] | 6.7 [5.8-7.1] | 6.45 [4.7-7.3] | 5.95 [5.1-7] |
| BASFI, total score, median [IQR] | 5.9 [4.3-7.2] | 5.95 [4.5-6.9] | 5.55 [3.9-6.8] | 6 [4-6.7] |
| BASMI, total score, median [IQR] | 4.65 [3.2-5.2] | 4.5 [2.8-5.1] | 4.15 [3.5-5.4] | 4.55 [3.3-5.1] |
| Chest expansion, cm, median [IQR] | 3.5 [3-4] | 3.5 [2-4] | 3 [3-4] | 3 [3-5] |
| Previous use of anti-TNFα, n (%) | 4 [18.18] | 2 [9.09] | 3 [13.64] | 4 [18.18] |

Note:
IQR—interquartile range

The ASAS20 response rate at Week 16 was set as the primary efficacy endpoint. In all the BCD-085 arms, the proportion of ASAS20 responders at Week 16 was above 70%, while in the placebo arm, only about 40% of patients responded to the treatment.

The analysis has shown that BCD-085 in doses 80 and 120 mg is superior to placebo in patients with active ankylosing spondylitis. Results for ASAS20 achievement are shown below. To prove the protocol-stated hypothesis of BCD-085 being superior to placebo, the 95% CIs were calculated for the difference in proportions of ASAS20 achievement (individual pairwise comparisons were performed for placebo versus each BCD-085 arm). The hypothesis was accepted if the lower bound of the estimated 95% CI for the difference in proportions of ASAS 20 was above the pre-specified margin of clinically non-meaningful differences (δ) of 10% (0.10) The results are provided in Table 37.

TABLE 37

The difference in proportions of ASAS20 (BCD-085-3 Study)

| Difference in ASA20 achievement | | 95% CI | p-value[1] |
|---|---|---|---|
| Arms 1 and 4 | 29.87% | [1.69%; 58.05%] | 0.0472 |
| Arms 2 and 4 | 38.96% | [12.36%; 65.56%] | 0.0082 |
| Arms 3 and 4 | 48.05% | [23.71%; 72.39%] | 0.0008 |

Note:
[1]—two-tailed $\chi^2$ test

Table 37 shows that the lower bounds of the 95% CIs for pairwise comparisons (placebo versus BCD-085) between arms 2, 4 and arms 3, 4 fall outside the pre-specified superiority margin. Thus, the hypothesis of BCD-085 being superior to placebo in patients with active ankylosing spondylitis was accepted and the primary study objective was met. Of note, the superiority of BCD-085 to placebo was proved for tested doses 80 mg and 120 mg.

Figure 24:
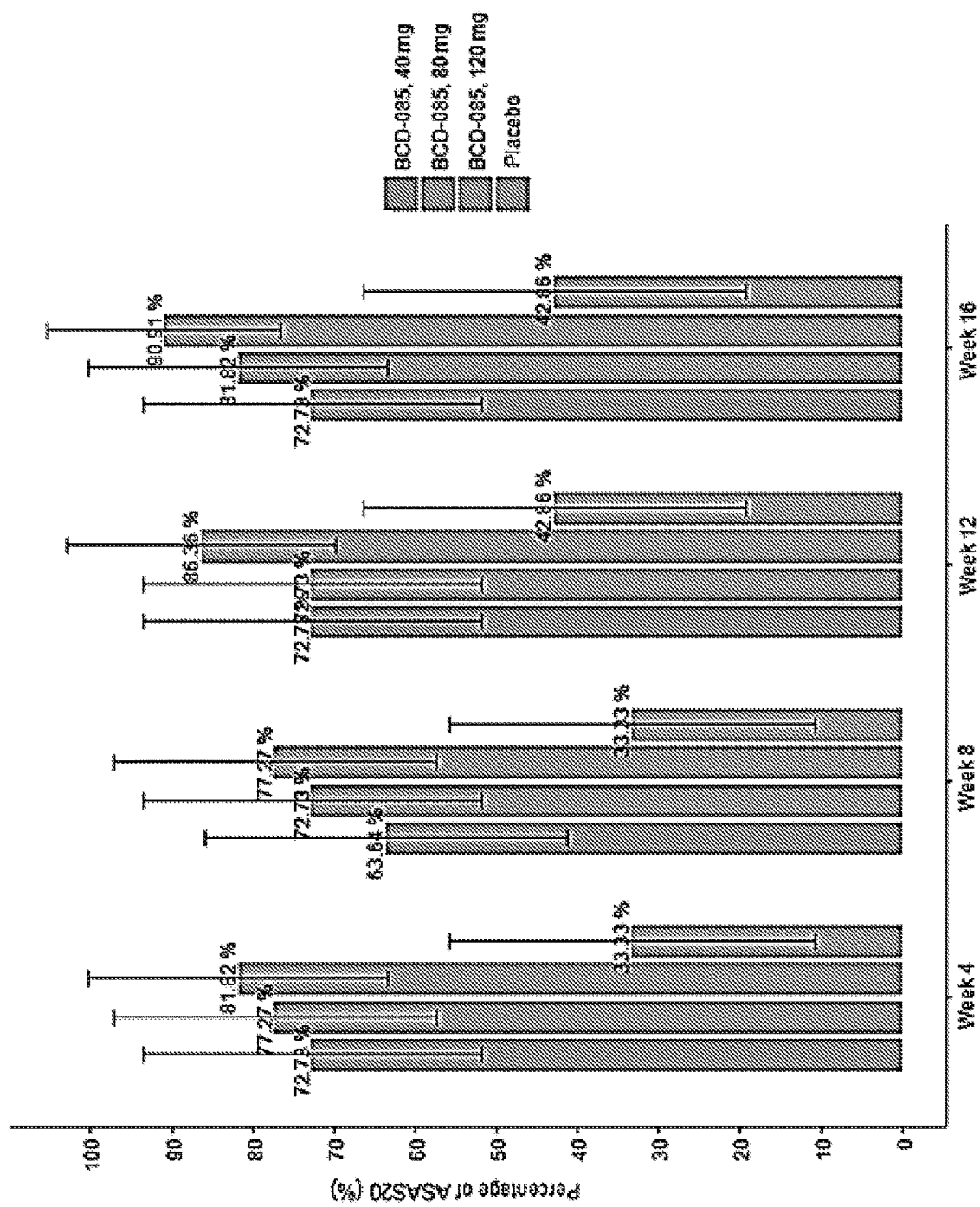
FIG. 24 is a graph illustrating the proportion of patients with ASAS20 Response during the study (BCD-085-3 Study).

ASAS20 at week 12 was reported in 72,73% of patients in group 1, 81.82% in group 2 and 90.91% in group 3 vs 23.1% who received placebo (p=0.0043 for groups 1, 2, 3 vs. placebo, FIG. 24).

TABLE 38

Proportion of patients with ASAS20, ASAS40, and ASAS5/6 response during the study (BCD-085-3 Study)

| Arm* | ASAS20 n (%) | ASAS40 n (%) | ASAS5/6 n (%) | P value[1] |
|---|---|---|---|---|
| Week 4 | | | | |
| 1 (n = 22) | 16 (72.73%) | 9 (40.91%) | 10 (45.45%) | $P_2 = 0.0039$ |
| 2 (n = 22) | 17 (77.27%) | 14 (63.64%) | 12 (54.55%) | $P_3 = 0.0246$ |
| 3 (n = 22) | 18 (81.82%) | 11 (50.00%) | 13 (59.09%) | $P_4 = 0.0024$ |
| 4 (n = 21) | 7 (33.33%) | 4 (19.05%) | 2 (9.52%) | |
| Week 8 | | | | |
| 1 (n = 22) | 14 (63.64%) | 9 (40.91%) | 11 (50.0%) | $P_2 = 0.0140$ |
| 2 (n = 22) | 16 (72.73%) | 13 (59.09%) | 12 (54.55%) | $P_3 = 0.0593$ |
| 3 (n = 22) | 17 (77.27%) | 10 (45.45%) | 11 (50.0%) | $P_4 = 0.0007$ |
| 4 (n = 21) | 7 (33.33%) | 4 (19.05%) | 1 (4.76%) | |
| Week 12 | | | | |
| 1 (n = 22) | 16 (72.73%) | 12 (54.55%) | 12 (54.55%) | $P_2 = 0.0214$ |
| 2 (n = 22) | 16 (72.73%) | 13 (59.09%) | 12 (54.55%) | $P_3 = 0.0069$ |
| 3 (n = 22) | 19 (86.36%) | 15 (68.18%) | 13 (59.09%) | $P_4 = 0.0809$ |
| 4 (n = 21) | 9 (42.86%) | 4 (19.05%) | 5 (23.81%) | |

TABLE 38-continued

Proportion of patients with ASAS20, ASAS40, and ASAS5/6 response during the study (BCD-085-3 Study)

| Arm* | ASAS20 n (%) | ASAS40 n (%) | ASAS5/6 n (%) | P value[1] |
|---|---|---|---|---|
| Week 16 | | | | |
| 1 (n = 22) | 16 (72.73%) | 9 (40.91%) | 11 (50.0%) | $P_2$ = 0.0043 |
| 2 (n = 22) | 18 (81.82%) | 14 (63.64%) | 12 (54.55%) | $P_3$ = 0.0004 |
| 3 (n = 22) | 20 (90.91%) | 16 (72.73%) | 15 (68.18%) | $P_4$ = 0.0027 |
| 4 (n = 21) | 9 (42.86%) | 3 (14.29%) | 3 (14.29%) | |

Figure 25:
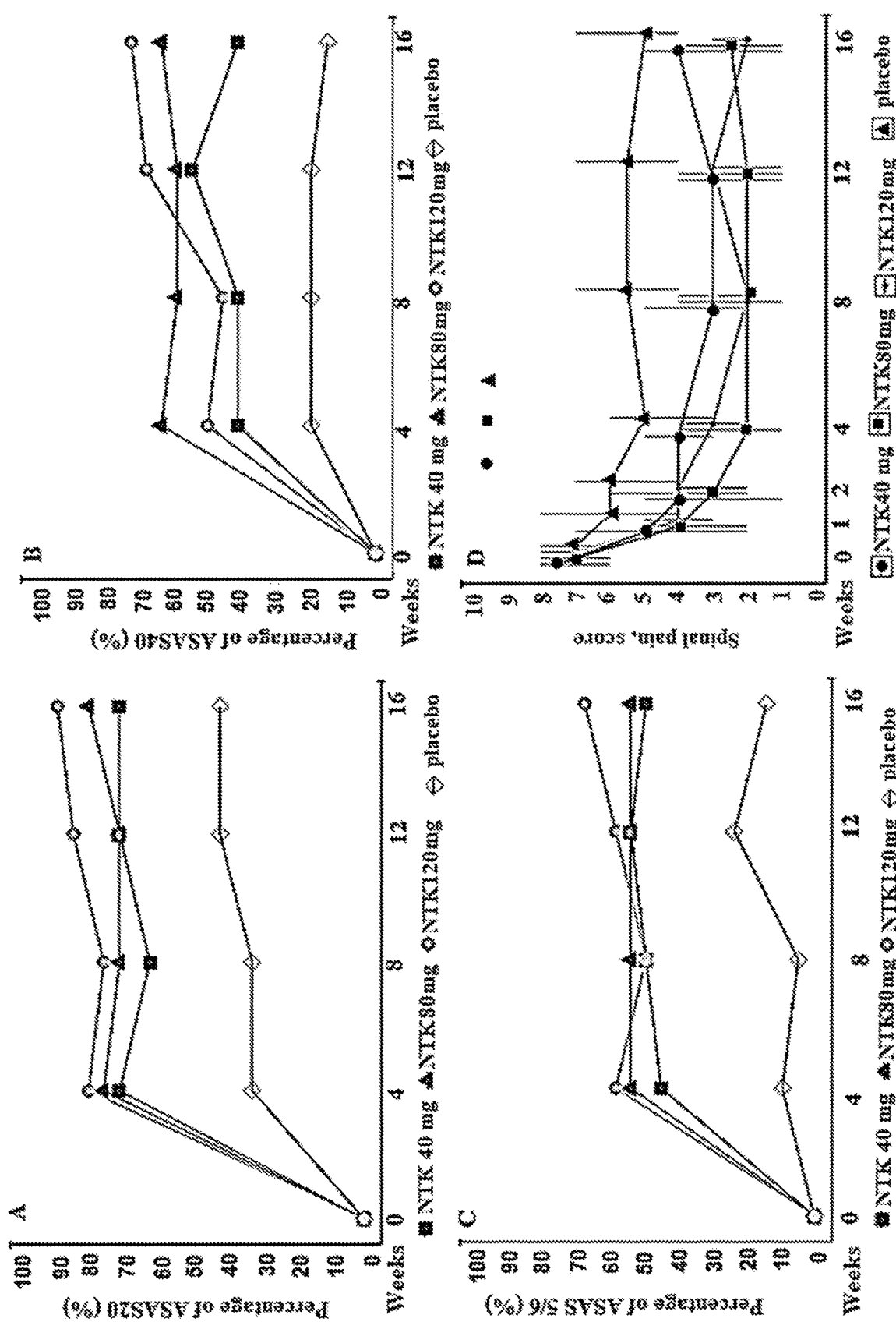
FIG. 25 is a graph illustrating the proportion of patients with ASAS20, ASAS40, and ASAS5/6 response during the study (BCD-085-3 Study).

Note:
[1]—two-tailed Fisher's exact test/two-tailed $\chi^2$ test;
$P_2$—ASAS20 assessment;
$P_3$—ASAS40 assessment;
$P_4$—ASAS 5/6 assessment
*Arm 1: BCD-085 40 mg; Arm 2—BCD-085 80 mg; Arm 3—BCD-085 120 mg; Arm 4—placebo The results of ASAS20, ASAS40, ASAS 5/6 are shown in the Table 38 (FIG. 25).

The percentage of patients achieved ASAS20, ASAS40, ASAS 5/6 was higher in BCD-085 arms, especially in 120 mg arm. Other secondary endpoints showed the similar dynamics: all BCD-085 arms demonstrated the better response in comparison with placebo arm. All secondary endpoints showed significant improvement by the time of second evaluation in comparison with screening. Achieved response was maintained throughout all study period.

Pharmacokinetics

Figure 26:
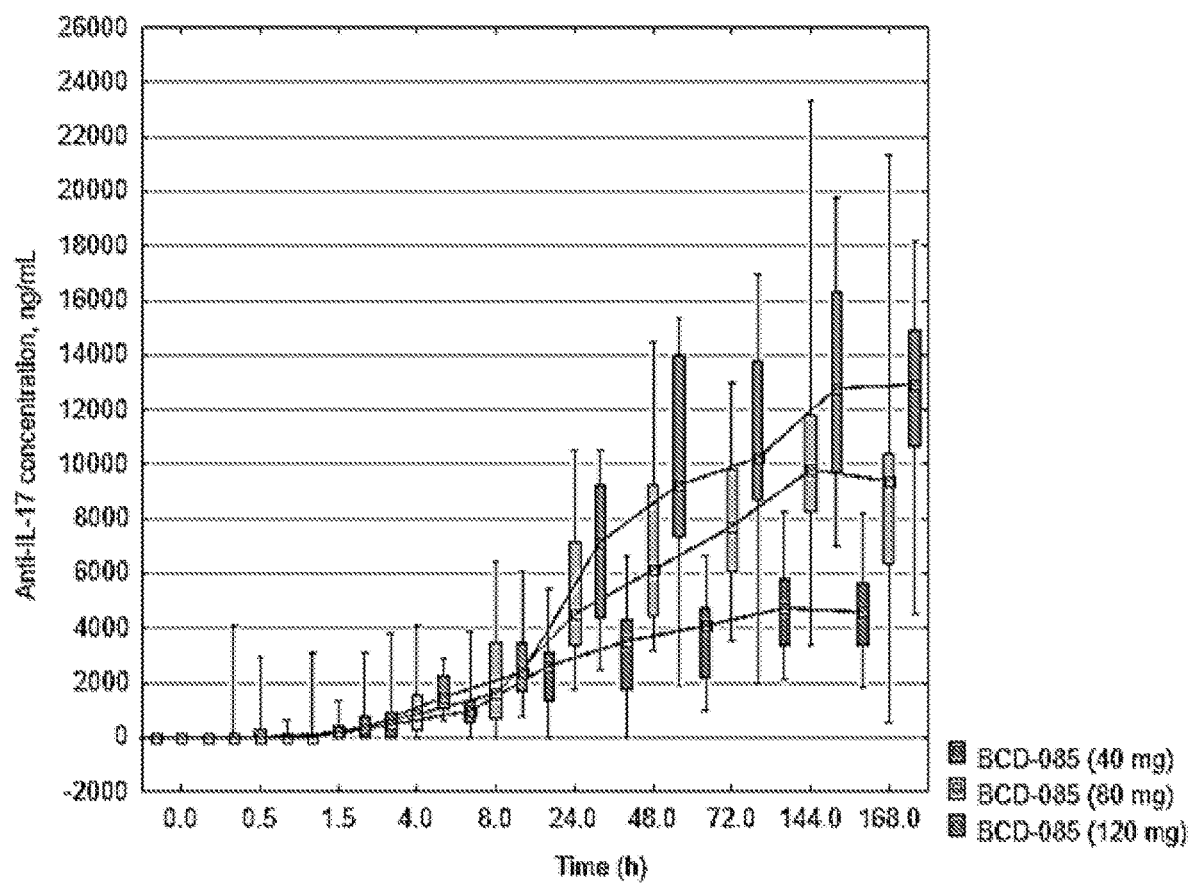
FIG. 26 is a graph illustrating pharmacokinetcs after single dose administration (Study BCD-085-3).

After a single injection of 40 mg, 80 mg, and 120 mg BCD-085, the drug was detectable in the serum for 0.5 to 4 h post-dose. Its concentration changed with time similarly for all doses (FIG. 26). The changes in BCD-085 concentration were proportional to the dose administered. $C_{max}$ and $AUC_{(0-168)}$ had strong dose-dependent relationships.

Figure 27:
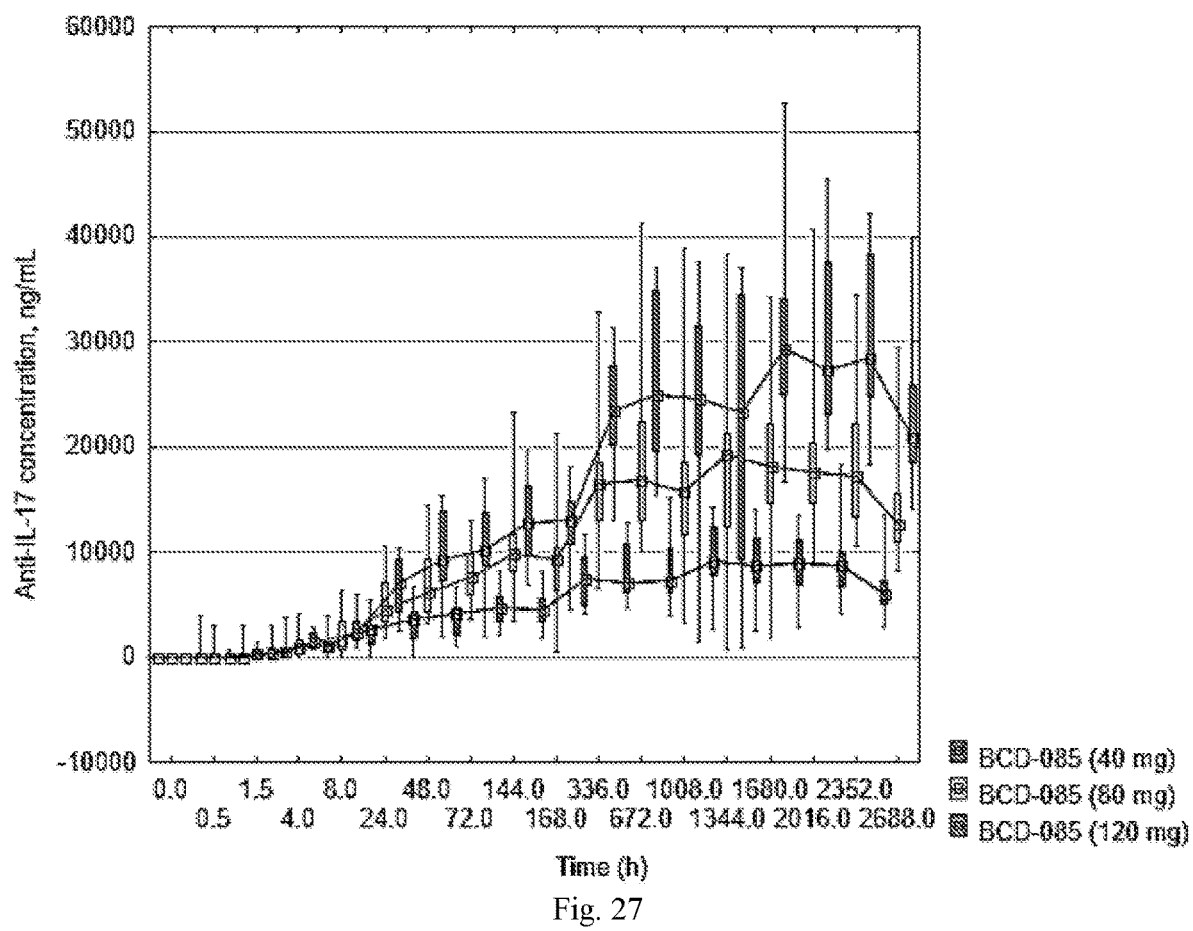
FIG. 27 is a graph illustrating pharmacokinetcs after multiple dose administration (Study BCD-085-3).

A subsequent use of BCD-085 resulted in gradual increase of its concentrations without evident signs of cumulation (FIG. 27).

Safety

The safety analysis included all patients who received at least one dose of BCD-085 (n=88, Table 39). At least one AE/SAE was reported in 45.45% of patients (arm 1), 27.27% of patients (arm 2), 18.18% of patients (arm 3), and 31.82% of patients (arm 4) (p=0.298). ARs were judged therapy-related in 22.73% of patients in group 1, in 18.18% of patients in group 2, in 4.55% of patients in group 3, and in 22.73% of patients in group 4 (p=0.354). Grade 3-4 AEs were reported for 4.55% in arms 1 and 4, for 9.09% in arm 2. The most common AEs were neutropenia, diastolic blood pressure increased. Most of the AEs were mild. No local reactions were reported.

One patient withdrew prematurely due to an AE, this occurred in the BCD-085 80 mg arm. No serious adverse events, local reactions and lethal outcomes were recorded.

TABLE 39

Summary of safety data (Study BCD-085-3)

| Variables | BCD-085 40 mg n = 22 | BCD-085 80 mg n = 22 | BCD-085 120 mg n = 22 | Placebo n = 22 | P-value* |
|---|---|---|---|---|---|
| At least 1 AE | 11 (50.00) | 6 (27.27) | 4 (18.18) | 7 (31.82) | 0.183 |
| At least 1 TAE | 5 (22.73) | 4 (18.18) | 1 (4.55) | 5 (22.73) | 0.354 |
| Sever AE | 1 (4.55) | 2 (9.09) | 0 | 1 (4.55) | 0.900 |

TABLE 39-continued

Summary of safety data (Study BCD-085-3)

| Variables | BCD-085 40 mg n = 22 | BCD-085 80 mg n = 22 | BCD-085 120 mg n = 22 | Placebo n = 22 | P-value* |
|---|---|---|---|---|---|
| Severe TAE | 0 | 1 (4.55) | 0 | 1 (4.55) | 1.00 |
| Withdrawal due to AE | 0 | 1 (4.55) | 0 | 0 | 1.00 |
| Summary of severe Aes | | | | | |
| Anaemia (Grade 3) | 0 | 0 | 0 | 1 (4.55) | 1.00 |
| Neutropenia (Grade 4) | 0 | 1 (4.55) | 0 | 0 | 1.00 |
| Erosive colitis (Grade 3) | 0 | 1 (4.55) | 0 | 0 | 1.00 |
| Episcleritis (Grade 3) | 1 (4.55) | 0 | 0 | 0 | 1.00 |

Immunogenicity

The population for immunogenicity assessment included 85 patients (those who received at least one injection of the study product and provided at least two blood samples for testing, one of which was taken before the first dosing on Day 1, Week 0). Blood samples were drawn at week 0 before injection, at week 8 and at week 16. Immunogenicity assessment did not detect any binding anti-BCD-085 antibodies in any patient.

Conclusion

Treatment with BCD-085 leads to significant improvement in all AS symptoms in comparison with placebo. The dose of 120 mg of BCD-085 had the most pronounced effect. The drug was well tolerated in all doses with no differences with placebo in safety profiles.

Example 9. Long-Term Use of Netakimab in Patients with Ankylosing Spondylitis (BCD-085-3Ext Study)

Study Design

Study BCD-085-3ext was a multicentre open-label Phase II extension study of the efficacy and safety of BCD-085 80 mg and 120 mg in patients with active ankylosing spondylitis who completed the BCD-085-3 study according to the Protocol. The primary objective was to assess the efficacy and safety of the maintenance therapy (up to 1 year) of BCD-085. The study is completed, the results are analyzed.

Figure 28:
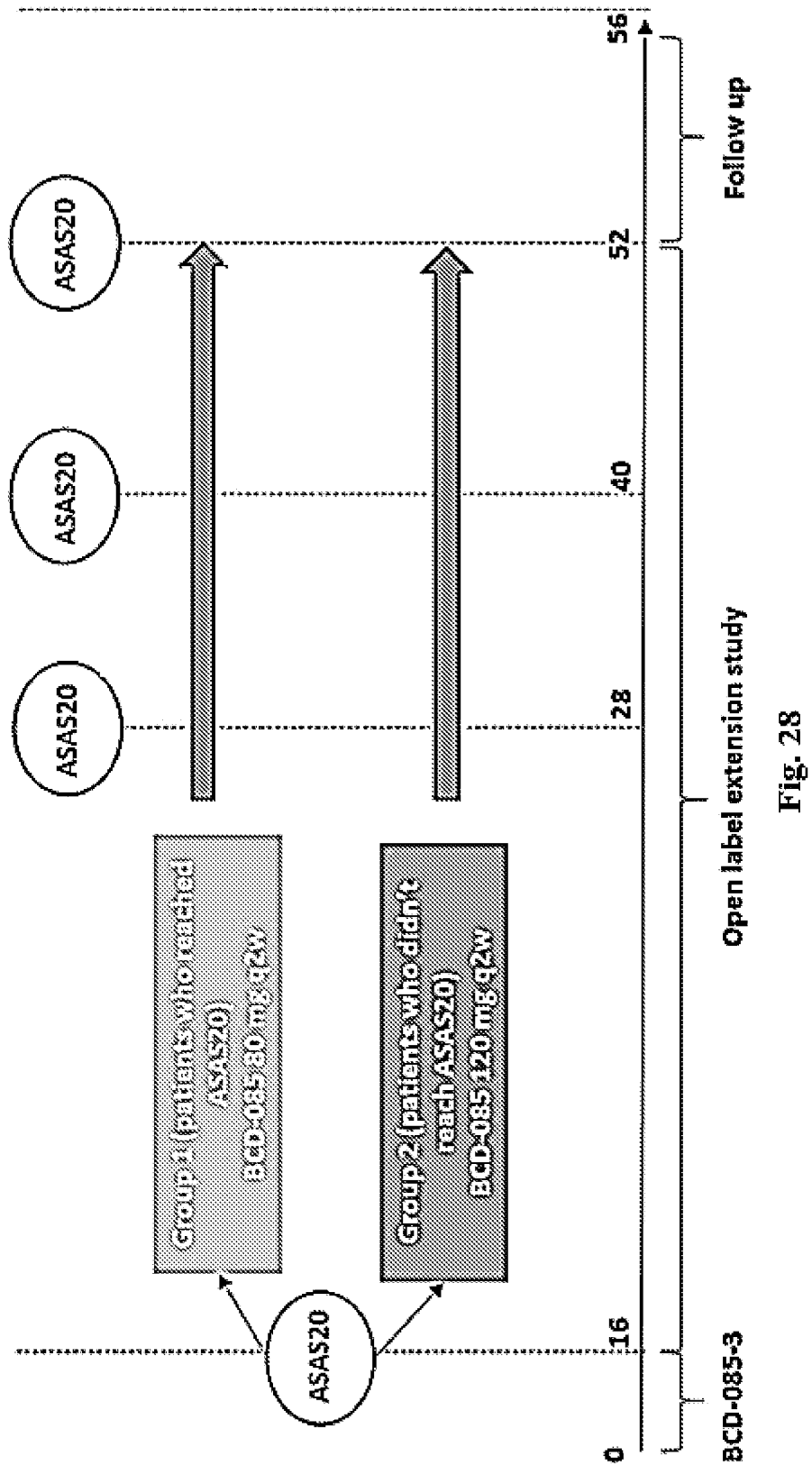
FIG. 28 is a graph illustrating study design (BCD-085-3ext Study).

If summarizing the duration of the follow-up in the main study BCD-085-2 (16 weeks) and its extension phase BCD-085-2ext (40 weeks), the total follow-up for 1 subject in both studies was 56 weeks (about 1 year) (FIG. 28).

Patient Population and Study Design

The study included 81 patients, who completed the BCD-085-3 study according to the Protocol. Patients who didn't reached ASAS20 (unresponders) after BCD-085-3 study received BCD-085 120 mg in Q2W regimen up to 1 year, patients who reached ASAS20 after BCD-085-3 study received BCD-085 80 mg in Q2W regimen up to 1 year.

During BCD-085-2ext study patients were treated in two arms:
Arm 1: BCD-085 80 mg;
Arm 2: BCD-085 80 120 mg.

The primary endpoint was the proportion of patients in each study arm who achieved ASAS20 at Week 36 of the BCD-085-ext study. Secondary endpoints include assessment of ASAS40 and ASAS5/6, the mean change from baseline in the BASDAI, BASMI, MASES, BASFI, ASDAS-CRP and the chest expansion, change in the 24-h pain score and also assessment of QoL. The efficacy endpoints were evaluated at weeks 12, 24 and 36 of BCD-085-2ext study (weeks 28, 40 and 52 of treatment). Safety endpoints included rates of adverse events (AE), SAE, 3-4 grade AE according to CTCAE 4.03, rates of early study discontinuation due to AE. Immunogenicity parameters included incidence of binding and neutralizing antibodies to BCD-085 after one year of treatment (week 40 of BCD-085-3ext study).

Results

In general, according to the results of the efficacy evaluation, it was established:

- Long-term (over a year) therapy with BCD-085 results in a high efficacy persistent within the time;
- Long-term use of BCD-085 was not associated with high rates efficacy loss;
- Use of the study drug at a dose of 120 mg allows to achieve a response to therapy by more patients, including patients in whom the use of BCD-085 for 16 weeks did not lead to the onset of a clinical response.

Evaluation of response by ASAS criteria (ASAS20/40, ASAS5/6) found that more than 70% of patients at each time point of OLE study achieved the appropriate response to therapy regardless of the dose used. In addition, the proportion of patients who have reached ASAS20 at 52 weeks of the OLE stage was 79.01% (86.42% with the use of the last-observation-carried-forward method). The proportion of patients who achieved ASAS40 one year of therapy was 71.60% (77.78% with the last-observation-carried-forward method).

Evaluation of other endpoints in the general patient population (n=81) demonstrated the existence of a similar trend for all parameters: against the background of the use of BCD-085, there was a pronounced, statistically significant improvement in all signs of AS, which formed to the first assessment point during the extended phase (week 28) and remained unchanged until the end of the study (Table 40).

TABLE 40

Main efficacy data obtained from BCD-085-3ext study (irrespectively to the regimen)

| Parameter | BCD-085-3 | | BCD-085-3ext | | | $p^1$ value |
|---|---|---|---|---|---|---|
| | Baseline | Week 16 | Week 28 | Week 40 | Week 52 | |
| BASDAI score | 6.3 | 2.9 | 2.1 | 2.2 | 2.25 | <0.0001 |
| BASMI score | 4.5 | 3.6 | 3.4 | 3.2 | 3 | <0.0001 |

TABLE 40-continued

Main efficacy data obtained from BCD-085-3ext study (irrespectively to the regimen)

| Parameter | BCD-085-3 | | BCD-085-3ext | | | $p^1$ value |
|---|---|---|---|---|---|---|
| | Baseline | Week 16 | Week 28 | Week 40 | Week 52 | |
| MASES score | 3 | 0 | 0 | 0 | 0 | <0.0001 |
| Chest excursion | 3 | 4 | 4 | 4 | 4 | <0.0001 |
| BASFI score | 5.9 | 3.2 | 2.2 | 2.3 | 1.9 | <0.0001 |
| ASDAS-CRP score | 3.92 | 2.25 | 1.83 | 1.825 | 1.845 | <0.0001 |
| SF-36 (physical component) | 31.2 | 39.5 | 41.6 | NA | 43.9 | <0.0001 |
| SF-36 (mental component) | 40.5 | 49.4 | 53.4 | NA | 54.1 | <0.0001 |
| Pain assessment, NRS | 7 | 3 | 2 | 2 | 2 | <0.0001 |
| Nocturnal pain assessment, NRS | 7 | 2 | 2 | 2 | 1 | <0.0001 |

Note:
[1]—Friedman's test

Thus, it can be concluded that the treatment with BCD-085 results in a significant improvement in majority of AS symptoms, which is formed mainly within the first month after the start of therapy and persisting throughout the year of treatment.

Evaluation of the loss of the achieved effect with an increase in the duration of therapy The analysis of the ASAS28/40 responses dynamics did not reveal a tendency to lose response during the OLE study.

In general, the loss of response was noted in 4.76 of patients.

Long-term efficacy data on BCD-085 use at doses of 80 mg and 120 mg

The long-term use of the BCD-085 in the maximum dose of 120 mg leads is highly effective in patients who did not have sufficient effect of treatment within the first 16 weeks. At the end of OLE ASAS2/40, ASAS5/6 responses were reached by 63.16, 52.66-Cand 52.660 of patients, respectively.

For other secondary endpoints, the presence of a similar dynamics over time was shown (Table 41).

TABLE 41

Main efficacy parameters for efficacy of BCD-085 at a doses of 80 and 120 mg within phase 2 studies (BCD-085-3 and BCD-085-3ext)

| Parameter | | BCD-085-3 | BCD-085-3ext | | | $p^1$ value |
|---|---|---|---|---|---|---|
| | | Week 16 | Week 28 | Week 40 | Week 52 | |
| BASDAI score | BCD-085 80 mg | 2.45 | 1.9 | 2 | 1.9 | <0.0001 |
| | BCD-085 120 mg | 5.8 | 3.3 | 3 | 3.2 | <0.0001 |
| BASMI score | BCD-085 80 mg | 3.25 | 3.1 | 3 | 2.8 | <0.0001 |
| | BCD-085 120 mg | 5.2 | 4 | 4 | 4 | 0.0002 |
| MASES score | BCD-085 80 mg | 0 | 0 | 0 | 0 | 0.0003 |
| | BCD-085 120 mg | 1 | 0 | 0 | 0 | 0.0007 |

TABLE 41-continued

Main efficacy parameters for efficacy of BCD-085 at a doses of
80 and 120 mg within phase 2 studies (BCD-085-3 and BCD-085-3ext)

| Parameter | | BCD-085-3 Week 16 | BCD-085-3ext Week 28 | Week 40 | Week 52 | p¹ value |
|---|---|---|---|---|---|---|
| Chest excursion | BCD-085 80 mg | 4 | 4.5 | 4 | 4 | 0.1759 |
|  | BCD-085 120 mg | 4 | 4 | 4 | 4 | 0.3012 |
| BASFI score | BCD-085 80 mg | 2.3 | 1.95 | 1.8 | 1.5 | <0.0001 |
|  | BCD-085 120 mg | 5.8 | 4 | 4 | 3.2 | <0.0001 |
| ASDAS-CRP score | BCD-085 80 mg | 2.135 | 1.695 | 1.65 | 1.61 | <0.0001 |
|  | BCD-085 120 mg | 3.77 | 2.48 | 2.45 | 2.5 | <0.0001 |
| SF-36 (physical component) | BCD-085 80 mg | 40.1 | 42.95 | NA | 44.6 | 0.0018 |
|  | BCD-085 120 mg | 34.2 | 36.9 | NA | 38.3 | 0.1504 |
| SF-36 (mental component) | BCD-085 80 mg | 50.80 | 53.35 | NA | 54.6 | 0.0477 |
|  | BCD-085 120 mg | 43.5 | 54 | NA | 50.3 | 0.0032 |
| Pain assessment, NRS | BCD-085 80 mg | 3 | 2 | 2 | 2 | <0.0001 |
|  | BCD-085 120 mg | 7 | 3 | 3 | 3 | <0.0001 |
| Pain assessment, NRS | BCD-085 80 mg | 2 | 1.5 | 1 | 1 | <0.0001 |
|  | BCD-085 120 mg | 5 | 3 | 3 | 3 | 0.0001 |

Note:
¹—Friedman's test; dispersive analysis for repeatable observations

The data show that patients from group 1 (80 mg), when included in BCD-085-3ext study, had low values of all major activity indices of ankylosing spondylitis (week 16 of the BCD-085-3 study). The continued use of the drug in them led to the stabilization of the effect (the average values of most indices went to the "plateau").

Patients from group 2 (120 mg) had initially higher values of all major indices when they were included (1.5-2 times higher than those in the 80 mg group), which is due to the lack of ASAS20 to the previous 16 weeks of treatment in the main study. The use of BCD-085 at a dose of 120 mg during OLE study leads to a pronounced and statistically significant decrease in the BASDAI, BASFI, BASMI indices and the assessment of pain. Thus, the BASDAI index, which reflects the activity of ankylosing spondylitis, was ≈3.2 in this group, which corresponds to an inactive disease. According to ASAS-EULAR2016 recommendations changes in the ASDAS score ≥1.1 and BASDAI score ≥2 are considered clinically significant. The data presented in the table above indicate the presence of these changes in the BCD-085 120 mg group, which confirms the significance of the effects.

Safety

The safety analysis included all patients who received at least one dose of BCD-085 within BCD-085-3ext study (n =81).

In general, at least one AE was registered in 40.74% (33) of participants, while treatment-related AEs were presented in 28.40% (23) patients. There were no cases of SAEs, grade 4 AEs or deaths within the whole study period (Table 42).

During BCD-085-3ext study two cases of early withdrawal related AE were reported (microbial eczema, positive blood test for tuberculosis).

TABLE 42

Safety data obtained from BCD-085-3ext study

| Type of deviation | Proportion of patients (n = 81) |
|---|---|
| Any AE | 33 (40.74%) |
| Any SAE | 0 (0.00%) |

TABLE 42-continued

Safety data obtained from BCD-085-3ext study

| Type of deviation | Proportion of patients (n = 81) |
|---|---|
| Treatment-related AEs | 23 (28.40%) |
| Grade 3 AEs | 4 (4.94%) |
| Treatment-related AEs of grade 3 | 2 (2.47%) |
| Local reactions | 1 (1.23%) |
| Study withdrawal due to AEs | 2 (2.47%) |

The majority of AEs were presented by single episodes throughout the study. Predominantly registered AEs belonged to infections, blood and lymphatic system disorders, and liver and biliary tract abnormalities. Cardiovascular disorders were less common.

Mainly registered AEs, including treatment-related, were mild and moderate (1-2 gr. by CTCAE v.4.03), which allow to conclude that the safety profile of BCD-085 was favorable. There were four patients with grade AEs, represented by neutropenia, increased GGT activity, URTI, and increased blood pressure. Two episodes of increase in blood pressure (gr.3), recorded in one patient, required medical therapy and resolved without consequences.

The expectancy of AE was based of known safety profiles of other IL-17 inhibitors, and data from previous clinical studies of BCD-085 (BCD-=85-1, BCD-085-2, BCD-085-2ext, andBCD-085-3. There was the only unexpected AE in BCD-085-3ext study —facial paresthesia. However, disorders of the nervous system accompanied by sensitivity abnormalities (facial nerve paralysis, sciatica) were previously described for secukinumab and ixekizumab, which may indicate some probability of such AE in patients treated with IL-17-inhibitors.

There was a series of AE episodes, which is of interest as part of the safety assessment of therapeutic monoclonal antibodies in general and interleukin-17 blockers in particular.

Two cases of positive blood tuberculosis test were registered with a normal chest radiograph and without any other signs of active tuberculosis.

One case of gr.2 mycosis (esophageal candidiasis) was identified (1.23%). This AE resolved without consequences within the standard therapy.

According to the protocol, manifestations of ankylosing spondylitis were not registered as AE. In this regard, it is necessary to note the episode of iridocyclitis, interpreted by the investigators as a manifestation of ankylosing spondylitis and not registered as AE. Iridocyclitis resolved without consequences within the standard therapy.

Given the route of administration of BCD-085 (subcutaneous injections), the development of local reactions was expected. The proportion of patients with local reactions was 1.23% (2 local reactions were recorded in one patient, represented by hyperemia, edema, pruritus, pain and the formation of local infiltrate), which indicates a low frequency of this adverse event.

There were no cases of antidrug-antibodies formation within the whole study period.

Thus, the use of BCD-085 throughout the year in patients with AS shows a favorable safety profile and good tolerability. The drug is characterized by a low probability of local reactions, SAEs, the frequency of AEs did not increase within the time of therapy. A comparison with the available data on the safety of other monoclonal antibodies against interleukin-17 (secukinumab, ixekizumab) indicates the comparability of safety profiles.

Conclusion

It was shown that long-term use of BCD-085 at 120 mg allowed to reach response even in late responding patients (who did not reach ASAS20 at week 16), e.g. after 1 year of treatment ASAS20/40 and ASAS5/6 were obtained by 63.16%, 52.66% and 52.66% of patients, respectively. Safety analysis showed that long-term use of BCD-085 was well tolerated by patients, immunogenicity analysis didn't reveal any cases of ADA formation.

Example 10. Efficacy of Netakimab in Patients with Ankylosing Spondylitis (BCD-085-5 Study)

Study Design

BCD-085-5 is an ongoing multicentre double-blind placebo-controlled Phase III study in patients with active ankylosing spondylitis. The primary objective is to evaluate the efficacy and safety of BCD-085 versus placebo in patients with active ankylosing spondylitis.

Study BCD-085-5 used the 60 mg/1 ml formulation for BCD-085 in pre-filled syringes. The route of administration was SC injections with 2 pre-filled syringes (2 SC injections, given for 15 min) at weeks 0, 1, 2 and then every other week within 3 years of treatment.

Patient Population and Study Design

The study includes 228 patients with active ankylosing spondylitis aged 18 to 65 years inclusively, who met the eligibility criteria. Patients should have ankylosing spondylitis according to the modified New York criteria (1984), diagnosed at least 3 months before signing the ICF. The study doesn't include patients previously treated with MAbs targeting IL17 (or IL17 receptor) and patients previously treated with 2 or more anti-TNF-alfa drugs. After the screening patients were randomized in ratio 1:1 into 2 arms: 1) BCD-085 120 mg and 2) placebo. Patients received BCD-085/placebo in the blinded manner on Day 1 at weeks 0, 1, 2, 4, 6, 8, 10, 12 and 14. From week 16 the therapy is open-label, patients from both groups start to receive BCD-085 120 mg in Q2W regimen (except responders from placebo arm: patients who achieved ASAS20 at week 14 in this group are excluded from the study). When procedures of visit at week 154 (week 170 for patients initially randomized to placebo arm) are completed, patients will undergo an 4-week safety follow up.

Results

Data from the first 16 weeks are presented.

Figure 29:
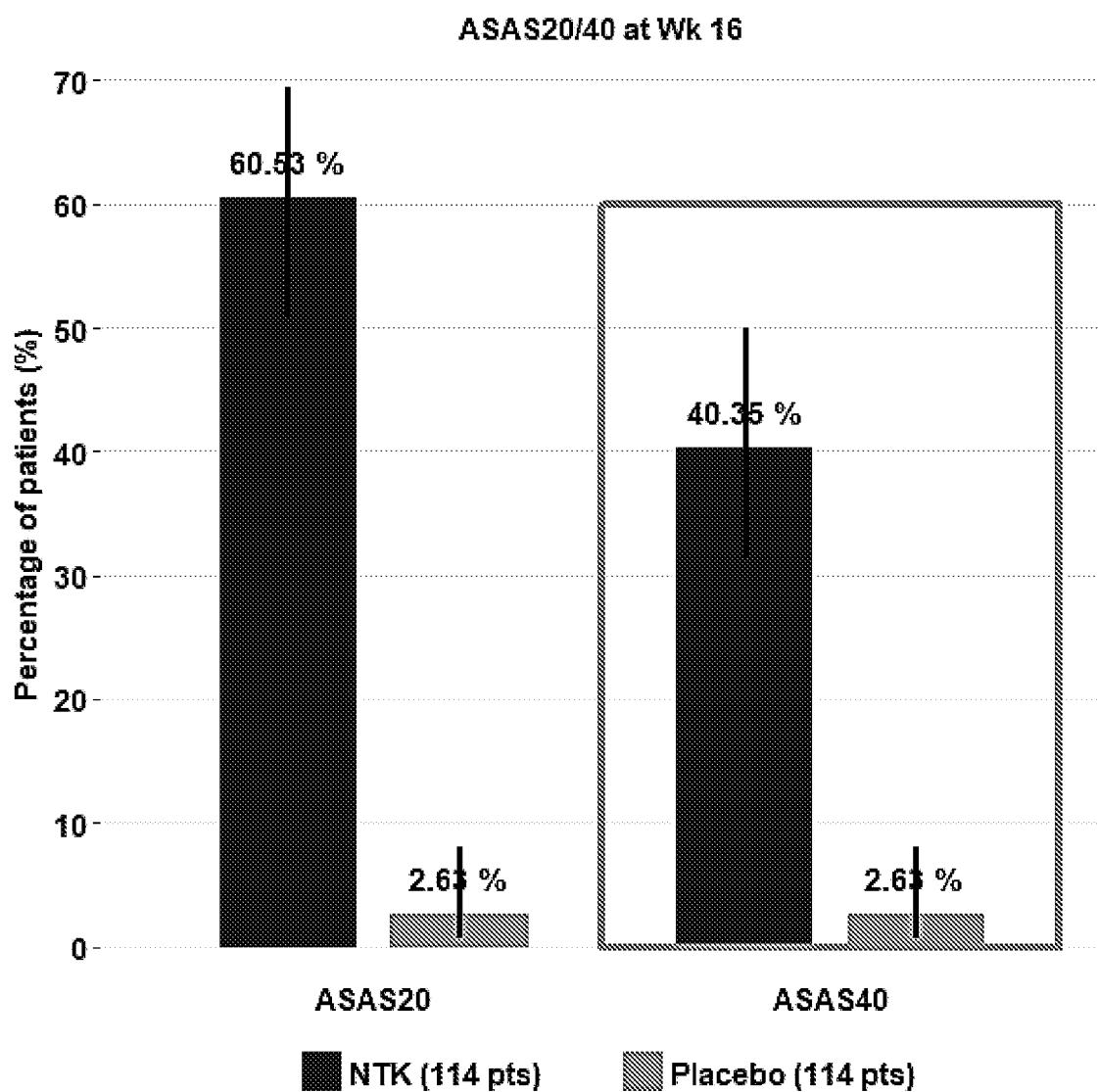
FIG. 29 is a graph illustrating ASAS20/40 response rate (Week 16).
Figure 30:
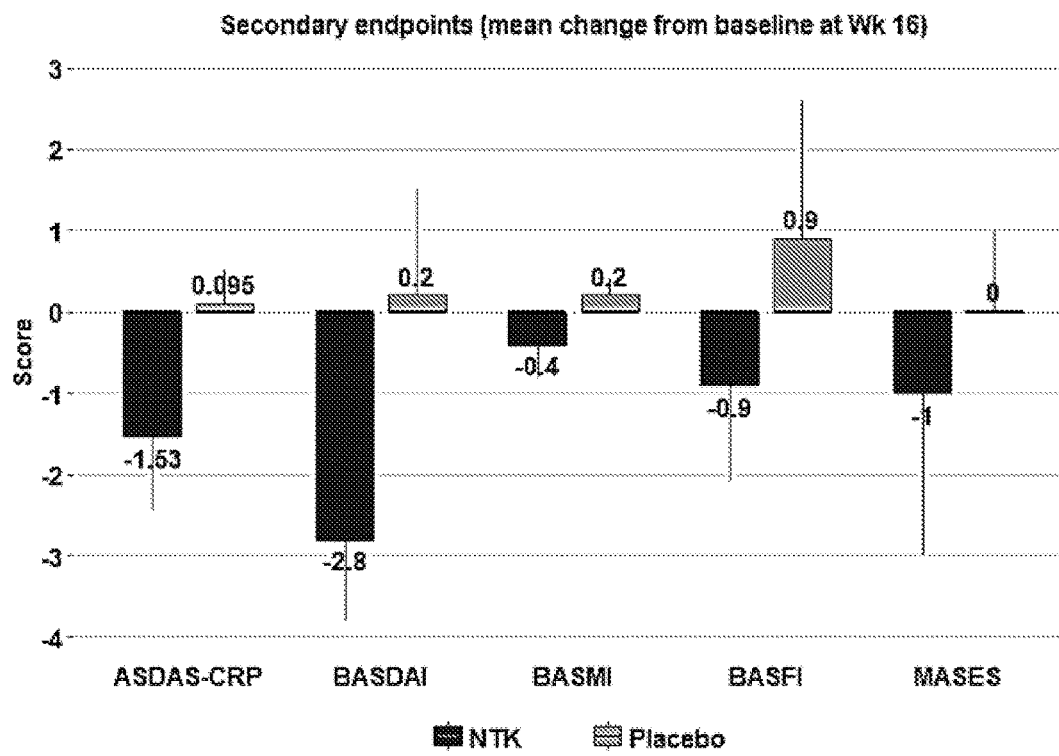
FIG. 30 is a graph illustrating main secondary endpoints (mean change from baseline at Week 16).

Baseline characteristics were similar between treatment arms. The mean age at baseline was 39.14±9.99 years, 75.88% of patients (pts) were male and the mean symptoms duration was 4.3±4.48 years. All patients had active AS (mean BASDAI: 6.21±1.55), 76.8% of patients were naive to any biological treatment. At week 16, ASAS40 response rate was higher in BCD-085 arm, compared to placebo arm: 40.35% versus (vs.) 2.63% pts respectively (95% CI for the difference in the ASAS40 response rate was [27.37%; 48.07%]($p<0.0001$, FIG. 29). Higher efficacy of BCD-085 was also proved by comparison of all other secondary efficacy endpoints (FIG. 30); improvement in BASDAI, MASES and BASFI became significant from Wk 4 and remained low during the study.

Figure 31:
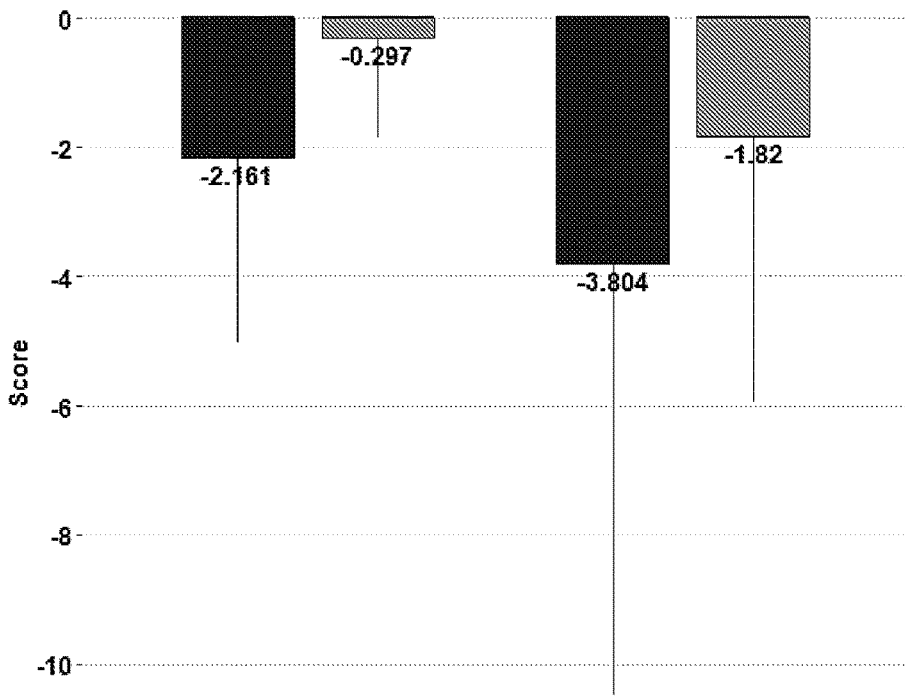
FIG. 31 is a graph illustrating the mean change from baseline in MRI scores.

Both arms were comparable in the Berlin spine score (4.18±4.58 in BCD-085 arm vs. 4.19±4.32 in placebo arm) and the SPARCC score (5.67±8.33 in BCD-085 arm vs. 5.23±7.86 in placebo arm) at baseline (p?0.05). Data analysis at week 16 revealed that BCD-085 arm achieved significant decline in bone marrow edema in direct comparison with placebo arm: by week 16 the mean change from baseline in the Berlin spine score was −2.16±2.87 in BCD-085 arm vs. −0.30±1.55 in placebo arm ($p<0.0001$) and the mean change from baseline in the SPARCC score was −3.80±6.68 in BCD-085 arm vs. −1.82±4.12 in placebo arm ($p<0.01$, FIG. 31).

Figure 32:
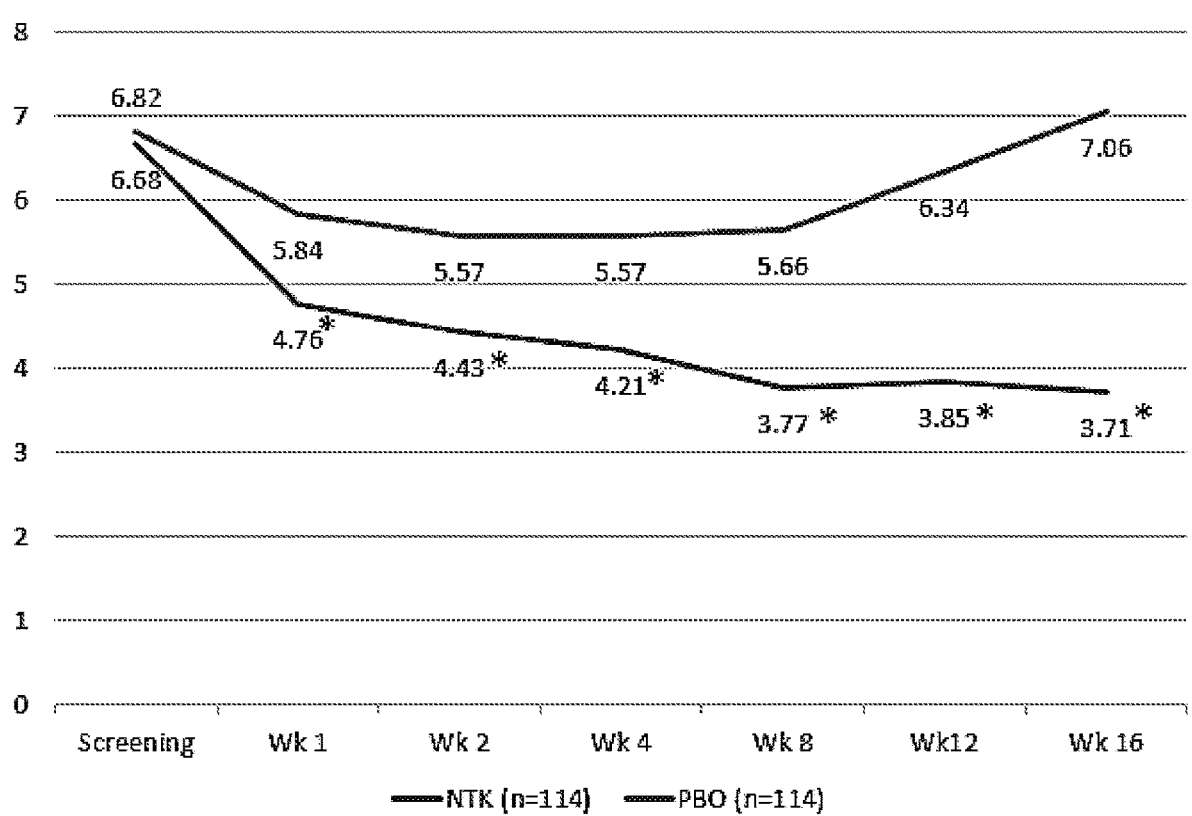
FIG. 32 is a graph illustrating total back pain score within 16 weeks of ASTERA study (means) (* P<0.05 for the comparison with placebo).
Figure 33:
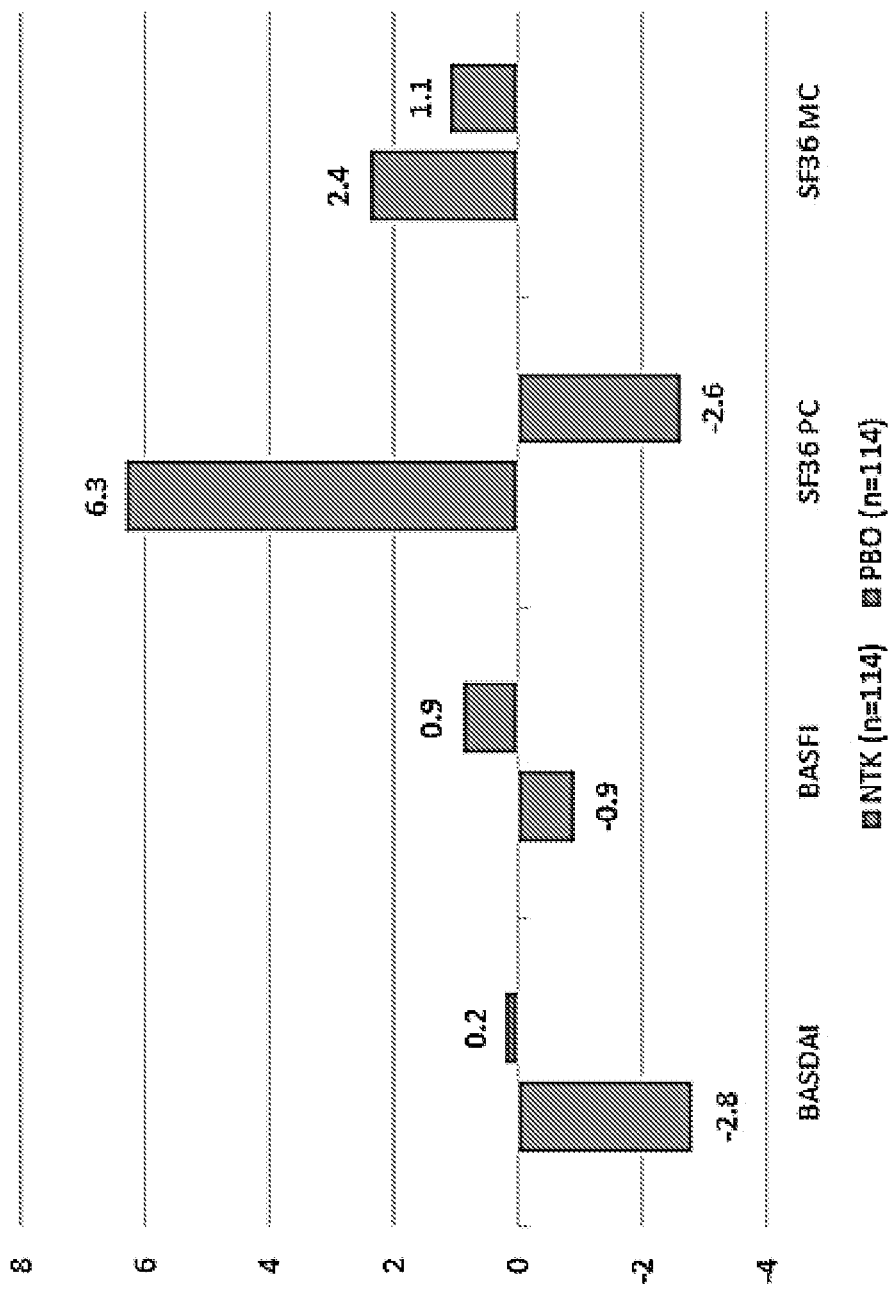
FIG. 33 is a graph illustrating Change in BASDAI, BASFI and QoL at Week 16 (means).

At week 1 the difference in total back pain score between study arms became statistically significant (FIG. 32). At week 16 use of BCD-085 was associated with statistically significant improvements from baseline in BASDAI (−2.8 vs 0.2, $p<0.0001$), BASFI (−0.9 vs 0.9, $p<0.0001$) and physical component of SF36 (6.3 vs. −2.6, $p<0.0001$) (FIG. 33). WPAI response in BCD-085 arm was significantly better at week 16, as compared with placebo (Table 43).

TABLE 43

Change in WPAI at week 16 (medians; upper and lower quartiles)

|  | BCD-085 (n = 114) | | Placebo (n = 114) | |
| --- | --- | --- | --- | --- |
| Parameter | Baseline | Change from baseline to Wk16 | Baseline | Change from baseline to Wk16 |
| % work time missed due to health | 0 [0; 18.4] | 0 [−11.1; 0] | 0 [0; 15.8] | 0 [0; 29.9] |
| % impairment while working due to health | 50 [30; 70] | −80 [−40; 0] | 50 [40; 70] | 10 [−10; 20] |

TABLE 43-continued

Change in WPAI at week 16 (medians; upper and lower quartiles)

| Parameter | BCD-085 (n = 114) | | Placebo (n = 114) | |
|---|---|---|---|---|
| | Baseline | Change from baseline to Wk16 | Baseline | Change from baseline to Wk16 |
| % overall work impairment due to health | 55.1 [40; 84] | −15.6 [−40; 0] | 60 [50; 75] | 1.2 [−10.3;20] |
| % activity impairment due to health | 60 [40; 80] | −20 [−40; −10] | 60 [50; 70] | 0 [−10; 20] |

Safety

Most reported adverse events (AE) and treatment-related adverse events (TRAE) were mild/moderate (Table 44). The most frequent AEs were anaemia, neutropenia and ALT increase. One serious adverse event (SAE) not related to the treatment (bone fracture, which required surgery), was reported in NTK arm.

TABLE 44

Summarized safety data

| Percentage of patients with | Arm | | |
|---|---|---|---|
| | BCD-085 (n = 114) | Placebo (n = 114) | p-value |
| Any AE/SAE | 33.33% (38) | 25.44% (29) | 0.245 |
| TRAE | 17.54% (20) | 14.04% (16) | 0.586 |

TABLE 44-continued

Summarized safety data

| Percentage of patients with | Arm | | |
|---|---|---|---|
| | BCD-085 (n = 114) | Placebo (n = 114) | p-value |
| Any SAE | 0.88% (1) | 0 | 1.00 |
| Grade 3-4 AEs | 2.63% (3) | 3.51% (4) | 1.00 |
| TRAE of grade 3-4 | 1.75% (2) | 1.75% (2) | 1.00 |
| Local reactions | 1.75% (2) | 0.88% (1) | 1.00 |

Netakimab up to a dose of 120 mg (e.g. doses suggested herein) is a well-tolerated drug with a favorable safety profile that leads to decline in AS activity, to improvement of function, axial mobility, MRI signs of inflammation and quality of life.

The invention claimed is:

1. An aqueous pharmaceutical composition suitable for parenteral administration to a subject for inhibiting IL17a protein activity comprising:
   a pharmaceutically effective amount of an anti-IL17a antibody comprising a VHH-derivative domain and a variable VL domain;
   a histidine-based buffering agent; and
   an effective amount of a sugar-based alcohol as an osmotic agent; wherein said anti-IL17a antibody is Netakimab and said sugar-based alcohol is Mannitol.

2. The aqueous pharmaceutical composition as defined in claim 1, wherein said Netakimab is of an amount of 5 mg/mL to 150 mg/mL.

3. The aqueous pharmaceutical composition as defined in claim 2, wherein said Netakimab is of an amount of 10 mg/mL to 100 mg/mL.

4. The aqueous pharmaceutical composition as defined in claim 3, wherein said Netakimab is of an amount of 40 mg/mL, 60 mg/mL or 70 mg/mL.

5. The aqueous pharmaceutical composition as defined claim 1, wherein said Mannitol is in an amount of 25-60 mg/mL.

6. The aqueous pharmaceutical composition as defined in claim 1, wherein a suitable amount of said histidine-based buffering agent is added to reach a pH of around 5.5 to around 6.5.

7. The aqueous pharmaceutical composition as defined in claim 6, wherein said buffering agent is composed of:
   an amount of 0.4 mg/mL to 1.6 mg/mL of L-histidine; and
   an amount of 0.4 mg/mL to 1.6 mg/mL of histidine hydrochloride monohydrate.

8. The aqueous pharmaceutical composition as defined in claim 1, further comprising a suitable solubilizer.

9. The aqueous pharmaceutical composition as defined in claim 8, wherein said solubilizer is Poloxamer 188.

10. The aqueous pharmaceutical composition as defined in claim 9, wherein said Poloxamer 188 is in an amount greater than 0 mg/mL but equal to or less than 1 mg/mL.

11. An aqueous pharmaceutical composition suitable for parenteral administration to a subject for inhibiting IL17a protein activity comprising:
   a pharmaceutically effective amount of an anti-IL17a antibody comprising a VHH-derivative domain and a variable VL domain;
   an acetate-based buffering agent; and
   a disaccharide as an osmotic agent; wherein said anti-IL17a antibody is Netakimab and said disaccharide is trehalose.

12. The aqueous pharmaceutical composition as defined in claim 11, wherein said Netakimab is of an amount of 5 mg/mL to 150 mg/mL.

13. The aqueous composition as defined in claim 11, wherein said Netakimab is of an amount of 10 mg/mL to 120 mg/mL.

14. The aqueous pharmaceutical composition as defined in claim 11, wherein said Netakimab is of an amount of 60 mg/mL, 100 mg/mL or 120 mg/mL.

15. The aqueous pharmaceutical composition as defined in claim 11, wherein said trehalose is added to said composition as trehalose dihydrate in an amount of 50 mg/mL to 120 mg/mL.

16. The aqueous pharmaceutical composition as defined in claim 11, wherein said amount of acetate-based buffering agent is composed of:
   0.4 mg/mL to 1.8 mg/mL of sodium acetate trihydrate; and
   a suitable amount of acetic acid to reach a pH of said composition inclusively between 4.0-6.0.

17. The aqueous pharmaceutical composition as defined in claim 16, further comprising a suitable solubilizer.

18. The aqueous pharmaceutical composition as defined in claim 17, wherein said solubilizer is Poloxamer 188.

19. The aqueous pharmaceutical composition as defined in claim 18, wherein said Poloxamer 188 is of an amount over 0 mg/mL to equal or under 1.0 mg/mL.

20. An aqueous pharmaceutical composition as defined in claim 18 comprising:
   Netakimab 60 mg/mL,
   Sodium acetate trihydrate 1.74 mg/mL,
   Trehalose dihydrate 80 mg/mL, and
   Acetic acid glac. to pH 5.0, wherein the pH of the composition is 5.0±0.5, or
   Netakimab 60 mg/mL,
   Sodium acetate trihydrate 1.74 mg/mL,
   Trehalose dihydrate 80 mg/mL,
   Poloxamer 188 0-1 mg/mL, and
   Acetic acid glac. to pH 5.0, wherein the pH of the composition is 5.0±0.5.

21. The aqueous pharmaceutical composition as defined in claim 20, wherein
   a) said Poloxamer 188 is of an amount of 0.5 mg/mL; or
   b) said Poloxamer 188 is of an amount of 1 mg/mL.

22. An aqueous pharmaceutical composition as defined in claim 18 comprising:
   Netakimab 120 mg/mL,
   Sodium acetate trihydrate 1.74 mg/mL,
   Trehalose dihydrate 80 mg/mL, and
   Acetic acid glac. to pH 5.0, wherein the pH of the composition is 5.0±0.5, or
   Netakimab 120 mg/mL,
   Sodium acetate trihydrate 1.74 mg/mL,
   Trehalose dihydrate 80 mg/mL,
   Poloxamer 188 0-1 mg/mL, and
   Acetic acid glac. to pH 5.0, wherein the pH of the composition is 5.0±0.5.

23. The aqueous pharmaceutical composition as defined in claim 22, wherein
   a) said Poloxamer 188 is of an amount of 0.5 mg/mL; or
   b) said Poloxamer 188 is of an amount of 1 mg/mL.

\* \* \* \* \*

SEQUENCE LISTING

```
<160> NUMBER OF SEQ ID NOS: 6

<210> SEQ ID NO 1
<211> LENGTH: 9
<212> TYPE: PRT
<213> ORGANISM: Chinese hamster

<400> SEQUENCE: 1

Gly Thr Phe Ala Thr Ser Pro Met Gly
1               5

<210> SEQ ID NO 2
<211> LENGTH: 17
<212> TYPE: PRT
<213> ORGANISM: Chinese hamster

<400> SEQUENCE: 2

Ala Ile Ser Pro Ser Gly Gly Asp Arg Ile Tyr Ala Asp Ser Val Lys
1               5                   10                  15

Gly

<210> SEQ ID NO 3
<211> LENGTH: 19
<212> TYPE: PRT
<213> ORGANISM: Chinese hamster

<400> SEQUENCE: 3

Cys Ala Val Arg Arg Arg Phe Asp Gly Thr Ser Tyr Tyr Thr Gly Asp
1               5                   10                  15
```

Tyr Asp Ser

<210> SEQ ID NO 4
<211> LENGTH: 109
<212> TYPE: PRT
<213> ORGANISM: Chinese hamster

<400> SEQUENCE: 4

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Asp Ala Ser Ser Arg Ala Thr Gly Ile Pro Asp Arg Phe Ser
50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Ser Tyr Ser Pro
                85                  90                  95

Val Thr Phe Gly Gln Gly Thr Lys Val Glu Ile Lys Arg
            100                 105

<210> SEQ ID NO 5
<211> LENGTH: 455
<212> TYPE: PRT
<213> ORGANISM: Chinese hamster
<220> FEATURE:
<223> OTHER INFORMATION: Heavy chain

<400> SEQUENCE: 5

Gln Val Gln Leu Val Gln Ser Gly Gly Gly Leu Val Gln Ala Gly Gly
1               5                   10                  15

Ser Leu Arg Leu Ser Cys Ala Ala Ser Gly Gly Thr Phe Ala Thr Ser
            20                  25                  30

Pro Met Gly Trp Leu Arg Gln Ala Pro Gly Lys Gly Thr Glu Phe Val
        35                  40                  45

Ala Ala Ile Ser Pro Ser Gly Gly Asp Arg Ile Tyr Ala Asp Ser Val
50                  55                  60

Lys Gly Arg Phe Thr Ile Ser Arg Asp Asn Ala Gly Tyr Phe Ile Tyr
65                  70                  75                  80

Leu Gln Met Asn Ser Leu Lys Pro Glu Asp Thr Ala Val Tyr Tyr Cys
                85                  90                  95

Ala Val Arg Arg Arg Phe Asp Gly Thr Ser Tyr Tyr Thr Gly Asp Tyr
            100                 105                 110

Asp Ser Trp Gly Gln Gly Thr Leu Val Thr Val Ser Ser Ala Ser Thr
        115                 120                 125

Lys Gly Pro Ser Val Phe Pro Leu Ala Pro Ser Ser Lys Ser Thr Ser
130                 135                 140

Gly Gly Thr Ala Ala Leu Gly Cys Leu Val Lys Asp Tyr Phe Pro Glu
145                 150                 155                 160

Pro Val Thr Val Ser Trp Asn Ser Gly Ala Leu Thr Ser Gly Val His
                165                 170                 175

Thr Phe Pro Ala Val Leu Gln Ser Ser Gly Leu Tyr Ser Leu Ser Ser
            180                 185                 190

Val Val Thr Val Pro Ser Ser Ser Leu Gly Thr Gln Thr Tyr Ile Cys

```
            195                 200                 205
Asn Val Asn His Lys Pro Ser Asn Thr Lys Val Asp Lys Arg Val Glu
210                 215                 220

Pro Lys Ser Cys Asp Lys Thr His Thr Cys Pro Pro Cys Pro Ala Pro
225                 230                 235                 240

Glu Leu Leu Gly Gly Pro Ser Val Phe Leu Phe Pro Pro Lys Pro Lys
                245                 250                 255

Asp Thr Leu Tyr Ile Thr Arg Glu Pro Glu Val Thr Cys Val Val Val
                260                 265                 270

Asp Val Ser His Glu Asp Pro Glu Val Lys Phe Asn Trp Tyr Val Asp
            275                 280                 285

Gly Val Glu Val His Asn Ala Lys Thr Lys Pro Arg Glu Glu Gln Tyr
        290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Ala Leu
                325                 330                 335

Pro Ala Pro Ile Glu Lys Thr Ile Ser Lys Ala Lys Gly Gln Pro Arg
                340                 345                 350

Glu Pro Gln Val Tyr Thr Leu Pro Pro Ser Arg Glu Glu Met Thr Lys
            355                 360                 365

Asn Gln Val Ser Leu Thr Cys Leu Val Lys Gly Phe Tyr Pro Ser Asp
370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Lys Leu Thr Val Asp Lys Ser Arg Trp Gln Gln Gly Asn Val Phe Ser
                420                 425                 430

Cys Ser Val Met His Glu Ala Leu His Asn His Tyr Thr Gln Lys Ser
            435                 440                 445

Leu Ser Leu Ser Pro Gly Lys
    450                 455

<210> SEQ ID NO 6
<211> LENGTH: 215
<212> TYPE: PRT
<213> ORGANISM: Chinese hamster
<220> FEATURE:
<223> OTHER INFORMATION: Light chain

<400> SEQUENCE: 6

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
                20                  25                  30

Tyr Leu Ala Trp Tyr Gln Gln Lys Pro Gly Gln Ala Pro Arg Leu Leu
            35                  40                  45

Ile Tyr Asp Ala Ser Ser Arg Ala Thr Gly Ile Pro Asp Arg Phe Ser
        50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Ser Tyr Ser Pro
                85                  90                  95

Val Thr Phe Gly Gln Gly Thr Lys Val Glu Ile Lys Arg Thr Val Ala
```

```
                    100                 105                 110
Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215
```